May 30, 1967 S. A. BLACK ETAL 3,322,595
TIRE CARCASS REMOVER
Original Filed Dec. 4, 1962 64 Sheets-Sheet 43

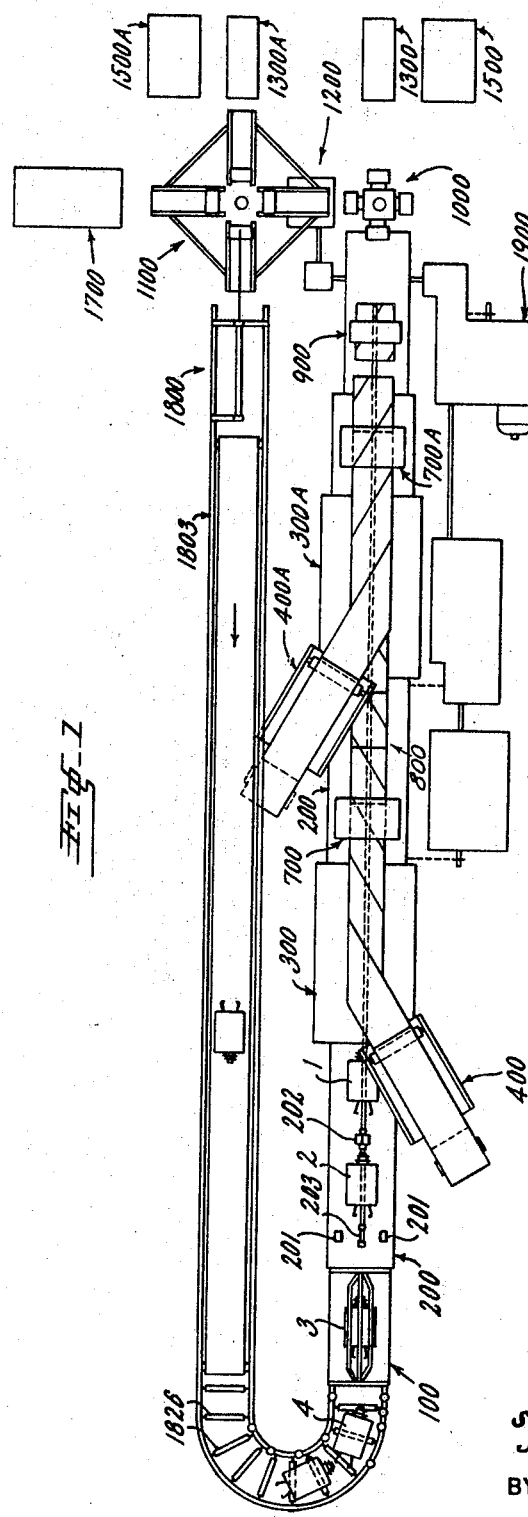

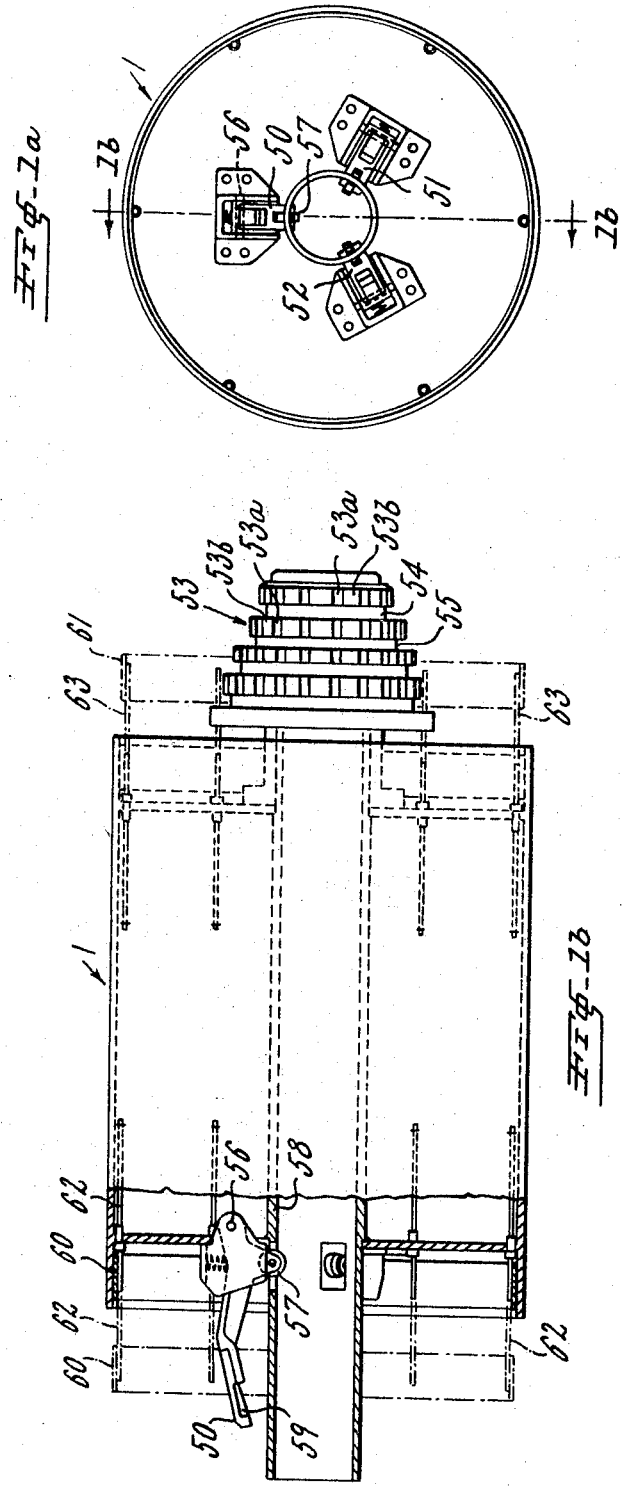

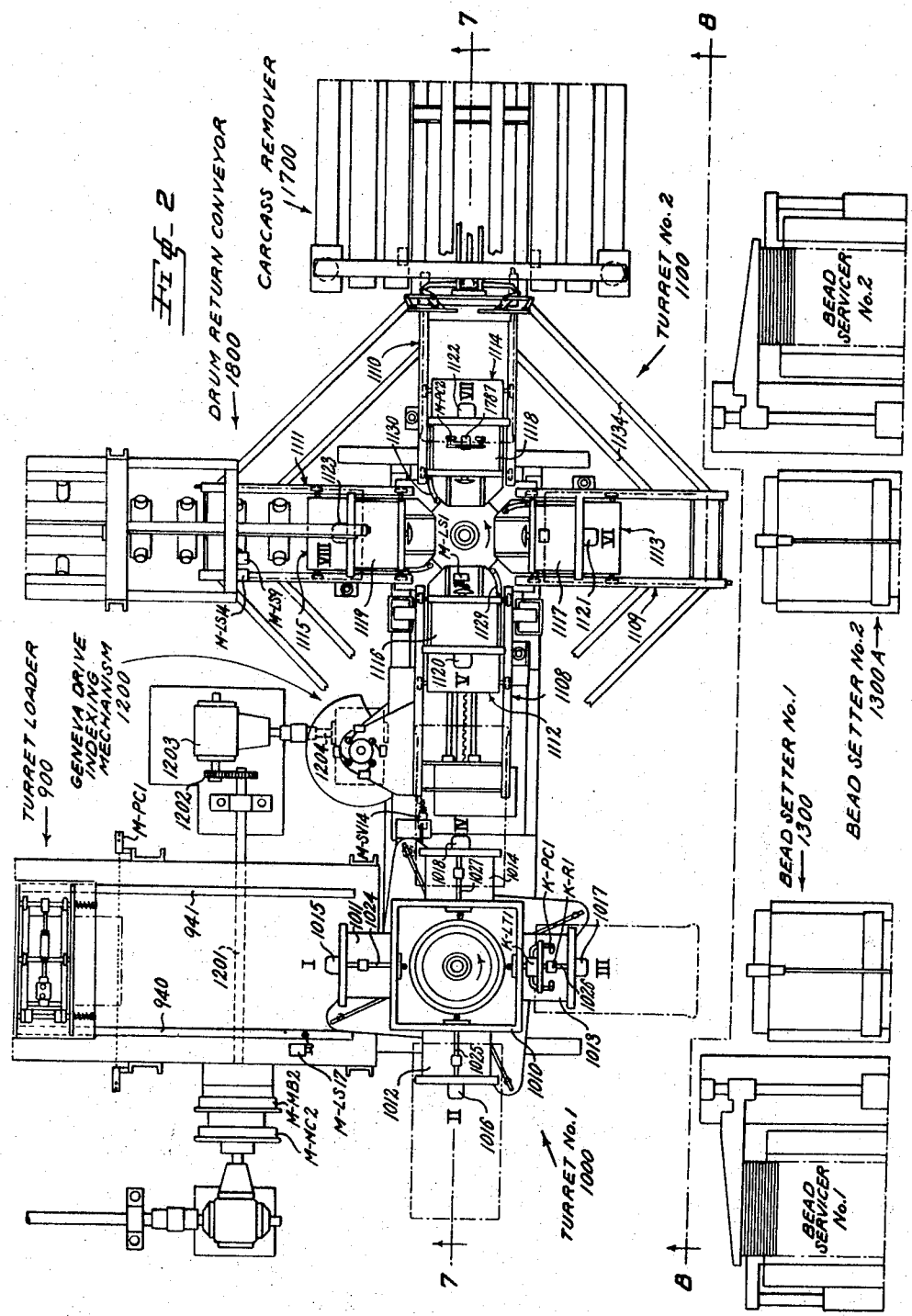

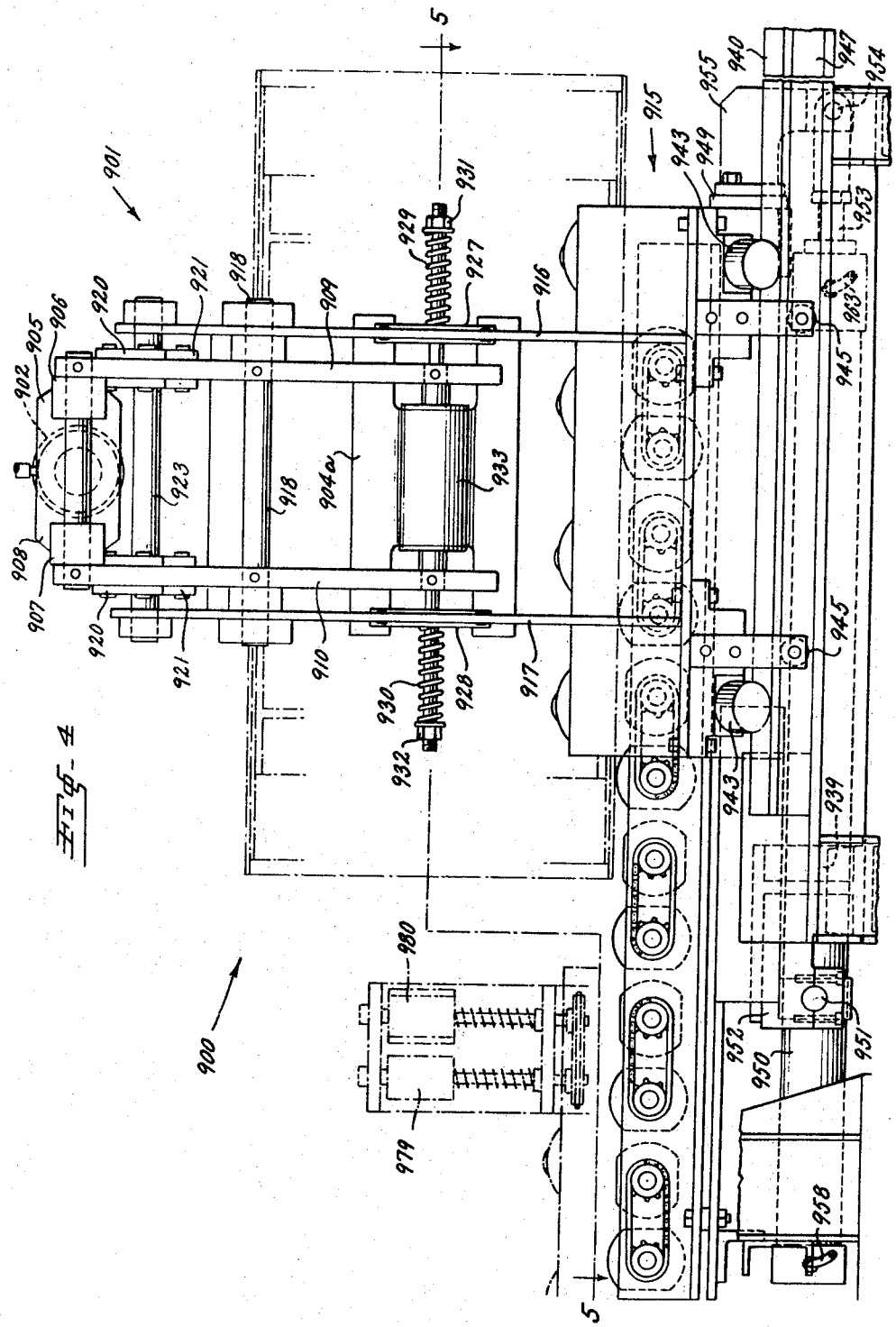

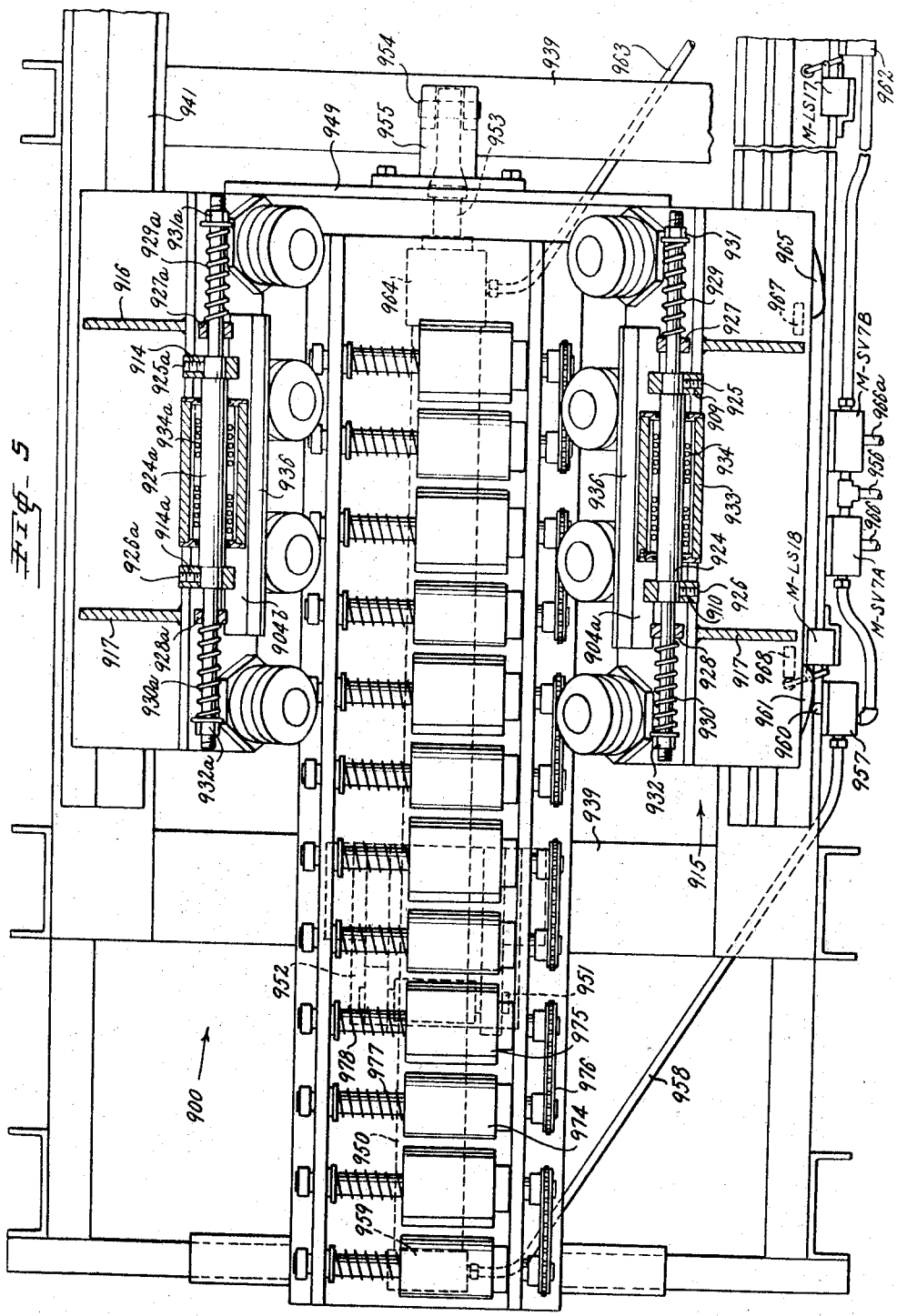

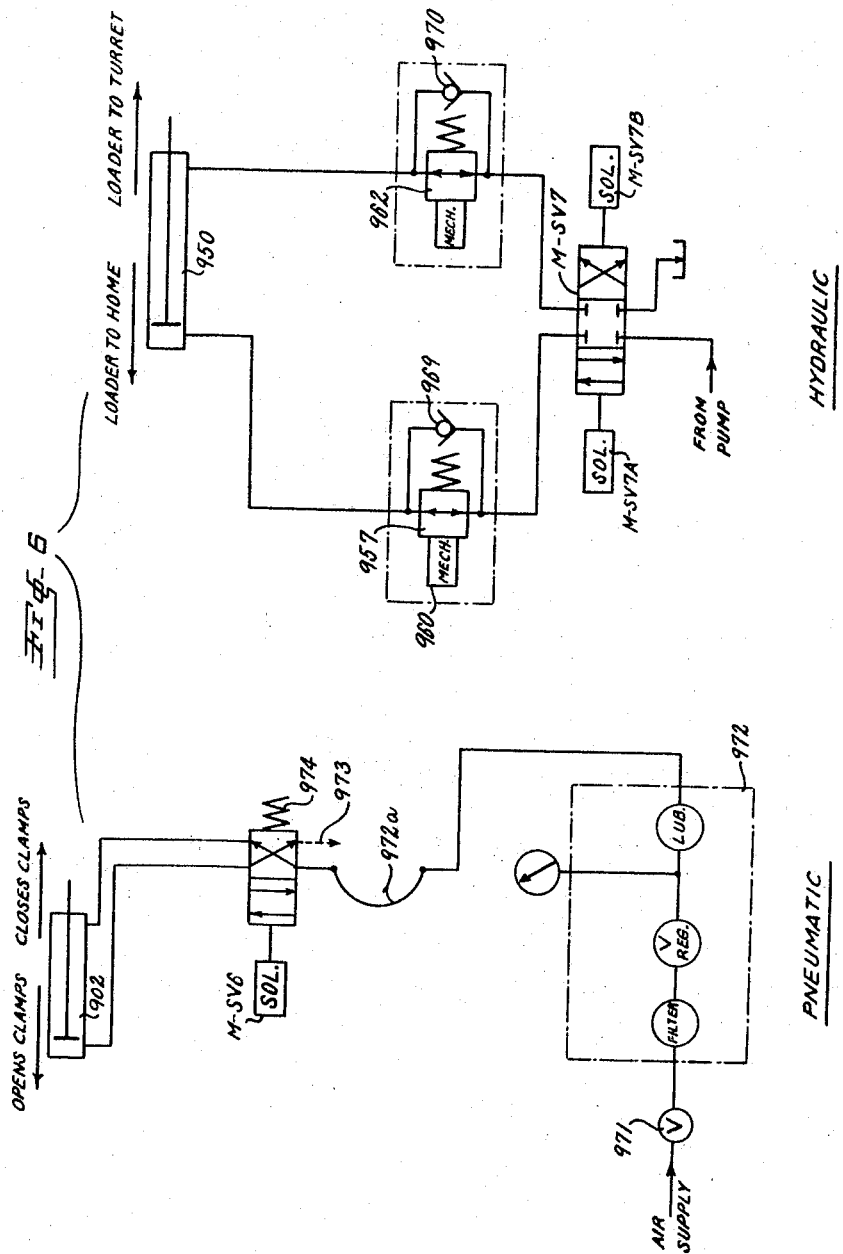

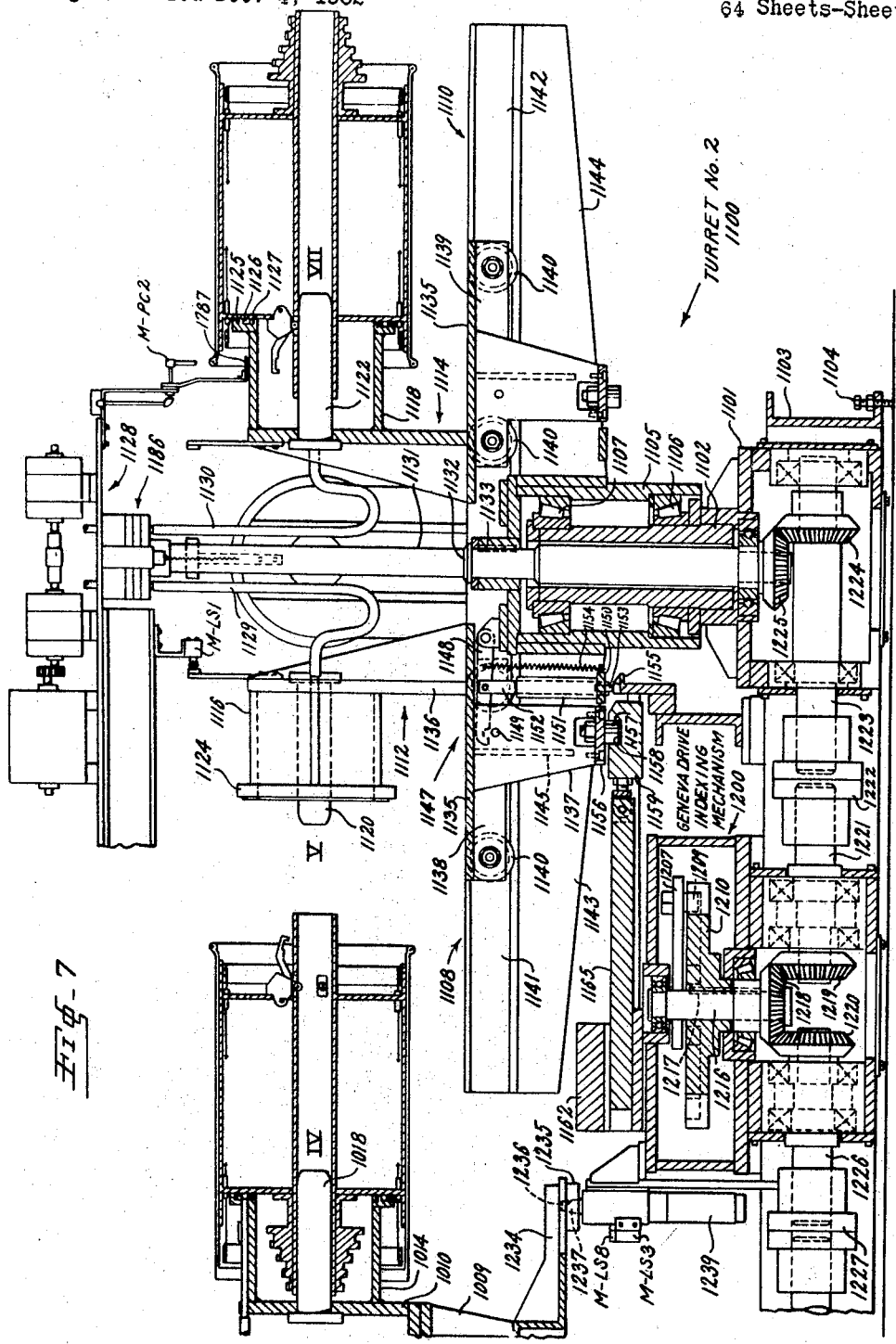

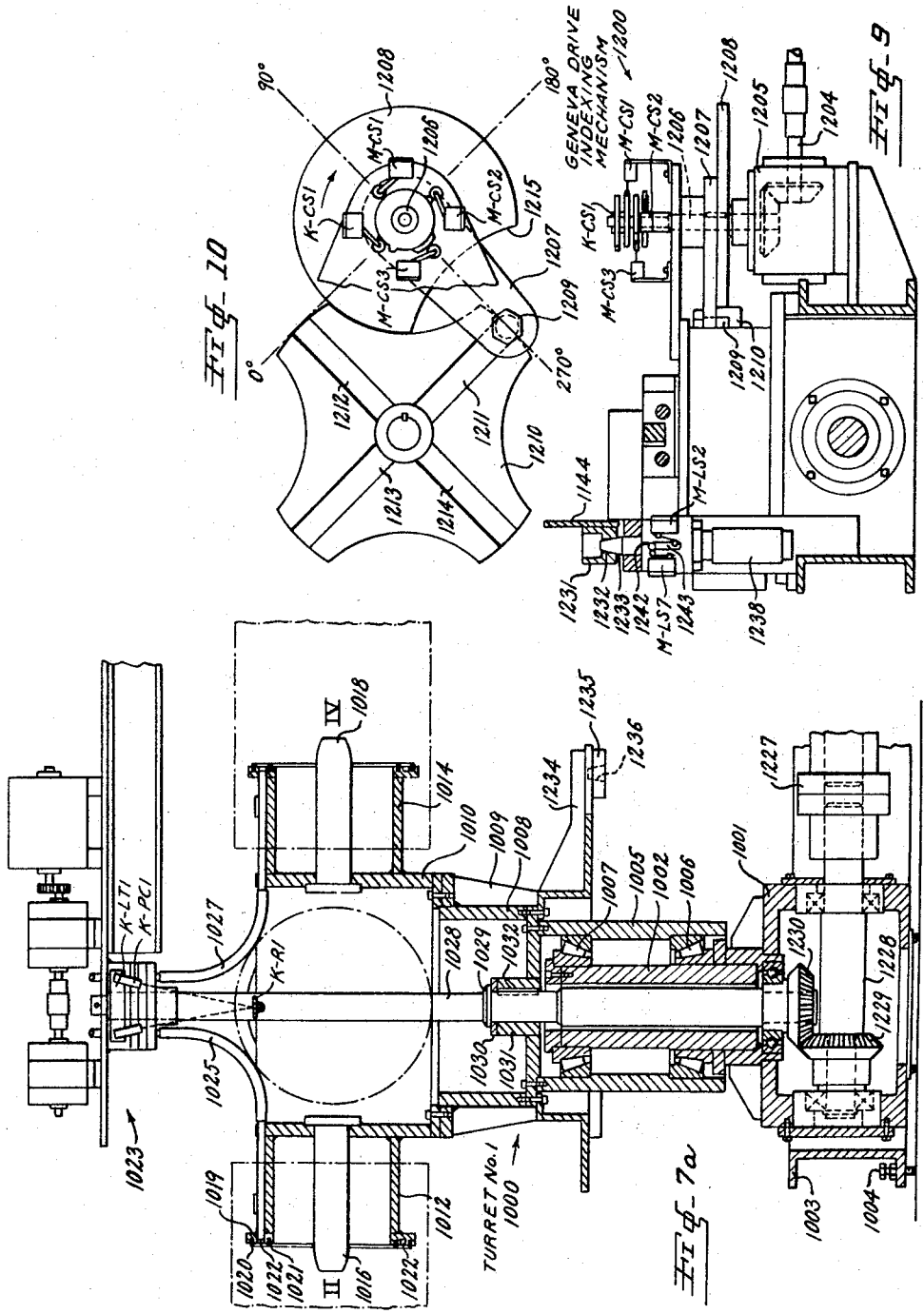

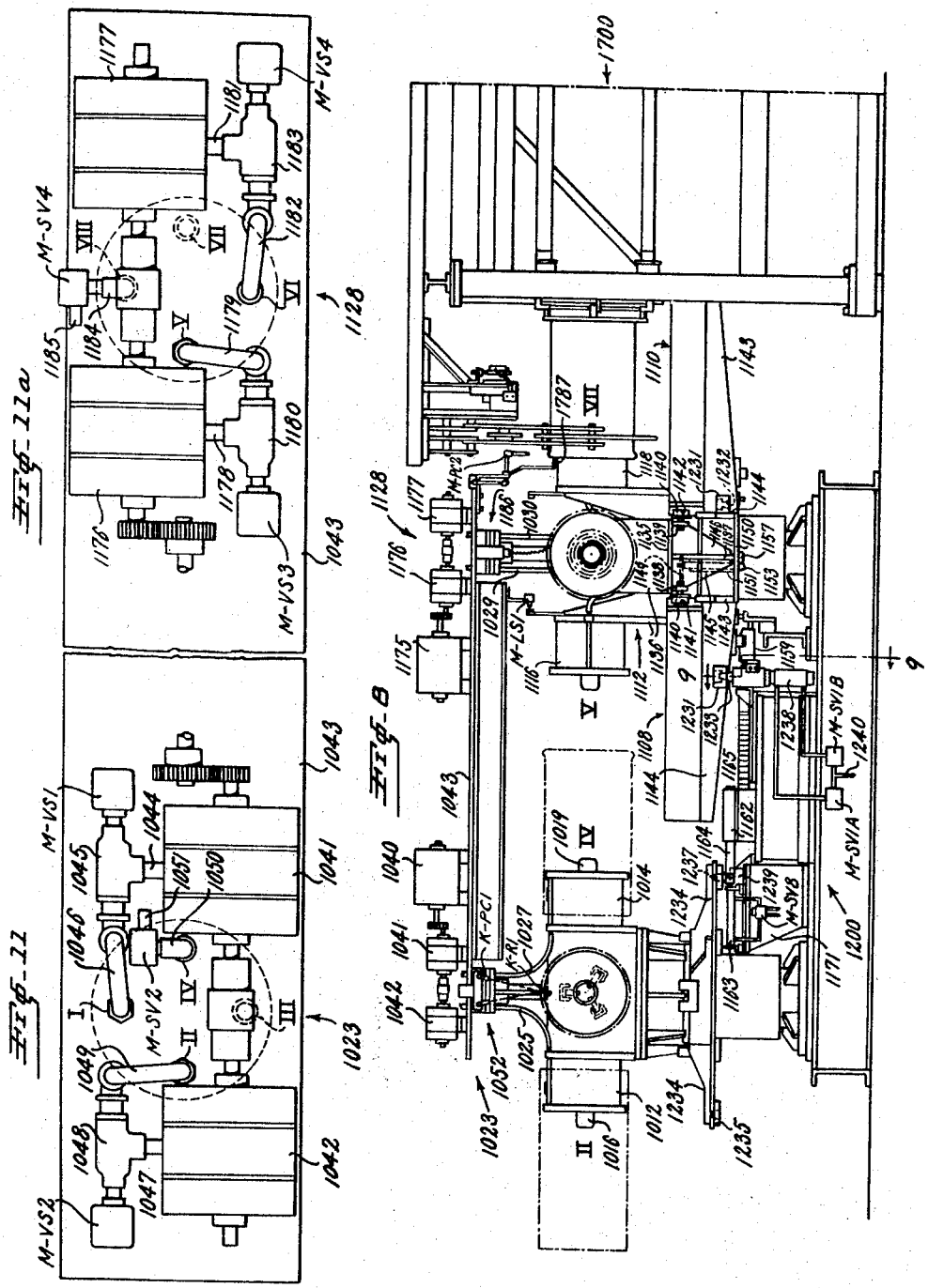

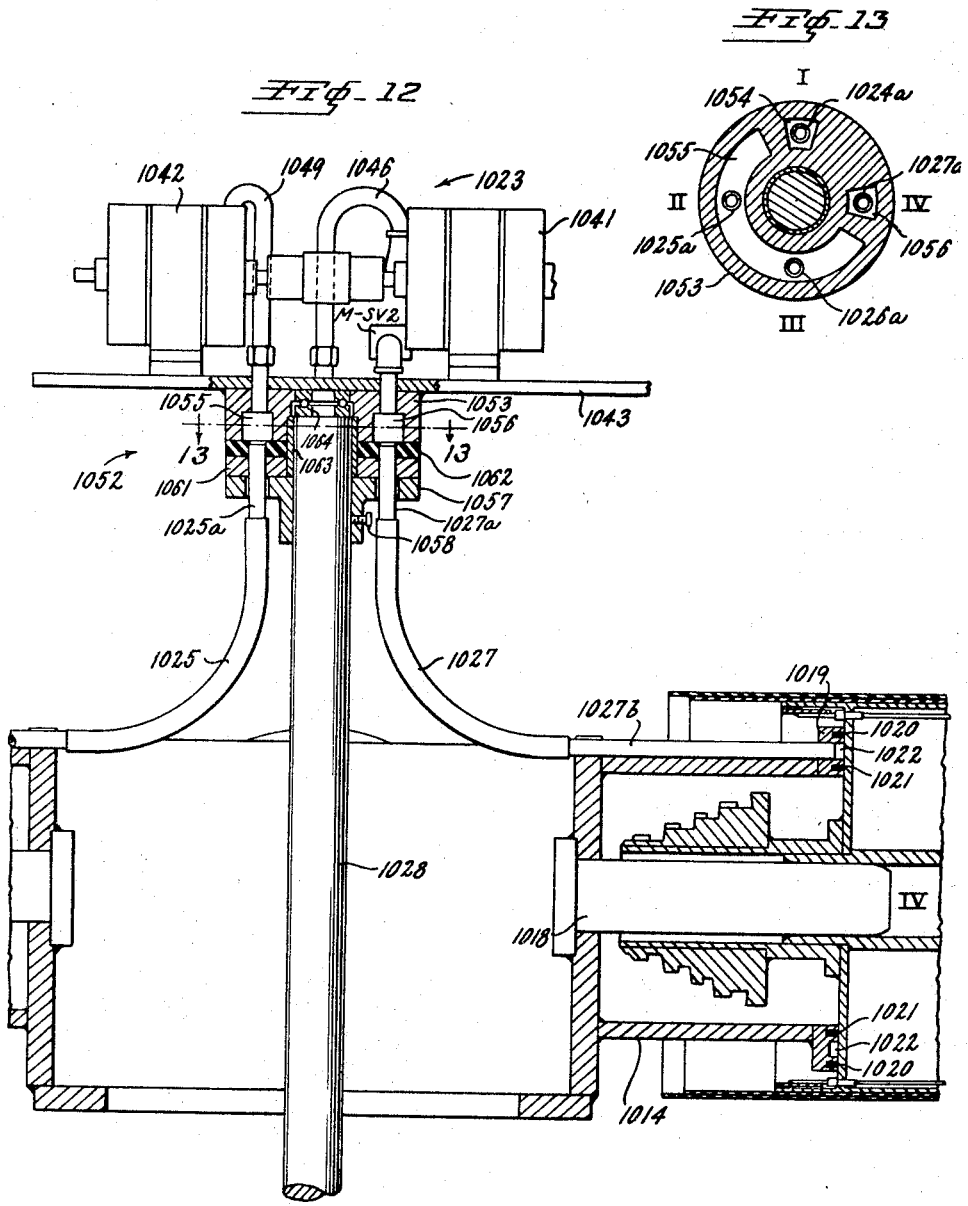

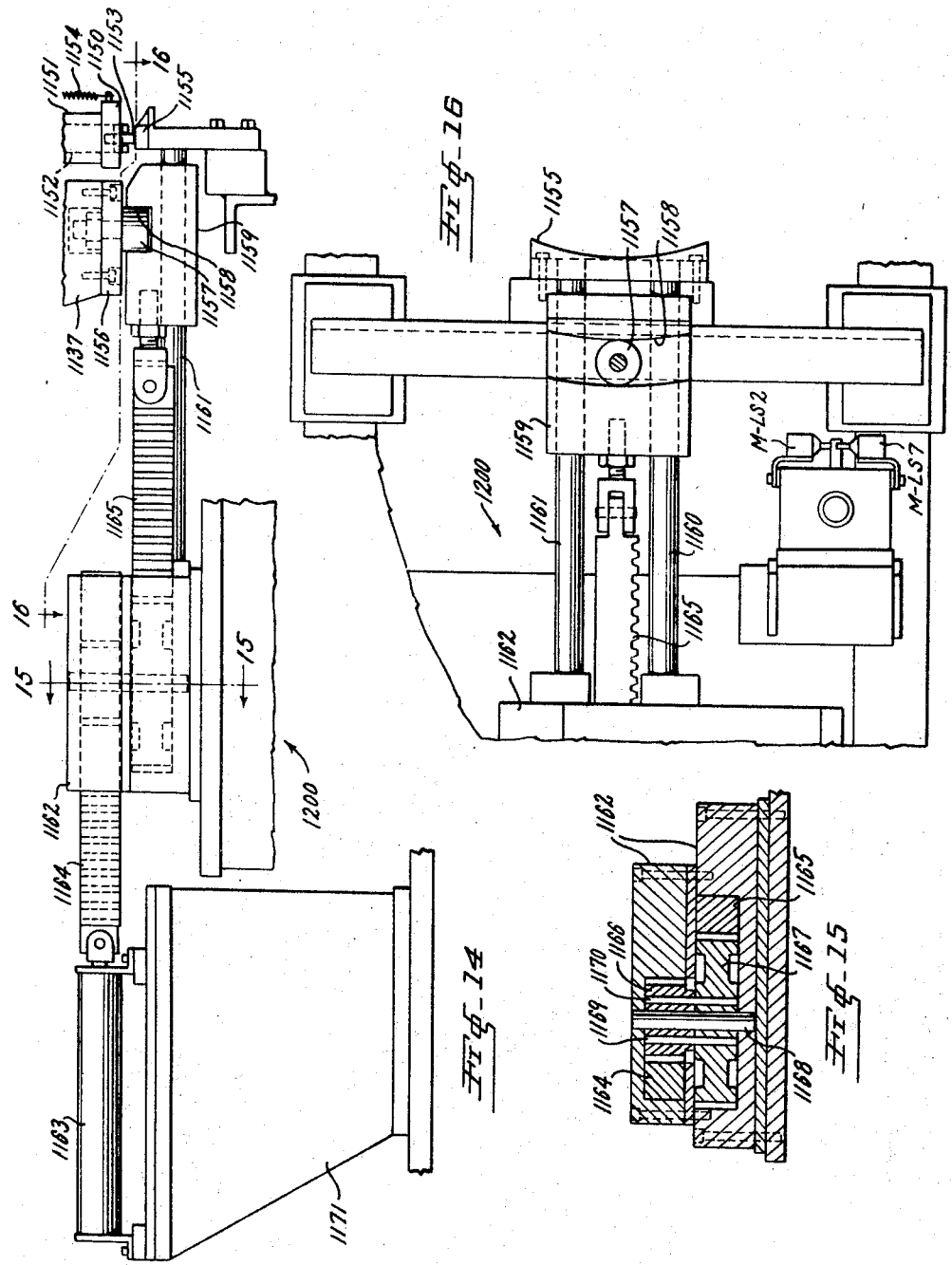

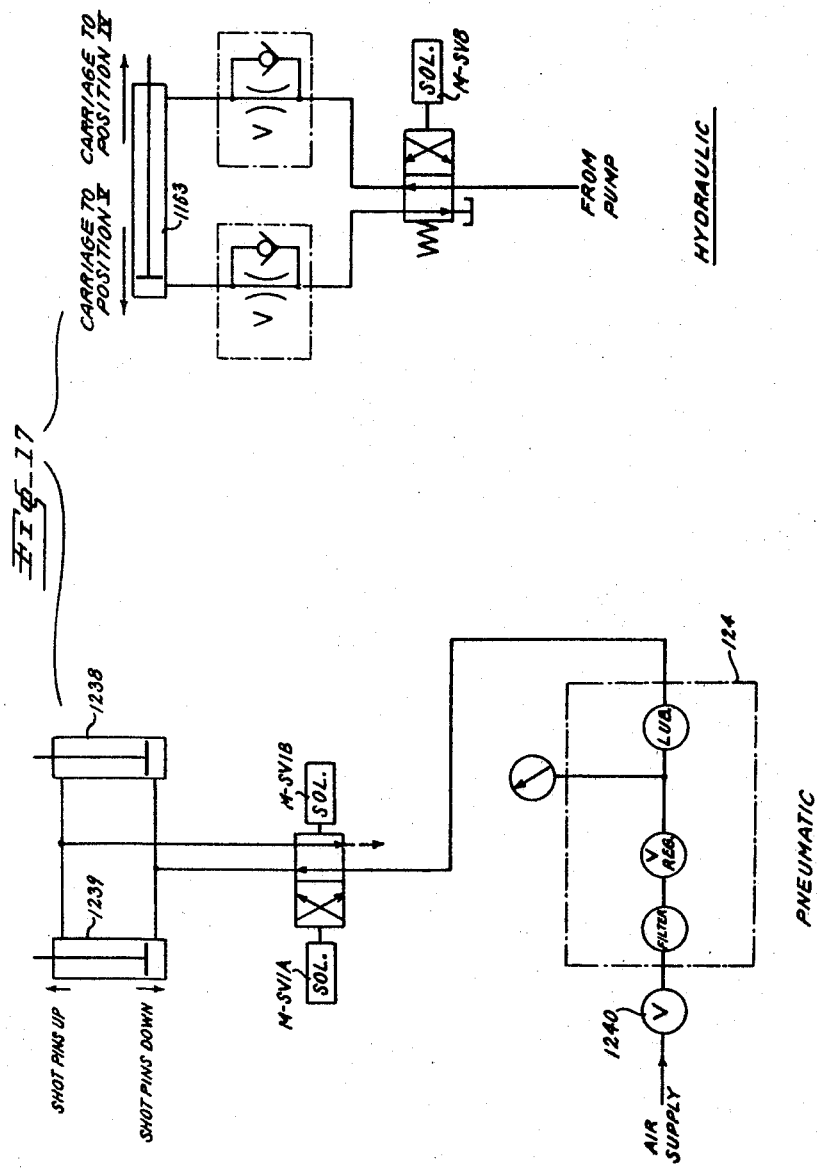

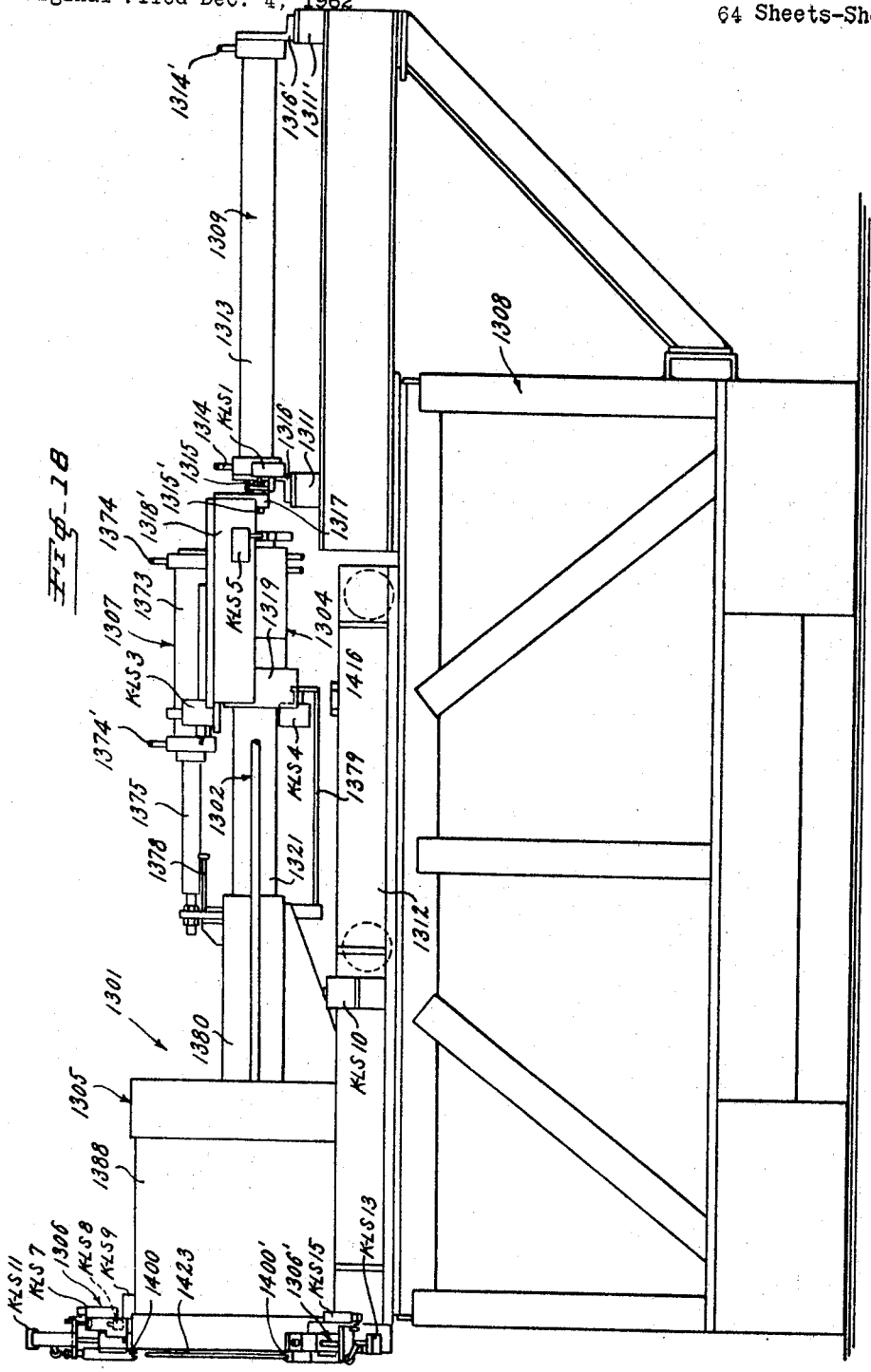

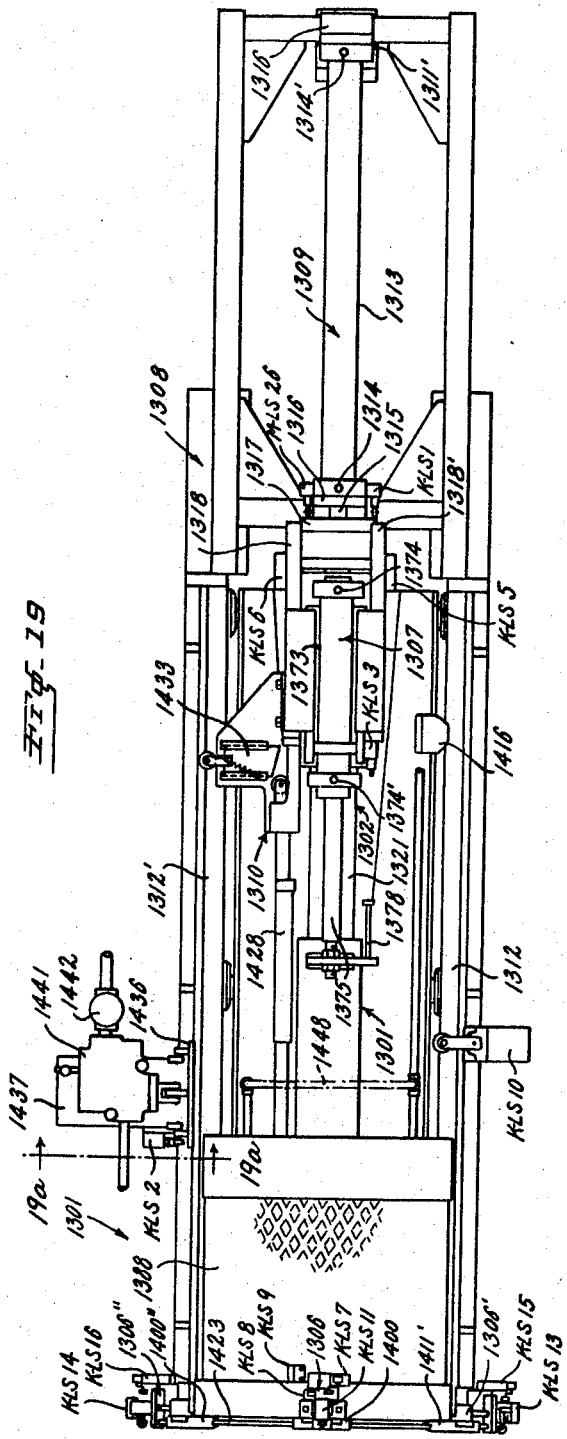

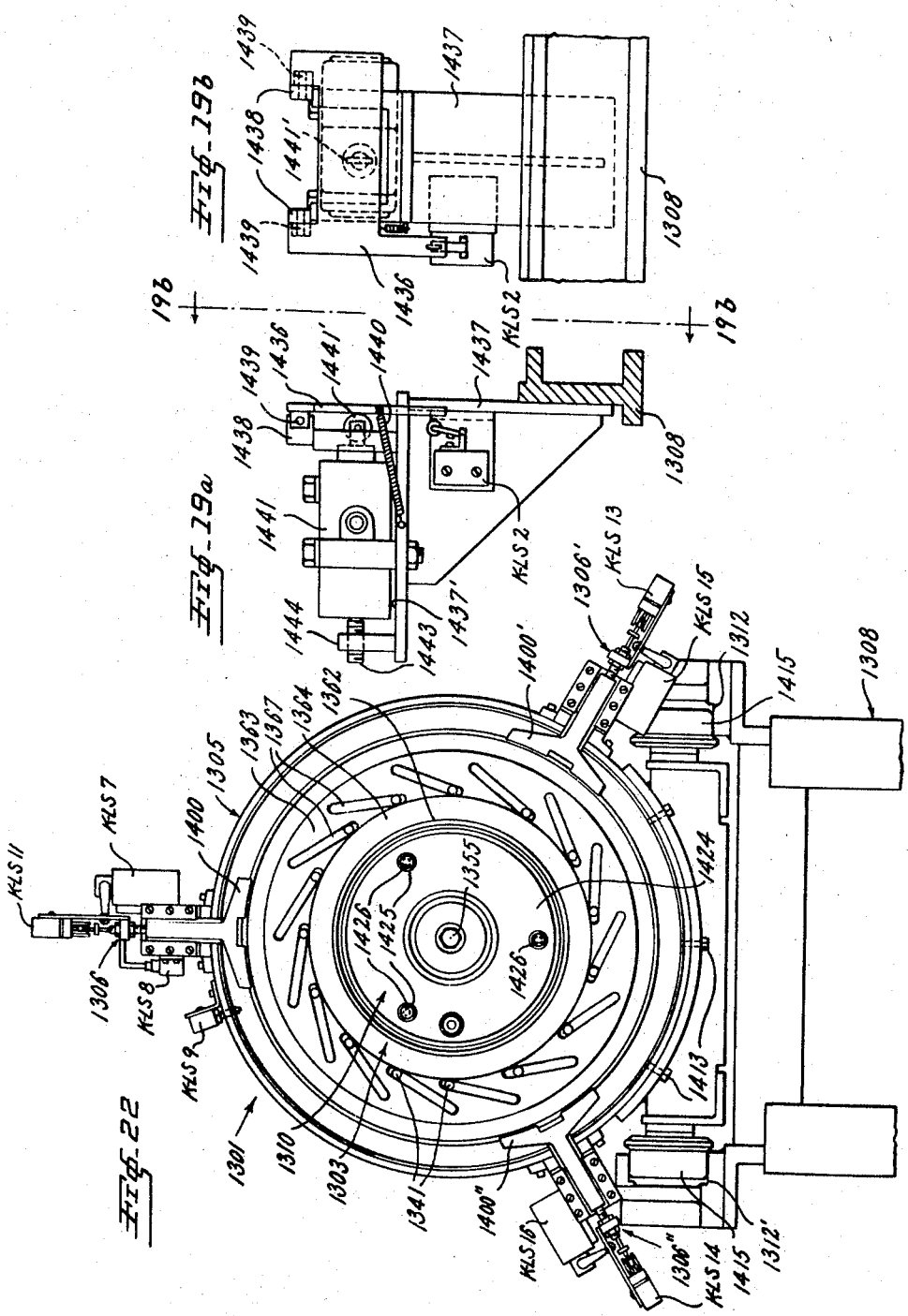

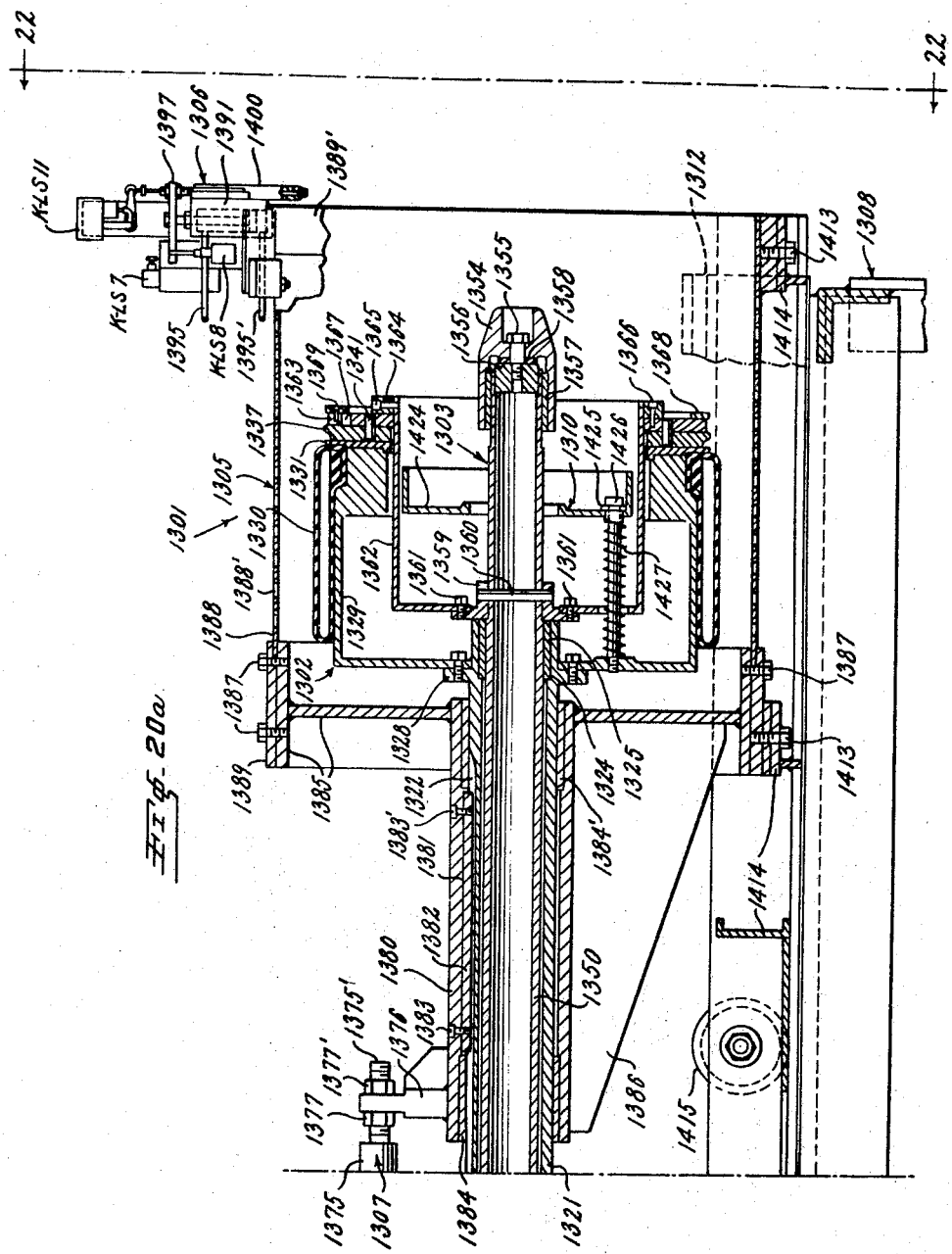

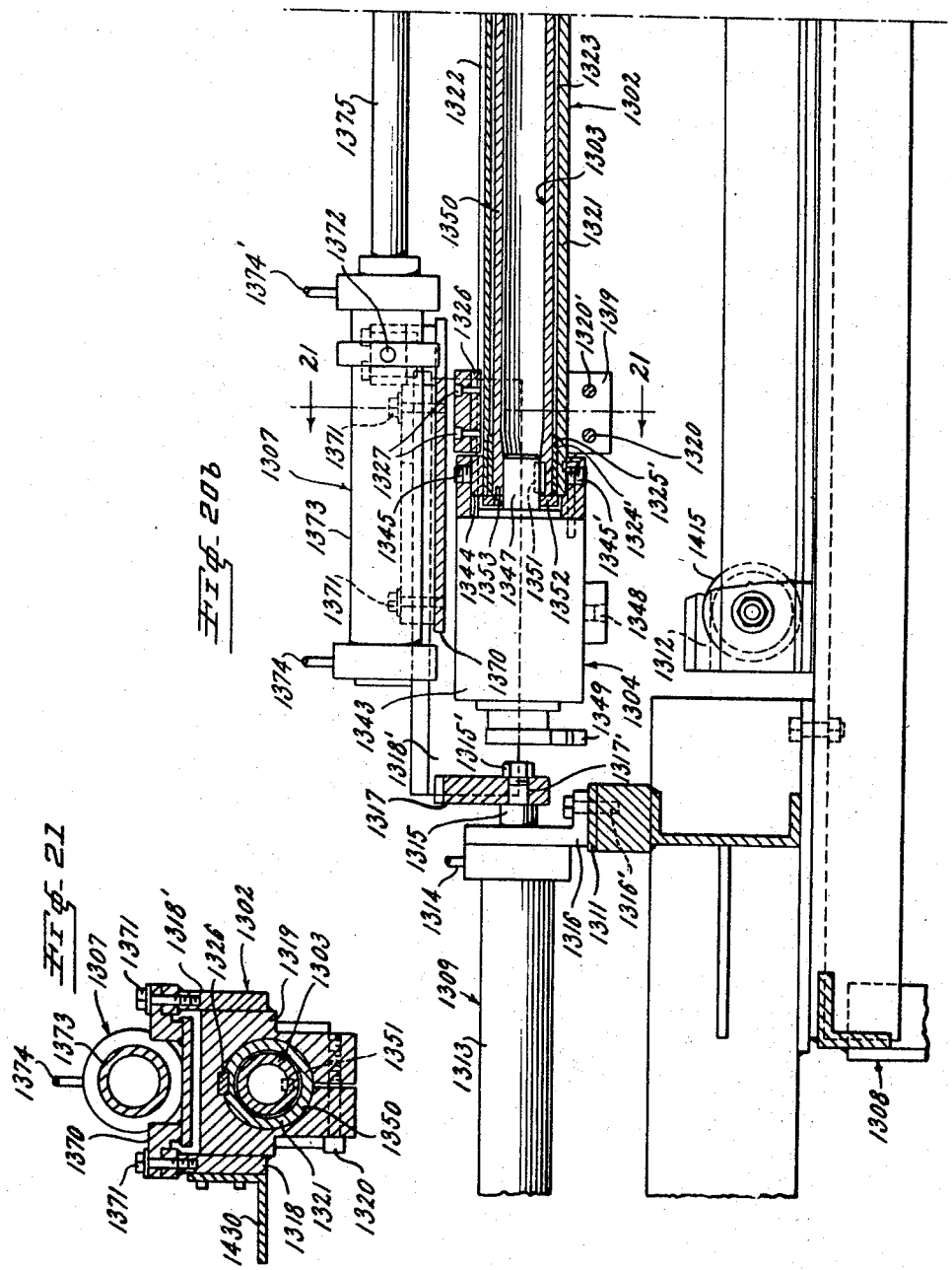

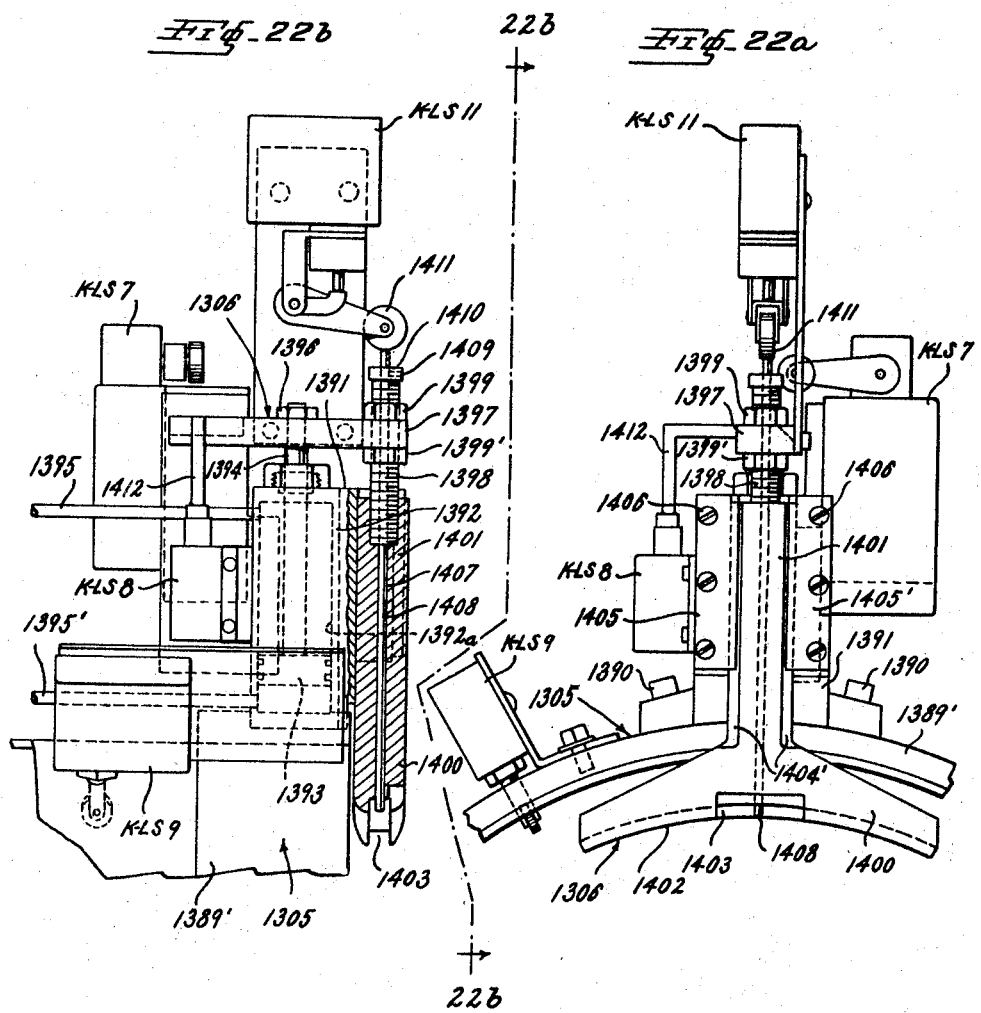

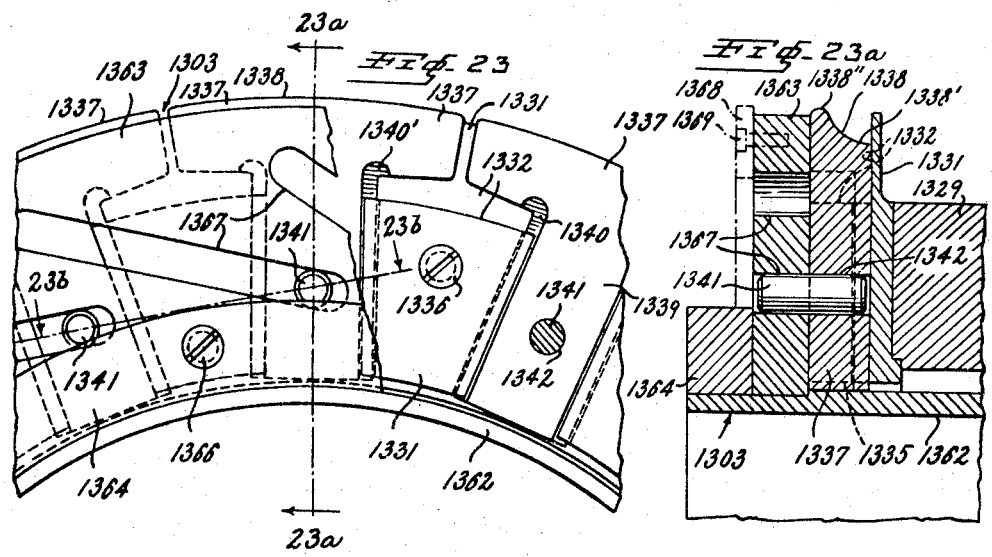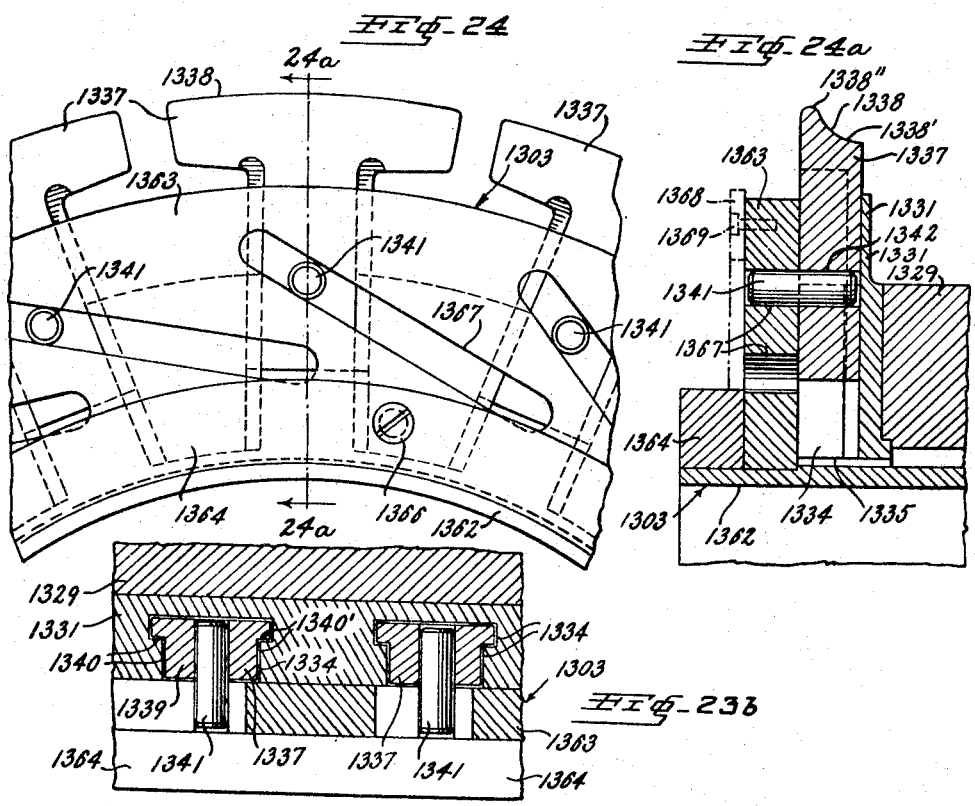

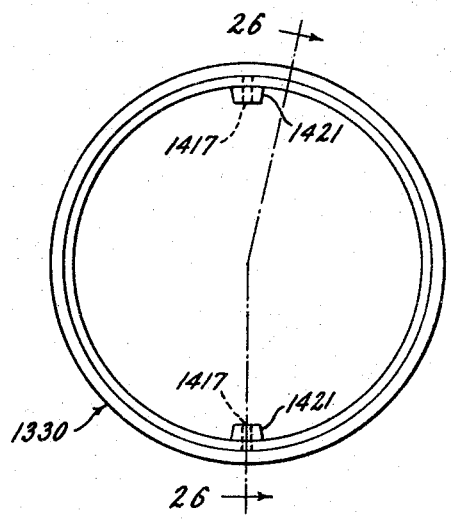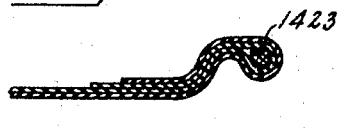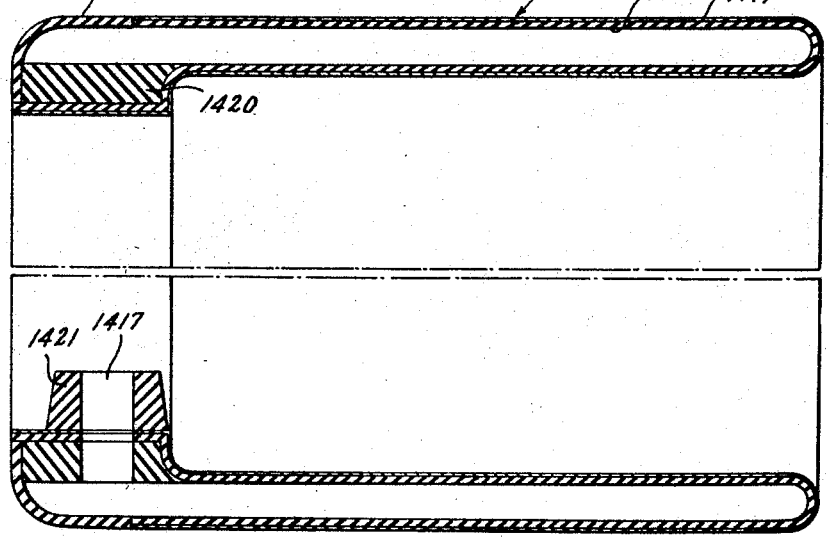

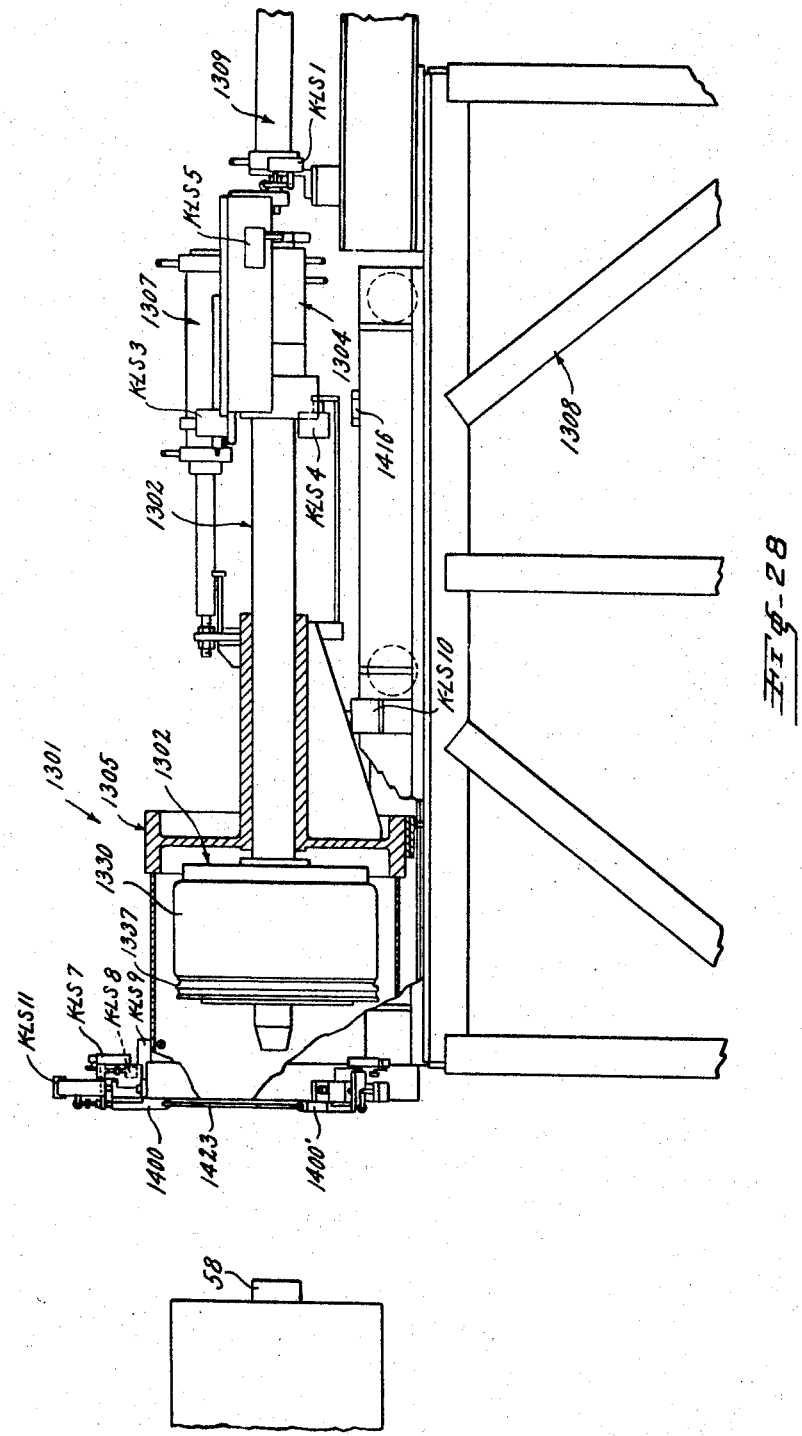

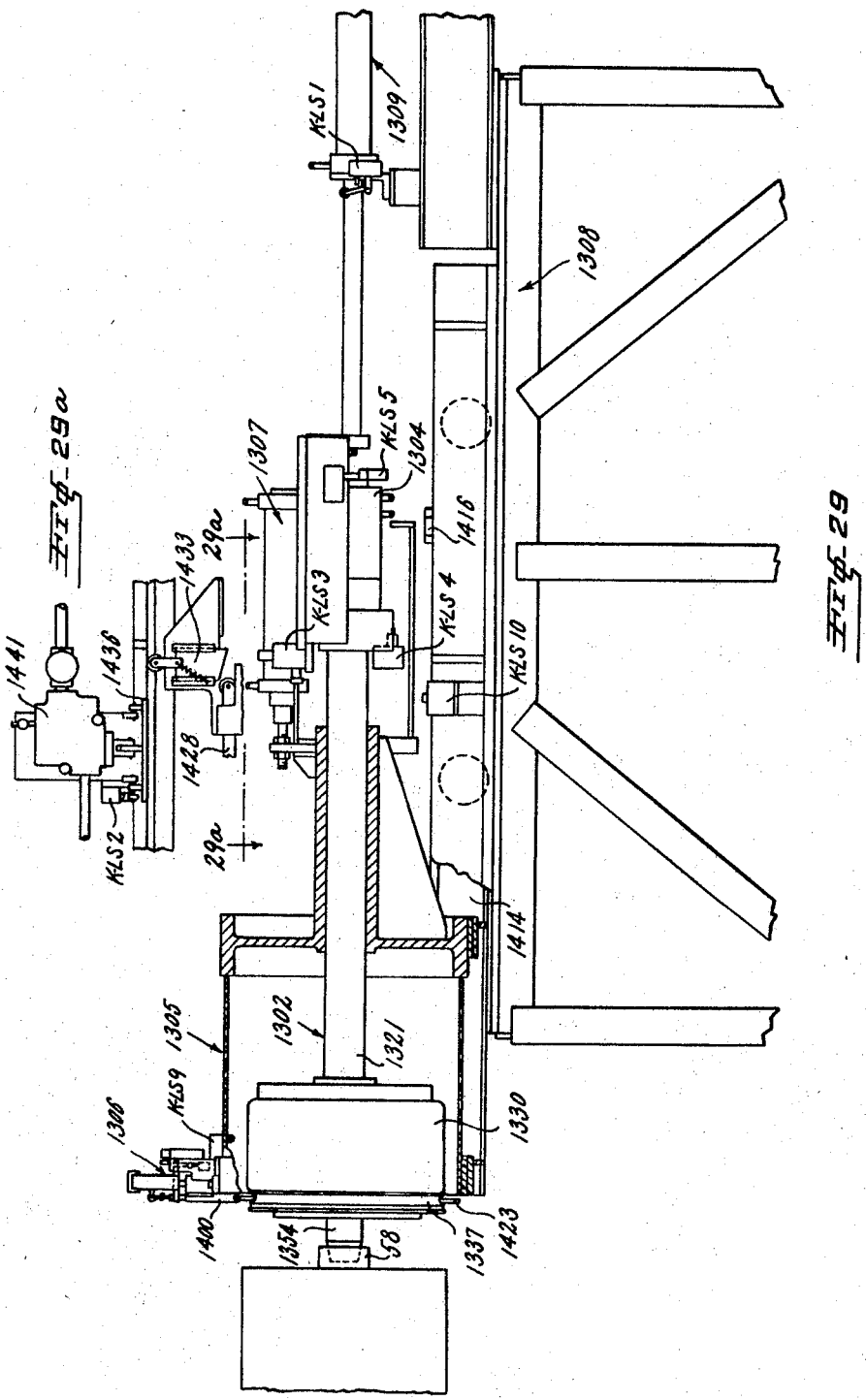

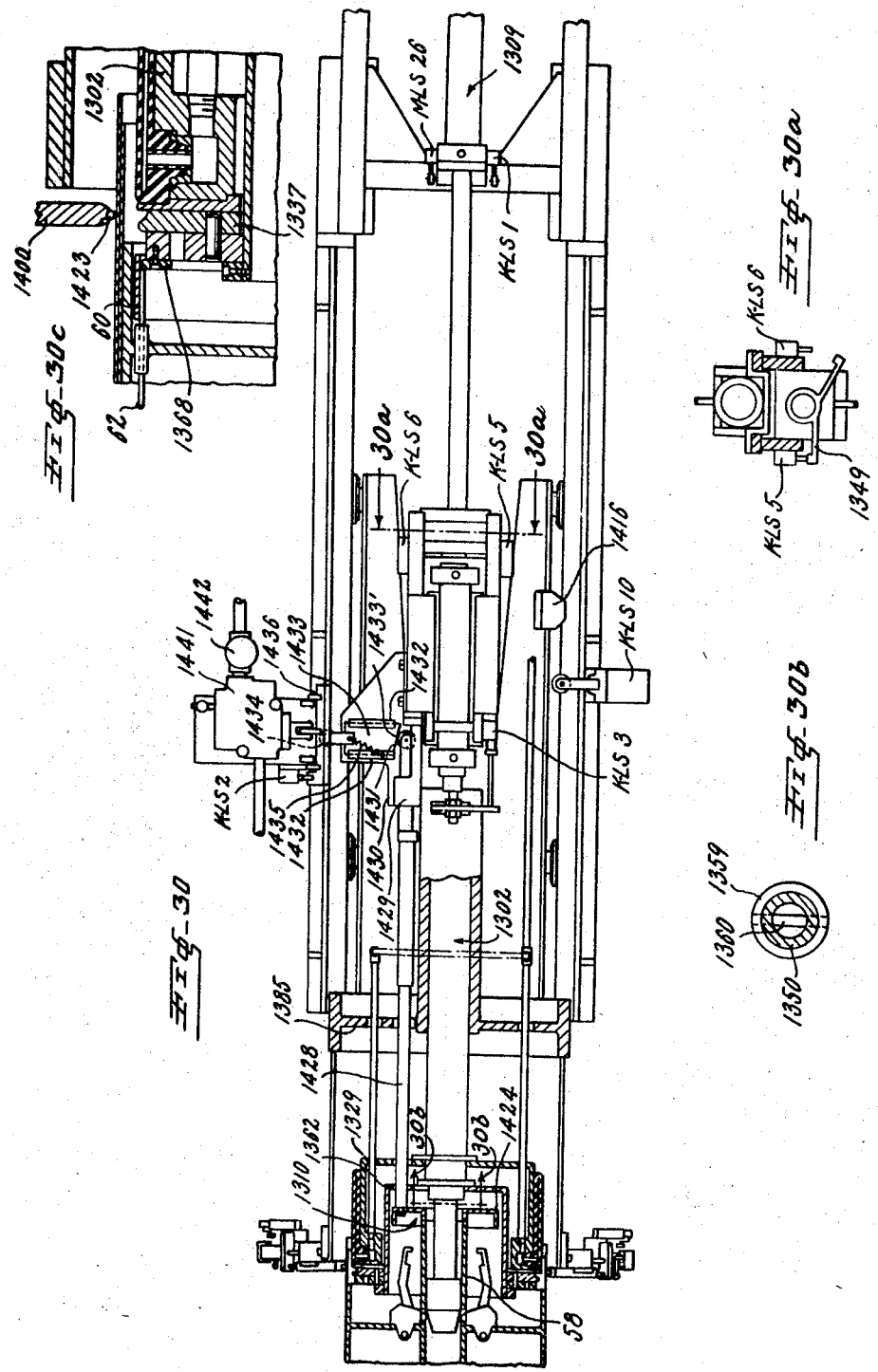

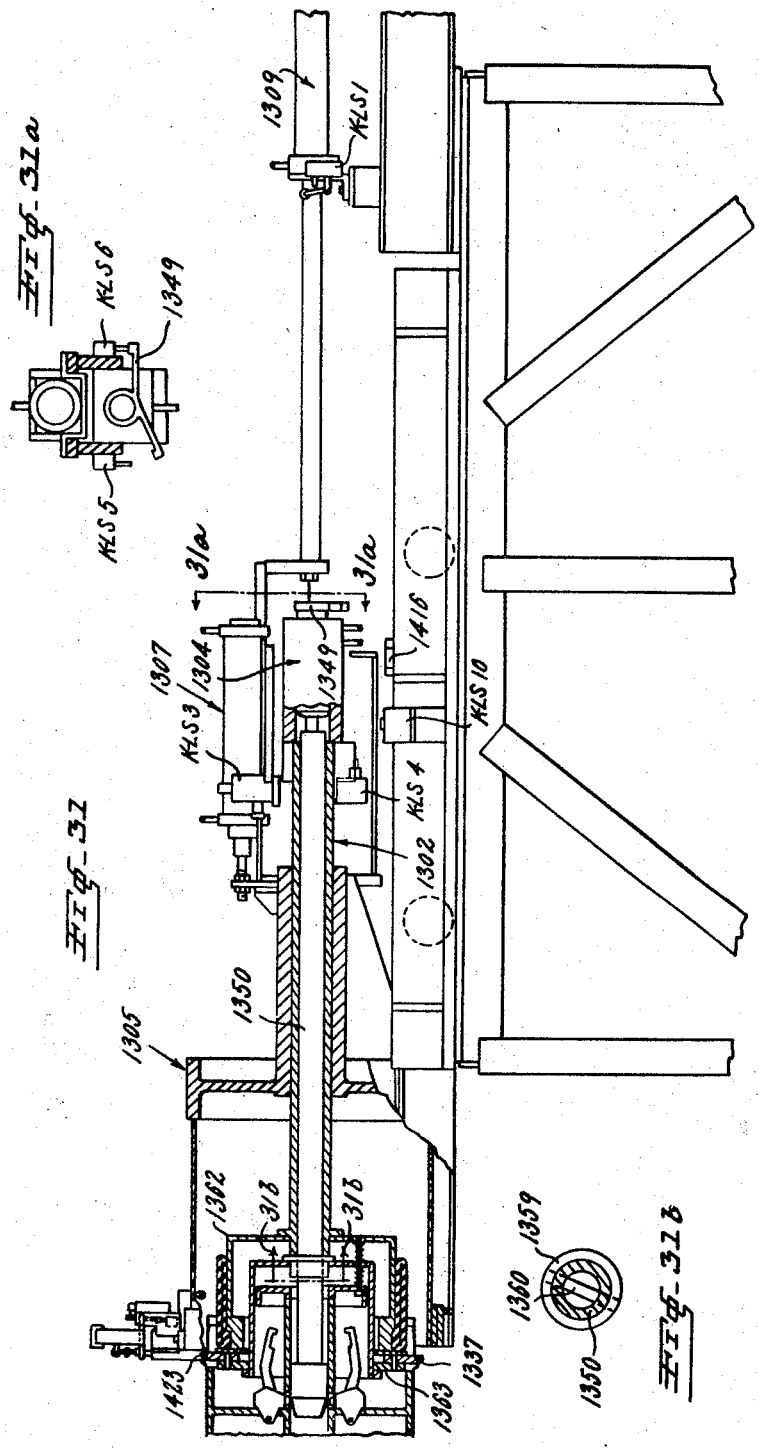

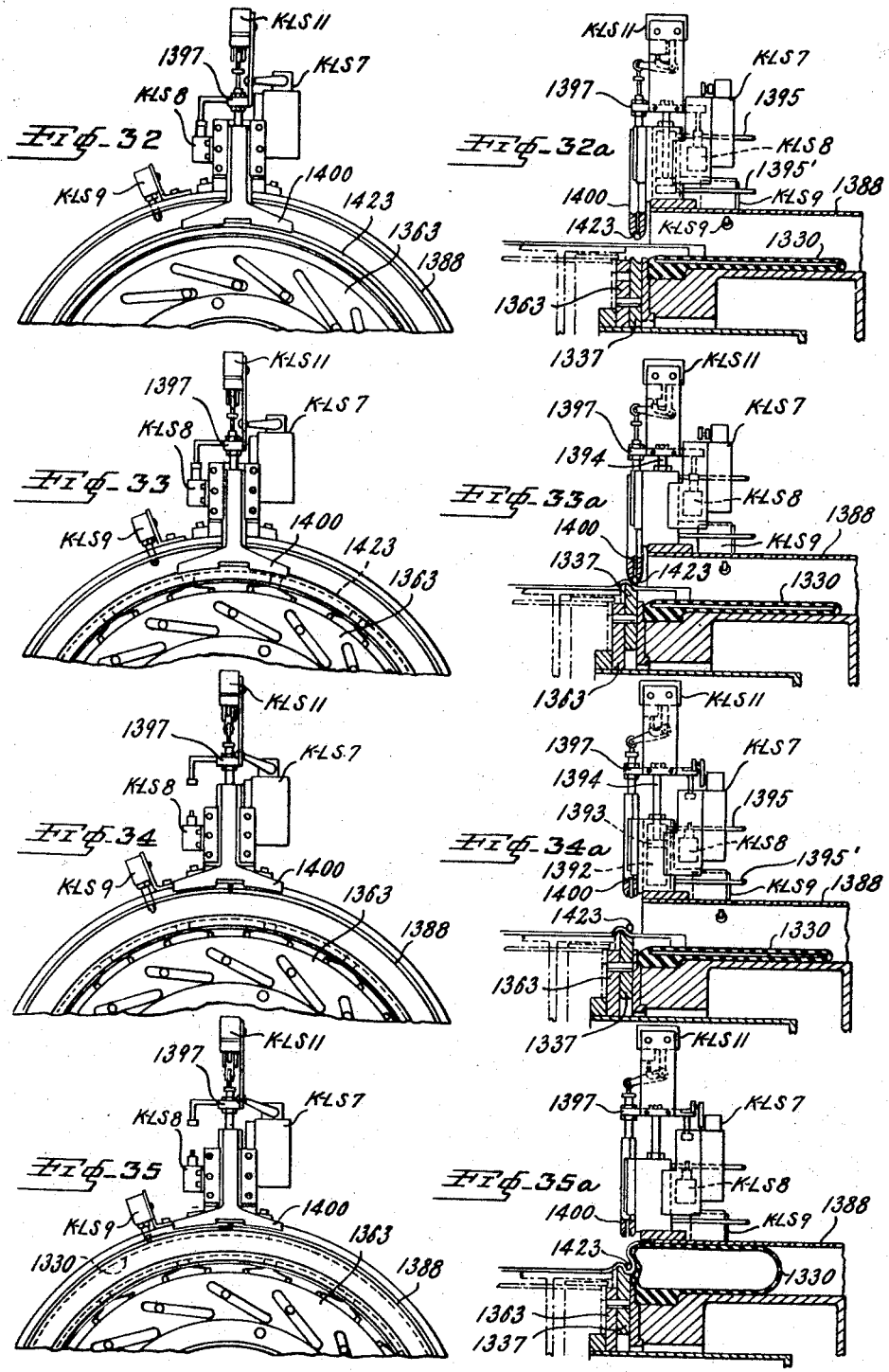

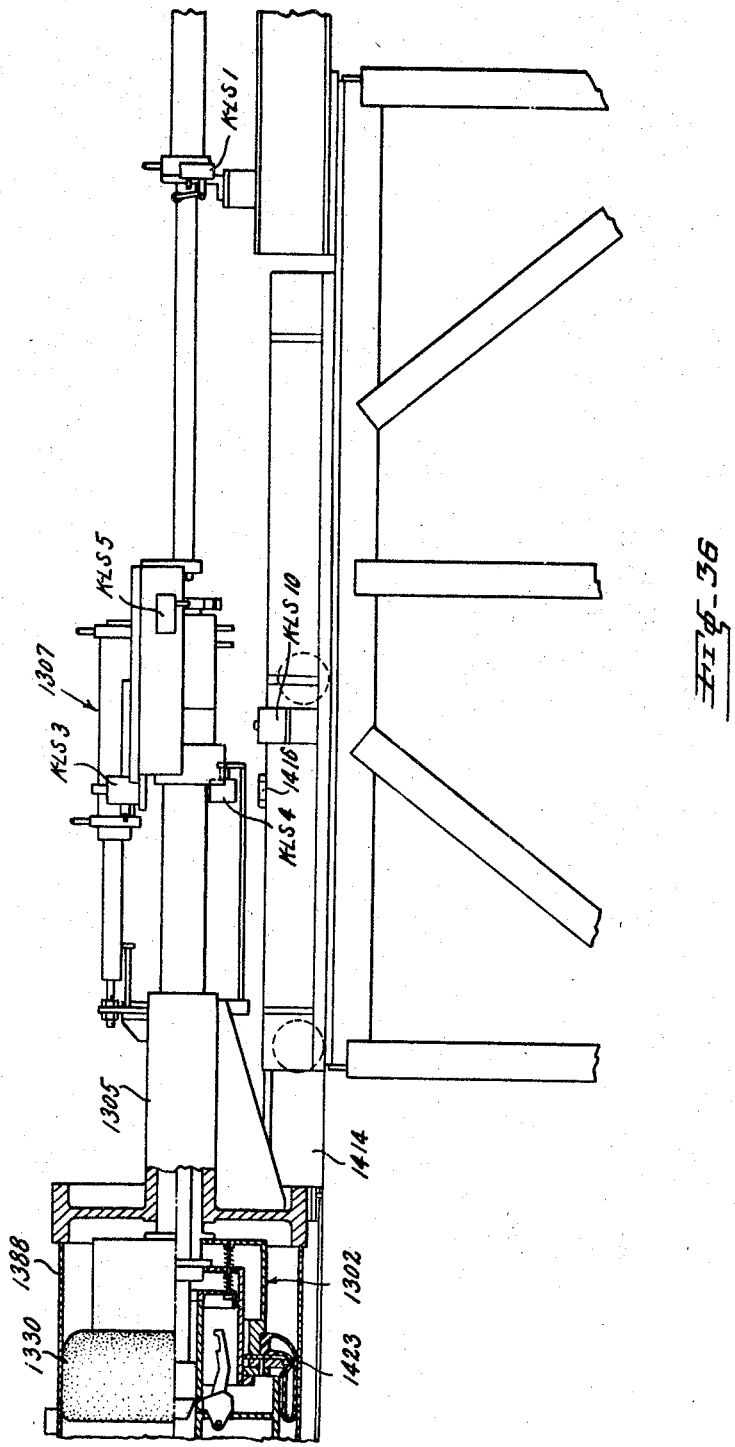

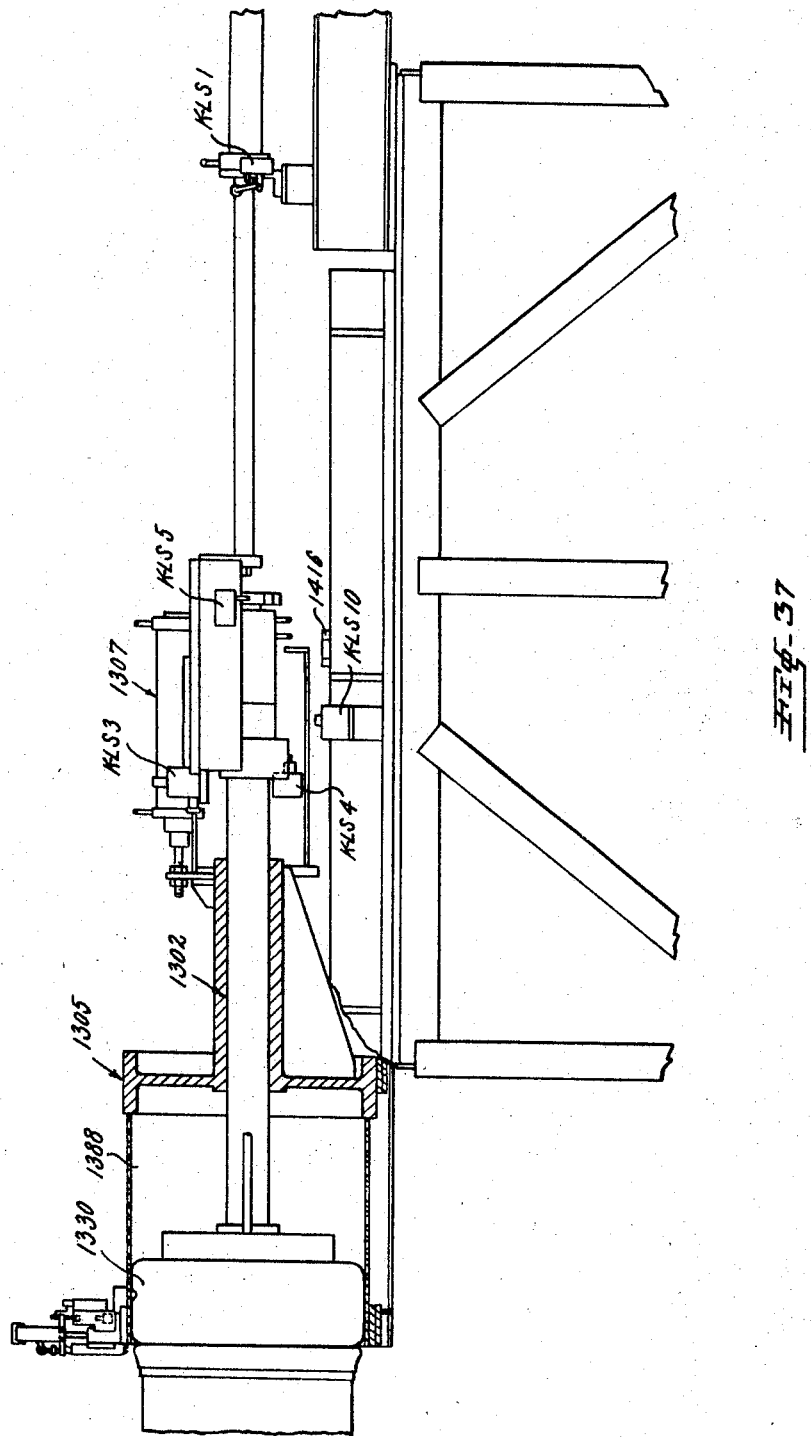

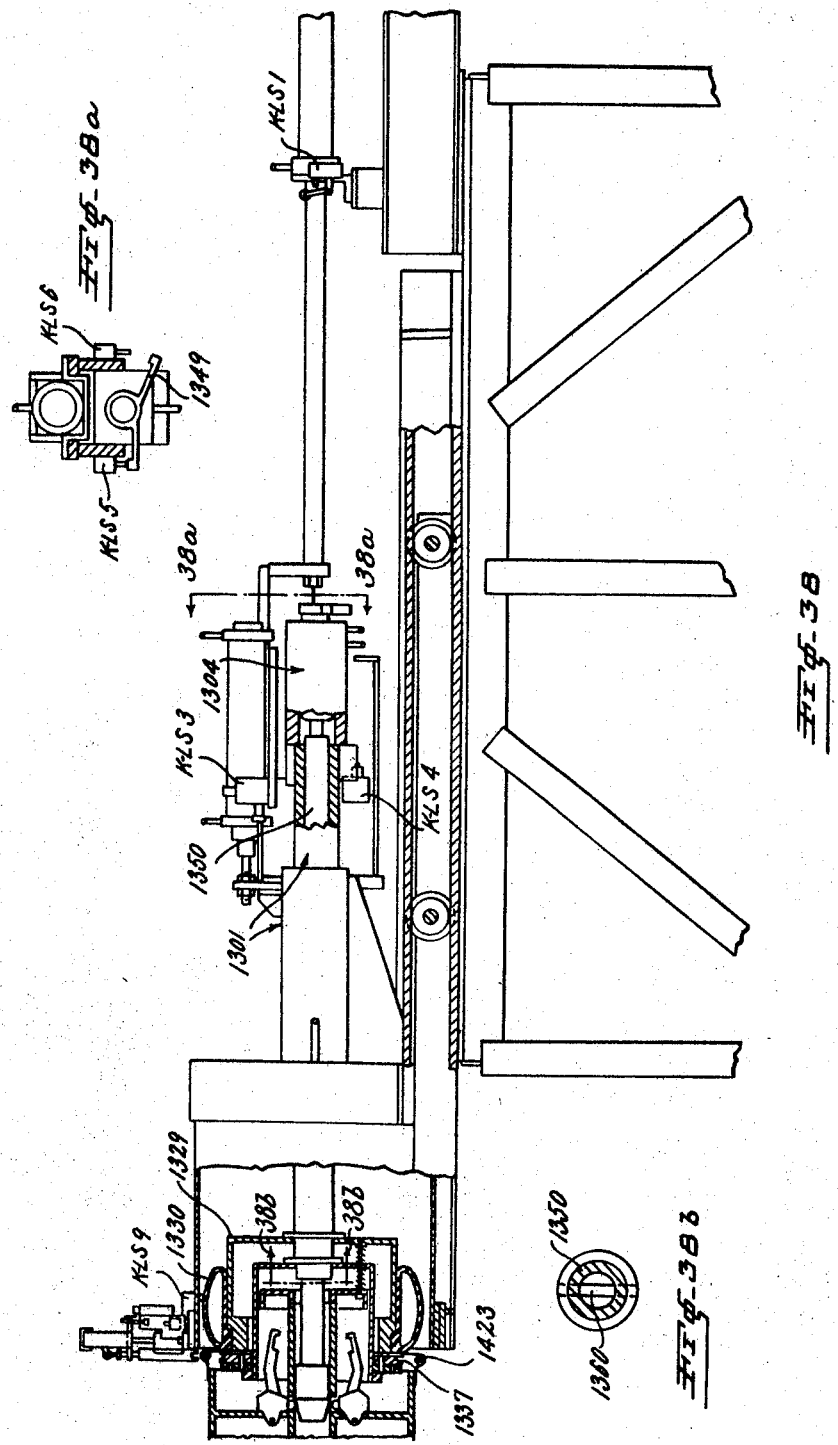

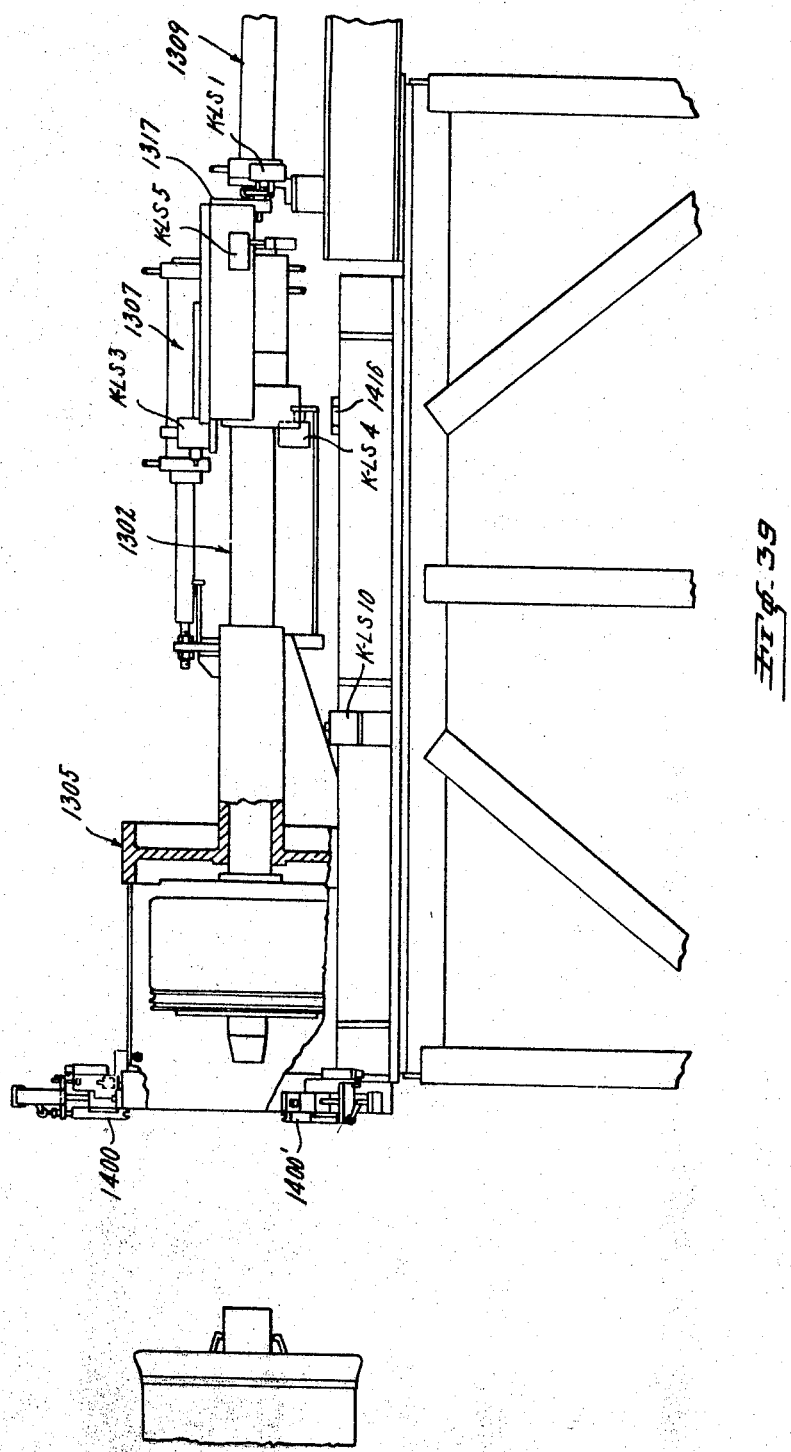

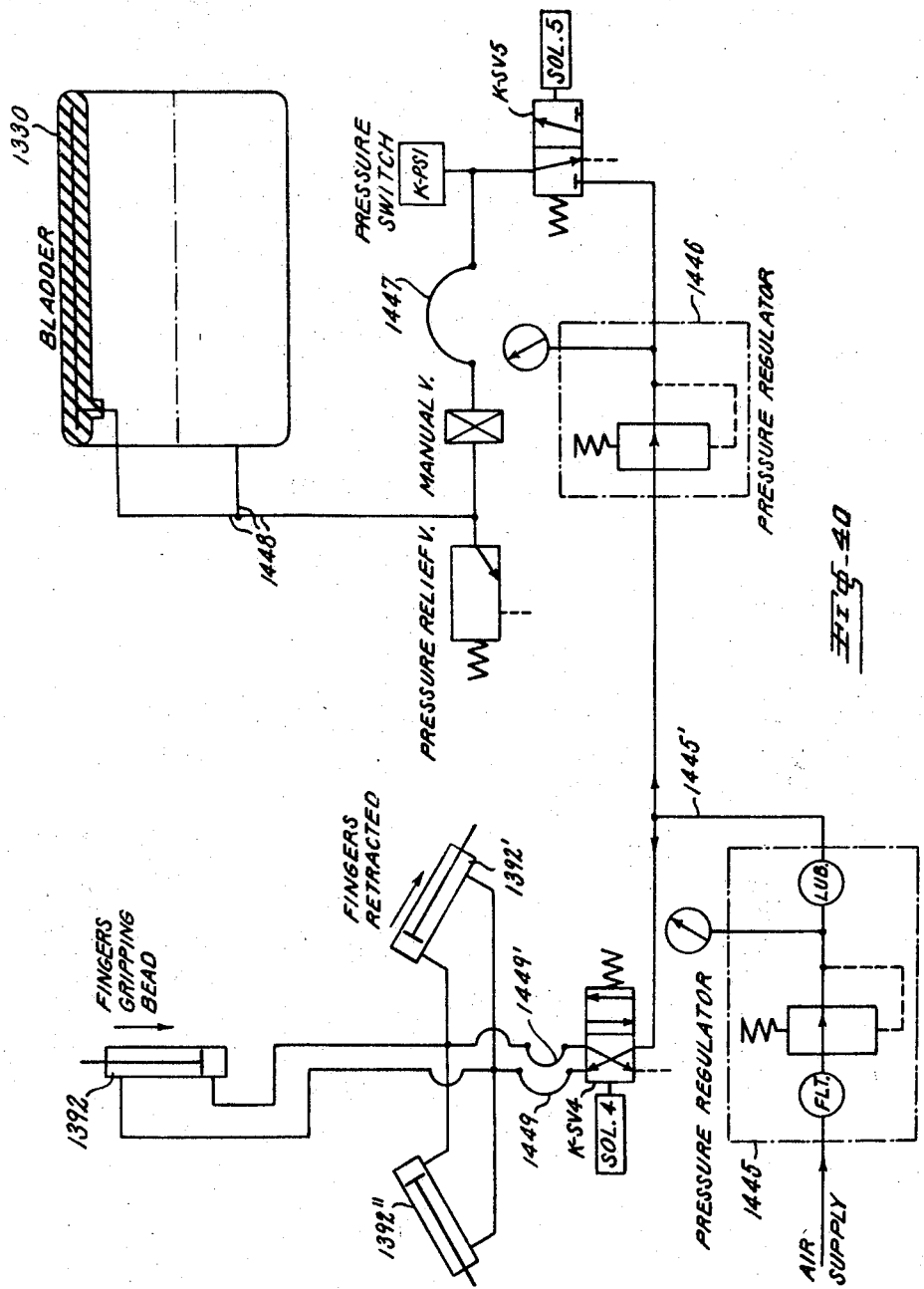

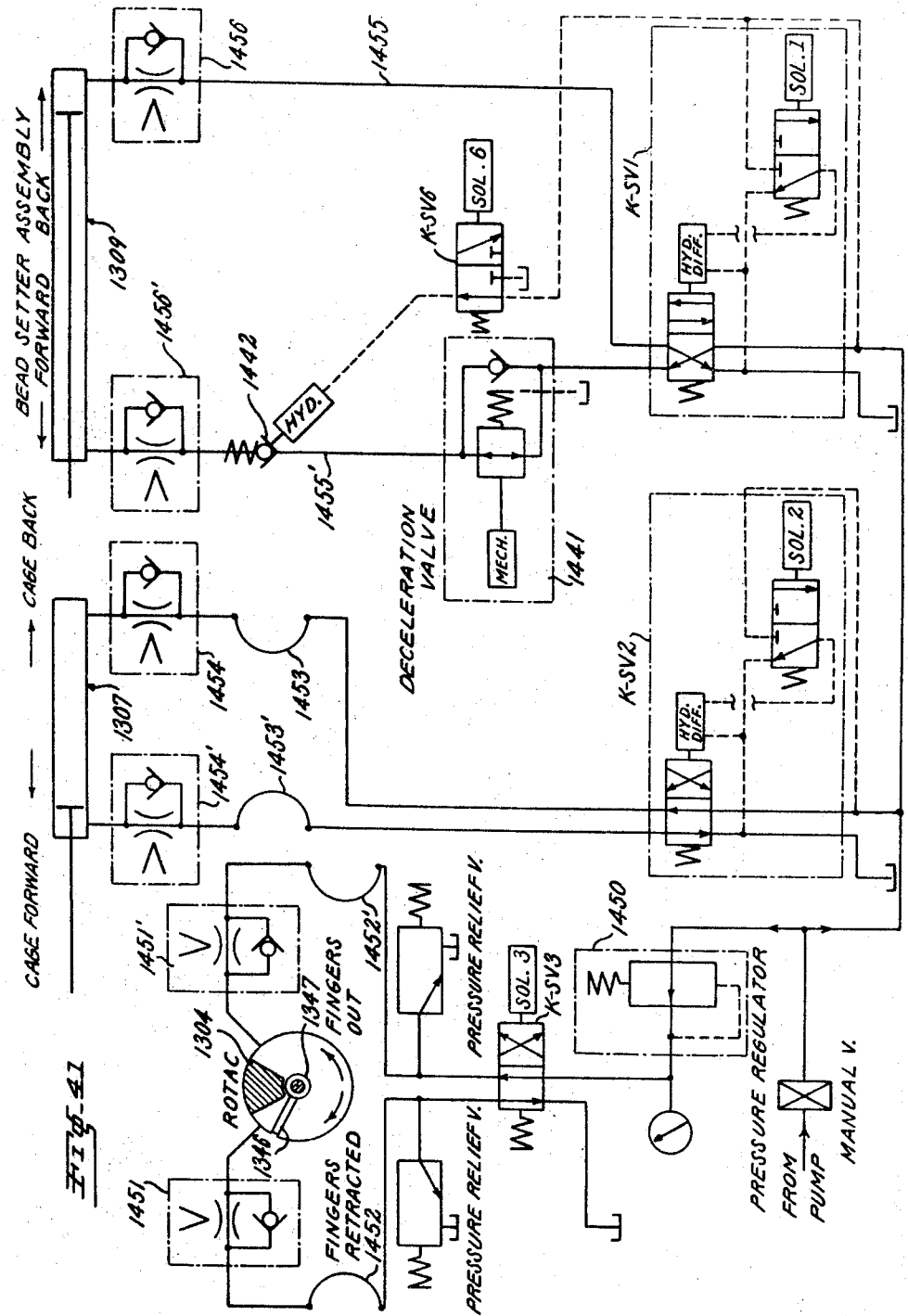

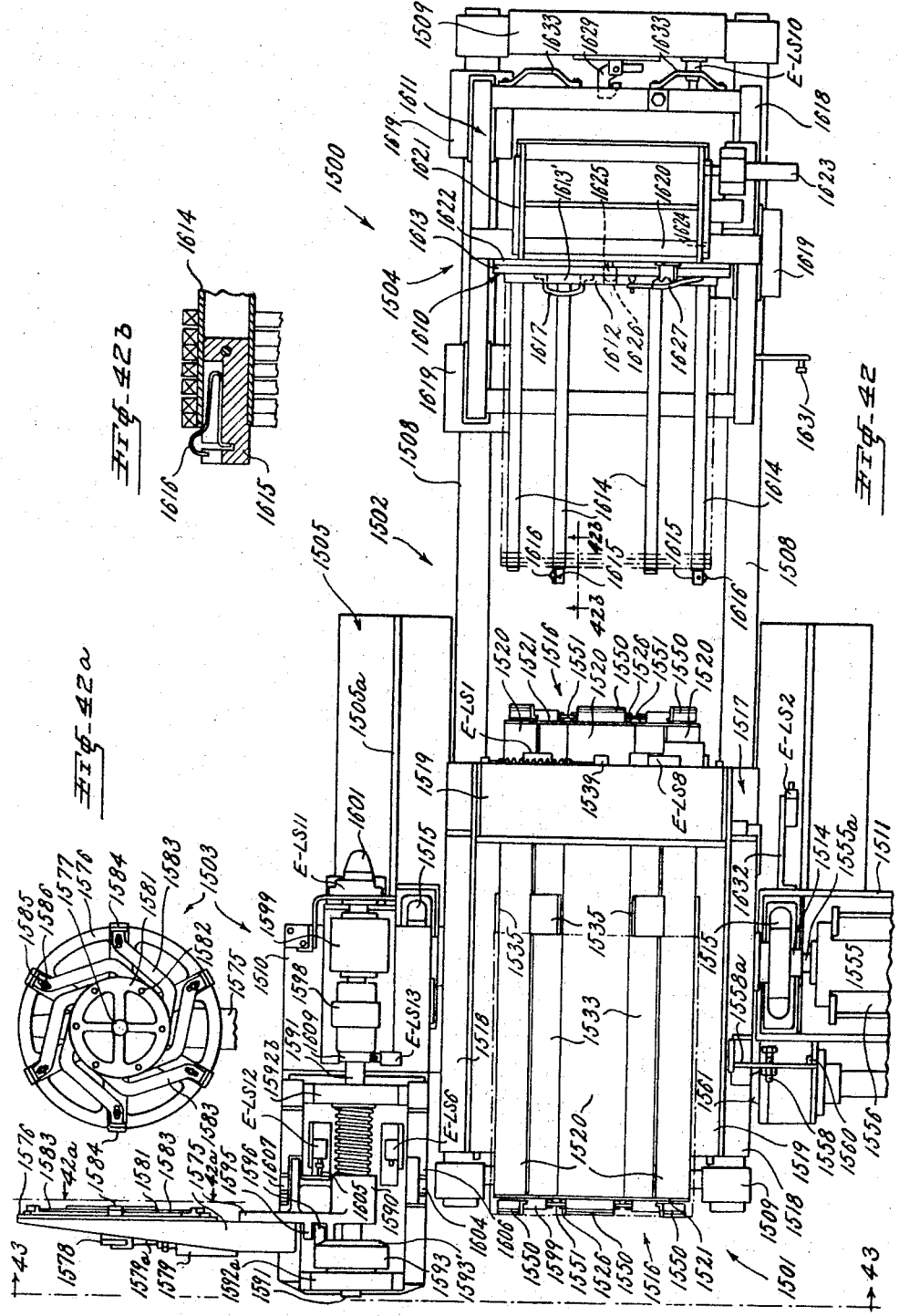

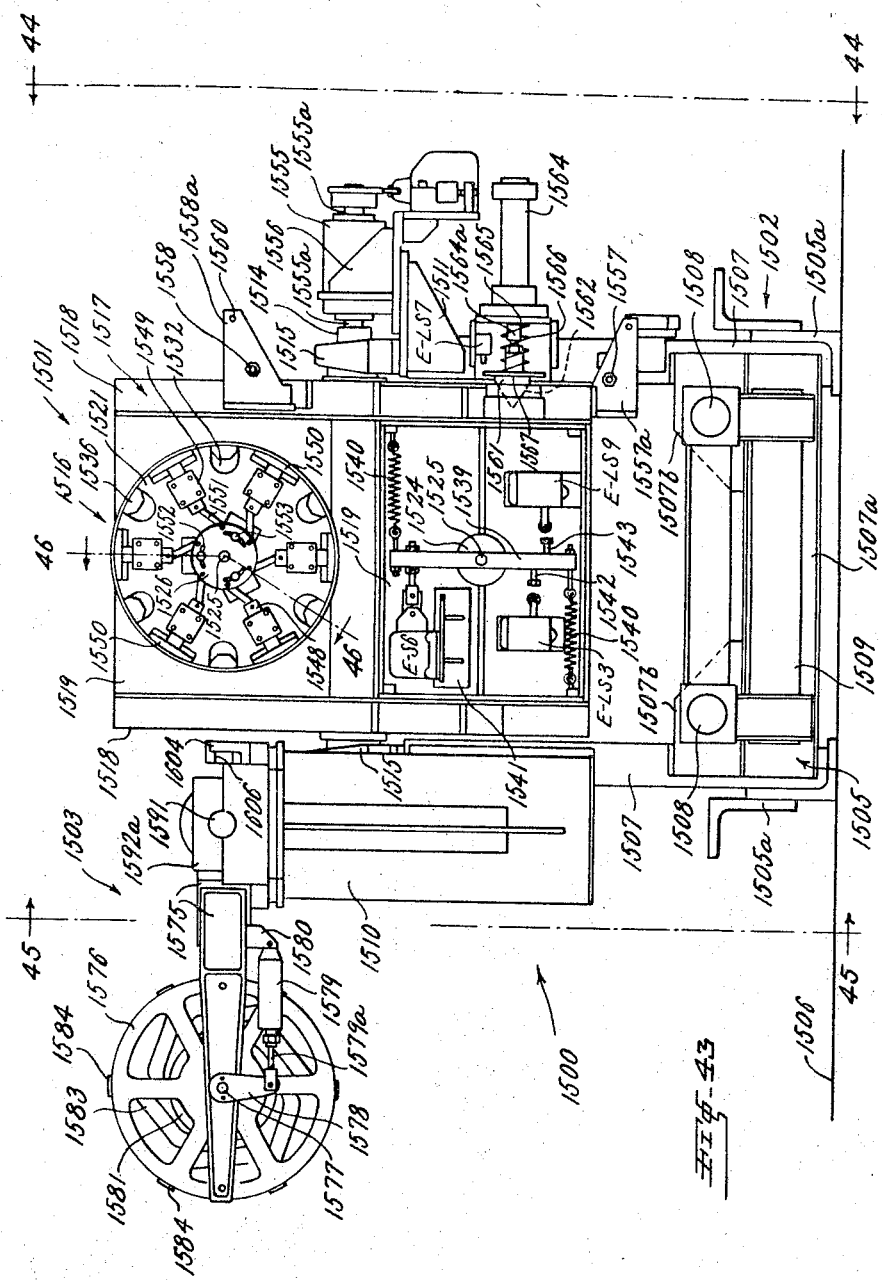

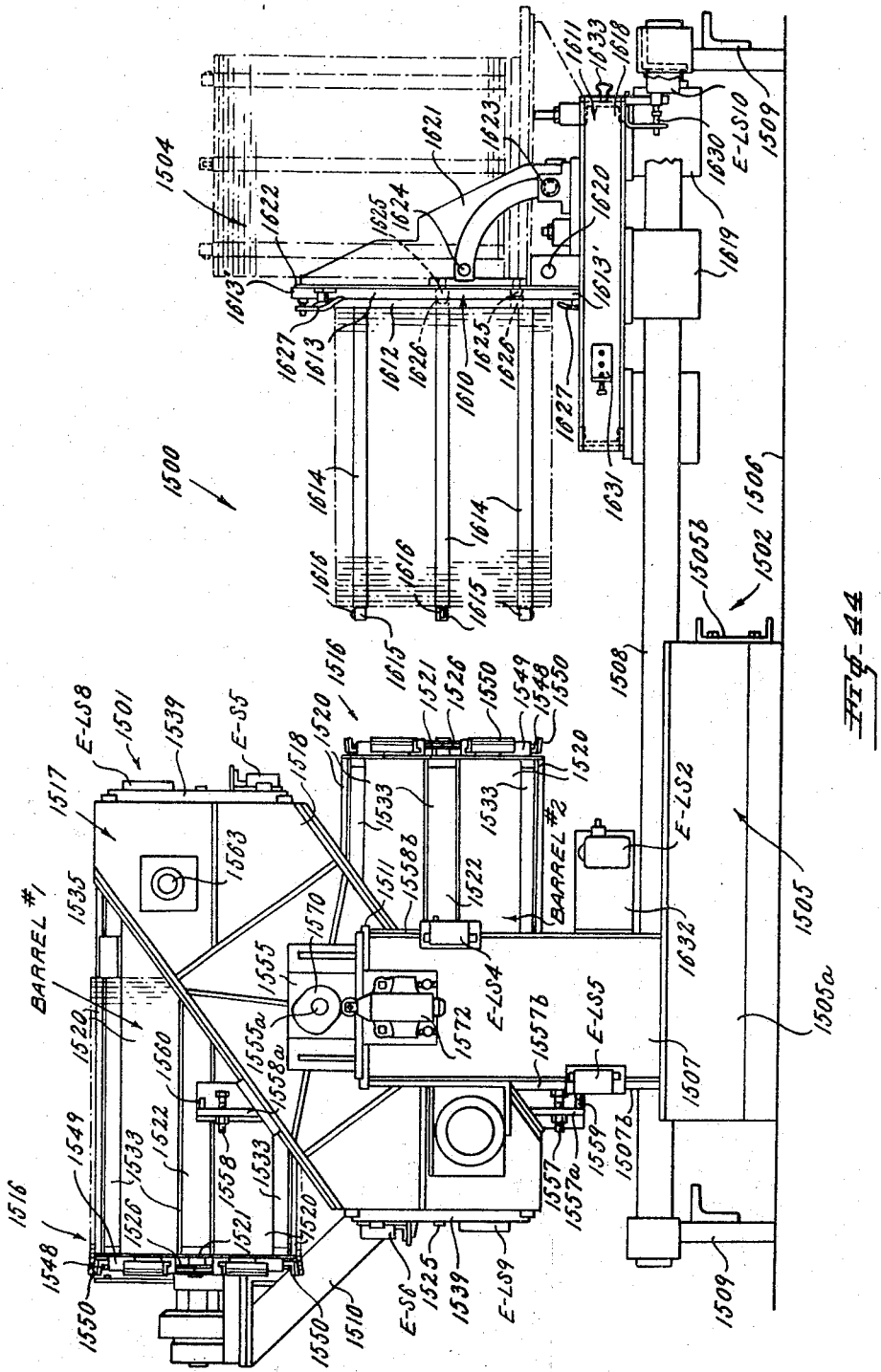

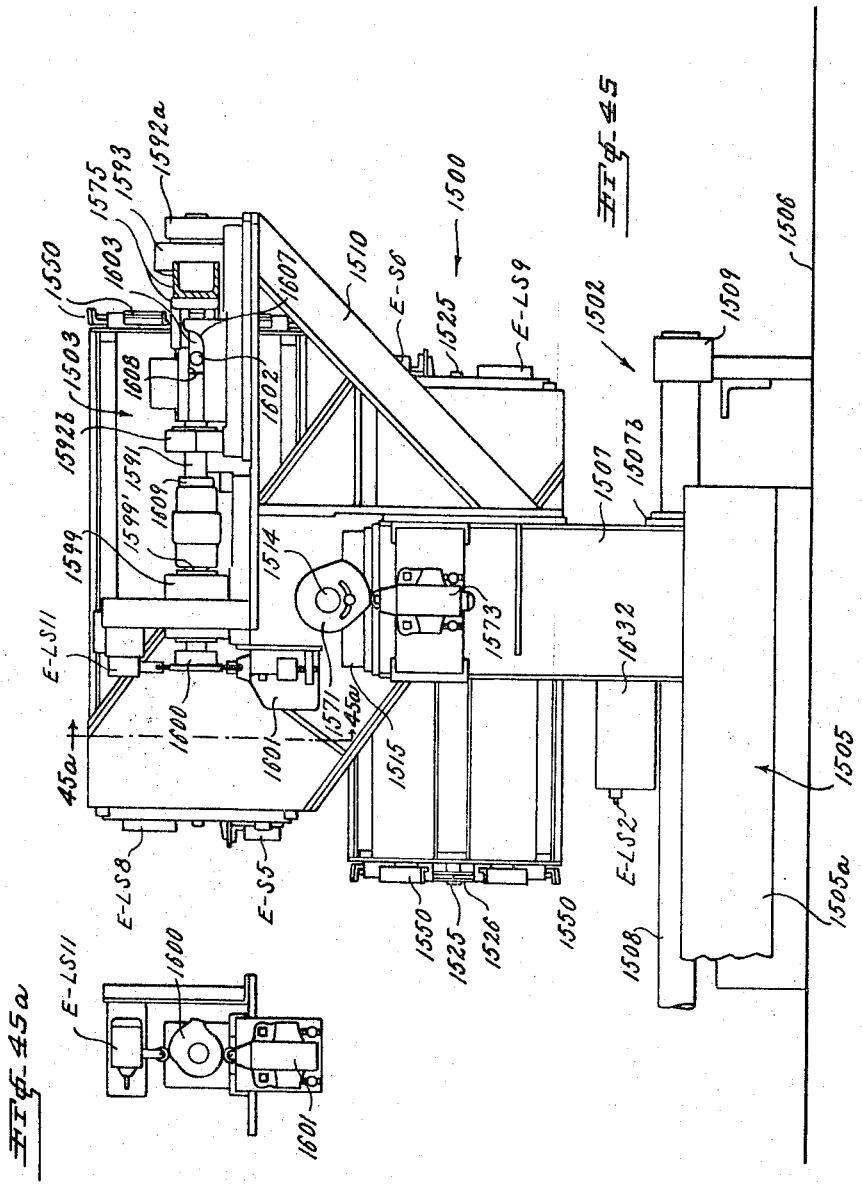

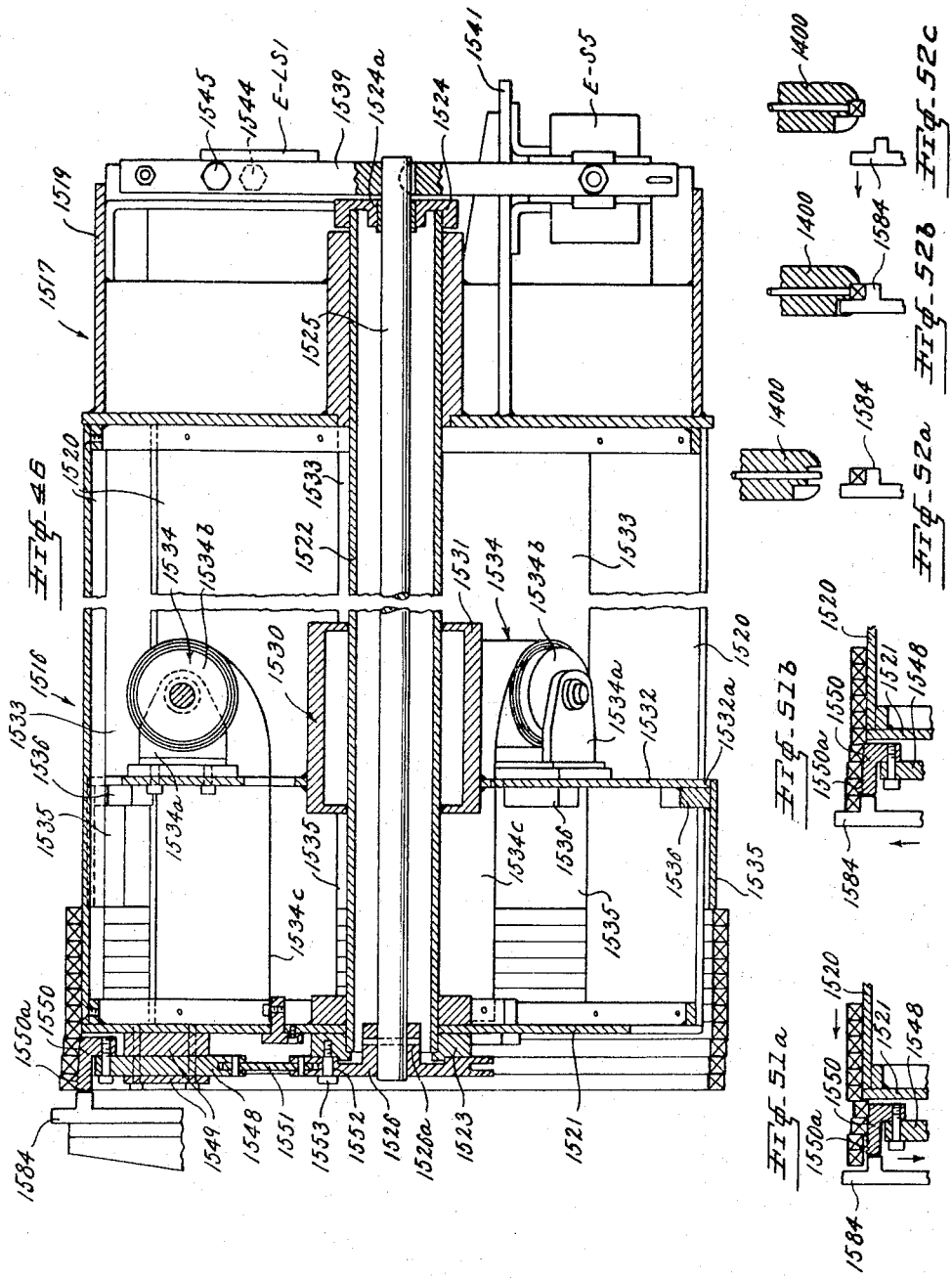

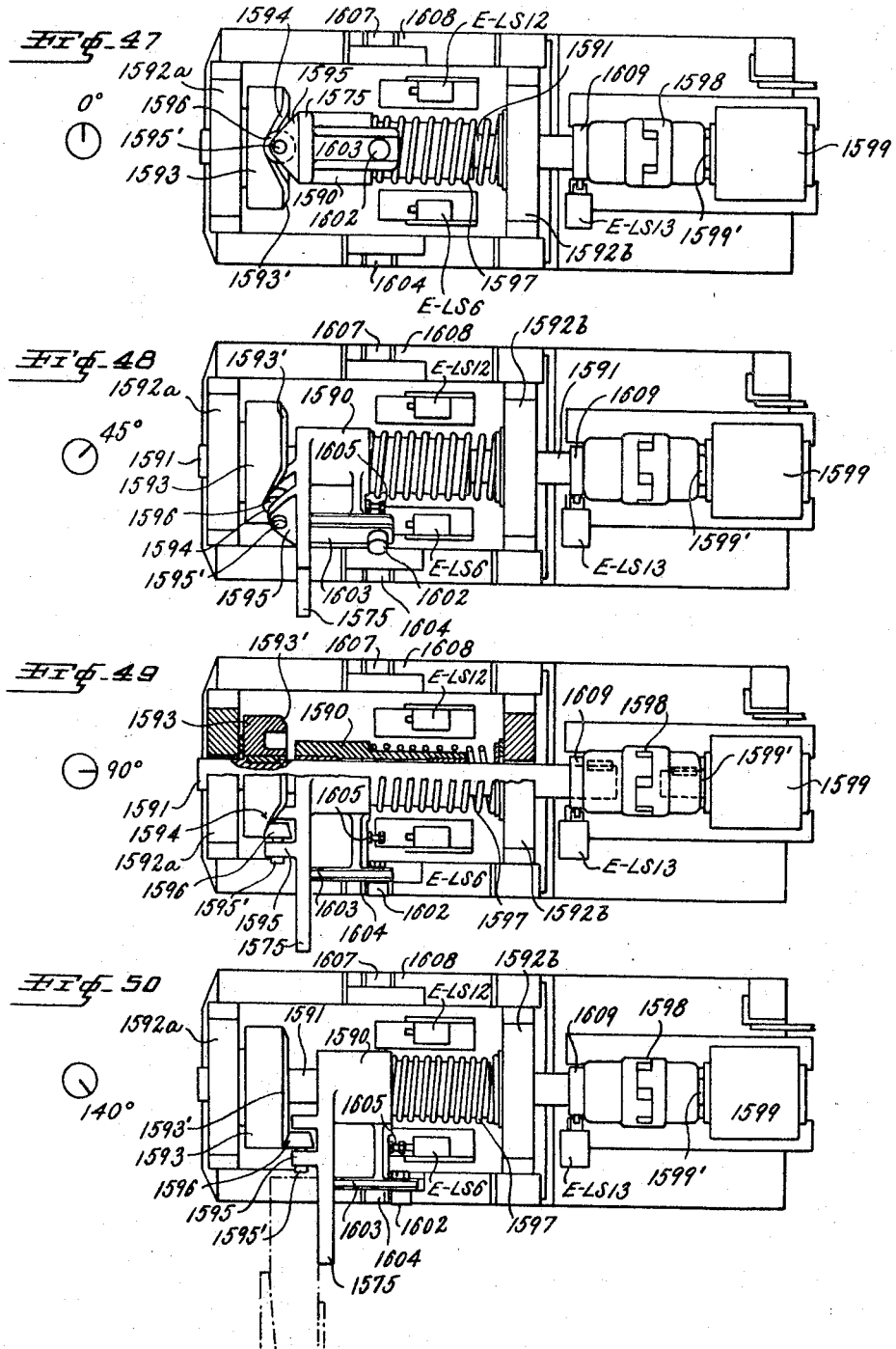

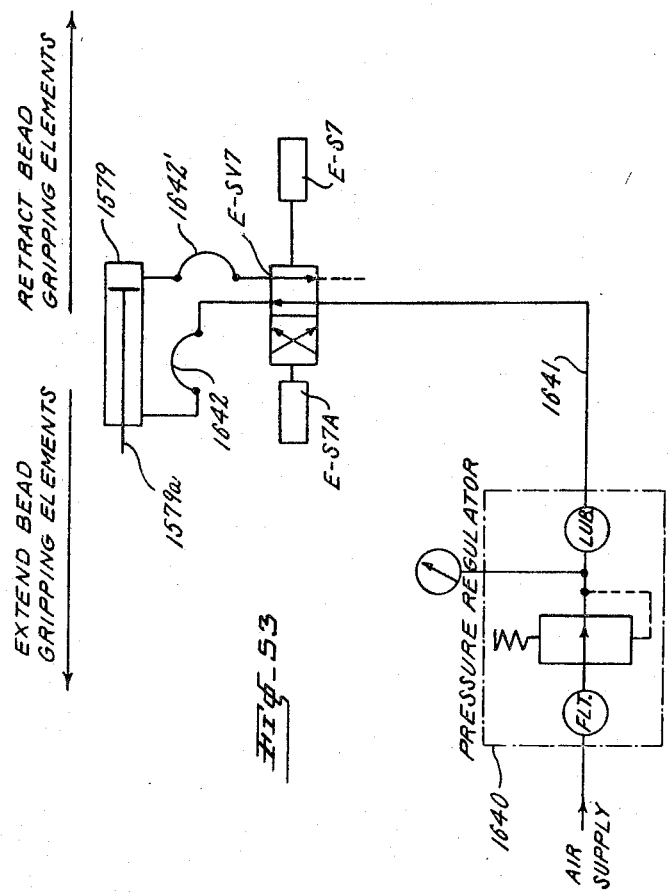

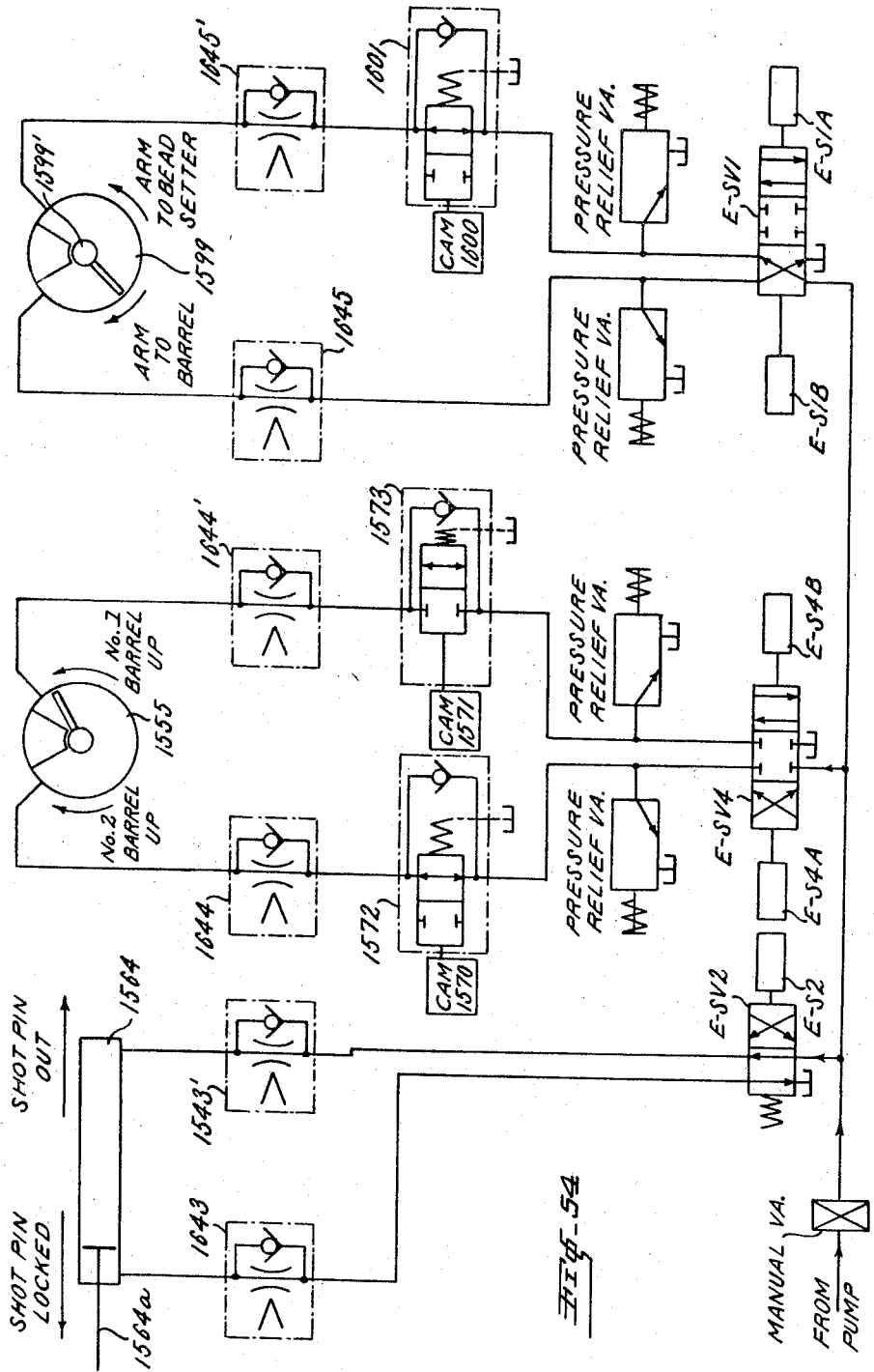

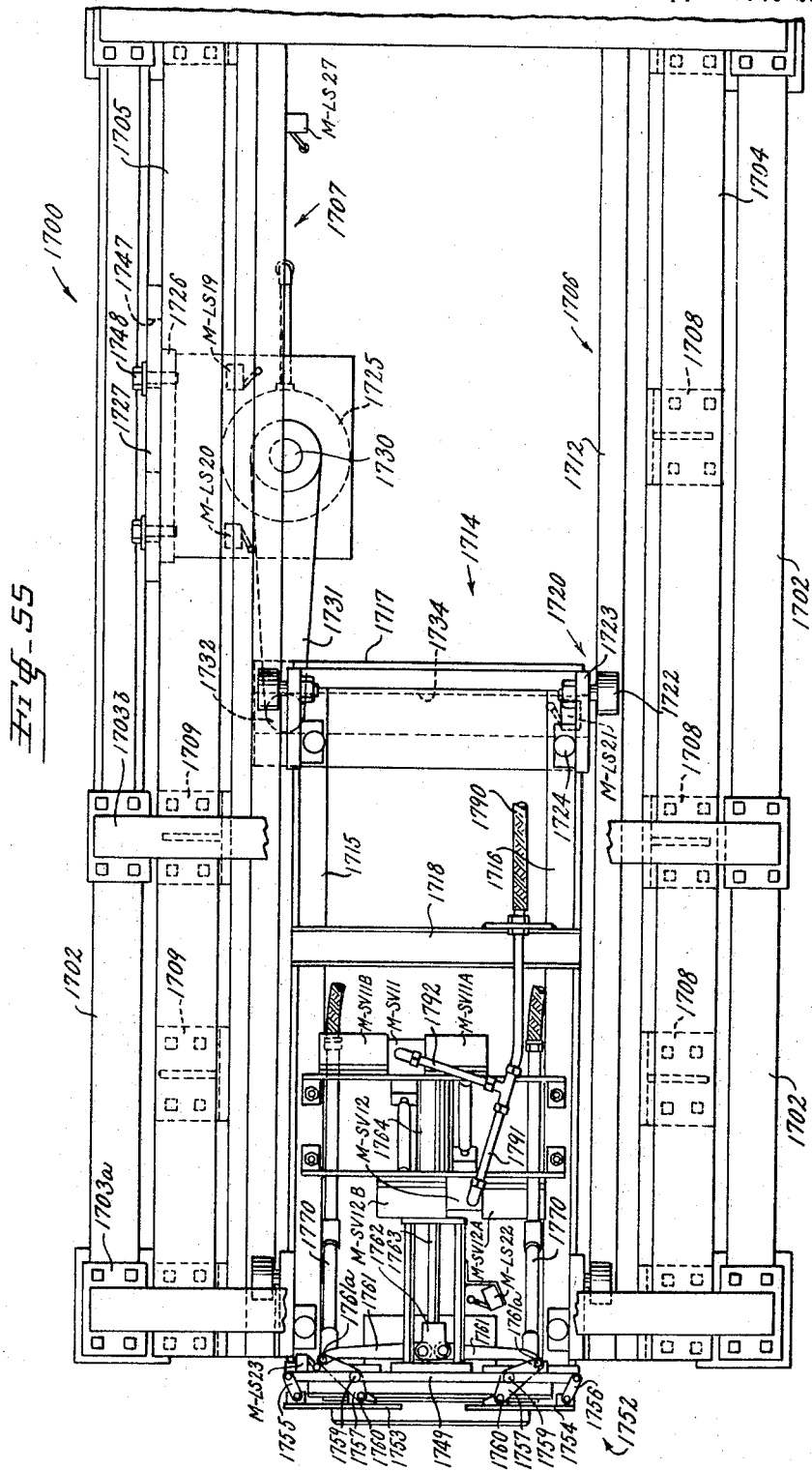

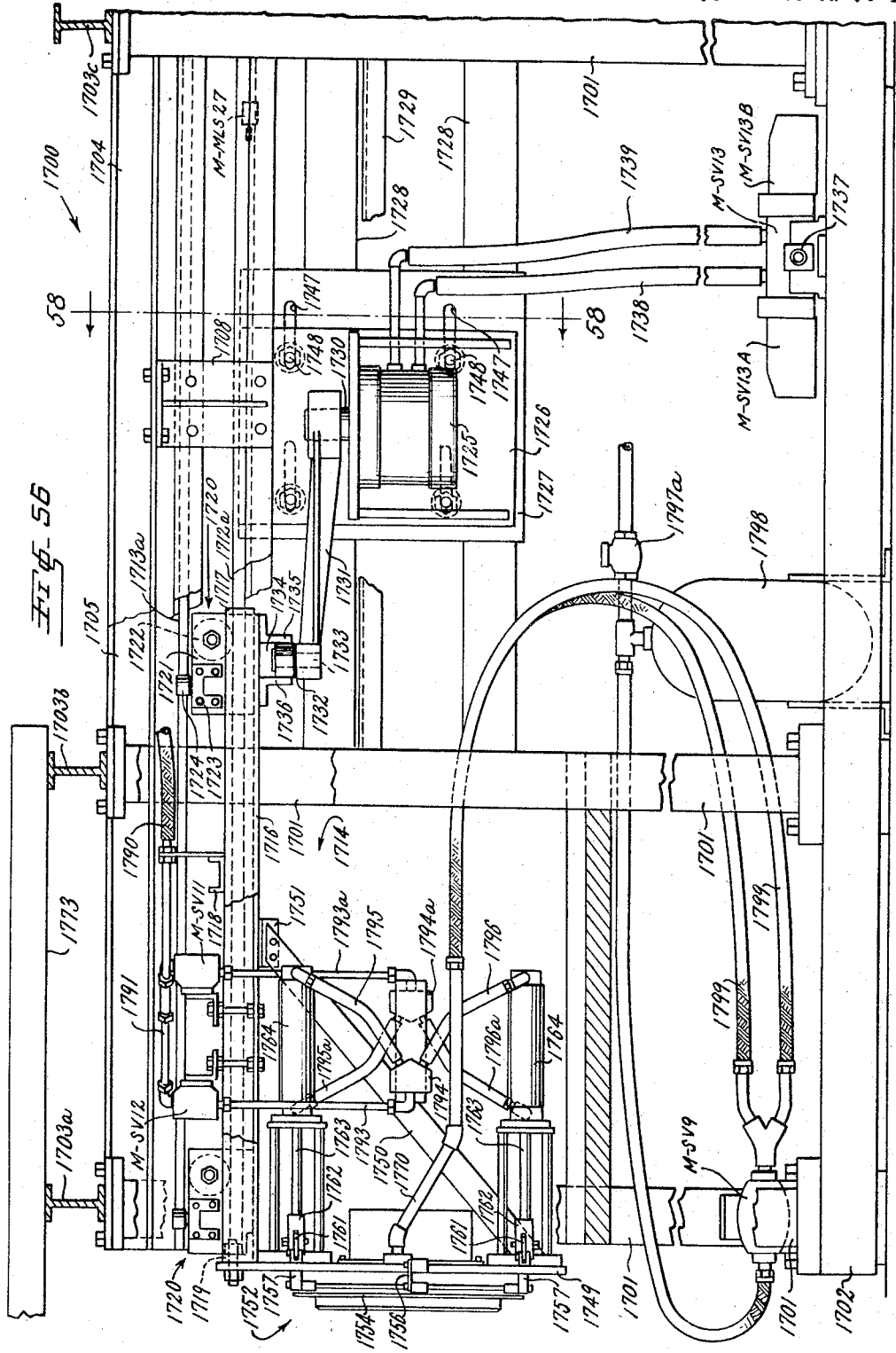

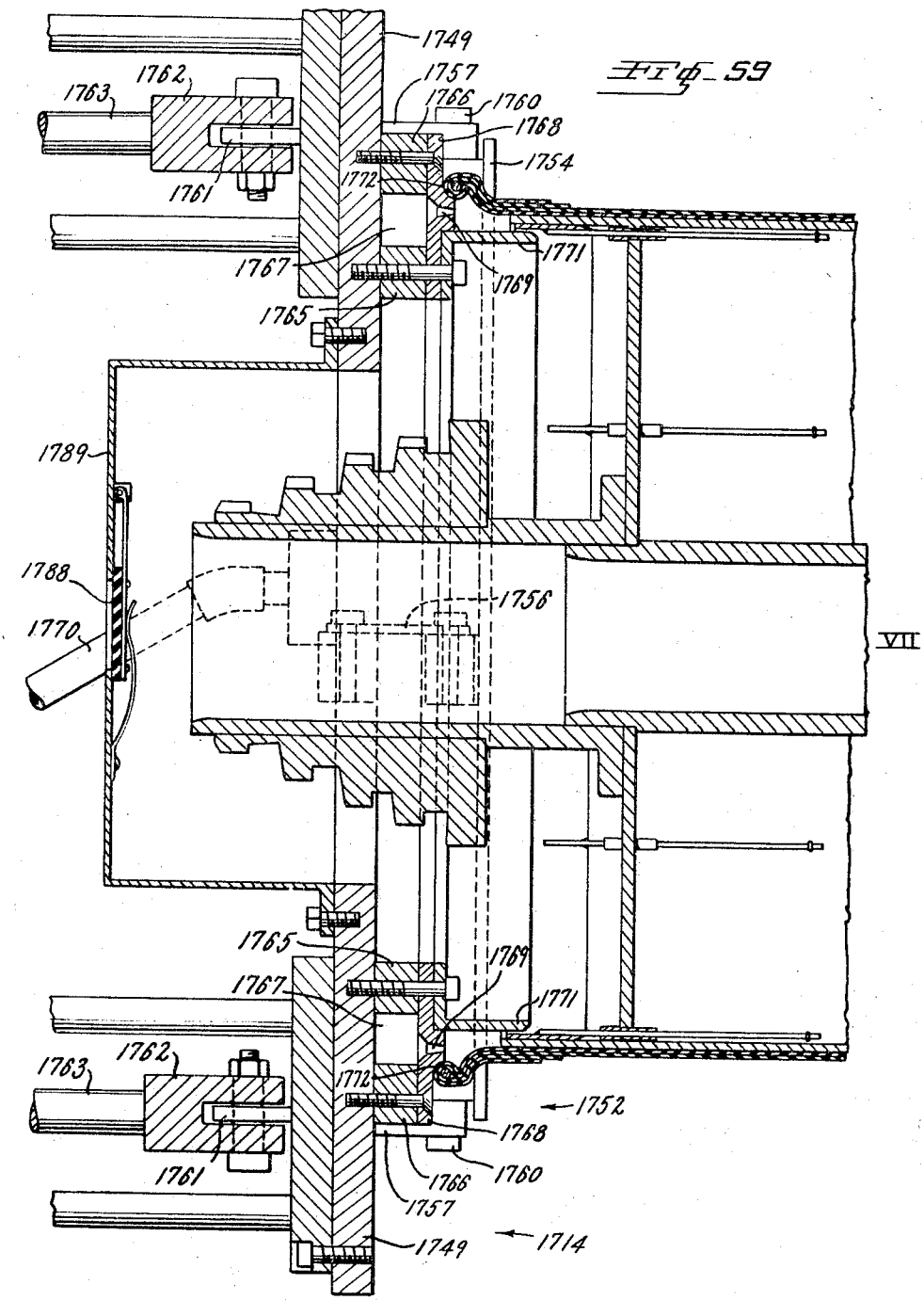

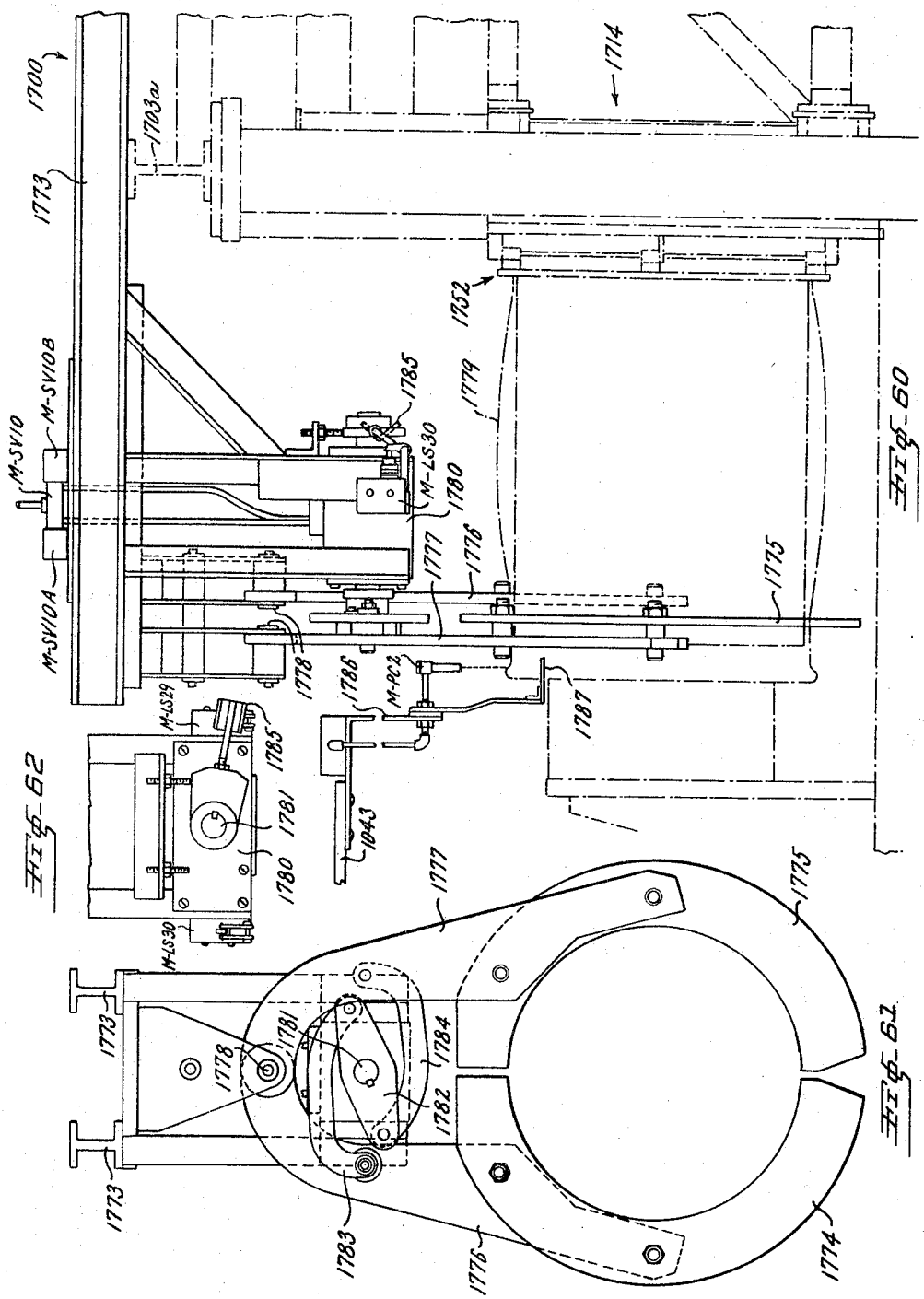

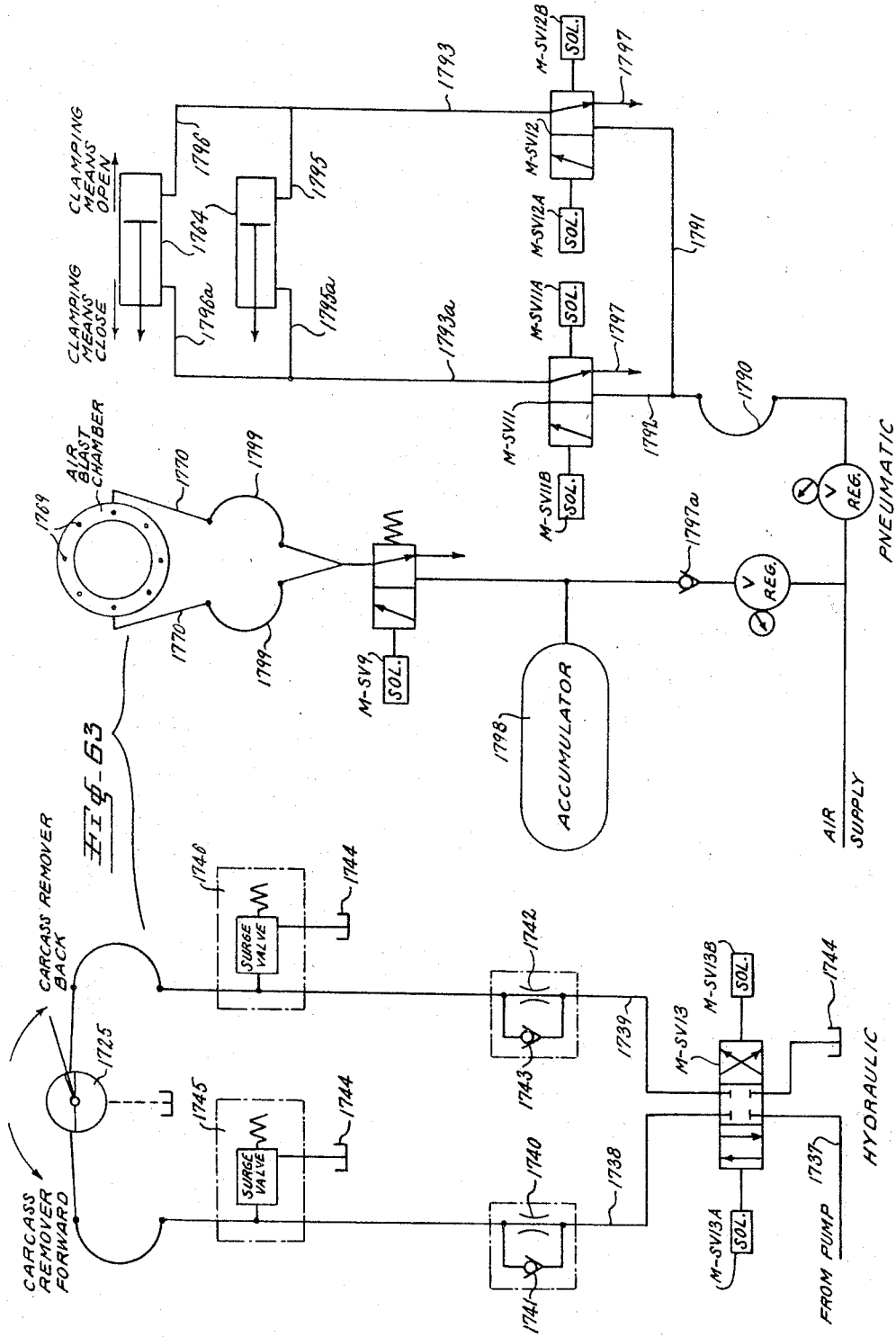

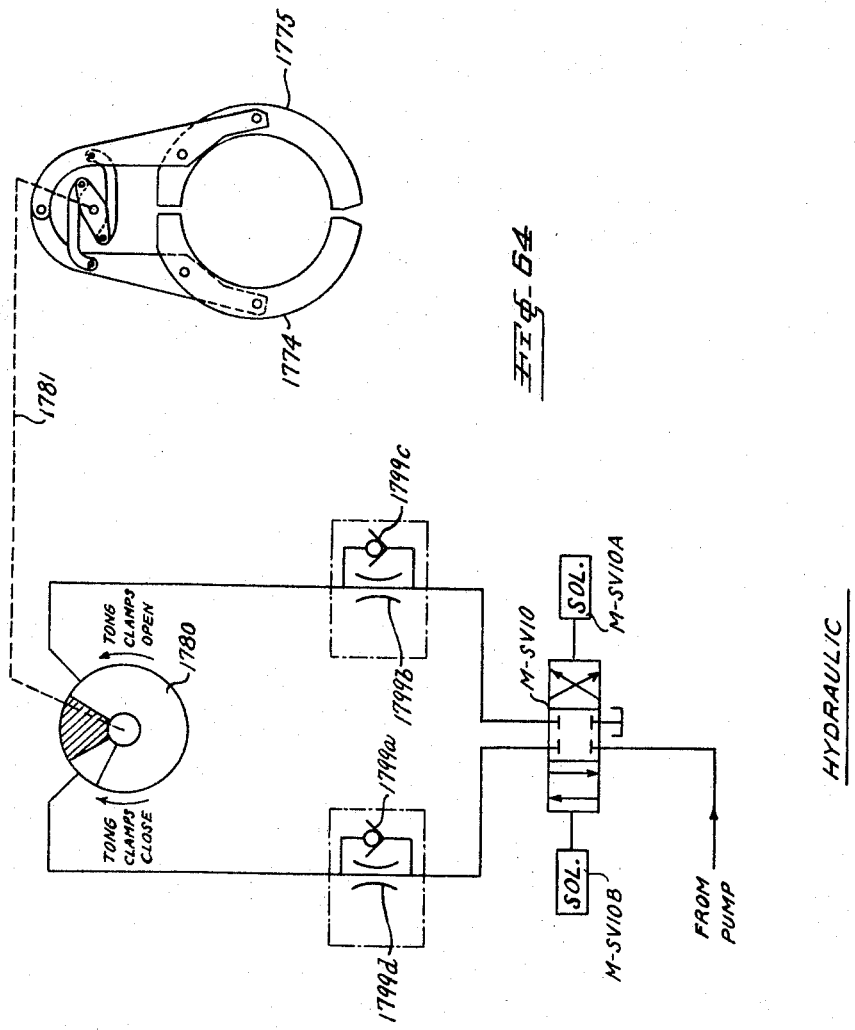

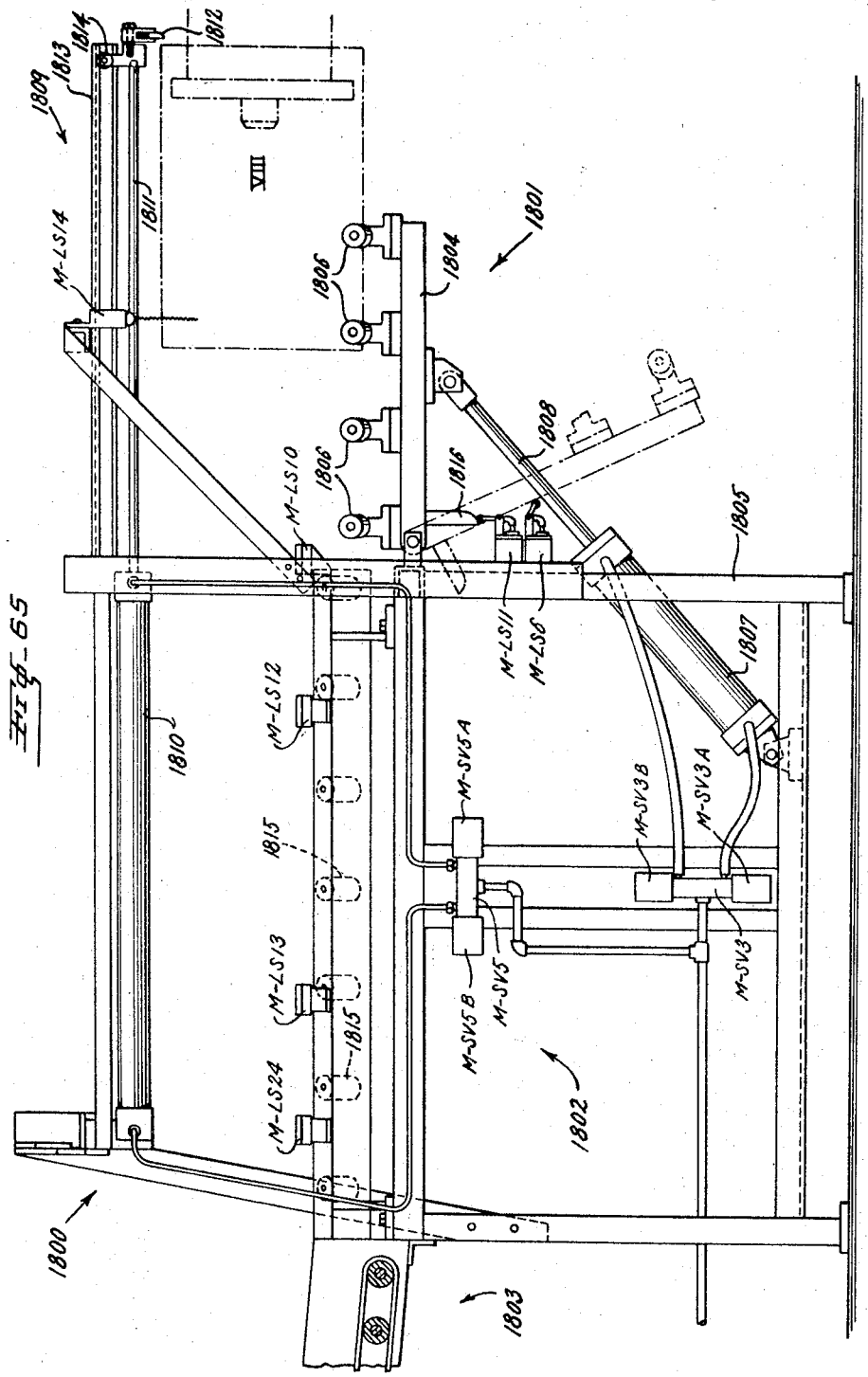

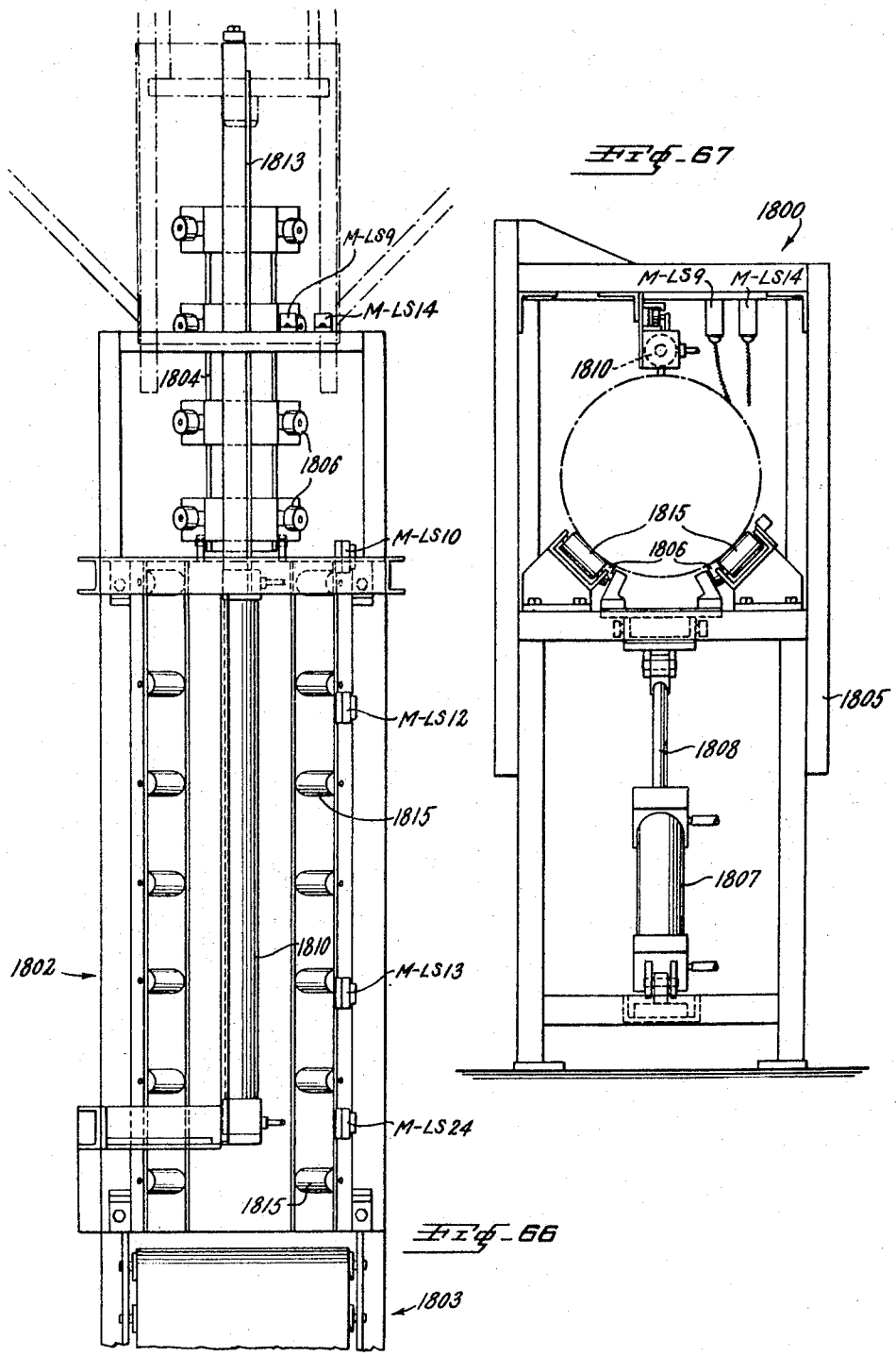

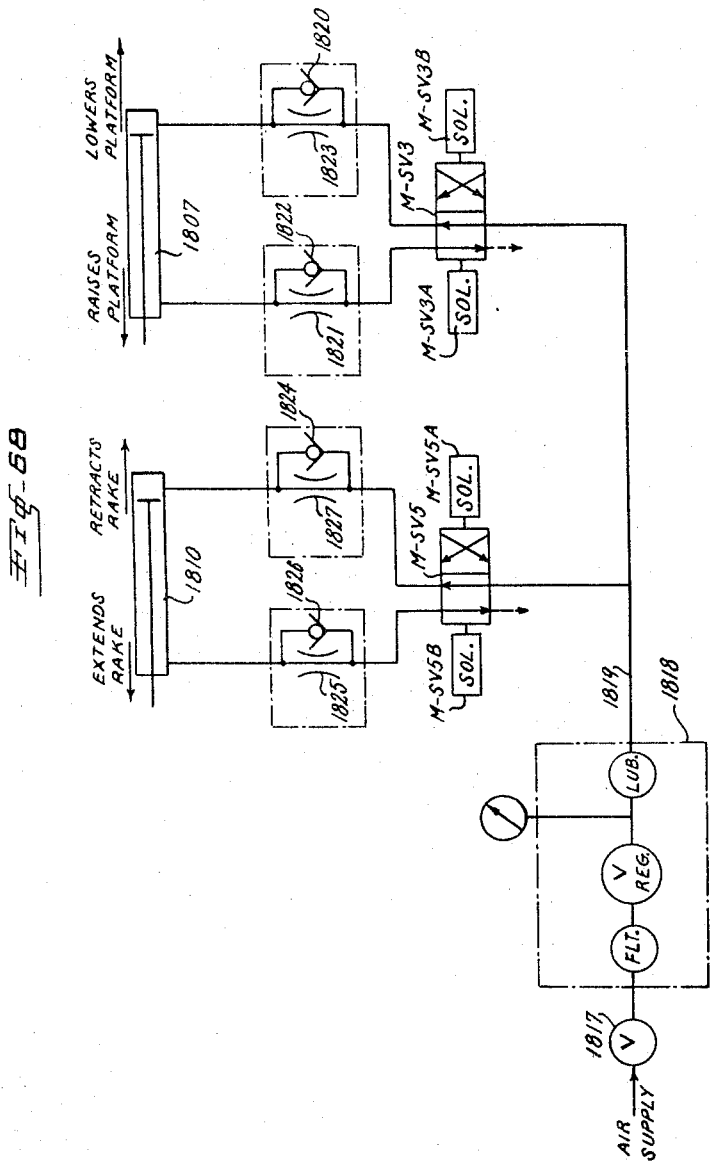

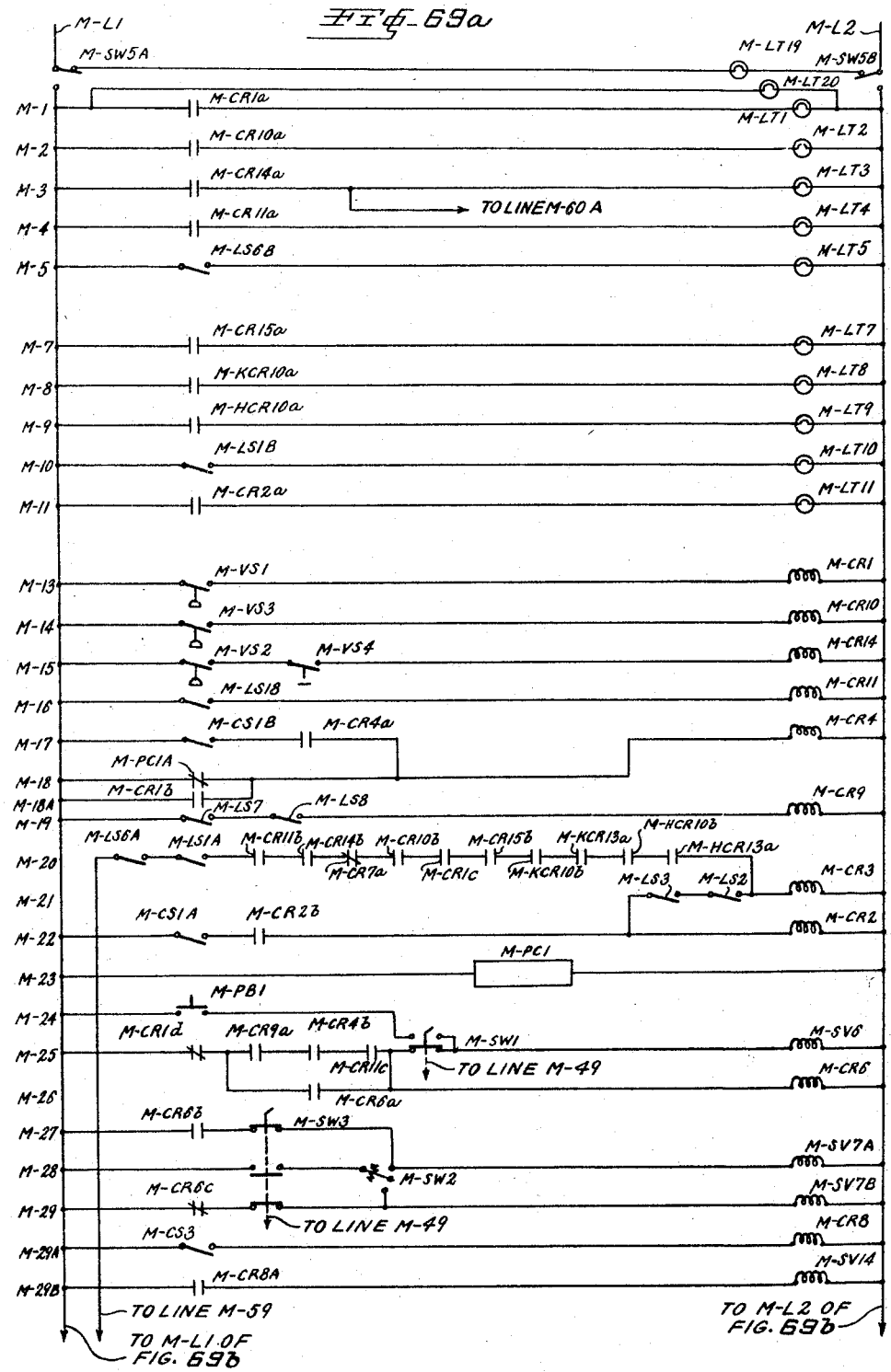

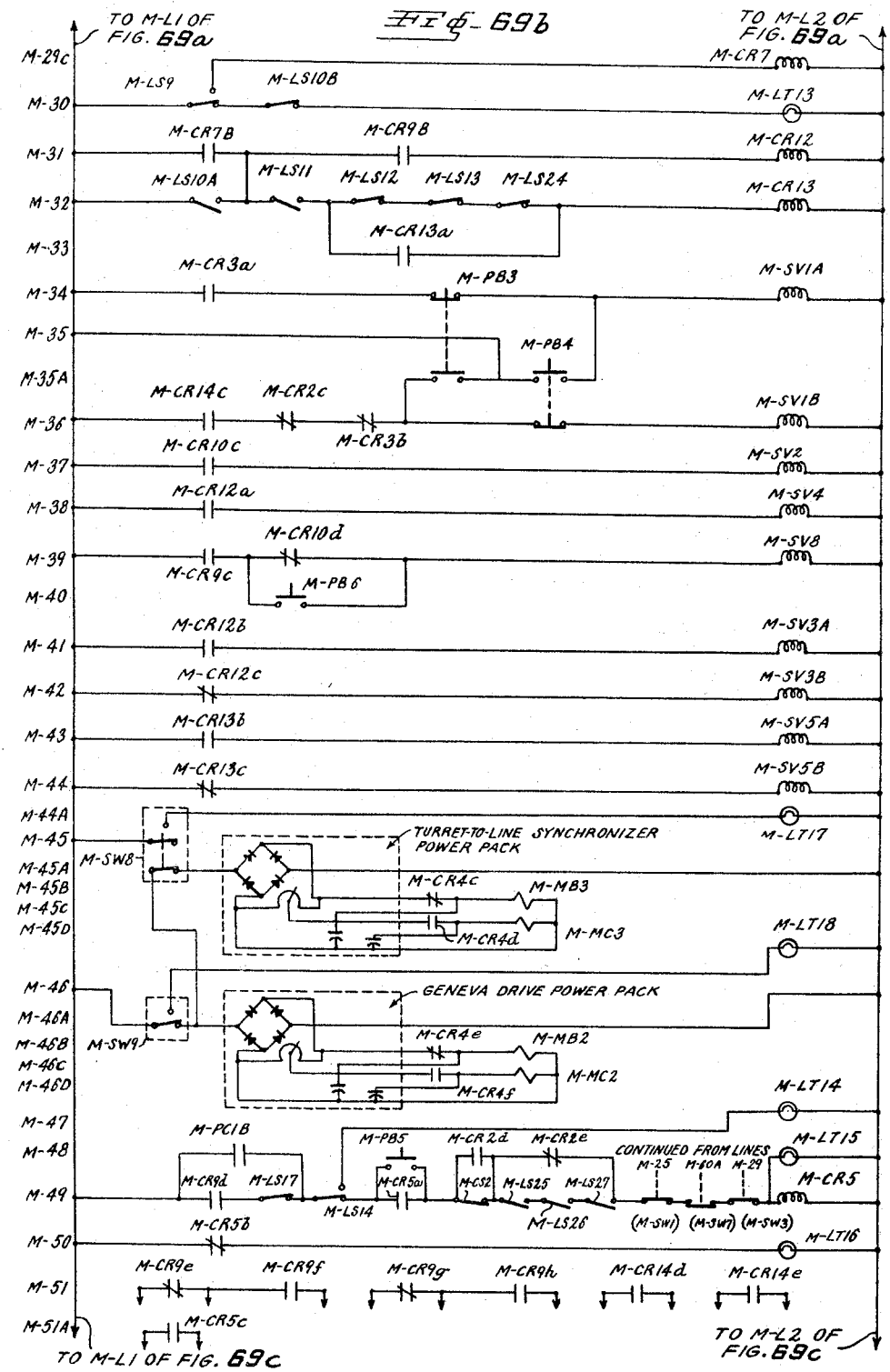

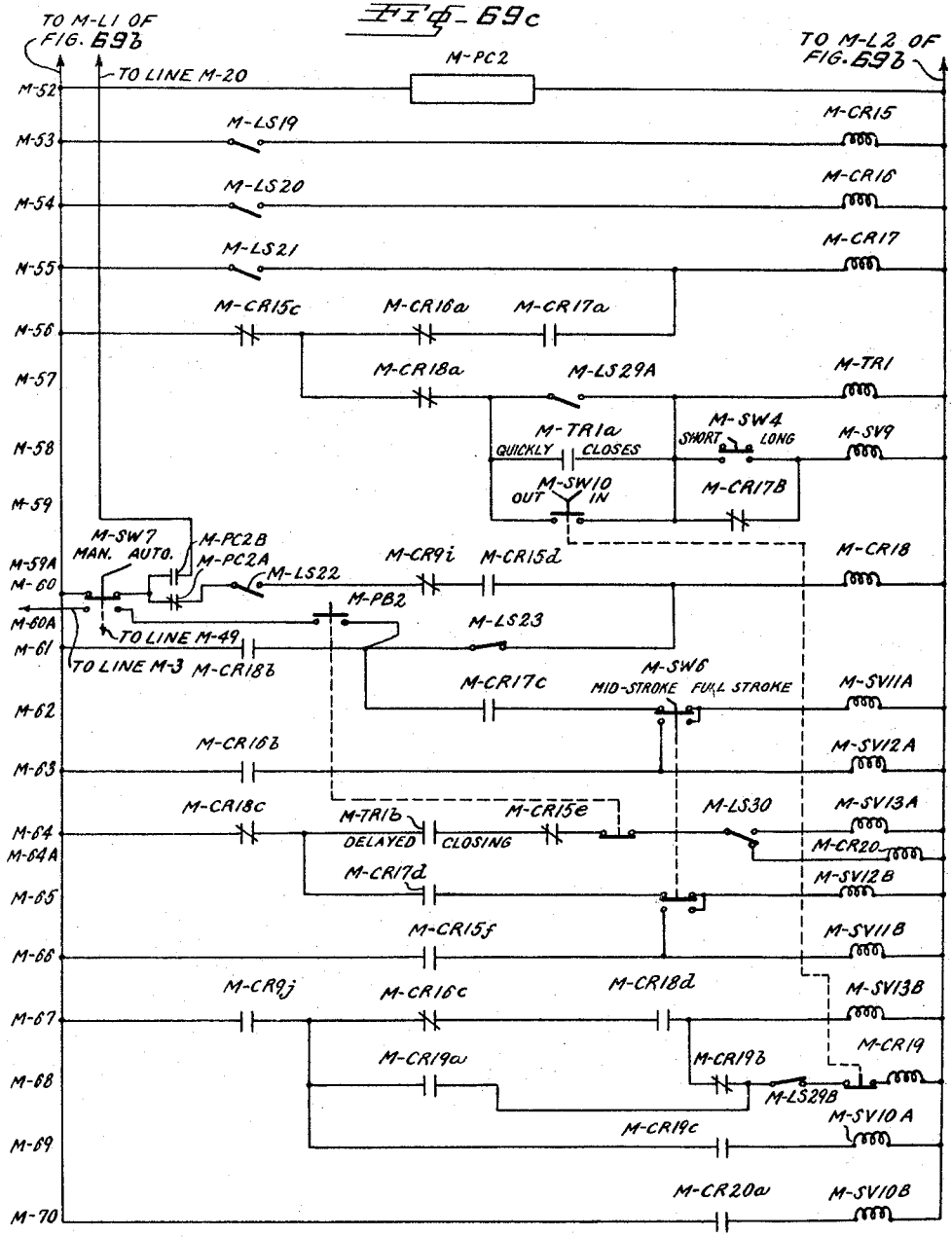

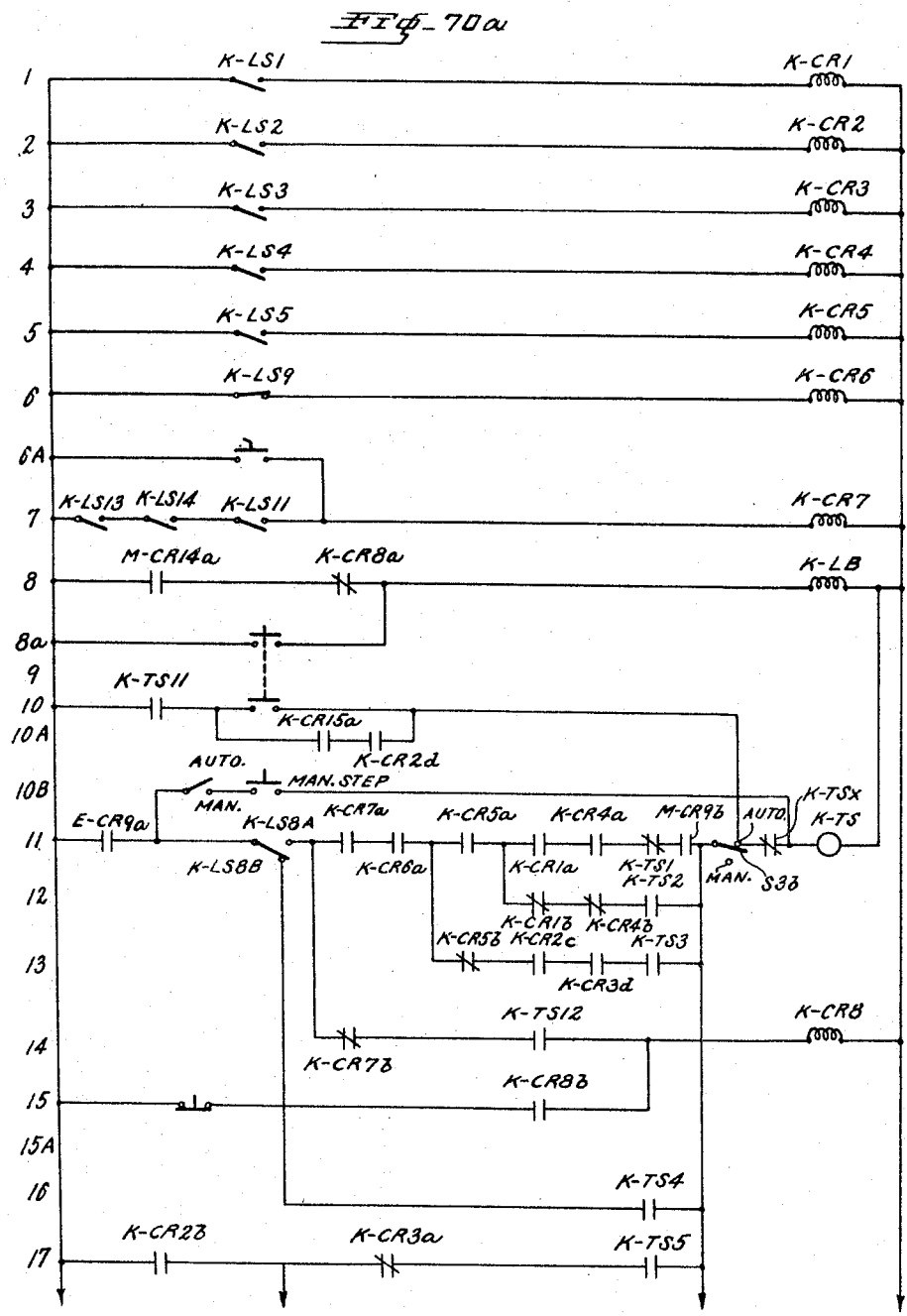

Fig. 72

| CONTACT NUMBER | CAM POSITIONS | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| X | × | × | × | × | × | × | × | × | × | × | × | × |
| 1 | × | O | O | O | O | O | O | O | O | O | O | O |
| 2 | O | × | O | O | O | O | O | O | O | O | O | O |
| 3 | O | O | × | O | O | O | O | O | O | O | O | O |
| 4 | O | O | O | × | O | O | O | O | O | O | O | O |
| 5 | O | O | O | O | × | O | O | O | O | O | O | O |
| 6 | O | O | O | O | O | × | O | O | O | O | O | O |
| 7 | O | O | O | O | O | O | × | O | O | O | O | O |
| 8 | O | O | O | O | O | O | O | × | O | O | O | O |
| 9 | O | O | O | O | O | O | O | O | × | O | O | O |
| 10 | O | O | O | O | O | O | O | O | O | × | × | × |
| 11 | O | × | × | × | × | × | × | × | × | × | × | × |
| 12 | × | × | × | O | O | O | O | O | O | O | O | × |
| 13 | O | × | × | × | × | × | × | × | O | O | O | O |
| 14 | O | × | × | × | × | O | O | O | O | O | O | O |
| 15 | O | O | O | O | O | × | × | × | O | O | O | O |
| 16 | O | O | × | × | O | O | O | O | O | O | O | O |
| 17 | O | O | O | × | × | × | × | O | O | O | O | O |
| 18 | O | × | × | × | O | O | O | O | O | O | O | O |
| 19 | O | O | O | × | × | × | O | O | O | O | O | O |

× CLOSED CONTACTS
O OPEN CONTACTS

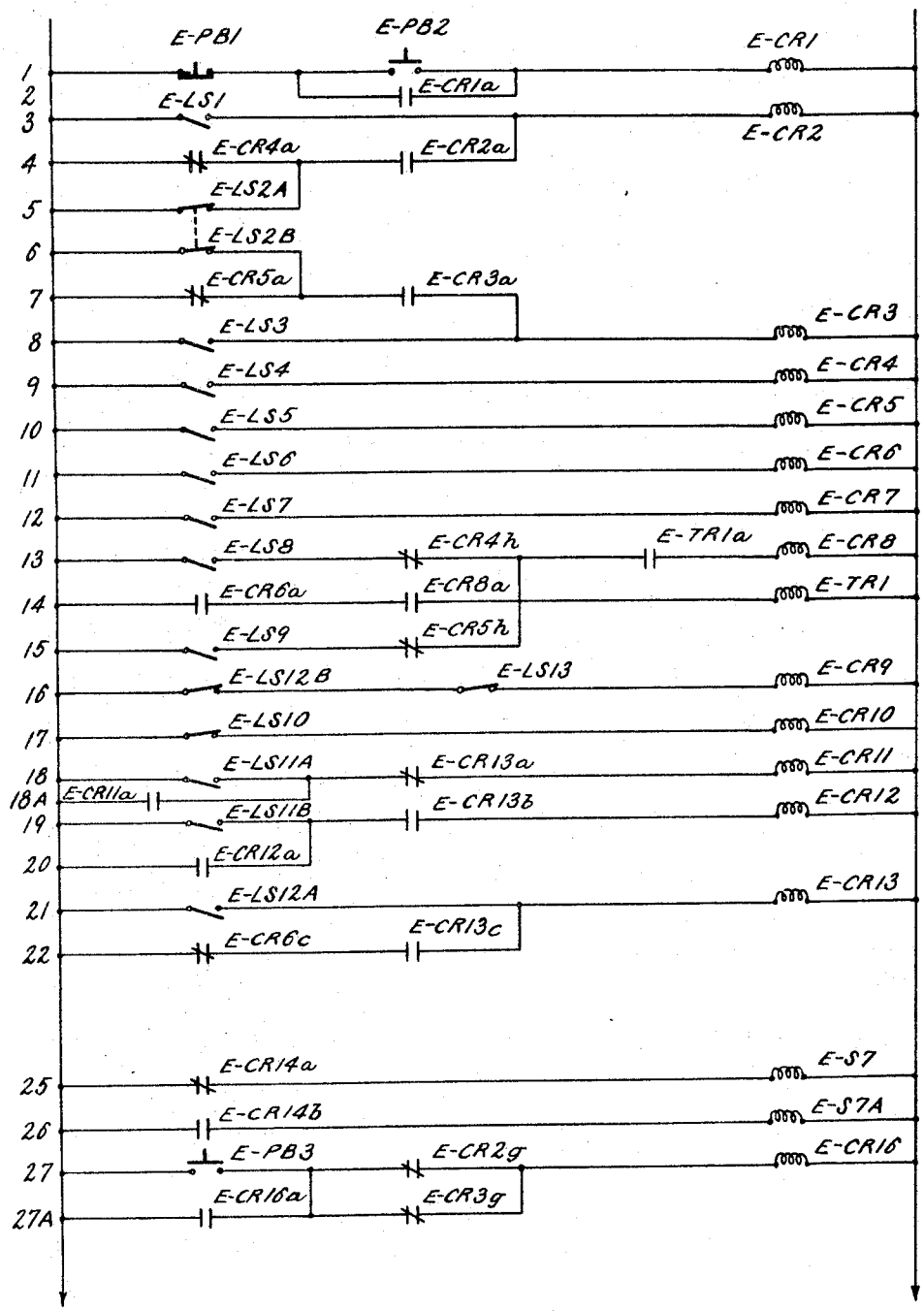

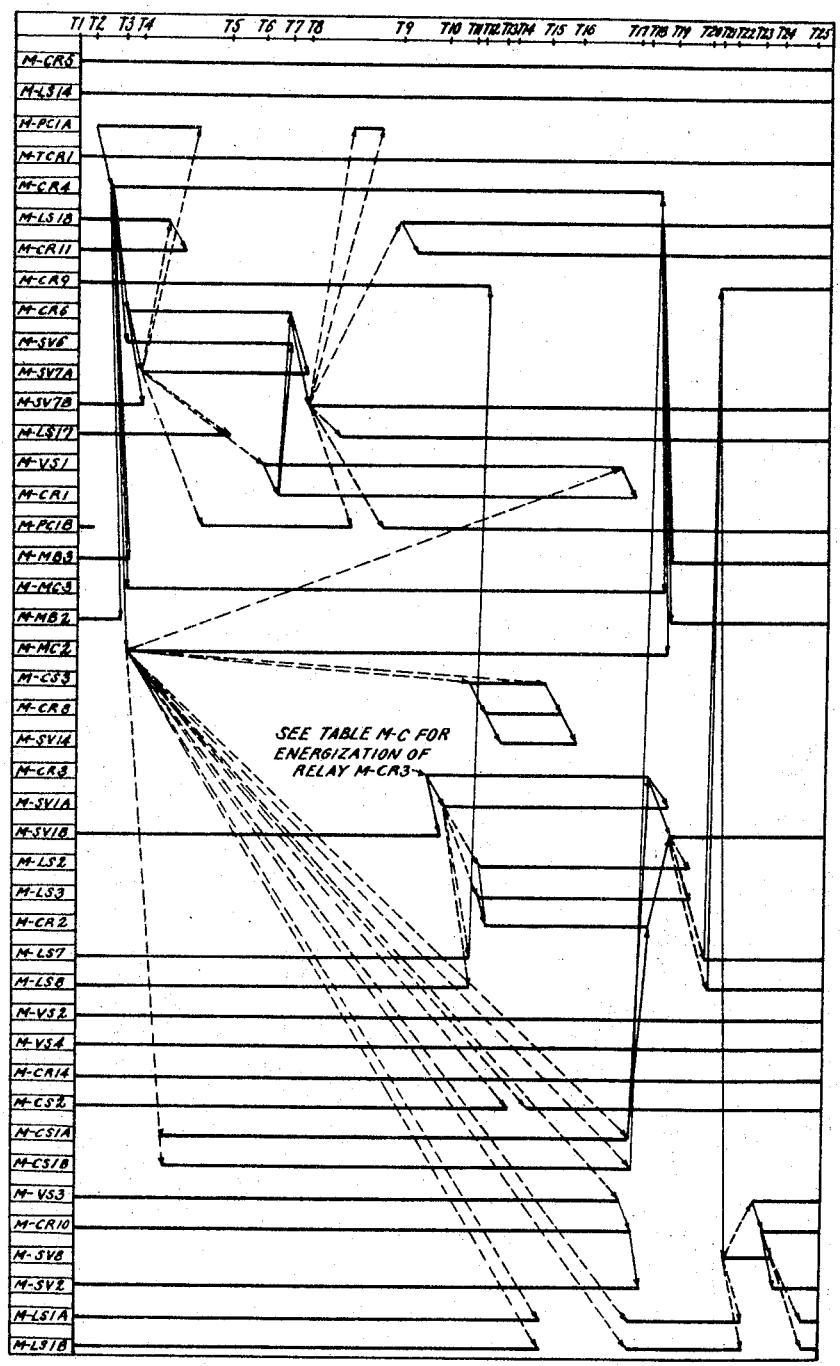

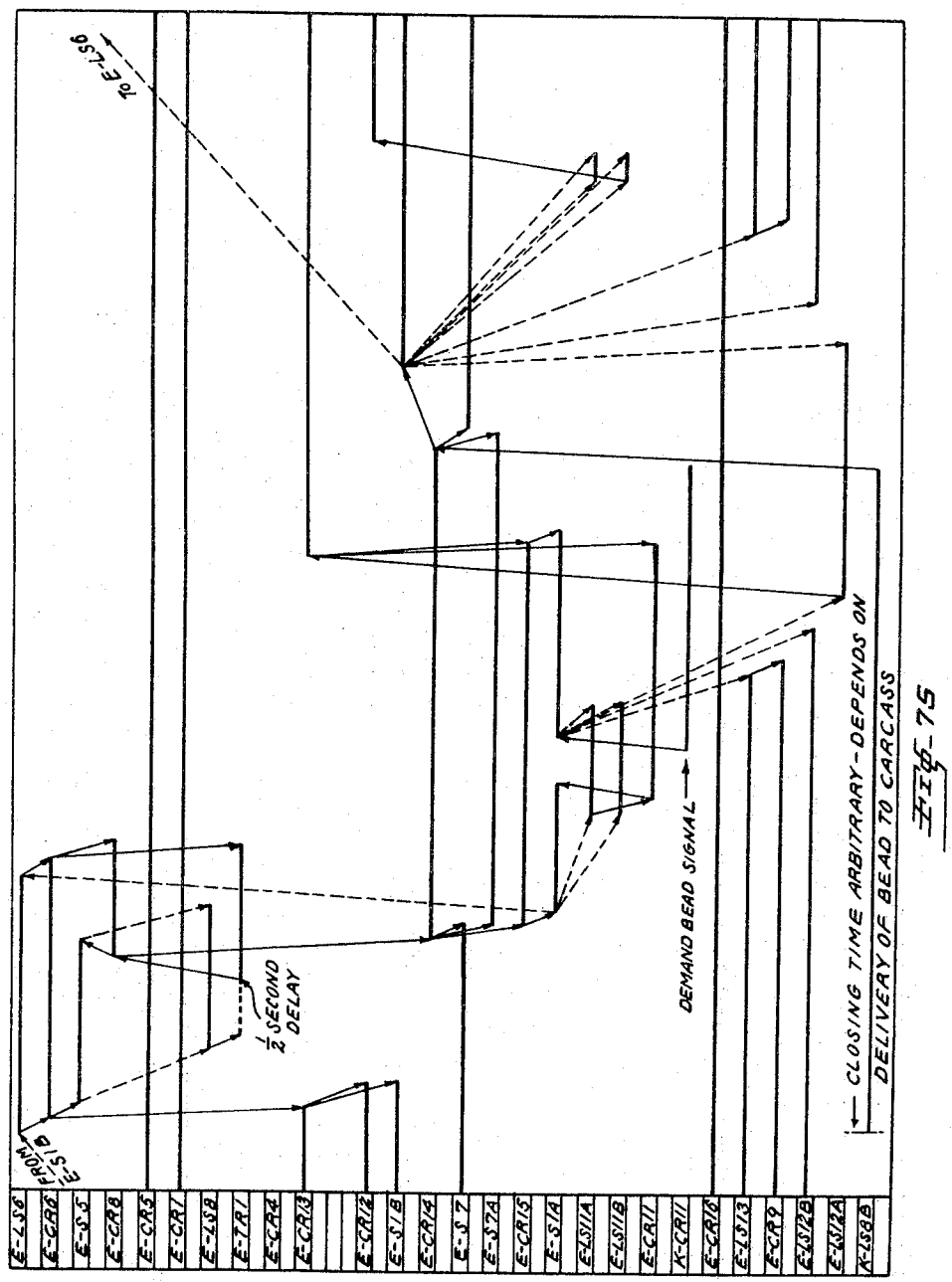

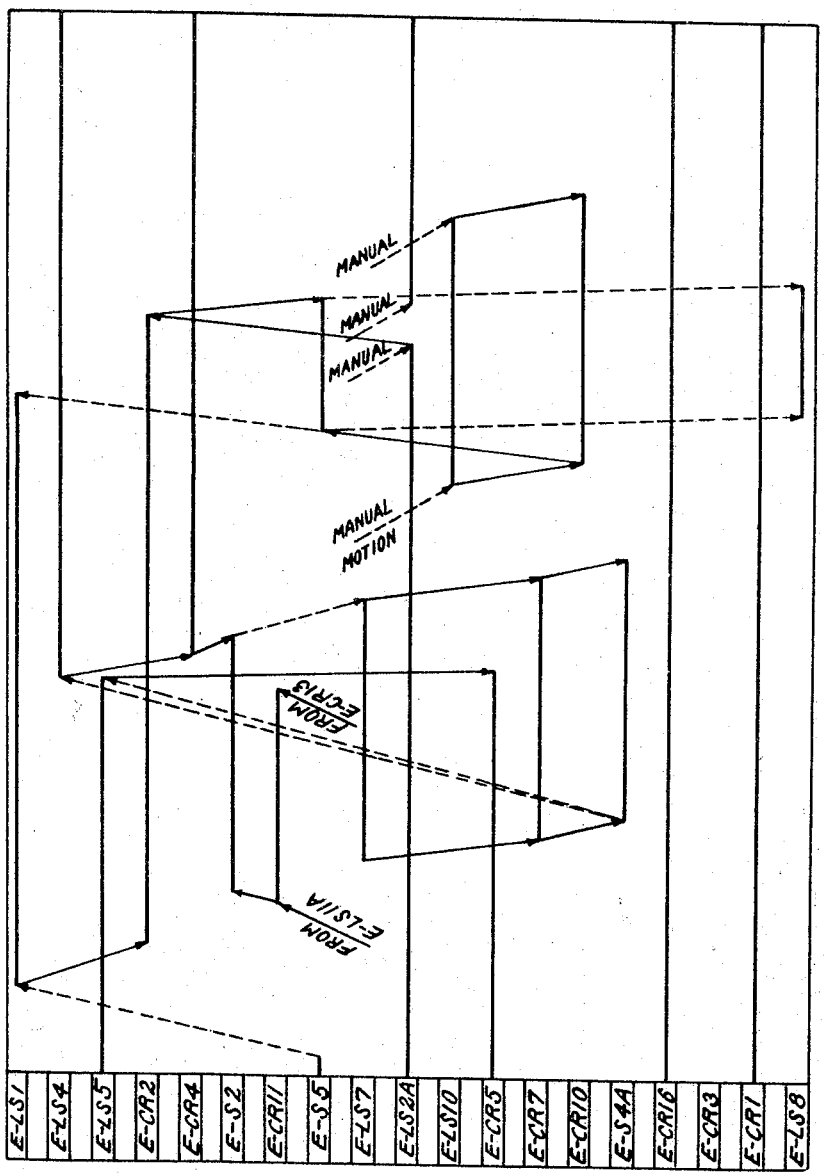

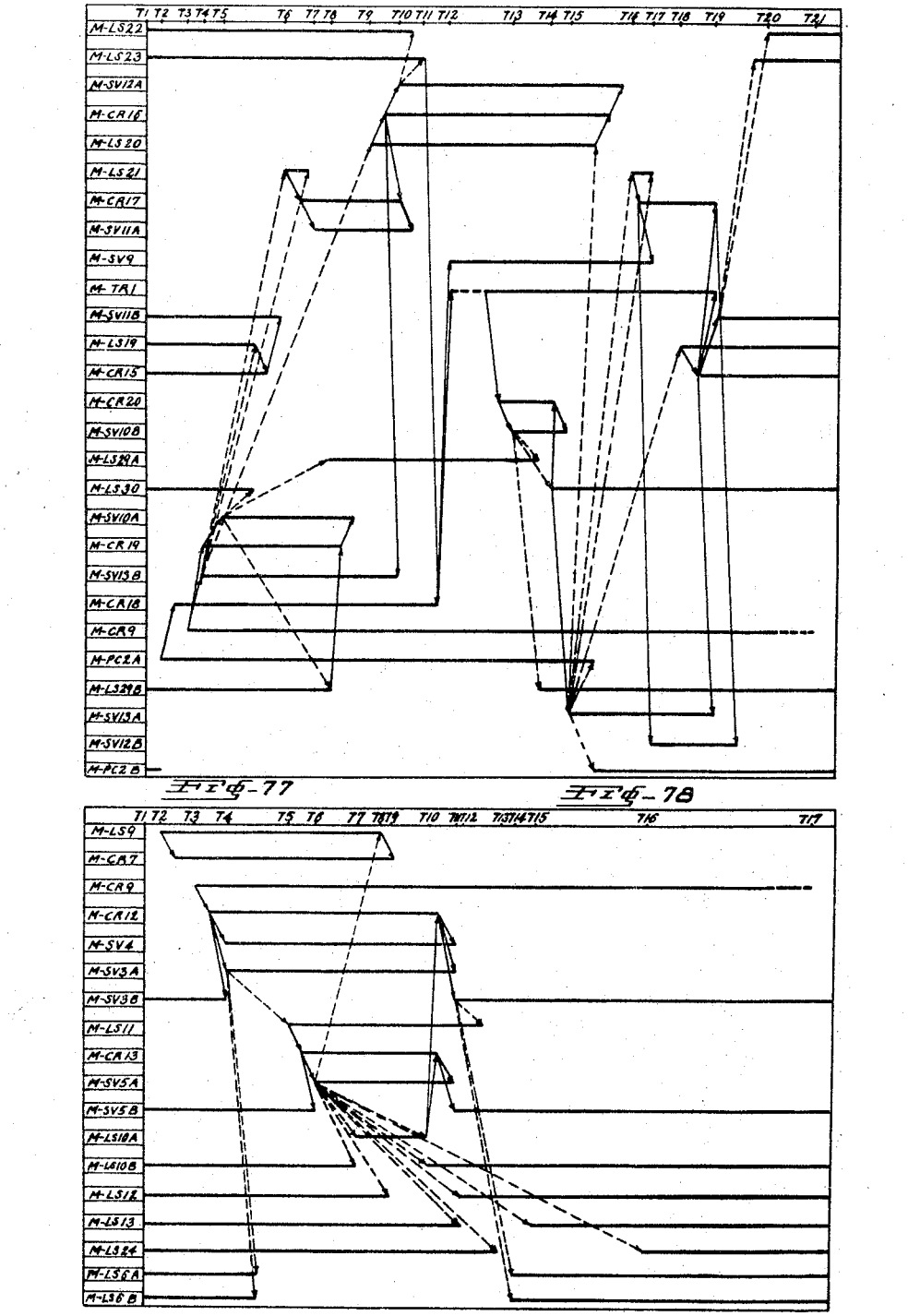

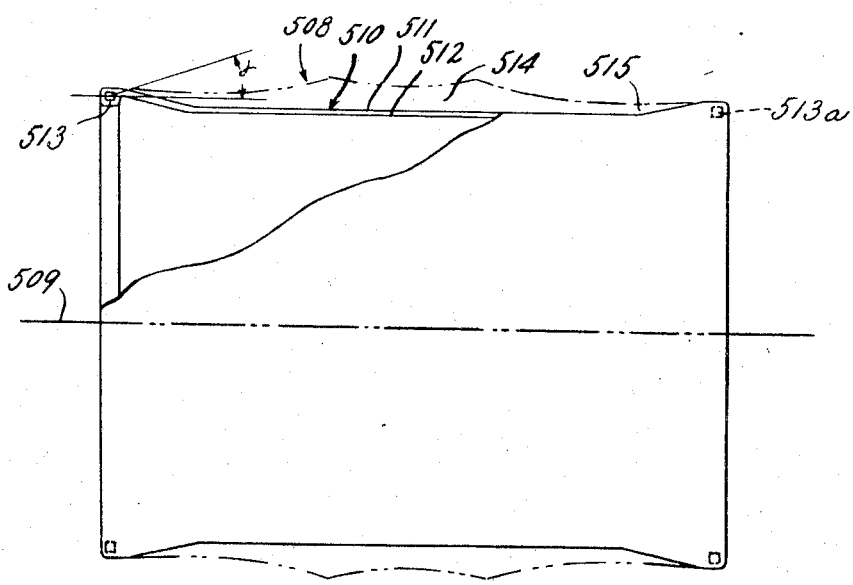
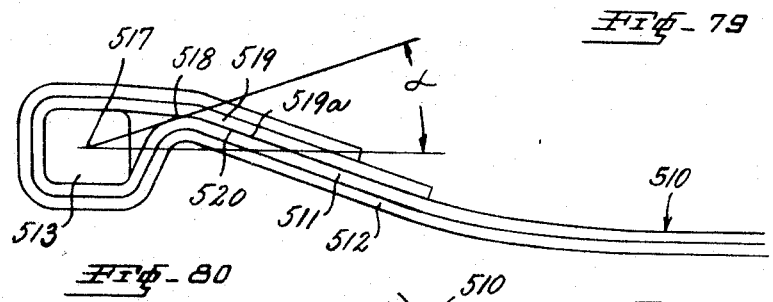
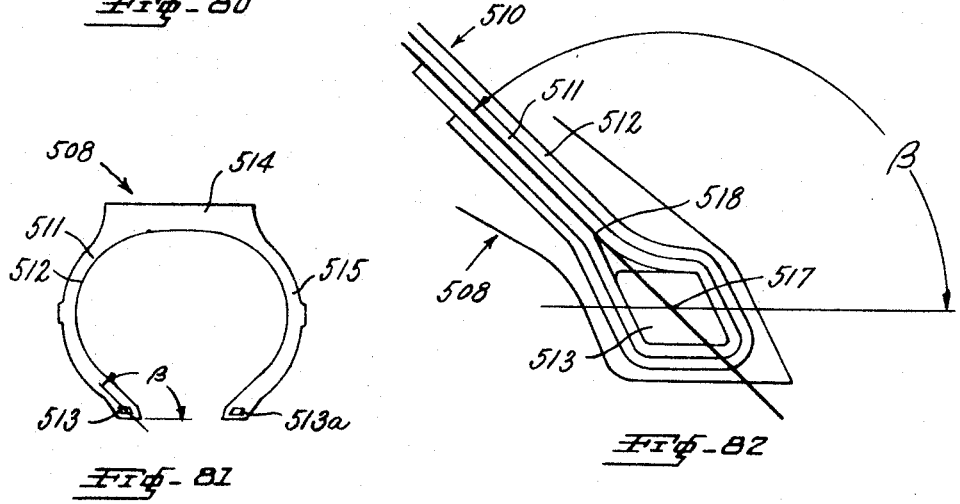

United States Patent Office 3,322,595
Patented May 30, 1967

3,322,595
TIRE CARCASS REMOVER
Sheppard A. Black, Wayne, and John D. Heide, Ramsey, N.J., assignors to Uniroyal, Inc., a corporation of New Jersey
Original application Dec. 4, 1962, Ser. No. 242,116. Divided and this application Mar. 25, 1966, Ser. No. 537,415
13 Claims. (Cl. 156—351)

This application is a division of our copending application Ser. No. 242,116, filed Dec. 4, 1962, and entitled "Automatic Machine and Method."

This invention relates to apparatus for making tire carcasses and, more particularly, to apparatus operative as an automatically controlled system for making tire carcasses continuously.

Prior machines have been proposed for making tire carcasses, but those machines are not capable of making the carcasses automatically. Further, such prior machines are not capable of production of tires at high rates. Further, such prior machines have limitations of accuracy with resulting non-uniformity of tires manufactured.

It is an object of the present invention, therefore, to provide a new and improved apparatus for making tire carcasses which avoids one or more of the abovementioned disadvantages of prior such apparatus.

It is another object of the invention to provide a new and improved apparatus for making tire carcasses which operates automatically.

It is another object of the invention to provide a new and improved apparatus for making tire carcasses at a high production rate of, for example, 480 tires per hour.

It is another object of the invention to provide a new and improved apparatus for making tire carcasses automatically which provides a high degree of uniformity of the tires manufactured thereby.

In accordance with a particular form of the invention, apparatus for removing a band of sheet material disposed on the cylindrical surface of a drum, comprises a frame and a carriage movably supported on said frame and adapted, when moved in a first direction, to engage the band disposed on the drum in the region of an extreme perimeter of the band. The apparatus also includes means for moving the carriage in the first direction, and means for clamping the aforesaid region of the band to the carriage, and means for moving said carriage in a second direction, substantially axially away from the drum, while the aforesaid region of the band is clamped to said carriage, to thereby remove the band from the drum.

For a better understanding of the present invention, together with other and further objects thereof, reference is made to the following description, taken in connection with the accompanying drawings, and its scope will be pointed out in the appended claims.

Referring to the drawings:

FIG. 1 is a plan view, partly schematic, of apparatus constructed in accordance with the invention;

FIG. 1a is an end view of a drum constructed in accordance with the invention;

FIG. 1b is a partly sectional view of a drum, taken along line 1b—1b of FIG. 1a;

FIG. 2 is a fragmentary plan view of the turret end of the machine;

FIG. 4 is a fragmentary side elevational view of the turret loader;

FIG. 5 is a sectional plan view, taken along the line 5—5 of FIG. 4;

FIG. 6 is a schematic drawing illustrating pneumatic and hydraulic control systems employed in the turret loader;

Figure 3:
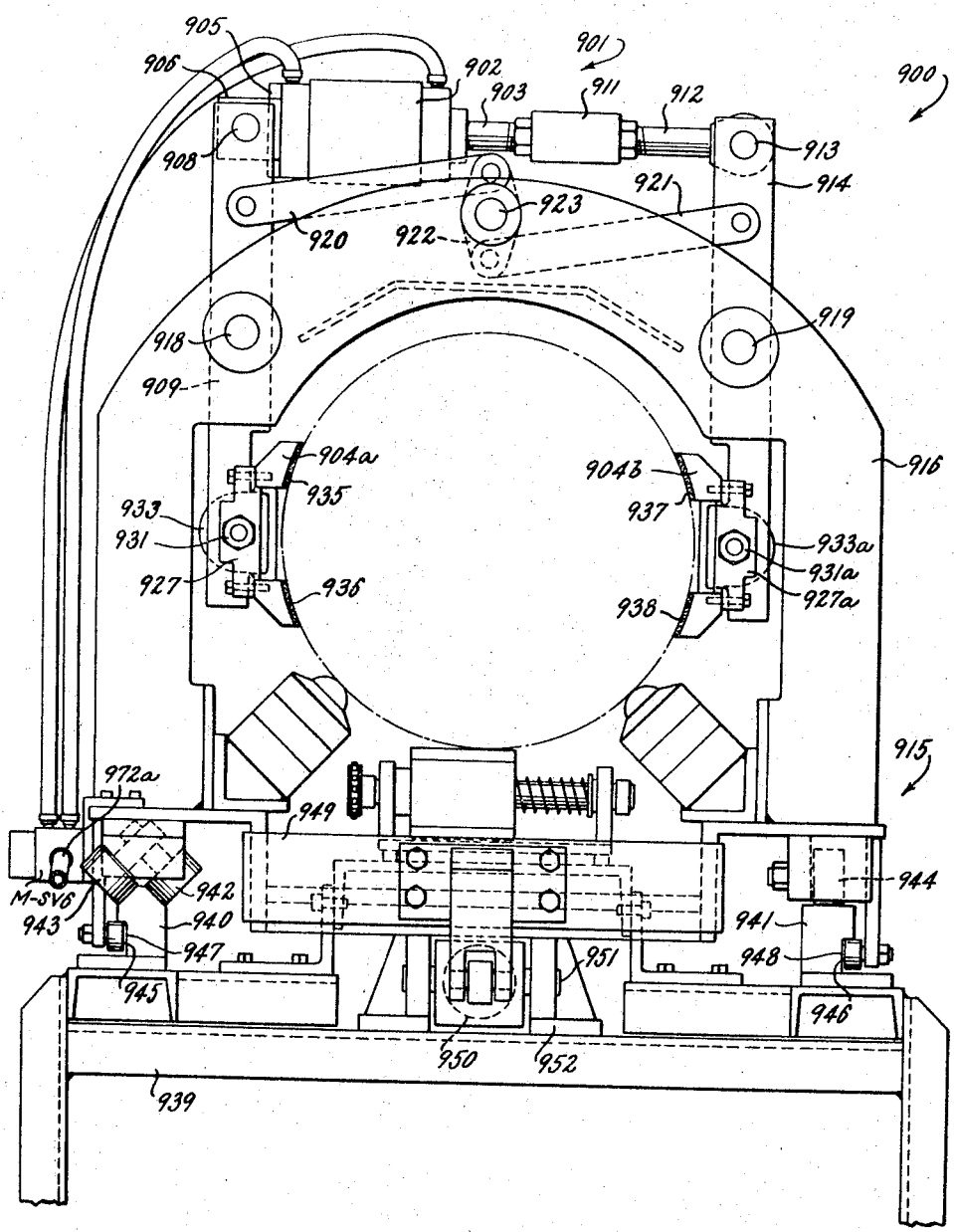
FIG. 3 is an end elevational view of a turret loader or pusher showing details of a clamping mechanism.
Figure 57:
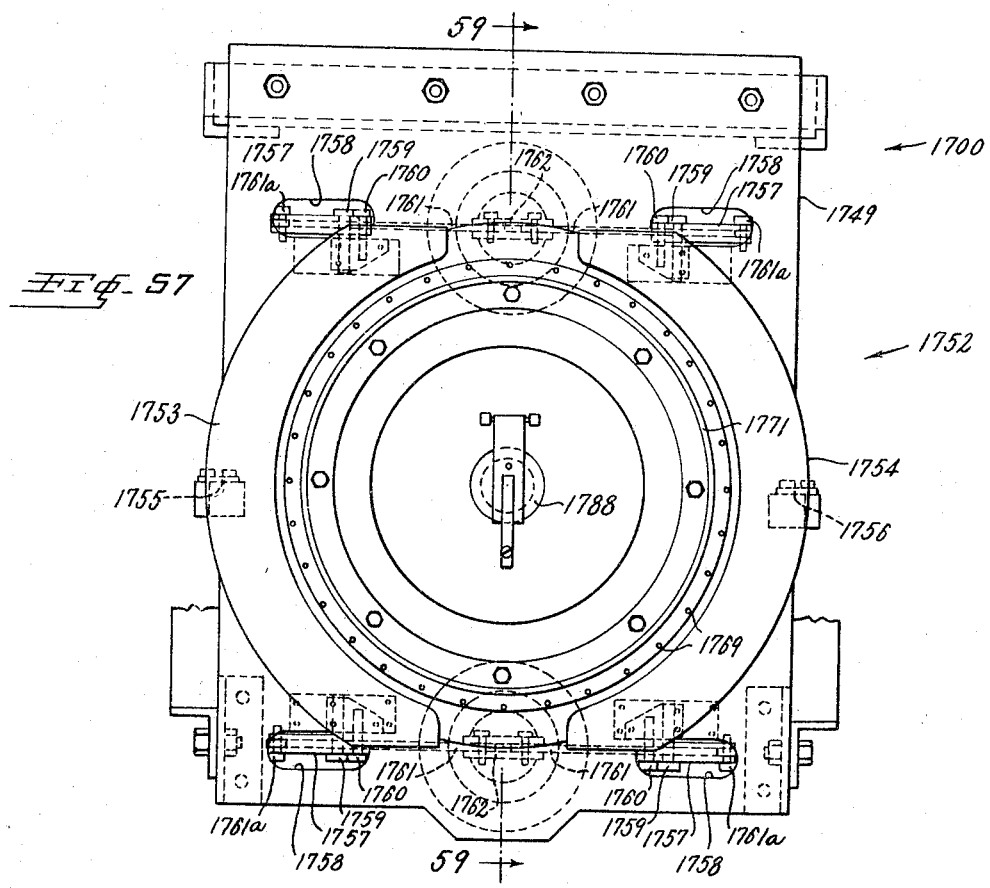
Figure 58:
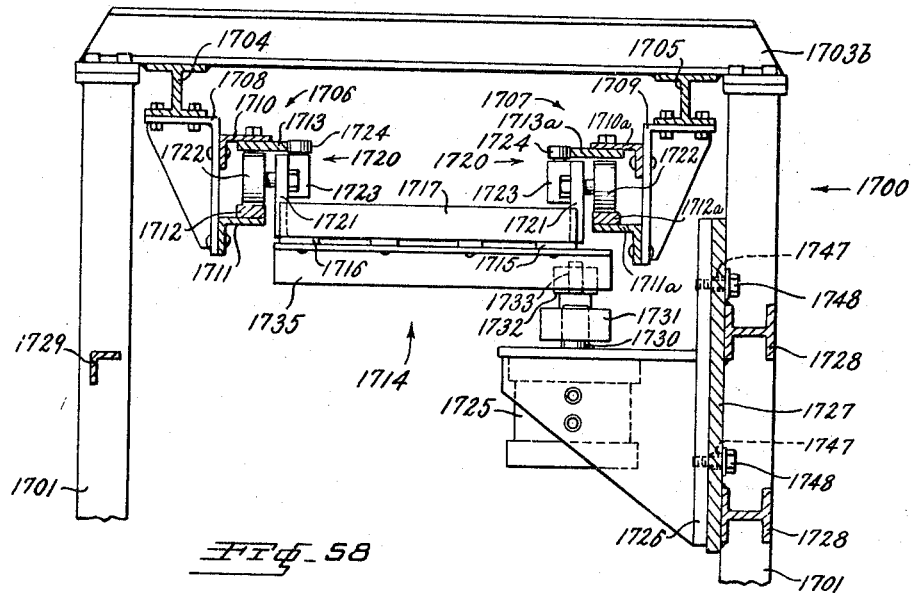
Figure 70B:
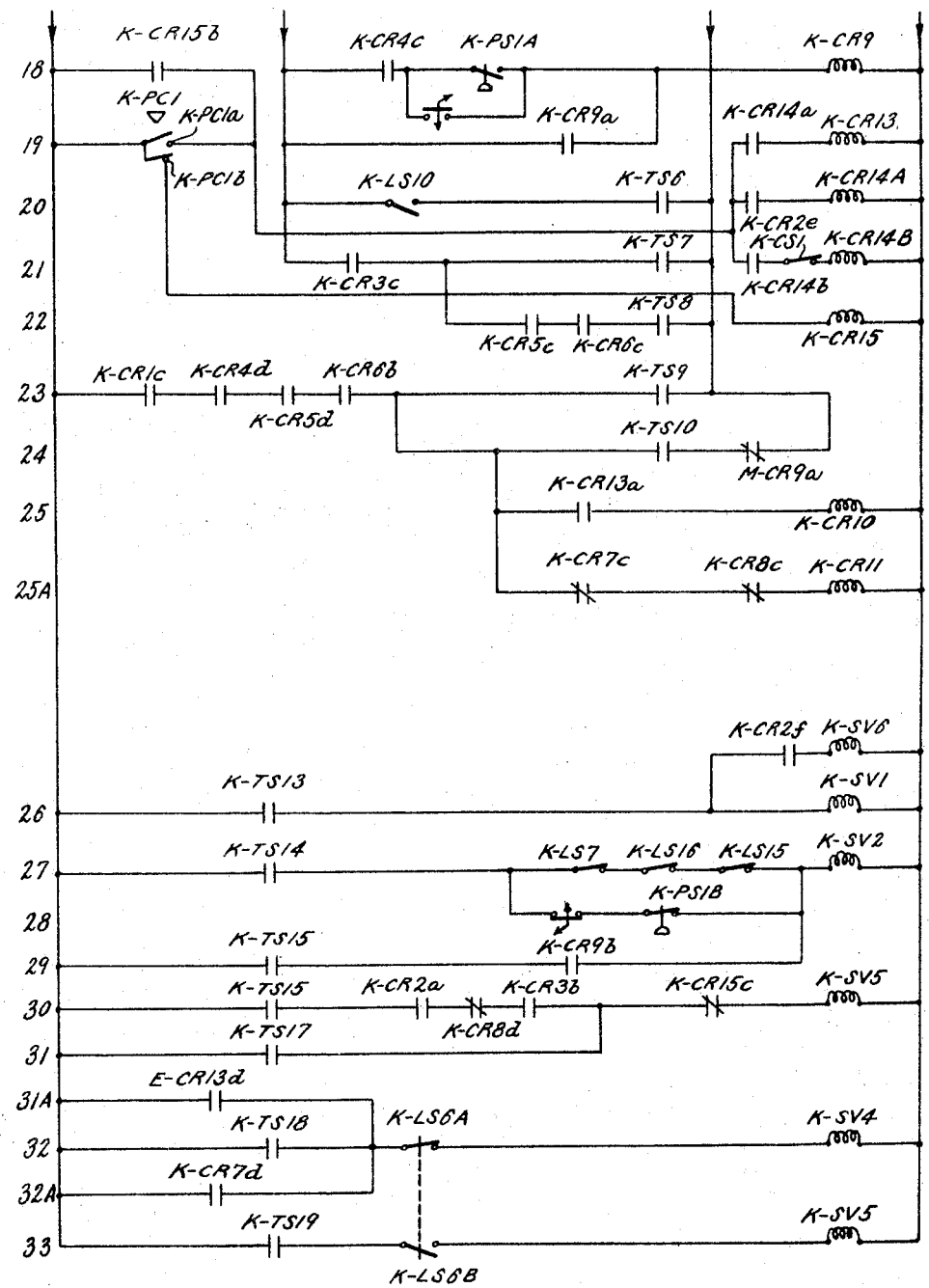
Figure 72B:
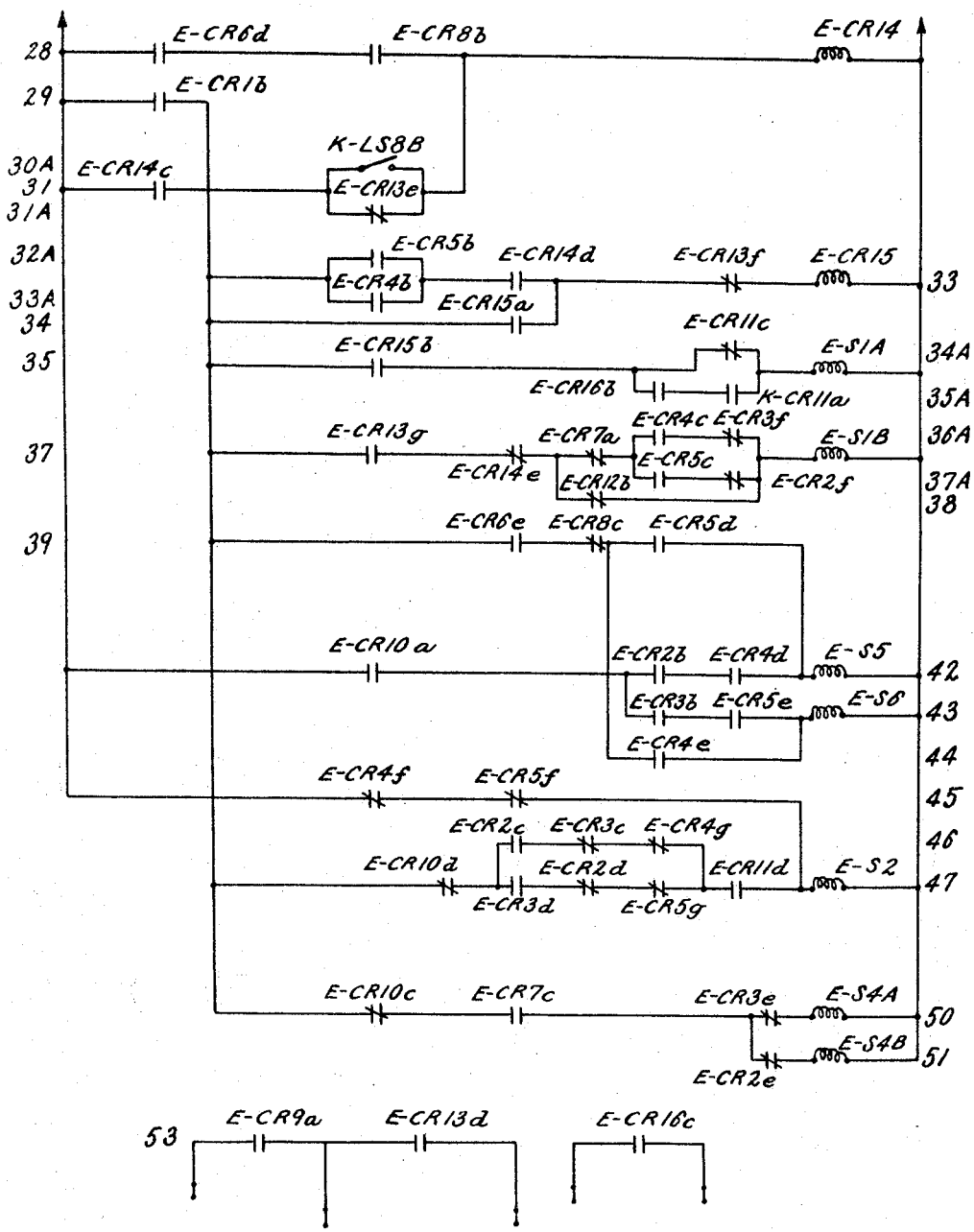
Figure 74:
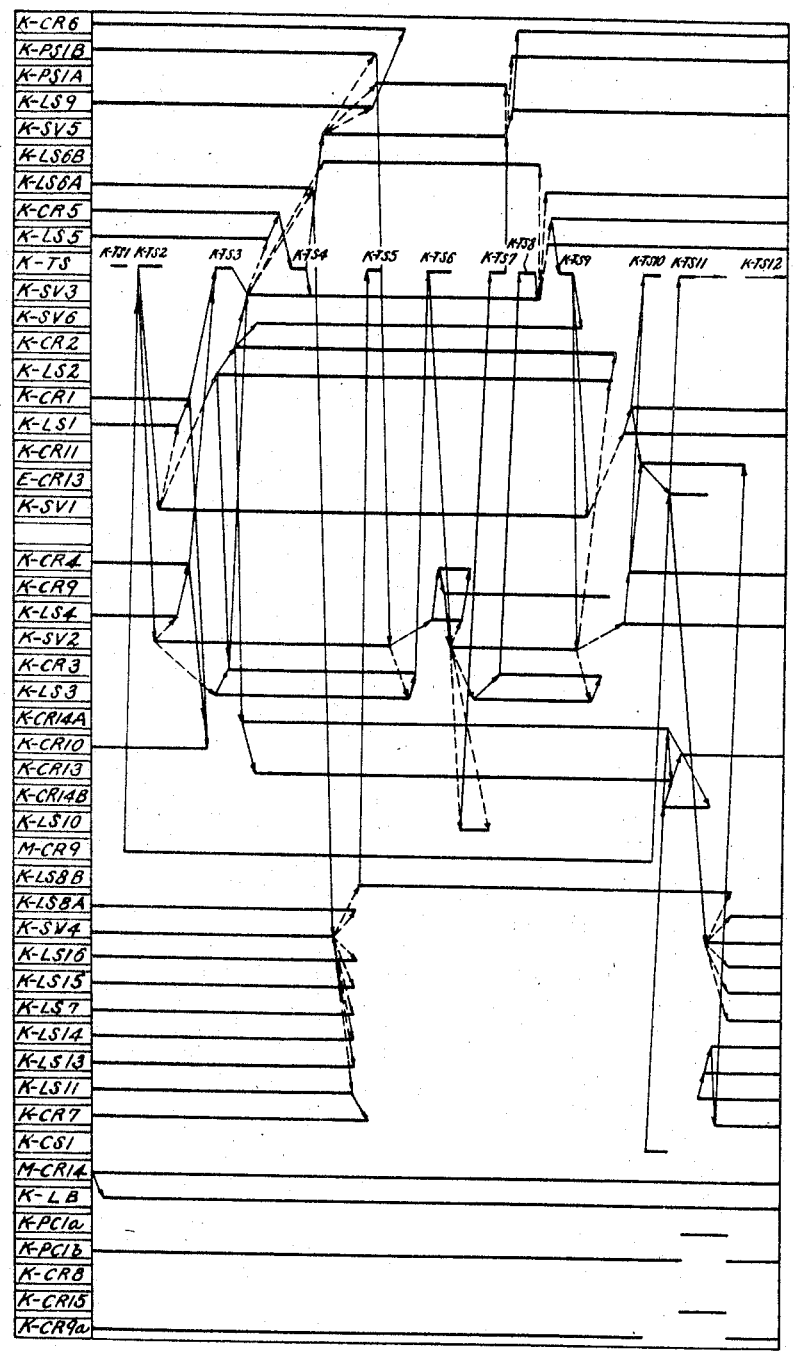

FIGS. 7 and 7a, together, represent a sectional elevational view, taken along the line 7—7 of FIG. 2, showing turrets, turret indexing means, and drum transfer carriages;

FIG. 8 is an end elevational view of the turret end of the machine, taken along the line 8—8 of FIG. 2;

FIG. 9 is a side elevational view taken along the line 9—9 of FIG. 8, showing a Geneva Drive indexing mechanism for indexing the turrets and also showing a locking mechanism for holding one of the turrets in a fixed position between indexes;

FIG. 10 is a fragmentary plan view of a portion of the structure shown in FIG. 9 illustrating the Geneva Drive turret indexing mechanism, and also showing various control switches actuated during cycling of the Geneva Drive indexing mechanism;

FIGS. 11 and 11a, together, represent a plan view of a portion of the vacuum means employed in holding the drums firmly against the turrets;

FIG. 12 is a sectional elevational view of one of the turrets, with parts broken away for clarity, showing details of the aforesaid vacuum means;

FIG. 13 is a sectional view, taken along the line 13—13 of FIG. 12;

FIG. 14 is an end elevational view of the means employed in moving the drum transfer carriages between the turrets;

FIG. 15 is a sectional view, taken along the line 15—15 of FIG. 14, showing a rack and pinion gear mechanism employed in driving the drum transfer carriages;

FIG. 16 is a plan view, taken along the line 16—16 of FIG. 14, showing drive means for the drum transfer carriages;

FIG. 17 is a schematic drawing illustrating a pneumatic control system utilized in locking the turrets between indexes and an hydraulic control system employed in moving the drum transfer carriages;

FIG. 18 is a side elevational view of the first bead setter;

FIG. 19 is a plan view of the first bead setter;

FIG. 19a is a fragmentary side elevational view of the deceleration valve detail of the bead setter taken along the line 19a—19a of FIG. 19;

FIG. 19b is a front elevational view of the deceleration valve detail taken along the line 19b—19b of FIG. 19a;

FIGS. 20a and 20b comprise together a side elevational view of the working components of the bead setter partially sectioned and partially broken away for the purpose of showing the details of construction thereof;

FIG. 21 is a sectional view of the apparatus shown in FIG. 20b taken along line 21—21 of FIG. 20b;

FIG. 22 is a front elevational view of the top portion of the bead setter taken along line 22—22 of FIG. 20a;

FIG. 22a is a fragmentary front elevational view of the external bead placing assembly detail of the bead setter;

FIG. 22b is a side elevational view, partially sectioned taken along line 22b—22b of FIG. 22a;

FIG. 23 is a fragmentary front elevational view of a portion of the bead holding and bladder carrier assembly partially broken away to show the details of construction thereof;

FIG. 23a is an elevational sectional view, taken along the line 23a—23a of FIG. 23;

FIG. 23b is a plan sectional view taken along the line 23b—23b of FIG. 23;

FIG. 24 is a front elevational view of the apparatus shown in FIG. 23 in another operational position;

FIG. 24a is an elevational section taken along the line 24a—24a of FIG. 24;

FIG. 25 is a front elevational view of the ply turn-up bladder;

FIG. 26 is a section of the bladder taken along line 26—26 of FIG. 25;

FIGS. 27a and 27b are sectional views of the bead region of two completed tire carcasses showing the operational advantages of the bladder construction of FIG. 26;

FIG. 28 is a side elevational view partly schematic and partly broken away and sectioned showing the bead setter at the start of its sequence of operation and showing a portion of a carcass ply bearing drum in operational relationship thereto;

FIG. 29 is a similar side elevational view showing the bead setter in its next succeeding operational position;

FIG. 29a is a fragmentary plan view of the bead setter taken along the line 29a—29a of FIG. 29;

FIG. 30 is a plan view of the bead setter, partially sectioned, cooperatively engaged with a carcass-bearing drum and representing the bead setter in its operational position just before the bead is set;

FIG. 30a is a sectional view of a switch actuating detail of the bead setter taken along line 30a—30a of FIG. 30;

FIG. 30b is a sectional view of the central shaft taken along the line 30b—30b of FIG. 30;

FIG. 30c is an enlarged sectional detail of the bead setter and drum in the operating position of FIG. 30 showing how the bands are depressed into the drum by the bead setter;

FIG. 31 is a side elevational view of the bead setter, partially sectioned, to show the operational position of the bead setter, drum and carcass just after the bead has been set;

FIG. 31a is a sectional view, corresponding to FIG. 30a, taken along line 31a—31a of FIG. 31;

FIG. 31b is a sectional detail, corresponding to FIG. 30b, taken along line 31b—31b of FIG. 31;

FIGS. 32, 33, 34 and 35 are sequentially taken front elevational views of the top portion of the bead setter showing the sequence of operation of the bead setter in setting the bead and commencing the ply turn-up around the bead;

FIGS. 32a, 33a, 34a and 35a are side elevational views, partially sectioned, of the top forward end of the bead setter showing the same sequential operational steps, respectively as are depicted in FIGS. 32, 33, 34 and 35;

FIG. 36 is a side elevational view of the bead setter, partially sectioned, showing the apparatus in its operational position at the completion of the ply turn-up step;

FIG. 37 is a side elevational view of the bead setter, partially sectioned, showing the cage retracted from the completed ply turn-up with the bladder about to deflate;

FIG. 38 is a side elevational view of the bead setter, partially sectioned, showing the bladder deflating and the bead released from the bead setter;

FIG. 38a is a sectional switch actuation detail, corresponding to FIG. 29a, taken along line 38a—38a of FIG. 38;

FIG. 38b is a sectional detail, corresponding to FIG. 29b, taken along line 38b—38b of FIG. 38;

FIG. 39 is a side elevational view of the bead setter, partially sectioned, showing the apparatus fully retracted to receive a new bead and the drum bearing the completed ply turn-up about to be moved by the turret to its next operational position;

FIG. 40 is a schematic diagram of the pneumatic control system of the bead setter;

FIG. 41 is a schematic diagram of the hydraulic control system of the bead setter;

FIG. 42 is a plan view of the first bead servicer;

FIG. 42a is a rear elevational view of a portion of the transfer arm assembly taken along line 42a—42a of FIG. 42;

FIG. 42b is a sectional detail of the end plug region of the loader taken along line 42b—42b of FIG. 42;

FIG. 43 is a front elevational view of the bead servicer taken along line 43—43 of FIG. 42;

FIG. 44 is a side elevational view of the bead servicer taken along line 44—44 of FIG. 43;

FIG. 45 is a side elevational view of the other side of the forward portion of the bead servicer taken along line 45—45 of FIG. 43;

FIG. 45a is a rear elevational view of a detail of the transfer arm assembly taken along line 45a—45a of FIG. 45;

FIG. 46 is a sectional view of a storage barrel on the bead servicer taken along line 46—46 of FIG. 43;

FIGS. 47, 48, 49 and 50 are plan views of a portion of the transfer arm assembly (partially sectioned in the case of FIG. 49) showing this portion of the transfer arm assembly in successive positions in its sequence of operation in moving the transfer arm from the vertical position into the position of engagement with the storage barrel;

FIGS. 51a and 51b are partially sectioned details of the storage barrel and transfer arm showing sequential operational steps in the transfer of a bead from the storage barrel to the transfer arm assembly;

FIGS. 52a, 52b and 52c are details, partially sectioned, of the transfer arm assembly and one of the external bead setter fingers showing the sequential steps in the operation of transferring the bead from the transfer arm to the external bead setter fingers;

FIG. 53 is a schematic diagram of the pneumatic system used in the bead servicer;

FIG. 54 is a schematic diagram of the hydraulic system utilized in the bead servicer;

FIG. 55 is a fragmentary plan view of a carcass remover;

FIG. 56 is a side elevational view, of the carcass remover, with parts broken away for clarity;

FIG. 57 is an end elevational view of the carcass remover, with parts broken away for clarity, showing clamping means;

FIG. 58 is a sectional elevational view, taken along line 58—58 of FIG. 56, showing a portion of the carcass remover;

FIG. 59 is a sectional elevational view, taken along the line 59—59 of FIG. 57 showing on an enlarged scale a carcass clamped to the carcass remover for movement therewith;

FIG. 60 is a side elevational view of a tong type clamping mechanism;

FIG. 61 is an end elevational view of the tong clamping mechanism;

FIG. 62 is an end elevational view, similar to FIG. 61 but taken from the opposite end of the tong opening and closing means;

FIG. 63 is a schematic diagram of a control system and a pneumatic control system utilized by the carcass remover;

FIG. 64 is a schematic diagram of a hydraulic control system employed in opening and closing the tong clamps;

FIG. 65 is a side elevational view of the initial portion of a drum return conveyor;

FIG. 66 is a plan view, of the initial portion of the drum return conveyor, with parts broken away for clarity illustrating various control switches that are actuated by the drum as it moves along the return conveyor path;

FIG. 67 is an end elevational view of the initial portion of the drum return conveyor;

FIG. 68 is a schematic diagram of a pneumatic control system employed in the drum return conveyor;

FIGS. 69a, 69b and 69c, together constitute an electrical diagram of the control circuit employed in controlling the automatic operations of the turrets, turret loader, carcass remover, drum return conveyor, and turret indexing mechanism;

FIGS. 70a and 70b together constitute an electrical diagram of the control circuit of the first bead setter;

FIG. 71 is a sequence chart to aid in explaining the operation of the stepping relay of the bead setter circuit;

FIGS. 72a and 72b together constitute an electrical diagram of the control circuit of the first bead servicer;

FIG. 73 is a sequence diagram to aid in explaining the operation of the turrets, turret loader, turret indexing mechanism and drum transfer carriages;

FIG. 74 is a sequence chart to aid in explaining the operation of the first bead setter;

FIG. 75 is a sequence chart to aid in explaining the bead transfer operation of the first bead servicer;

FIG. 76 is a sequence chart to aid in explaining the loading operation of the first bead servicer;

FIG. 77 is a sequence chart to aid in explaining the operation of the carcass remover;

FIG. 78 is a sequence chart to aid in explaining the operation of the drum return conveyor;

FIG. 79 is a view of a raw two-ply tire carcass of this invention, partially broken away and partially sectioned on a plane containing the axis of the tire carcass. The outline of the tread and sidewall stock is shown in "phantom" lines to indicate the appearance of a raw tire of the invention;

FIG. 80 is an enlarged sectional view of the bead region of the raw carcass shown in the upper left-hand portion of FIG. 79, showing in detail the location and assembly of each fabric ply and ply end in the bead region;

FIG. 81 is the upper half of a cross-sectional view of a shaped tire. The cross-section is taken on a plane containing the axis of the tire; and FIG. 82 is an enlarged view of the left-hand bead region of the shaped tire shown in FIG. 81. The figure corresponds to FIG. 80, showing in detail the new location of each fabric ply and ply end in the bead region after the rotation that accompanies shaping.

*General description and explanation of operation of FIG. 1 apparatus*

Referring now more particularly to FIG. 1 of the drawings, the apparatus continuously handles, for example, fifty drums, including drums 1–4. As will be described more fully subsequently, each drum preferably is a rigid metal cylinder with a hollow central region, having a grooved cone attached to one end of the drum and a cam-actuated set of locking fingers attached to the other end of the drum. A pair of annular bands are slidably mounted at the ends of each drum for supporting fabric between drums, as will be apparent subsequently.

The first unit of the apparatus is a band-positioning apparatus 100 for extending the retractable bands of the drums. To this end, a pair of displaceable arms having fingers grip the bands while each drum is in the band-positioning apparatus.

The second unit is a drum loader 200 successively moving the drums into a line of interconnected drums. The drum loader moves the drums along an elongated cam 203 which extends through the machine. The drum loader 200 has an electrically interlocking set of two piston-operated clamps 201, 202 which holds the cam 203 rigidly, in cooperation with the drums, as will be more fully explained subsequently. The clamps 201, 202 open and close alternately so that each drum can be moved onto the cam in a series of three steps. When a drum is first introduced into the drum loader 200, the first set of clamps 201 automatically opens. The drum is then pushed between clamps 201 and 202, the clamps 201 close on the cam, and the clamps 202 open. The drum is then pushed forward so that each drum locks with the drum ahead or downstream by means of the locking cone and fingers which select a groove of the cone. The locking of the drums is controlled by the position of the drums along the cam 203 which has a stepped diameter along its length to actuate the fingers.

The interlocked drums are then driven through a winding frame 300 having a series of driving wheels located in line at the bottom of the drums and on each side of the drums. These wheels are rotatable to drive the drum forward and are mounted in swivels so that they can be adjusted in angle to impart the correct rotating and longitudinally advancing motion to the drums. Fabric is applied to the interlocked set of drums from a let-off frame 400 mounted on one side of the unit 300 and adjusted to cause the fabric to wind onto the drums at a predetermined cord angle.

As the drums advance through the winding frame they move to a fabric cutting unit 700. The fabric cutting unit includes a high speed rotary knife so mounted on a frame as to permit it to be revolved circumferentially around the drums. The knife is mounted so that on signal it cuts the fabric circumferentially between the drums. The cutting unit is mounted on a carriage synchronized with the speed of the longitudinal advance of the drums, and a signal is supplied to the cutting unit by means of an electrical contact made by the drum moving over a contact ring on the cam to cause the fabric cut to be made exactly between two adjacent drums.

After the fabric is cut, the drum advances over a portion of the cam which opens the locking fingers and frees the drum from the following drum. A transfer unit 800 of rollers then advances the drum to lock it automatically on the preceding drum which is rotating and moving longitundinally into a second winding frame 300A. The transfer unit 800 permits the drum to rotate freely about its longitudinal axis. The cam 203 in this portion of the apparatus has a diameter causing the fingers of the preceding rotating drum to interconnect with a different groove on the cone of the drum on the transfer unit. Accordingly, the drum is automatically locked onto the preceding drum with a new and different distance between drums. The drums are then advanced through the seconding winding unit 300A which is similar to the winding unit 300 and is supplied with fabric from a let-off unit 400A similar to the unit 400. The units 300A and 400A preferably are of opposite hand to the units 300 and 400 to permit crossing fabric plies. Thereafter, the second ply is cut by a cutting unit 700A similar to the cutting unit 700.

The drums are then moved to a turret loader 900 for loading a swivel turret 1000 which grips each drum by means of a pneumatic chuck. The drum is then swung by the turret 1000 to a bead setter 1300 supplied with bead wires by a bead servicer 1500. The bead setter 1300 automatically positions a wire bead over the carcass plies. A set of cam-operated fingers simultaneously moves under the fabric and then grips the bead wire while a pneumatically inflated air bag located under a cage of the bead setter rolls the fabric over the top of the bead wire and makes a fabric turn-up.

The turret 1000 then rotates under the control of a Geneva drive mechanism 1200 and transfers the drum to a second turret 1100 with a pneumatic chuck for gripping the drum. The turret 1100 then rotates and positions the drum with respect to a second bead setter 1300A similar to the bead setter 1300. The bead setter 1300A is supplied with bead wires by a bead servicer 1500A similar to the bead servicer 1500 and applies the bead wire to the other end of the drum.

The turrett 1100 then rotates the drum to a carcass remover 1700 where the carcass is clamped by a suitable mechanism and air is introduced under the carcass to permit the carcass to be pulled off the drum.

The carcasses may then be removed from the apparatus and stored for further processing, such as the application of tread stock, shaping and curing. The turret 1100 then rotates the drum to a return conveyor 1800 which transfers the drum to the band-positioning apparatus where the drum is introduced again into the line.

*Description of drum*

Referring now more particularly to FIGS. 1a and 1b, a hollow drum 1 is represented in elevational end view in FIG. 1a and in cross section in FIG. 1b, taken along line 1b—1b of FIG. 1a. The drum includes means for interconnecting drums with predetermined spacings therebetween. More particularly, this means comprises a plurality of movable fingers 50, 51, 52 at one end of the drum and a tapered or conical device 53 having a plurality of axially spaced circumferential grooves 54, 55 at the other end of the drum. The fingers of each drum are adapted to register with a selected circumferential groove in the cone of an adjacent drum for interconnecting the drums with predetermined spacings.

As represented in FIG. 1b, the finger 50 is spring-loaded and pivoted on a pin 56 attached to a housing which in turn is attached to the drum wall and has a roller 57 which extends through a slot in a sleeve 58 for actuation by the stepped diameter of a cam 203 (FIG. 1) which extends longitudinally through sleeves of the drums as will be described more fully subsequently. One of the three fingers of each drum, for example, the finger 50 has a web 59 for interlocking with selected longitudinal ribs 53b and slots 53a to provide a rotational lock between drums at various stages of the operation.

Each drum also has a pair of displaceable bands 60, 61 mounted on rods 62, 63 at each end of the drum and slidable longitudinally of the drum. The bands are represented in FIG. 3 in an extended position in broken-line construction and the band 60 is also represented in a retracted position in solid-line construction.

*General description and Explanation of Operation of the turret end of the machine*

This portion of the specification relates to the turret end of the tire building machine and, more particularly, to the means by which the carcass bearing drums are loaded onto the turrets, the means by which the turrets are indexed and the drums transferred therebetween so that first one end and then the other end of the cylindrical carcasses are presented to bead setting mechanisms which assemble bead wires thereto and form beads thereon, the means by which the beaded carcasses are removed from the drums, and the means by which the bare drums are disengaged from the turrets and returned to the input portion of the machine to be re-used in the fabrication of additional tire carcasses.

The general arrangement of the equipment at the turret end of the machine has been illustrated in FIG. 73. A pair of "plus" (+) shaped turrets, each of which will hereinafter be referred to either as turret No. 1 or as turret No. 2, are shown generally at 1000 and 1100, respectively. Both turrets are adapted to be simultaneously angularly turned or indexed in 90° counterclockwise steps by an indexing mechanism, in this instance a Geneva drive indexing mechanism, shown generally at 1200. Roman numerals I, II, III and IV represent fixed positions with respect to turret No. 1, and Roman numerals V, VI, VII and VIII represent fixed positions with respect to turret No. 2. Accordingly, drums carried by the turrets index from one to another of the fixed positions as the Geneva drive indexing mechanism advances the turrets in 90° steps.

Various independent operations are performed on the carcass bearing drums at several of the fixed positions I through VIII. These operations take place during a time interval occurring between successive indexing steps of the turrets. Preferably, the operations set forth for the fixed positions listed below are employed. However, it will be apparent that other operations may be performed at any unused position and that changes or shifts in the operation performed at any given position may be made.

Position I represents the turret loading position. As has previously been indicated, upon completion of the cutting of the second fabric ply, the carcass bearing drum is disconnected from the main line and is thereafter pushed by the drums still in the main line into the turret loader or pusher, shown generally at 900, until it is essentially centered therein. When it reaches a central location within the turret loader 900, the outer ply interrupts a light beam between a photoelectric lamp and its photocell to initiate the turret loading action. This, in turn, causes the turret loader 900 to clamp about the drum and then begin moving from the position shown in FIG. 29 towards position I of turret No. 1. Upon arrival at position I the drum is grasped by the turret and released by the turret loader, and the turret loader returns, empty, to its initial or starting position.

No action occurs at position II of turret No. 1 at any time during operation of this embodiment of the machine.

During the time interval between indexing of the turrets, a bead setter, referred to as bead setter No. 1 and shown generally at 1300 adjacent position III of turret No. 1, operates to apply a bead ring to the projecting end of a carcass carried by the drum at position III.

Similarly, a drum transfer carriage mechanism, movable between position V of turret No. 2 and position IV of turret No. 1, operates to transfer a carcass bearing drum from position IV to position V during the time interval between indexing of the turrets. The transfer of the drum between positions IV and V causes the drum to be reversed 180° with respect to turret No. 2 so that the unbeaded end of the carcass becomes remote from the center of that turret.

At position VI on turret No. 2, a second bead setter, referred to as bead setter No. 2 and shown generally at 1300A, operates to apply a second bead ring to the tire carcass during the time interval between indexing of the turrets. This action completes the basic configuration and building of the carcass on the drum.

At position VII a carcass remover, shown generally at 1700, grasps the carcass and removes it from the drum by axially pulling it while the drum is held fixed to position VII of the turret. This prepares the drum for removal from the turret at the next position.

At position VIII the drum is released from the grasp of the turret and a drum return conveyor, shown generally at 1800, is employed to move the drum clear of turret No. 2 and start it on its way back to the input end of the machine.

As previously indicated, each of the various actions transpiring at positions I, III, IV, V, VI, VII and VIII occurs during substantially the same time period between consecutive index steps of the turrets. When all of these operations have been completed a signal is applied to the indexing mechanism 1200 to initiate indexing of the two turrets and, upon completion of the indexing, the various operations which occur at positions I, III, IV, V, VI, VII and VIII begin anew and the cycle is repeated so long as the machine is in operation.

A duration of seven and a half (7½) seconds has been selected as the nominal time period for each cycle in order that each of the various actions may be completed at its respective position between indexes. Of this period, approximately one and a half (1½) seconds are consumed in the actual indexing movement of the turrets and the remaining six seconds provide adequate time for the various operations to occur.

*Description of the turret loader 900*

Referring now to FIGS. 3, 4, 5 and 6 there has been illustrated a turret loader or pusher 900, which serves as a means to move a carcass bearing drum from the main line onto position I of turret No. 1. As previously indicated, the turret loader 900 is positioned downstream of cutter No. 2 (700A FIG. 1) and, upon completion of the cutting of the second layer of fabric, the cam 203 (FIG. 1) disengages the clamping fingers of the lead drum from its upstream neighbor. The lead drum, in turn, is then pushed by the upstream drums into an opening in the turret loader 900.

When the lead drum becomes approximately centrally positioned within the turret loader 900, the leading edge of its outer ply interrupts the light beam (FIG. 2) between a lamp and a photocell of a photoelectrically operated relay assembly M–PC1 to initiate the turret loader operation. The initial action, then, of the turret loader (see FIG. 3) is to firmly clamp the lead drum in place within the loader. This is accomplished by means of a drum clamping means or mechanism, shown generally at 901.

The drum clamping mechanism 901 includes a pneumatically operated power cylinder 902 controlled by a solenoid valve M–SV6. A piston rod 903 is carried within thet power cylinder 902 to aid in transmitting the clamping action developed in the power cylinder to a pair of clamps 904a and 904b which are engageable with the outer peripheral surface of the drum entering the turret loader 900.

Referring now to FIG. 31, one end of power cylinder 902 is rigidly fastened to a support plate 905 which, in turn, is rigidly fastened to a pair of support blocks 906 and 907. Support blocks 906 and 907 are each provided with an aperture therethrough for pivotally mounting the support blocks on a shaft 908. Shaft 908 is rigidly carried by a pair of lever arms 909 and 910, the shaft being rigidly connected at either end to one of the arms 909 and 910. Piston rod 903 (FIG. 3) is similarly pivotally connected, through a coupling 911 and an extension 912, to a shaft 913. Each end of shaft 913 is rigidly mounted in one of a pair of lever arms, 914 (FIG. 3) and 914a (FIG. 5) so that a pivotal connection is provided between the piston rod 903 and its supporting lever arms 914 and 914a.

A frame, shown generally in FIG. 4 at 915, and including a pair of vertical support plates 916 and 917, carries the entire drum clamping mechanism 901 by means of shafts 918 and 919 (FIG. 3). Lever arms 909 and 910 (FIG. 4) are rigidly supported by shaft 918, and shaft 918, in turn, is pivotally carried by one of the vertical support plates 916 and 917 at each of its ends. A similar arrangement (FIG. 3) is employed with the piston rod side of the drum clamping mechanism 901 in conjunction with shaft 919. Additionally, the upper ends of the lever arms 909 and 914, and 910 and 914a, are locked together for operation in unison by means of a coupling mechanism including links 920 and 921, and a crank assembly 922. The crank assembly 922 is keyed to a shaft 923 which, in turn (FIG. 4) is pivotally mounted at each of its ends in one or the other of vertical support plates 916 and 917. Similarly, links 920 and 921 are each pivotally supported at their ends to insure proper coupling action.

In order to avoid damaging the carcass plies on the drum when the turret loader 900 commences moving a drum towards position I of turret No. 1, a shock absorbing mounting is provided to connect the drum clamps 904a and 904b to their respective lever arms in the drum clamping mechanism 901. The shock absorbing mounting has been illustrated most clearly in FIG. 5. The shock absorbing mounting for drum clamp 904a will be described in detail and, since the mounting for drum clamp 904b is similar to that of drum clamp 904a, the same numerals have been used in connection with drum clamp 904b with the exception that the letter "a" has been added to these numerals.

The lever arms 909 and 910 are provided with apertures adjacent their lower ends through which passes a shaft 924. The shaft 924 is rigidly secured to the lever arms 909 and 910 by means of set screws 925 and 926, respectively. The set screws 925 and 926, in conjunction with shoulders formed in the shaft 924, serve to cause shaft 924 to rigidly follow the movements of the levers 909 and 910. Drum clamp 904a has affixed thereto a pair of vertically positioned plates 927 and 928 (see FIG. 3). Plates 927 and 928 are rigidly fastened to either end of the drum clamp 904a and are provided (FIG. 5) with apertures therethrough in which shaft 924 is slidably mounted. The ends of shaft 924 are threaded and each end carries a compression spring, 929 and 930, and a retaining nut 931 and 932. The compression springs each extend between a vertical plate 927 or 928 and an adjacent nut 931 or 932 to act as buffers when the turret loader 900 starts or stops while carrying a drum. A linear bearing 933, having a plurality of ball bearings 934 carried therein, is formed on the drum clamp 904a to provide a sliding connection between the drum clamp and the shaft 924.

The operation of the shock absorbing connection between the frame 915 of the turret loader 900 and the drum clamp 904a is as follows. Assuming that the turret loader 900, as viewed in FIG. 5, begins to move rapidly to the right after the carcass bearing drum has been clamped by the drum clamps 904a and 904b, levers 909 and 910 commence moving the shaft 924 to the right, while the drum clamp 904a tends to remain stationary due to the inertia of the carcass bearing drum. Thus, vertical plate 928, which is rigidly mounted on drum clamp 904a, begins compressing the spring 930 against its retaining nut 932 and the compressive force reacts against the vertical plate 928 to smoothly initiate movement of the drum clamp 904a and the drum carried thereby. This tends to smoothly accelerate the drum and, prior to the turret loader 900 reaching position I on turret No. 1, the drum is accelerated to the speed of the turret loader 900. Similarly, upon deceleration of the turret loader 900 as it approaches position I of turret No. 1, vertical plate 927 begins compressing spring 929 against its retaining nut 931 to smoothly aid in the deceleration of the carcass bearing drum prior to reaching its position at the turret.

The foregoing shock absorbing arrangement is designed to insure that the fabric plies surrounding the drum do not become wrinkled during axial movement of the drum from its position on the main line to its position at turret No. 1.

In order to prevent the tacky surface of the carcass carried by the drum from sticking to the drum clamps 904a and 904b, the drum clamps are provided with carcass engaging surfaces 935, 936, 937 and 938 made of a material which does not normally adhere to the tacky fabric ply material, for example, polyurethane. Hence, when the drum clamps 904a and 904b disengage from the carcass at position I of turret No. 1, under the action of power cylinder 902, the carcass is cleanly released from the drum clamps.

Referring to FIG. 3, the movable frame 915 of the turret loader is supported on a foundation 939 which rests on the floor and serves as a base for the turret loader portion of the machine. Frame 939 is provided with fixed laterally spaced apart tracks or guideways 940 and 941 located near the outer edges of the foundation 939. The under portion of the movable frame 915 is provided with a plurality of rollers or wheels 942, 943 and 944 which serve to support the weight of the turret loader on the tracks 940 and 941. Rollers 942 and 943 are mounted at 45° angles with respect to a vertical plane parallel to the direction of horizontal movement of the turret loader, and serve, in addition to supporting the weight of the turret loader, to prevent the turret loader from shifting horizontally out of its prescribed longitudinal path of movement. A pair of rollers 945 and 946, which are carried by the underside of frame 915 and engage slots 947 and 948, respectively, formed in the tracks 940 and 941, serve to prevent the turret loader from lifting vertically and thereby being jostled off of the tracks 940 and 941. Thus the turret loader may move longitudinally in a horizontal direction but is restrained from any vertical movement or from any transverse horizontal movement.

Frame 915 includes at its forward lower edge a vertical cross plate 949 which aids in supplying structural strength to the frame 915 and also serves as a member to which the axial thrust mechanism of the turret loader is connected. Referring to FIG. 4, there is illustrated the means for longitudinally moving the turret loader. A hydraulically actuated power cylinder 950 is provided which is of sufficient length so that the stroke of a piston carried thereby will move the turret loader from its home or start position to its final position at turret No. 1 to load the turret with a carcass bearing drum. Power cylinder 950 is carried by the foundation 939 at a lower level than, and centrally located with respect to, the tracks or guideways 940 and 941. It is pivotally supported from the framework 939 at pivot point 951 by means of brackets shown generally at 952. A piston rod 953 is operated by the power cylinder 950 and is pivotally connected at its forward end by means of a pivotal connection 954 to an angle bracket 955, which, in turn, is rigidly fastened to the vertical cross plate 949. Thus, by virtue of the connection between the piston rod 953 and vertical cross plate 949, longitudinal movement of the piston rod 953 within the power cylinder 950 results in longitudinal movement of the turret loader 900 along its tracks 940 and 941. The pivotal connection 951, supporting the power cylinder 950 from the foundation of the machine 939, and the pivotal connection 954 assure that slight misalignment between the plane of the trackways and a plane through pivotal connections 951 and 954 does not bind the piston rod 953 in its motion relative to the power cylinder 950.

Referring now to FIG. 5, there has been illustrated in greater detail the hydraulic actuation system for the power cylinder 950. Hydraulic fluid under pressure is brought to the turret loader by means of a conduit 956. A pair of solenoid valves M–SV7A and M–SV7B direct the pressurized flow to one or the other end of the power cylinder 950 for proper movement of the turret loader 900. Assuming that the turret loader is in the position shown in FIG. 5 (and also has just received a drum from the main line and is clamped thereabout), solenoid valve M–SV7A is then energized to allow high pressure hydraulic fluid to flow through a check valve incorporated within a mechanically controlled restrictor or valve 957, and through a conduit 958, to the rear cylinder head 959 of the power cylinder 950. This results in movement of the piston rod 953 toward position I of turret No. 1, and consequent movement of the turret loader and carcass bearing drum therewith.

Mechanically controlled restrictor or valve 957 restricts the return flow of hydraulic fluid from the rear head 959 of power cylinder 950 during the return stroke of the piston rod 953. It is provided with an actuating arm 960 which cooperates with a cam 961, mounted on the movable frame 915, to restrict and then close off the valve 957 when the turret loader approaches and reaches the position shown in FIG. 5. This insures that the turret loader smoothly decelerates and stops upon returning from turret No. 1.

A similar mechanically controlled restrictor valve 962 is provided in the return line from the forward end of power cylinder 950. As before, a conduit 963 is provided for connecting the valve 962 with the forward head 964 of the power cylinder 950. Similarly, a cam 965, carried by the frame 915 of the turret loader, cooperates with an actuating arm (not shown) on the mechanically controlled valve 962 to smoothly decelerate and stops the turret loader during its forward stroke as it approaches and reaches position I on turret No. 1. In this case, the smooth deceleration serves an additional purpose in that it aids in slowing down the drum without causing damage to the fabric.

Drain lines 966 and 966a, which are connected to solenoid valves M–SV7A and M–SV7B, respectively, each connect with an oil sump and allow oil to drain through their associated solenoid valves and back to the sump when the solenoid valves are de-energized. A limit switch within M–LS17 is provided on track 940 near turret No. 1 for actuation when the turret loader reaches position I. A limit switch M–LS18 is also provided on track 940 at the home or starting position of the turret loader. These limit switches sense the arrival of the turret loader at either of its extreme positions and provide signals thereof to the automatic electrical control circuits of the machine. Limit switch M–LS17 is actuated by an arm 967 and limit switch M–LS18 is actuated by an arm 968, both arms being carried by frame 915.

Schematic drawings of the pneumatic and hydraulic control systems associated with the turret loader 900 have been illustrated in FIG. 6. Referring to the hydraulic control system of FIG. 6, it may be seen that, upon energization of solenoid M–SV7A, hydraulic fluid under pressure is supplied from a pump (not shown) through a check valve 969, bypassing mechanically controlled restrictor or valve 957, to power cylinder 950. This results in rapid movement of the turret loader towards turret No. 1. Check valve 969 is employed to insure rapid initial movement of the turret loader irrespective of the position of actuating arm 960 and its valve 957. The return flow of hydraulic fluid from power cylinder 950 is directed through mechanically controlled valve 962, which also incorporates a check valve 970; however, check valve 970 is closed to the reverse flow of hydraulic fluid. The return hydraulic fluid, therefore, must pass through the check valve 962 and be under the control of the cam and mechanical actuating arm therefor. Thus, when the turret loader reaches the area of turret No. 1, back pressure rises in the cylinder 950 due to the closing of valve 962 by the cam 965 (FIG. 76) and the turret loader smoothly decelerates and stops upon reaching the turret. In the reverse operation check valve 970 opens wide when solenoid valve M–SV7B is energized and immediate rapid action takes place with the turret loader returning to its start or home position. However, as before, when the turret loader approaches and reaches its final position, valve 957, under the influence of actuating arm 960 and cam 961, creates a back pressure in the power cylinder 950 to first slow down and then stop the turret loader.

The pneumatic control system employed in opening and closing the drum clamps 904a and 904b (FIG. 74) about a carcass bearing drum carried by the turret loader 900 is also illustrated in FIG. 6. Air under pressure is supplied through a stop valve 971 which, during normal operation of the system, is left in a wide open condition. The pressurized air then passes through a filter, pressure regulator, and lubricator assembly, shown generally at 972, to solenoid valve M–SV6, flexible conduit 972a being used to provide compensation for the movement of the turret loader with respect to the stationary air source. When solenoid valve M–SV6 is energized, the pressurized air passes to power cylinder 902 to cause the clamps to close about the carcass carrying drum. The return side of power cylinder 902, of course, is opened to atmosphere through a bleed line shown at 973. Upon de-energization of solenoid valve M–SV6 (after the drum has been carried to position I at turret No. 1) a spring 974 associated with solenoid valve M–SV6 causes the solenoid valve to assume the position shown in FIG. 77 and high pressure air is then directed to power cylinder 902 in a direction to cause the clamps to open. The return side of the power cylinder 902 is at this time connected to atmosphere through bleed line 973 to facilitate the opening of the clamps.

A final point relative to the turret loader operation should be considered before turning to a description of the turrets per se. Referring to FIG. 5, it may be observed that a plurality of pairs of squared rollers 974, each pair of which are conected together for simultaneous operation by a chain 976, are provided along the main conveyor line up to and into the vicinity of the turret loader 900. The usual springs 977 and 978 are provided in association with each of the squared rollers to facilitate the movement of a carcass bearing drum into the turret loader 900. The operation of the squared rollers has previously been described and will not be repeated again at this time. However, it should be noted that the rollers 974 and 975 are idlers only and are not independently driven. Since the carcass bearing drums which approach the turret loader 900 are being pushed along by subsequent drums on the main line, the rollers adjacent the turret loader 900 are not required to be driven.

Referring to FIG. 4 an additional pair of squared rollers, also idlers, has been shown in dotted lines at 979 and 980. These are vertically mounted near the end of the conveyor main line to prevent the carcass bearing drums from being jostled off the main line at a time when the drums have been disconnected from both the cam 203 (FIG. 1) and the subsequently following drums on the main line, while they are merely being pushed along into the turret loader 900.

*Description of the turrets 1000, 1100*

Referring now to FIGS. 7 and 7a (which, together, represent a sectional elevation view taken along the line A—A of FIG. 2), turret No. 1 (1000) is illustrated in FIG. 7a, and both turret No. 2 (1100) and the Geneva drive indexing mechanism (1200) are illustrated in FIG. 7.

Referring more particularly to FIG. 7a, representing turret No. 1, a foundation or base 1001 is provided. Base 1001 is a box-like stationary structure fitted with suitable bearing arrangements for the purpose of supporting rotary components of the indexing mechanism, which will be described in greater detail hereinafter.

A hollow cylindrical sleeve 1002, which is welded or otherwise suitably rigidly mounted on box-like base structure 1001, projects upwardly therefrom. The base 1001 is, in turn, carried by a channel-shaped foundation member 1003 which is adapted to be vertically positioned with respect to the floor by means of adjusting bolts 1004 in order to align the turrets vertically with the main line assembly. The foregoing structure forms the basic load carrying support for turret No. 1 and these parts should be formed of relatively heavy steel stock in order to adequately support the weight of the turrets and absorb the stresses inherent during indexing of the turrets.

An outer hollow cylindrical sleeve 1005 is rotatably supported on the inner hollow cylindrical sleeve 1002 by means of tapered roller bearings indicated at 1006 and 1007. Tapered roller bearings 1006 serve, additionally, as thrust bearings and transmit the weight of the rotary parts of the turret to the stationary structure thereof.

A generally cylindrical transition member 1008 is carried atop the outer hollow cylindrical sleeve 1005 and this transition piece, along with a plurality of tapered support plates 1009 welded thereto, supports a generally square-shaped (in plan) member 1010 (see FIG. 2). The square-shaped member 1010 comprises four vertical plates positioned at 90° angles to each other, each vertical plate having fastened thereto a horizontally extended cylindrical drum supporting member or post 1011, 1012, 1013 and 1014. Centrally located within each of the drums supporting posts 1011, 1012, 1013 and 1014 is a spindle or shaft 1015, 1016, 1017 and 1018, respectively, which projects from one of the vertical walls of the square-shaped member 1010 and is rigidly affixed thereto such as by welding or bolting. The spindles or shafts 1015 through 1018 are adapted to engage the central openings in the drums carried by the turrets to accurately align each drum with its respective drum supporting post 1011 through 1014 when the drums are mounted onto the turret.

The maximum outer diameter of each drum supporting post 1011 through 1014 is kept smaller than the minimum internal diameter of the outer shell of the drum which it supports. Thus, the drums may be brought on to the spindles a sufficient distance to allow overlapping between the drums and the drum supporting posts.

The outermost edge of each of the drum supporting posts 1011 through 1014 is provided with a C-shaped flange 1019 (FIG. 7a), the flange 1019 being provided with outer and inner annular sealing rings 1020 and 1021. The sealing rings 1020 and 1021 are adapted to sealingly engage the inner vertical walls of the various drums arriving at the turrets to form annular chambers 1022 (FIG. 7a) which function to securely hold the drum against the flanges 1019 when a vacuum is developed within the chamber 1022. The manner in which a vacuum is developed in the annular chamber 1022 will be more fully described hereinafter. However, for purposes of the present discussion it may be seen that a vacuum means shown generally at 1023 connects with the vacuum chamber 1022 by means of a plurality of conduits 1024 through 1027 (FIG. 2).

Thus, assuming vacuum means 1023 is drawing a vacuum at position I, when the turret loader 900 reaches position I, the drum carried thereby cooperates with sealing rings 1020 and 1021 to seal the chamber 1022 and create a high vacuum therein. This vacuum holds the drum to position I of the turret and, subsequently, the drum clamps 904a and 904b of the turret loader 900 open to release the drum from the influence of the turret loader. Thereafter, the turret loader 900 returns to the position shown in FIG. 2, while the drum remains firmly attached to the drum supporting post 1011.

In connection with the indexing of turret No. 1 to carry the drums from position I around to position IV (FIG. 7a), it should be noted that the turret is provided with a central rotatable spindle or shaft 1028. The shaft 1028 is supported on the rotary structure of the turret by means of a spring clip 1029 which coacts with a flange 1030 rigidly bolted to an edge of a guide member 1031 carried by the cylindrical transition piece 1008. A key and keyway 1032 lock guide 1031 and shaft 1028 together in order to transmit rotary indexing motion from the shaft 1028 to the rotary components of the turret. It should also be noted that the central shaft 1028 extends upwardly into the vacuum means 1023 to cooperate therewith in controlling the vacuum at the various flanges 1019 of the drum supporting posts, in a manner which will be further explained hereinafter.

Turret No. 2 (1100) is illustrated in FIG. 7. The stationary structure of turret No. 2 includes a box-like base structure 1101, having a hollow cylindrical sleeve 1102 extending upwardly vertically therefrom. Similarly, the base 1101 is carried by a channel shaped foundation member 1103 which is rigidly interconnected with the foundation member 1103 (FIG. 7a) of turret No. 1. Foundation member 1103 is also provided with adjusting bolts 1104 which aid in vertically positioning the turret with respect to the floor.

The rotating components of turret No. 2 include an outer hollow cylindrical sleeve 1105 which is rotatably supported on the stationary hollow cylindrical sleeve 1102 by means of tapered roller bearings 1106 and 1107 in a manner similar to the arrangement for turret No. 1, previously described.

In place of the cylindrical transition piece 1008 of turret No. 1 (FIG. 7a), turret No. 2 is provided with four horizontally extending carriage tracks, shown generally at 1108, 1109, 1110 and 1111 in FIG. 100. The carriage tracks 1108 through 1111 are rigidly welded to or otherwise supported by the outer hollow cylindrical sleeve 1105 and project horizontally outwardly therefrom at circumferential positions spaced 90° apart from each other.

Each of the carriage tracks 1108, 1109, 1110 and 1111 carries a drum transfer carriage 1112, 1113, 1114 and 1115, respectively, thereon. The drum transfer carriages 1112 through 1115 are movable upon the carriage tracks 1108 through 1111 and serve as a means for transferring carcass-bearing drums from position IV on turret No. 1 to position V on turret No. 2. The structural details of the drum transfer carriage will be considered in greater detail hereinafter; however, for the present it should be noted that each carriage 1112, 1113, 1114 and 1115 has mounted thereon a horizontally extending cylindrical drum-supporting member or post 1116, 1117, 1118 and 1119, respectively. The drum-supporting posts 1116, 1117, 1118 and 1119, as with turret No. 1, are each provided with a centrally located spindle or shaft 1120, 1121, 1122 and 1123, respectively, which engages the central opening in the drums to support the drums thereon.

Similarly, each of the drum-supporting posts 1116 through 1119 on turret No. 2 are provided (FIG. 7) with a C-shaped flange 1124 at its outermost edge. An outer sealing ring 1125 and an inner sealing ring 1126 cooperate with the C-shaped flange 1124 and the vertical wall of a drum to form a chamber 1127 which is employed to provide a vacuum that holds the drums tight against the drum supporting posts.

As before, a vacuum means, shown generally at 1128, connects with the vacuum chambers 1127 by means of a plurality of flexible conduits, two of which are shown at 1129 and 1130 in FIG. 7B.

Turret No. 2 is also provided with a central spindle or shaft 1131 which is supported from the outer hollow cylindrical sleeve 1105 by means of a spring clip 1132. The shaft 1131 is keyed to the cylindrical sleeve 1105 by means of a key and keyway arrangement indicated at 1133. Thus, rotary motion imparted to the central shaft 1131 will, in turn, cause the rotating components of turret No. 2 to move in synchronism with the shaft 1131. It will be observed at this time that the shaft 1131 extends upwardly into the vacuum means 1128 to facilitate controlling the state of the vacuum at the various positions I through IV on the turret.

Referring to FIG. 2 it may be seen that a plurality of diagonal struts 1134 interconnect the various carriage tracks 1108 through 1111 of turret No. 2, to add rigidity to the overall rotating structure, so that during indexing thereof the angular alignment between the various carriage tracks will not be distorted due to large initial acceleration or final deceleration forces.

The structures employed in the carriage tracks 1108 through 1111 and in the drum transfer carriages 1112 through 1115 will now be considered. Referring to FIGS. 7 and 7a, it may be seen that each drum transfer carriage includes a movable base plate 1135 which forms the main horizontal support member of its respective carriage. A first vertical support plate 1136 is rigidly carried by each base plate 1135 and serve as a support upon which the various drum-supporting posts 1116 through 1119 are mounted in their respective drum transfer carriages. A second vertical support plate 1137 depends below each of the base plates 1135 to add rigidity thereto. It serves to afford locking of the drum transfer carriages in place at position V and moving of the drum transfer carriages to position IV in a manner to be further described below.

A pair of longitudinal wheel supporting members 1138 and 1139 also depend from the lower surface of each base plate 1135 at opposite sides thereof. The longitudinal support members 1138 and 1139 each carry a pair of rollers or wheels 1140 which engage and ride upon guideways 1141 and 1142 formed in the carriage tracks 1108 through 1111. The guideways 1141 and 1142 are fixedly bolted or otherwise secured to longitudinal support members 1143 and 1144, respectively. The longitudinal support members 1143 and 1144 extend outwardly from the outer hollow cylindrical sleeve 1105 and may be welded thereto in order to rigidly support the carriage tracks 1108 through 1111 and drum transfer carriages 1112 through 1115.

A pair of cross-brace plates 1145 and 1146 depend from each base plate 1135. These are provided to add further rigidity to the drum transfer carriages 1122 through 1115. Cross-brace plate 1145 extends between the longitudinal wheel supporting member 1138 and the vertical support plate 1137, while cross-brace plate 1146 extends between the longitudinal wheel supporting member 1139 and the vertical support plate 1137. The cross-brace plates may be welded or otherwise rigidly secured to the wheel supporting members, vertical support plates, and base plates between which they extend.

A latching arrangement by which the drum transfer carriages are normally retained in place adjacent the center of turret No. 2 will now be considered. Referring more particularly to FIG. 7, a latching mechanism, shown generally at 1147, has been illustrated. The latching mechanism 1147 includes a latch lever 1148 which is pivotally supported at one of its ends at the top of the outer hollow cylindrical sleeve 1105. The other end of latch lever 1148 is arcuately slotted in order that it may engage a pin or stud 1149 which extends between the longitudinal wheel support member 1138 and the second vertical support plate 1137 of each drum transfer carriage. A cross member 1150, which is rigidly carried by the side support members 1143 and 1144 and extends therebetween, serves as a support for a bushing 1151 which is employed in the latching mechanism. Bushing 1151 serves as a guide for a link 1152 that has one end connected to the latch lever 1148, at a point between the ends thereof, and carries a roller or wheel 1153 at its other end. A spring 1154 extending between the latch lever 1148 and the cross member 1150 serves to normally bias the latch lever 1148 into engagement with the pin 1149 to hold the drum transfer carriages adjacent the center of turret No. 2. However, as shown in FIG. 7, when a drum transfer carriage (in this case carriage 1112) is indexed to position V, the roller 1153 of the latching mechanism engages a cam 1155 which is fixedly located at position V and does not index with the turret. The resulting unlatching action causes the latch lever 1148 to disengage from the pin 1149, thereby freeing the drum transfer carriage for subsequent horizontal movement towards position IV of turret No. 1.

It should be noted that each of the drum transfer carriages 1112 through 1115 is provided with its own latching mechanism 1147 that indexes along with the carriage. During indexing, and at all times other than when a particular drum transfer carriage is at position V, each latching mechanism 1147 is locked to rigidly retain its respective drum transfer carriage adjacent to the center of turret No. 2.

Referring now to FIGS. 7, 8, 14, 15 and 16, the driving means by which the drum transfer carriages 1112 through 1115 are moved from position V to position IV and back has been illustrated. Each of the drum transfer carriages 1112 through 1115 is provided with a support plate 1156 which is bolted or otherwise fixed to the base of the vertical support plate 1137. A roller 1157 is fastened to each support plate 1156 and projects downwardly therefrom. As the various drum transfer carriages 1112 through 1115 are indexed into position V of turret No. 2 (FIGS. 15 and 16), the rollers 1157 slide into an arcuate slot 1158 formed in a sliding block or crosshead 1159. This action occurs simultaneously with the unlatching of the latching mechanism 1147, due to the engagement of roller 1153 with the cam 1155.

A pair of guide rods 1160 and 1161, which are rigidly carried between the framework of the machine adjacent the cam 1155 and a housing 1162, engage apertures formed through the crosshead 1159 to guide the movement of the crosshead while the drum transfer carriages are being moved from position V to position IV and back. In order to provide the motive power for translating the drum transfer carriages 1112 through 1115 to position IV and back, an hydraulically actuated power cylinder 1163 is provided. The piston rod of power cylinder 1163 is drivingly connected to a first rack gear 1164. A second rack gear 1165 extends from the lower portion of the housing 1162 into driving engagement with the crosshead 1159. Within the housing 1162 (see FIG. 15), pinion gears 1166 and 1167 are provided. Pinion gear 1166 is in engagement with the rack gear 1164 and pinion gear 1167 is in engagement with the rack gear 1165. The two pinion gears are mounted on a single shaft 1168 and are coupled together for simultaneous rotation by means of shear pins 1169 and 1170. The pins 1169 and 1170 are adapted to be sheared under excessive load in order to disconnect the coupling between the two pinion gears 1166 and 1167 in the event that a malfunction occurs which blocks the movement of the drum transfer carriages from position V to position IV or back. It should be noted that pinion gear 1166 is of smaller diameter than pinion gear 1167 and, hence, the stroke of the crosshead 1159 (and drum transfer carriages) will be greater than the stroke of the piston in power cylinder 1163.

Referring to FIG. 8, it may be seen that the actuation of power cylinder 1163 is under the control of a solenoid valve M–SV8, which (FIG. 17) is spring biased to cause the power cylinder 1163 to drive a drum transfer carriage to position V when it is de-energized; however when solenoid valve M–SV8 is energized, it causes the power cylinder 1163 to move a drum transfer carriage to position IV. A limit switch M–LS1 (FIG. 7) is employed to initiate electrical signals which indicate the presence or absence of a drum transfer carriage at position V. This limit switch and the previously mentioned solenoid valve M–SV8 operate in conjunction with a vacuum switch hereinafter to be described to automatically control the movement of drum transfer carriages between position V on turret No. 2 and position IV on turret No. 1 in connection with the transfer of drums from turret No. 1 to turret No. 2.

It should be noted that the power cylinder 1163 is supported from the framework at the turret end of the machine by means of an I beam 1171 which is of such clear shape as to clear the various components mounted on the foundation of the machine. Similarly, the housing 1162, which encloses the pinion gears 1166 and 1167, is mounted atop the housing for the Geneva drive indexing mechanism 1200.

Referring now to FIGS. 2, 7, 7a, 9 and 37, the Geneva drive indexing mechanism for rotating turrets No. 1 and No. 2 in discrete 90° steps is illustrated.

As set forth earlier, a 7½ second period, for example, may be selected as the time period for an indexing cycle of the turrets. During this 7½-second period, 1½ seconds as an average are spent while the turret loader 900 awaits the arrival of a new drum from the main line and this period has been termed "dwell time." Upon arrival of a new drum at turret loader 900, the dwell period is complete, and the Geneva drive is then energized and moves through three-quarters of a turn (from 0° through 270°) in the next 4½ seconds. During the dwell period and the turning of the Geneva drive from 0° through 270° (a total period of six seconds, more or less), the various independent operations occurring at positions I, III, IV, V, VI, VII and VIII take place. The final 1½ seconds of the 7½-second period is then consumed in the actual indexing of the turrets (during which time the Geneva drive rotates from 270° to 360°). At this point the Geneva drive stops and a new cycle begins.

Rotary power for driving the Geneva drive indexing mechanism is supplied (FIG. 2) by the main drive through a shaft D. A clutch M–MC2 serves to connect shaft D to the input end of Geneva drive indexing mechanism 1200. A brake M–MB2 serves to lock the Geneva drive indexing mechanism 1200 when clutch M–MC2 is disengaged from shaft D. A shaft 1201, gears 1202 and speed changer 1203 are connected to both the brake M–MB2 and clutch M–MC2 assemblies to transmit the rotary motion of shaft D to a shaft 1204 that leads into the Geneva drive indexing mechanism 1200. Referring to FIGS. 80 and 81, it may be seen that the rotary motion of shaft 1204 is applied to a gear box 1205 and results in rotary movement of shaft 1206, due to the action of a pair of bevel gears located within gear box 1205. Shaft 1206 is keyed to each of a Geneva drive arm 1207 and a Geneva drive plate 1208, both of which rotate in synchronism with shaft 1206. Geneva drive arm 1207 is fitted with a pin 1209 at its end remote from shaft 1206, the pin being rigidly secured thereto and depending through and below the Geneva drive arm 1207. A Geneva drive wheel 1210 (FIG. 10), having a plurality of grooves 1211, 1212, 1213 and 1214 formed in its upper surface, is rotatably mounted within the Geneva drive mechanism 1200. (See FIG. 7.) As may be observed in FIGS. 80 and 81, when the Geneva drive arm is at 0°, it is just out of engagement with the grooves of the Geneva drive wheel 1210 and, consequently, during rotation of the Geneva drive arm between 0° and 270°, no indexing action of the turrets occurs. Between 270° and 360°, however, the pin 1209 of Geneva drive arm 1207 engages one of the grooves 1211 through 1214 on Geneva drive wheel 1210 to cause the Geneva drive wheel to rotate 90° during that period. The Geneva drive plate 1208 is arcuately recessed at 1215 to allow the projecting portions of the Geneva drive wheel 1210 to pass therethrough during rotation of the wheel 1210. Thus, in the arrangement shown in FIG. 10, as the Geneva drive arm 1207 passes from its 270° to its 360° or 0° position, groove 1211 is indexed 90° and ends up occupying the position at which groove 1212 is shown. Similarly, the remaining grooves all index 90° during the same time period so that grooves 1214 replaces groove 1211 and will be engaged by the Geneva drive arm during the next indexing of the turrets.

A plurality of cam actuated switches M–CS1, M–CS2, M–CS3 and K–CS1 are provided adjacent the upper end of the shaft 1206 to facilitate various automatic electrical control actions and to provide electrical checking circuits with respect to the operation of the turret end of the machine. Their function and operation will be described in greater detail hereinafter, it being sufficient at this time to point out that switch M–CS1 is actuated by its cam at the 360° position of the Geneva drive arm 1207, switch M–CS2 is actuated at the 270° position of the Geneva drive arm, switch M–CS3 is actuated by its cam during the time that the Geneva drive arm is between 230° and 290°, and switch K–CS1 is actuated by its cam at the 290° position of the Geneva drive arm.

Referring now to FIG. 7, the manner by which indexing of the Geneva drive wheel 1210 results in indexing of turrets No. 1 and No. 2 is illustrated. Geneva drive wheel 1210 is key to a shaft 1216 by means of a key and keyway arrangement 1217, to thereby drive shaft 1216 during indexing of the Geneve drive wheel 1210. The rotary motion of shaft 1216 is applied through a bevel gear 1218 to turret No. 2 by means of bevel gear 1219 and to turret No. 1 by means of bevel gear 1200. A shaft 1221, a flexible coupling 1222, a shaft 1223 and a pair of bevel gears 1224 and 1225, the latter of which is mounted on the base of the central shaft 1131 of turret No. 2, comprise the components employed in transmitting the indexing motion of Geneva drive wheel 1210 to the rotary structure of turret No. 2.

Similarly, the indexing input to turret No. 1 comprises, in addition to the previously mentioned bevel gear 1220, a shaft 1226, a flexible coupling 1227 (FIG. 7a), a second shaft 1228, and a pair of bevel gears 1229 and 1230, the latter of which is mounted at the base of the central shaft 1028 of turret No. 1.

The various shafts comprising the means for transmitting the Geneva drive indexing motion to the turrets are suitably supported in roller or ball bearings in a conventional manner and these bearings have been schematically indicated at various points in FIGS. 7 and 7a.

An arrangement by which the turrets are mechanically locked in place between index movements thereof may be seen by reference to FIGS. 8 and 9. The means for mechanically locking turret No. 2 in place includes a plurality of lock pin or shot pin receiving assemblies 1231 one of which is rigidly carried on each of the side plates 1144 of the various carriage tracks 1108 through 1111. Each shot pin receiving assembly 1231 includes a conically shaped aperture 1232 formed therein that is adapted to receive a tapered lock pin or shot pin 1233 to rigidly hold turret No. 2 stationary during the six seconds of each indexing cycle when it is not being rotated. A similar arrangement is provided in connection with holding turret No. 1 stationary between indexing movements. In this case (FIGS. 7 and 7a) an extension 1234 is fastened to the rotary components of the turret. The extension 1234 is provided with a plurality of lock pin or shot pin receiving assemblies 1235 located at angular intervals every 90° apart. Each shot pin receiving assembly 1235 is conically apertured as at 1236 to receive a conically shaped lock pin or shot pin 1237 when it is adjacent thereto (FIG. 7).

Shot pin 1237 for turret No. 1 and shot pin 1233 for turret No. 2 (FIG. 9) are each rigidly carried by the stationary housing of the Geneva drive indexing mechanism 1200. Hence, they do not index with the turrets. In addition, four shot pin receiving assemblies 1231 or 1235 are provided on each turret. They are positioned 90° apart from one another so that each turret can be locked at the completion of indexing, regardless of which shot pin receiving assembly is adjacent its respective shot pin. The shot pins 1233 and 1237 are each driven into and out of their shot pin receiving assemblies by a separate pneumatically actuated power cylinder. A pneumatically actuated power cylinder 1238 (FIG. 9) is employed to drive shot pin 1233 into and out of engagement with its shot pin receiving assemblies 1231. Similarly (FIG. 7), a pneumatically actuated power cylinder 1239 is employed to drive shot pin 1237 into and out of engagement with its shot pin receiving assemblies 1235.

Referring now to FIG. 8, the pneumatic control valves employed in directing the flow of compressed air to the power cylinders 1238 and 1239 have been illustrated. Conduit 1240 serves to bring pressurized air to a pair of solenoid valves M–SV1A and M–SV1B. Solenoid valve M–SV1A, when energized, directs the compressed air to the upper end of the power cylinder 1238 to result in downward movement of the shot pin 1233 to disengage it from its shot pin receiving assembly 1231. Solenoid valve M–SV1A also is connected (not shown) to power cylinder 1239, which controls the engagement of shot pin 1237 with the shot pin receiving assemblies 1235 of turret No. 1, to achieve the same effect. The solenoid valve M–SV1B, on the other hand, is employed to raise both shot pins by directing compressed air to the lower half of the power cylinders 1238 and 1239 when solenoid valve M–SV1B is energized.

Referring to FIG. 115, the pneumatic control system employed in moving the shot pins is schematically illustrated. In the arrangement shown, solenoid valve M–SV1B has just been energized to direct compressed air from an air supply (not shown), through a normally open cut-off valve 1240, a filter, pressure regulator and lubricator assembly, shown generally at 1241, to the lower portions of the power cylinders 1238 and 1239. This, in turn, causes the shot pins of turret No. 1 and turret No. 2 to rise into engagement with their associated shot pin receiving assemblies and locks the turrets in position. It will be noted that during this time solenoid valve M–SV1A is de-energized and provides an exhaust to atmosphere for the upper portions of the power cylinders 1238 and 1239. When solenoid valve M–SV1A becomes energized and solenoid valve M–SV1B is de-energized, a reverse flow is initiated and compressed air is then directed to the upper portion of the power cylinders 1238 and 1239 to push the shot pins down and the lower portions of the power cylinders are exhausted to atmosphere.

The electrical circuitry by means of which the solenoid valves M–SV1A and M–SV1B are controlled to cause movement of the shot pins will be described in greater detail hereinafter; however, it should be pointed out that (FIG. 9) shot pin 1233 has associated therewith a pair of limit switches M–LS2 and M–LS7 which are actuated by movement of shot pin 1233. A lug 1242, which is directly carried by and movable with shot pin 1233, engages and actuates limit switch M–LS7 when the shot pin is up. Similarly, when the shot pin is down, lug 1242 engages and actuates limit switch M–LS2. The lug 1242 moves in a slot or guide channel 1243 to assure that it will properly engage the respective limit switches at either end of its travel. Referring to FIG. 7, it may be seen that a similar limit switch arrangement is provided in conjunction with shot pin 1237. In this case limit switch M–LS8 is actuated when the shot pin 1237 is up and limit switch M–LS3 becomes actuated when shot pin 1237 is down.

Referring now to FIGS. 8, 11, 11a, 12 and 13, the previously mentioned vacuum means 1023 of turret No. 1 and vacuum means 1128 of turret No. 2 have been illustrated in greater detail. As shown in FIG. 8, the vacuum means 1023 of turret No. 1 includes a motor 1040 which is drivingly connected to first and second vacuum pumps 1041 and 1042, respectively. The motor 1040 and pumps 1041 and 1042 run continuously during the operation of the machine. They are supported on a foundation plate 1043, which extends between the upper portions of turrets No. 1 and No. 2 and is supported thereby. Vacuum means 1128 of turret No. 2 also includes a motor 1175 which is drivingly connected to first and second vacuum pumps 1176 and 1177, respectively. The motor 1175 and vacuum pumps 1176 and 1177 which run continuously during operation of the machine, are also supported on the foundation plate 1043 mentioned above.

The two vacuum means 1023 and 1128 are essentially similar, and, therefore, a complete description only of the vacuum means 1023 with respect to turret No. 1 will be given. Thereafter, the minor distinctions provided in vacuum means 1128 for turret No. 2 will be pointed out in conjunction with that turret and the overall operation of both vacuum means.

Referring now to FIG. 11 it may be seen that the first vacuum pump 1041 has connected thereto a conduit 1044, a T-connector 1045, and a second conduit 1046 which projects downwardly into the foundation plate 1043. A vacuum switch M–VS1 is provided in communication with the T-connector 1045 and is actuated by the presence of a high vacuum in the T-connector to provide an electrical signal thereof. Conduit 1046, in a manner which will appear more clearly hereinafter, is always in communication with the chamber 1022 (FIG. 12) that is located at position I of turret No. 1. The arrival of a drum at position I causes a vacuum to develop in the chamber 1022 which aids in unloading the drum from the turret loader 900 and holds it firmly against position I. The Roman numeral I has been listed in FIG. 11 to indicate the correlation between conduit 1046 and position I of turret No. 1.

Vacuum pump 1042 has connected thereto a conduit 1047 which is in communication with a T-connector 1048. A second conduit 1049 also communicates with T-connector 1048 and projects downwardly into the foundation plate 1043. Similarly, a vacuum switch M–VS2 is in communication with the T-connector 1048 and this vacuum switch becomes actuated when a vacuum exists within the T-connector 1048. The foregoing structure, in conjunction with vacuum pump 1042, is employed in the creation of and maintenance of a vacuum at positions II and III of turret No. 1 in a manner which will appear in greater detail hereinafter.

A solenoid valve M–SV2 located at the end of a conduit 1050 is provided in communication with the chamber 1022 (FIG. 83) at position IV of turret No. 1. Upon energization of solenoid valve M–SV2, the chamber 1022 at position IV is connected to atmosphere to facilitate releasing the carcass bearing drum in conjunction with its transfer to position V of turret No. 2. The atmospheric inlet line for solenoid valve M–SV2 has been indicated at 1051 (FIG. 11).

Referring now to FIGS. 12 and 13, the manner in which the vacuum is drawn on the various chambers 1022 at the drum supporting posts 1011 through 1014 has been illustrated in greater detail. The vacuum control function for the various positions I through IV of turret No. 1 is performed by a rotary valve means, shown generally at 1052. Valve means 1052 includes an upper stationary housing 1053 which is fixedly carried on the underside of foundation plate 1043.

Referring now to FIG. 13, which is a sectional view taken through the housing 1053 of FIG. 12, looking down, it may be seen that the housing 1053 is formed with a plurality of arcuate chambers 1054, 1055 and 1056. Arcuate chamber 1054 corresponds to position I of turret No. 1 and, as previously indicated, is maintained under a vacuum by a vacuum pump 1041 through conduit 1046 (FIG. 83). Similarly, arcuate chamber 1055 corresponds to positions II and III of turret No. 1. Chamber 1055 is maintained under vacuum by vacuum pump 1042 via conduit 1049 (FIG. 12). Arcuate chamber 1056, on the other hand, is in communication with solenoid valve M–SV2 and, upon energization of the solenoid valve, atmospheric pressure develops therein to facilitate the release of the drum for subsequent movement to position V of turret No. 2.

As previously indicated, the central spindle or shaft 1028 of turret No. 1 projects upwardly into the area adjacent the vacuum means 1023. In actuality, it serves as the support for the rotating components of the valve means 1052. As shown in FIGS. 12 and 13, the rotary components of valve means 1052 include a drive flange 1057 which is rigidly clamped to the shaft 1028 for rotation therewith during indexing by means of a set screw 1058. Four metallic tubes 1024a, 1025a, 1026a and 1027a pass freely through holes in the drive flange 1057 and connect with the flexible conduits 1024, 1025, 1026 and 1027, respectively. The flexible conduits, in turn, each communicate with respective pipes 1024b, 1025b, 1026b and 1027b to thereby connect each of the four chambers 1022 with the valve means 1052. The metallic tubes 1024a through 1027a are each welded to a tube ring 1061 which is freely positioned atop the drive flange 1057. A rubbery sealing ring 1062 is positioned atop the tube ring 1061 and is provided with four holes into which the tubes 1024a through 1027a project to thereby establish communication between these tubes and the chambers 1054, 1055 and 1056.

The foregoing structure provides a "floating" seal between the stationary and movable components of the valve means 1052. When the vacuum is on, tube ring 1061 raises and compresses the seal ring 1062 against the lower surface of the valve housing 1053. The holes in drive flange 1057 are sufficiently large to allow the tube ring 1061 to cock slightly to take up any misalignment that might exist between the rotary and stationary components, while the rubbery seal ring 1062 effectively seals the space between these parts to prevent loss of vacuum.

In order to provide a bearing surface between the central shaft 1028 and the stationary valve housing 1053, a sleeve bushing 1063 is employed. Similarly, a thrust bearing 1064, mounted between the upper end of the central shaft 1028 and the lower surface of the foundation plate 1043, is utilized to support the weight of the vacuum means 1023 atop the central shaft 1028.

Referring now to FIGS. 11, 12 and 13, together, the sequence of operations, insofar as the vacuum means 1023 is concerned, will now be considered. Assuming that both vacuum pumps 1041 and 1042 are in operation and drawing vacuums in their associated chambers 1054 and 1055 of the valve housing 1053, and, that the turrets have just indexed so that no drum exists at position I while a drum is still being carried at position IV, upon arrival of a new drum at position I, a vacuum forms in vacuum chamber 1054. Hence, vacuum switch M–VS1 (FIG. 11) is actuated to initiate an electrical signal indicative of the arrival of the drum at position I and of the safe condition of the vacuum seal for use in the electrical control circuits. Since, during the next previous indexing of the turrets, a drum was carried from position I to position II and also from position II to position III, vacuum chamber 1055 (FIG. 13) is under a vacuum and, therefore, vacuum switch M–VS2 (FIG. 11) remains actuated to electrically indicate that drums are being carried at these positions and that the vacuum is at a safe level.

Vacuum switch M–VS2 remains actuated throughout the entire operation of the machine due to the fact that, in normal operation, a drum is always carried at positions II and III of turret No. 1. Similarly, assuming that the solenoid valve M–SV2 had closed prior to the previous indexing, a vacuum exists in chamber 1056. This vacuum is not as great as those of chambers 1054, since chamber 1056 is not connected to any vacuum pump and only obtains a residual vacuum which carries to position IV when the turrets index. However, with the arrival of a drum at position IV the need for a vacuum at that position disappears because the drum must then be transferred to position V of turret No. 2. Hence, solenoid valve M–SV2 becomes energized after indexing in order to break the vacuum at position IV. This, in turn, allows the subsequent operation of the drum transfer carriage to pick up the drum from position IV and transfer it to position V.

In summary of the operation of the vacuum means 1023 it may be seen that a vacuum exists at position I only during those times that a drum is actually carried at that position—subsequent indexing of the turret removes a drum from this position and breaks the vacuum therein; positions II and III of turret No. 1 are always under vacuum during normal operation; and position IV retains residual vacuum only so long as solenoid valve M–SV2 remains de-energized.

The arrangement by which the vacuum means 1128 is utilized in turret No. 2 may be more clearly understood by reference now to FIGS. 11a, 12 and 13. As used in connection with turret No. 2, a valve housing similar to the valve housing 1053 is rotated 90° counter-clockwise from the position shown in FIG. 111 so that its chamber 1054 is aligned with position V of turret No. 2, its chamber 1055 is aligned with positions VI and VII of turret No. 2, and its chamber 1056 is aligned with position VIII of turret No. 2. Similarly in FIG. 109A, the vacuum pump 1176 is utilized to draw a vacuum at position V by means of conduits 1178 and 1179 and a T-connection 1180. A vacuum switch M–VS3 is connected in communication with the T-connection 1180 to sense whether or not a vacuum exists at position V. With a vacuum at position V, vacuum switch M–VS3 becomes actuated and initiates an electrical signal indicative of this fact. Also, vacuum pump 1177 is connected through conduits 1181 and 1182 and a T-connection 1183 to draw vacuums at positions VI and VIII on turret No. 2. As with turret No. 1, these positions are always under vacuum during normal operation of the machine. A vacuum switch M–VS4, which is in communication with the T-connection 1183, serves to provide an electrical indication of the fact that vacuum exists at positions VI and VII. A solenoid valve M–SV4 is provided in communication with the vacuum chamber at position VIII through conduit 1184. This valve performs a similar function to that of solenoid valve M–SV2 of turret No. 1 in that it releases the vacuum at position VIII by means of a bleed line 1185 when solenoid valve M–SV4 is energized. This facilitates the removal of a drum from position VIII in order to start the drum on a return trip back to the input end of the tire building machine. The valve means for turret No. 2, shown generally at 1186 in FIG. 7, perform the same function for turret No. 2 as valve means 1052 (FIG. 12) performs for turret No. 1. The only difference between the two is that the housing 1053 (FIG. 13), as previously mentioned, is rotated 90° counter-clockwise in the adaption of the valve means 1052 to turret No. 2.

In summary of the operation of the vacuum means 1128 at turret No. 2, it will be understood that vacuum switch M–VS3 is de-actuated whenever there is no drum present on the drum transfer carriage located at position V. However, when a drum transfer carriage moves to position IV and picks up a drum, a vacuum is created at position V and vacuum switch M–VS3 becomes actuated to electrically signify this condition. Thereupon, the drum transfer carriage retracts to position V carrying the drum that was previously at position IV along with it. In this connection it should be noted that at this time solenoid valve M–SV2 (FIG. 11) is energized to relieve the residual vacuum at position IV and facilitate the transfer of the drum to position V. In a like manner with turret No. 1, since a drum is always present at positions VI and VII of turret No. 2 during normal operation of the machine, a vacuum will be retained at those positions due to the vacuum pump 1177 (FIG. 11a) and, therefore, vacuum switch M–VS4 remains actuated throughout the entire normal operation of the machine. As drums finally index to position VIII and are ready to be removed from turret No. 2, of course, solenoid valve M–SV4 energizes to relieve the vacuum at that position, thereby allowing the drums to be removed from the turret and returned to the input end of the machine by the drum return conveyor 1800 (FIG. 2).

*Description and explanation of operation of the first bead setter*

As is shown in FIGS. 1 and 29, the machine is provided with two bead setters, the first bead setter 1300 encountered in the flow of drums through the machine being designated generally as bead setter No. 1 and the second 1300A being designated generally as bead setter No. 2. These two bead setters are located respectively adjacent and opposed to position III of turret No. 1 and position VI of turret No. 2. The structures and functioning of the two bead setters are substantially identical except that bead setter No. 2 is of opposite hand throughout to bead setter No. 1. Consequently, only bead setter No. 1 will be described in detail in this specification, bead setter No. 2 being different from bead setter No. 1 only in that there are different letter designations for the equivalent sensing and control apparatus and functions, and for the control interlocks with the turrets.

The functions of each bead setter, with respect to the one end of each drum presented to it, are to depress the band on the drum to its non-extended position, to position a wrapped bundle of bead wires (or "bead" as it is called hereinafter) at the proper longitudinal position external to and substantially concentric with the fabric plies previously wrapped on the drum, and to cause the ends of the plies to be turned up and back over the bead and adhered to the carcass plies while the bead is firmly held in its proper position with respect to the plies wrapped on the drum. These functions are accomplished by first advancing the "front" or "forward" end of the bead setter assembly into contact with the band on the drum and continuing this advance to depress the band to its retracted position while, at the same time, longitudinally positioning the internal bead holding fingers of the bead setter assembly at the proper final location for the bead with respect to the carcass plies wrapped on the drum. Simultaneously, the bead setter cage assembly is retracted with respect to the bead holding and bladder carrier assembly until a bead held by the fingers of the external bead placing assemblies (which are mounted on the cage assembly) is positioned directly opposite to the internal fingers. The internal fingers are then expanded to grip the bead and the external fingers are withdrawn outwardly. Next, the bladder is inflated, expanding the ends of the plies against the cage. The cage is then advanced forward, toward the turret, rolling bladder and ply ends over the bead and adhering the ply ends to the carcass body. The cage is subsequently retracted, the bladder rolled back and deflated, and the internal fingers retracted radially inwardly. Then the moving parts of the bead setter are returned to their original or start position to permit indexing of the turrets and the reception of another bead from the bead servicer, which last-mentioned apparatus will be described in a subsequent section of this specification.

The structure of the bead setters may be seen and more easily understood by reference now to FIGS. 18 through 26. In particular, FIGS. 18 through 22 will be initially referred to in describing the major assemblies comprising the bead setter. The bead setter assembly itself, shown generally at 1301, is comprised of the following major sub-assemblies: The bead holding and bladder carrier assembly 1302, the central shaft and camming assembly 1303, an hydraulic rotary motor 1304 of the type known as a "Rotac" for rotating the central shaft and camming assembly 1303 relative to the bead holding and bladder carrier assembly 1302, the cage assembly 1305 on which are mounted the three external bead positioning assemblies 1306, 1306′ and 1306″, and an hydraulic cylinder assembly 1307 for reciprocally moving the cage assembly 1305 relative to the bead holding and bladder carrier assembly 1302. In addition to the bead setter assembly 1301, itself, a base 1308 and an hydraulic cylinder assembly 1309 for advancing and retracting the entire bead setter assembly 1301 with respect to the base 1308 complete the necessary major structural elements of the bead setter 1300. The bead setter 1300 herein described is provided with an additional major assembly, the bead setter positioning assembly 1310, for the purpose of permitting the bead setter assembly 1301 to automatically select the proper operational position for setting beads on carcasses carried by drums of different lengths presented to it in random sequence. If it were desired to limit the operational capability of the bead setter to handling drums and carcasses of a single uniform length, this latter assembly could be dispensed with in favor of a simple mechanism providing for repeated cushioned stops of the forward motion of the piston in cylinder assembly 1309 at a predetermined longitudinal position. Actually, such a mechanism (not shown) is standard in many hydraulic cylinders and is provided in the cylinder assembly 1309 to stop the forward motion of the piston when no drum is present in the opposed turret position.

The complete bead setter 1301 is also provided with the necessary hydraulic, pneumatic and electrical systems for power and control, all of which will be discussed in a later portion of this specification.

Referring now especially to FIGS. 18 and 22, the base 1308, which is affixed to the floor by suitable studs (not shown), may be constructed of any suitable arrangement of structural steel members such as those shown in FIG. 18, it being necessary that the base 1308 be sufficiently rigid to permit substantially no movement of the bead setter assembly 1301 relative to the floor and, consequently, relative to the turret 1000 except for the desired operational movement of the bead setter assembly 1301. The base 1308 must also have such appropriate dimensions that the longitudinal center line of the bead setter assembly 1301, once said assembly is operationally mounted thereon, will substantially coincide with the longitudinal center line of the drum held by the turret 1000 in position III. The base 1308 is provided with appropriately positioned mounting brackets 1311 and 1311′ for mounting the hydraulic cylinder assembly 1309 thereon and with a pair of parallel tracks 1312 and 1312′ in which the rollers 1415 of the carriage on the cage assembly 1305 may travel.

The hydraulic cylinder assembly 1309 is comprised of a conventional hydraulic cylinder 1313, closed at both ends, in which a slidably mounted piston (not shown) may be caused to be driven reciprocally by hydraulic fluid admitted under pressure through either of the fluid inlets 1314 and 1314′, the fluid on the side of the piston opposite that under the pressure of the admitted fluid being forced out of the cylinder 1313 through the other inlet by the movement of the piston. The cylinder 1313 is provided with conventional internal means for cushioning the stop of travel of the piston at either end of the cylinder. A piston rod 1315 is slidably mounted in suitable fluid seals in a bore in the forward end of the cylinder 1313, whereby said rod 2315 reciprocates in said cylinder 1313 with said piston. The cylinder 1313 is affixed by means of suitable brackets 1316 and bolts 1316′ to the mounting brackets 1311 and 1311' on the base 1308.

The piston rod 1315, which is threaded on its forward, external end, is attached by means of a nut 1315' to the bead holding and bladder carrier assembly 1302; so that the reciprocation of the piston in the cylinder 1313 causes the entire bead setter assembly 1301 to be reciprocated forward and backward toward and away from the turret 1000.

At the end of the bead holding and bladder carrier assembly 1302 most remote from the turret 1000 an end plate 1317 provided with a hole 1317' suitably sized to mate with the threaded end of the piston rod 1315 is attached securely thereto by means of the nut 1315'. This end plate 1317 is welded or otherwise rigidly fastened to two side plates 1318 and 1318' positioned as shown in FIGS. 20b and 21. Side plates 1318 and 1318' are, in turn, welded to the split block 1319 which is tightly clamped by means of bolts 1320 and 1320' to the hollow shaft 1321. As may be seen in FIG. 90, the end plate 1317 bears against and actuates two switches K–LS1 and M–LS26 when the bead holding and bladder carrier assembly 1302 is in its most rearward or rest position.

As is shown in FIGS. 20a and 20b, the shaft 1321 is provided, throughout most of its length, with a keyway 1322. The key 1326 affixed to the block 1319 by the screws 1327, and inserted in the keyway 1322 prevents any rotation of the shaft 1321 with respect to the block 1319. At either end of the bore 1323 through the shaft 1321 are provided recesses 1324 and 1324' in which are fitted tubular bearings 1325 and 1325'.

Referring now to FIG. 20a, near the front end of the shaft 1321 is provided a ring collar 1328. Fastened to this collar 1328 by means of a multiplicity of screws is the bladder carrying drum 1329. The bladder 1330, which will be described in more detail hereinafter, is mounted on the external periphery of the drum 1329. On the front face of the drum 1329 is mounted guide plate 1331.

Referring now to FIGS. 23, 23a and 23b, the annular guide plate 1331 is provided with an annular recess 1332 of rectangular cross-section machined in its radially outermost front corner. At regularly spaced intervals around the circumference of the guide plate 1331, are machined a plurality of radially directed, parallel side T-shaped grooves 1334 running through from recess 1332 to the annularly innermost face 1335 of the guide plate 1331. A multiplicity of screws 1336 hold the guide plate 1331 to the drum 1329, the heads of screws 1336 being recessed in the guide plate 1331.

Slidably mounted in the slots 1334 are the T-shaped internal bead holding fingers 1337. The radially outermost surfaces 1338 of these fingers 1337, when viewed and positioned as shown in FIG. 23 are arcuate, the center of each such arc substantially coinciding with the longitudinal center line of drum 1329. When viewed in cross-section, as shown in FIGS. 23a and 24a, the radially outermost surfaces 1338 of the fingers 1337 are provided with a relatively flat bead holding surface 1338' adjacent to the ring 1331 and a shoulder 1338" remote from said ring. The purpose of this shoulder 1338" is to prevent the bead from being forced off the fingers 1337 by the action of the bladder 1330 during the actual ply turn-up operation. The shank 1339 of each finger 1337 is machined with recesses 1340 and 1340' to the cross-sectional shape shown in FIG. 23b whereby the fingers 1337 may be snugly but slidably mounted in the aforementioned T-shaped grooves 1334 in the guide plate 1331. On the radial center line of each finger 1337 a pin 1341 is pressed into a hole 1342 in finger 1337 in interference fit with said hole. When the pins 1341 are actuated, by means described hereinafter, they cause each finger 1337 to slide radially outwardly and inwardly in grooves 1334. FIGS. 23 and 23a depict the fingers 1337 in their radially innermost position while FIGS. 24 and 24a depict the fingers 1337 in an extended position.

Referring again to FIG. 20b, attached to the end of shaft 1321 most remote from the turret 1000 is the body 1343 of the rotary motor 1304. The attachment which, in the machine described, has been made by means of a key 1344 and set screws 1345 and 1345', must be such that the body 1343 may not rotate with respect to the shaft 1321. The rotor 1346 (shown schematically in FIG. 41) of the rotary motor 1304, which is mounted on the shaft 1347, is actuated by hydraulic fluid admitted, as will be more fully described hereinafter, through either of the two fluid inlets in the body 1343, one of which is shown at 1348. Mounted on the end of the shaft 1347 most remote from turret 1000 is an arm 1349 (seen also in FIG. 30a) which, upon rotation of the rotor 1346 of the rotary motor 1304 actuated alternatively switches K–LS5 and K–LS6. The sequence of such actuation will be more fully described in a later portion of this specification. The opposite or forward end of the shaft 1347 is keyed to the central shaft 1350 by a key 1351.

The shaft 1350, which passes completely through the bore of the shaft 1321, is rotatably mounted in tubular bearings 1325 and 1325' and is prevented from moving longitudinally relative to the shaft 1321 toward the turret 1000 by an end piece 1352 which is secured to the shaft 1350 by suitable machine screws, one of which is shown at 1353 in FIG. 20b. Rotatably mounted on the front end of the shaft 1350 is a drum center 1354 which is attached by means of a screw 1355 to a plug 1356 welded into the open end of the shaft 1350. A tubular bearing 1357 and a disk bearing 1358 facilitate rotation of the center 1354 on the shaft 1350.

As shown in FIG. 20a, to the left of the drum center 1354 and immediately to the right of the front end of the shaft 1321, a flange 1359 is secured to the shaft 1350 by a pin 1360. Fastened to the flange 1359 by a plurality of machine screws 1361 is a drum 1362. Mounted on the end of the drum 1362 nearest the turret 1000 is the annular camming piece 1363 which is secured to the drum 1362 by means of a lock ring 1364, radial screws 1365 and longitudinal screws 1366. As is best seen in FIGS. 22 and 23, the camming piece 1363 is provided, around its circumference, with a plurality of camming slots 1367 inclined approximately tangentially to the outer surface of the drum 1362. As is best seen in FIGS. 23 and 23a, the camming ring 1363 is positioned so that it has a very small face-to-face operating clearance with the guide plate 1331 and the fingers 1337 and so that the pins 1341 extend well into camming slots 1367. Consequently, when the rotary motor 1304 is actuated hydraulically, the central shaft 1350 is rotated relative to shaft 1321, and the camming ring 1363 is rotated relative to the guide plate 1331 and the fingers 1337, whereby the fingers 1337 are extended radially from their position as shown in FIG. 23 to their position as shown in FIG. 24 by the force exerted on the pins 1341 by the slots 1367.

In addition to rotating the central shaft 1350, the rotary motor 1343 simultaneously rotates the arm 1349 (see FIG. 101a). Consequently, when the rotation of the rotor 1346 of the rotary motor 1343 is in such a direction as to radially extend the fingers 1337, the arm 1349 is simultaneously rotated to actuate limit switch K–LS6 and to de-actuate limit switch K–LS5, thereby signaling that the fingers 1337 have been extended to grip the bead. Similarly, when the rotor 1346 is rotated so as to retract the fingers 1337 radially inwardly, the arm 1349 is simultaneously rotated to actuate limit switch K–LS5 and to de-actuate limit switch K–LS6 thereby signaling that the fingers 1337 are in the retracted position.

As may be best seen in FIG. 23a, the depressor ring 1368 is mounted on the outer periphery of the front surface of the camming ring 1363 by a plurality of screws 1369. The function of depressor ring 1368 is to bear against the rods 62 on each drum successively presented to the bead setter 1300 during the initial forward travel of the bead setter assembly 1301, thereby depressing the band 60 to its unextended position.

Referring now to FIG. 20b, saddle 1370 is mounted on the side plates 1318 and 1318' by means of screws 1371.

Mounted, in turn, on the saddle 1370, by means of the trunnion mounting 1372, is the hydraulic cylinder assembly 1307. This hydraulic cylinder assembly 1307, which is similar in construction to hydraulic cylinder assembly 1309, previously described, is comprised of a conventional hydraulic cylinder 1373 closed at both ends in which a slidably mounted piston (not shown) may be caused to be driven reciprocally by hydraulic fluid admitted under pressure through either of the alternative fluid inlets 1374 and 1374', the fluid on the side of the piston opposite to that under pressure of the admitted fluid being forced out of the cylinder 1373 through the other inlet by the movement of the piston. A piston rod 1375 affixed to the piston is slidably mounted in a suitable fluid seal in a bore in the end of the cylinder 1373 facing the cage assembly 1305, whereby the rod 1375 reciprocates with respect to the cylinder 1373.

The threaded end 1375' is adjustably fastened to a bracket 1376 by means of nuts 1377 and 1377', whereby the entire cage assembly 1305 may be reciprocated with respect to the bead holding and bladder carrier assembly 1302 by the action of the hydraulic cylinder assembly 1307.

Referring now to FIG. 18, limit switches K-LS3 and K-LS4 are suitably mounted on the bead holding and bladder carrier assembly 1302. Affixed to the cage assembly 1305, are switch actuators 1378 and 1379 for actuating limit switches K-LS3 and K-LS4, respectively. Switches K-LS3 and K-LS4 and actuators 1378 and 1379 are so constructed and positioned that, when the cage assembly 1305 is extended forward relative to the bead holding and bladder carrier assembly 1302, limit switch K-LS3 will be de-actuated and limit switch K-LS4 will be actuated thereby signaling that the position of the cage assembly 1305 is forward. Similarly, when the cage assembly 1305 is retracted relative to the bead holding and bladder carrier assembly 1302, limit switch K-LS3 is actuated and limit switch K-LS4 is de-actuated thereby signaling that the cage assembly 1305 is in its retracted position.

Referring now to FIG. 20a for a description of the cage assembly 1305, the bracket 1376 is welded to the hollow shaft 1380. The shaft 1380 is provided with an internal key slot 1381 in which a key 1382 is mounted by means of screws 1383 and 1383'. This key 1382, in turn, is slidably mounted in the slot 1322 on the shaft 1321, whereby any relative rotation of the two shafts is prevented while the shaft 1380 is free to move longitudinally with respect to the shaft 1321. To facilitate this longitudinal movement, the bore of the shaft 1380 is provided, at either end, with two recessed tubular bearings 1384 and 1384'. Welded to shaft 1380 at its forward end is the web and rim 1385. A gusset 1386 lends support to the web and rim 1385. Fastened to the web and rim 1385 by means of a multiplicity of screws 1387 is the cage 1388 comprised of a cylindrical metal grill 1388' and two solid annular end bands 1389 and 1389'.

Mounted on the top of the band 1389' by means of screws 1390 is the external finger or bead placing assembly 1306, the details of which are best shown in FIGS. 93a and 93b. The external bead placing assembly 1306 is comprised of a body 1391. Affixed to the body 1391 is a pneumatic cylinder 1392, in which is provided a cylindrical bore 1392A. Reciprocally mounted in the bore 1392A is a piston 1393 to which is affixed a piston rod 1394 which extends through suitable packing means out of the top end of the cylinder 1392. High pressure air admitted alternatively through the air inlets 1395 or 1395' causes the piston 1393 and piston rod 1394 to move up or down with respect to the cylindrical bore 1392. Attached to the top end of the piston rod 1394 by means of a lock nut 1396 is a cross bar 1397. Attached, in turn, to the front end of this cross bar 1397 and passing through it is an externally threaded shaft 1398 which may be positioned vertically with respect to the cross bar 1397 by means of lock nuts 1399 and 1399'. The threaded shaft 1398 is screwed into the upper end of the shank 1401 of the external bead holding finger 1400, whereby admission of air through the inlet 1395 causes the finger 1400 to be advanced radially inward with respect to the cage assembly 1305, while admission of air through inlet 1395' causes the finger 1400 to be retracted radially outward from the center line of the bead setter.

Referring now to FIG. 22a, the bead gripping surface 1402 of the finger 1400 is arcuate, the arc corresponding approximately in radius to the radius of the bead to be gripped. As shown in cross-section in FIG. 22b, the bead gripping surface 1402 is provided with a groove 1403 in order that the bead may be firmly held by the three cooperating external bead fingers 1400, 1400' and 1400''. Referring again to FIG. 22a it should be noted that two guide recesses 1404' are machined on the shank 1401 of finger 1400. Guide pieces 1405 and 1405' fastened to the body 1391 by a plurality of screws 1406 fit into the recesses 1404' thereby forming, in conjunction with the body 1391, a slide track for the radial reciprocation of the finger 1400. A bore 1407 passes completely through the threaded shaft 1398 and the finger 1400. Slidably mounted in this bore is a bead sensing pin 1408 the bottom end of which extends into the groove 1403 when no bead is present and the top end of which extends above the top end of the shaft 1398. Affixed to pin 1408 above the top end of the shaft 1398 by means of a set screw 1409 is a collar 1410. The collar 1410 prevents the pin 1408 from sliding radially inward out of the bore 1407. Pin 1408 is prevented from moving radially outward out of the bore 1407 by the spring-loaded follower of limit switch K-LS11 which is mounted so that the follower 1411 will be depressed, actuating switch K-LS11 when the pin 1408 is forced radially outward by a bead held in the groove 1403. Another limit switch K-LS8 is actuated by the actuator 1412 welded to the cross bar 1397 when the finger 1400 is advanced to its radially most inward position, while a third limit switch, K-LS7 is actuated directly by the cross bar 1397 when the finger 1400 is retracted to its radially outermost position.

Referring now to FIG. 22, it should be noted that two identical external bead placing assemblies 1306' and 1306'' are mounted on the band 1389' at positions disposed angularly 120° on either side of the external bead placing assembly 1306. Consequently, when simultaneously advanced inwardly pneumatically, the fingers 1400, 1400' and 1400'' function similarly to the jaws of a three-jaw chuck in gripping and holding a bead. Assembly 1306' is provided with limit switches K-LS13 and K-LS15 corresponding respectively to limit switches K-LS11 and K-LS7 on assembly 1306. Assembly 1306'' is provided with limit switches K-LS16 and K-LS14 corresponding respectively to limit switches K-LS7 and K-LS11 on assembly 1306. Neither assembly 1306' nor assembly 1306'' is provided with a limit switch corresponding to limit switch K-LS8 on assembly 1306.

Also mounted on the cage 1388 is limit switch K-LS9 which is actuated when the bladder 1330 is inflated against the cage 1388.

As may be seen in FIGS. 20a, 20b and 22, the cage 1388 is mounted by means of suitable machine screws 1413 threaded into the bands 1389 and 1389' to a carriage frame 1414. The carriage frame 1414, when the bead setter assembly 1301 is in home or rest position, extends from the forward end of the cage assembly 1305 to the rearward end of the hydraulic rotary motor 1304. To the rear of the cage assembly 1305 four wheels 1415 are suitably rotatably mounted on the frame 1414 in such positions that they will travel in the tracks 1312 and 1312'. These wheels 1415 are so positioned in pairs longitudinally that all four wheels will remain in the tracks 1312 and 1312' whether the bead setter assembly 1301 is at its home or rest position or in its furthest forward position. In addition to providing for longitudinal movement of the bead setter assembly 1301 with respect to the frame 1308 and of the cage assembly 1305 with respect to the bead holding and bladder carrier assembly 1302, it is the function of the carriage frame 1414 and wheels 1415 to support the entire forward or head end of the bead setter assembly 1301.

As may best be seen in FIG. 19, one-way limit switch K–LS10 is mounted on the base frame 1308 adjacent to the track 1312. Limit switch K–LS10 is actuated by an actuator 1416, which is mounted on the carriage frame 1414, only as the carriage 1414 and cage 1388 roll backward from their most advanced final forward movement in each cycle, said final forward movement being for the purpose of actually turning the carcass ply up and over the bead. The actuation of limit switch K–LS10 results (as will hereinafter more fully be described) in the initiating of the deflation of the bladder 1330 slightly before it is rolled back to its rest position.

It is the function of the bladder 1330 mounted on drum 1329 (as shown in FIG. 20a) to actually "turn-up" the carcass plies wound on each successively presented drum around the bead. This is accomplished by the bladder 1330 being inflated to expand the carcass ply ends against the cage 1388. Then, in its final forward movement as previously mentioned, the cage 1388 rolls both bladder 1330 and plies forward over the bead, adhering the ply ends firmly to the carcass plies supported by the drum. This adhering action is effectuated by the pressure of the inflated bladder against the turned up plies.

Referring now particularly to FIGS. 25 and 26, the details of construction of a preferred form of the bladder 1330 will be described. As shown in these figures, the bladder 1330 is constructed in the form of an annular flattened tube provided with two inlets 1417, disposed 180° apart, for pressurized air. The annular tube is comprised of a layer of soft resilient rubber 1418. Bonded to this layer of rubber 1418 throughout most of its cross sectional periphery is a layer of rubber-coated reinforcing fabric 1419. This layer of fabric 1419, which, in a preferred bladder construction is .040" thick, completely surrounds the cross sectional periphery of the bladder 1330 except for the face of the bladder nearest the turret and approximately 1¼" of the outer surface of the bladder immediately adjacent thereto. The rubber layer 1418 is approximately .060" thick in the regions where it is reinforced by the fabric layer 1419, and this thickness is increased to .120" in the non-reinforced region 1418'. A suitable, relatively thick ring of rubber 1420 is provided internally at the forward end of the bladder to prevent the drum engaging region of the bladder 1330 from stretching away from the drum 1329 when the bladder 1330 is inflated. Also, suitable rubber plugs 1421 are provided at the inlets 1417 of the bladder 1330.

The purpose of the fabric layer 1419 is to strengthen the bladder 1330 against failure due to flexing and/or wear. It has been found, however that, were the fabric layer 1419 to be extended completely around the cross sectional periphery of the bladder 1330, no appreciable stretching of this cross sectional periphery would be permitted when the bladder is inflated. The result is a bead area fold of the carcass plies similar to that shown in FIG. 27a, where the carcass plies tend to form a crease 1422 about the bead 1423. When the fabric 1419 is eliminated from and bladder stretching is permitted in the region 1418' of the bladder cross sectional periphery as shown in FIG. 26, a smooth wrapping of the carcass plies around the bead 1423, as shown in FIG. 27b, results.

As may best be seen in FIG. 101, as the bead holder and bladder carrier assembly 1302 is advanced towards a drum at position III on the turret 1000 the bead setter positioning assembly 1310 eventually bears against and is actuated by the sleeve 58 on the drum. In the operation of bead setter No. 2 with respect to a drum in position VI on turret 1100, the corresponding assembly 1310A bears against and is actuated by the cone 53 on the drum. It is the function of this drum length positioning assembly 1310 to stop the forward travel of the bead holding and bladder carrier assembly 1302 at the proper position for setting a bead in the carcass plies wound on each drum presented to the bead setter. Because the bead setting position is determined by the dimensions of each drum presented, it is therefore possible for the bead setter to properly set beads in carcasses of two or more lengths presented to it in random order, thereby facilitating simultaneous production runs of two or more sizes of tires on the same tire building machine.

Referring now particularly to FIG. 20a, the drum sensing element of the bead setter positioning assembly 1310 is a face plate 1424. Mounted in holes in the face plate 1424 near its outer edge and angularly disposed 120° apart are three bushings 1425. The face plate 1424 is mounted on the drum 1329 by means of three flat fillister headed guide rods 1426 passed through the bushings 1425, passing through clearance holes in the drum 1362 and threaded into drum 1329. Three coil springs 1427 mounted on the guide rods 1426 act to return the plate 1424 to the forward position as shown in FIG. 20a whenever it has been displaced longitudinally toward the drum 1329.

Referring now again to FIG. 30, attached to the plate 1424 by suitable means, such as the threaded end and nut illustrated, is the forward end of the push rod 1428 which extends rearward through suitable clearance holes in the drums 1329 and 1362 and the web 1385. Mounted on the rearward end of the push rod 1428, which is slidably guided and supported by the guide mounting 1429 affixed to the support plate 1430 (which, as shown in FIG. 21, is, in turn, mounted on the side plate 1318), is a roller 1431.

On the top surface of the support plate 1430 are mounted, in parallel relationship, two guides 1432 having L-shaped cross-sections. Slidably mounted on the plate 1430 between the guides 1432 is a slider 1433 having, on its end nearest the shaft 1321, an inclined face 1433' so oriented that rearward motion of the rod 1428 will cause the roller 1431 to move the slider 1433 outward from the longitudinal axis of the bead setter. On the opposite end of the slider 1433 from the inclined face 1433', is mounted a roller 1434. The slider 1433 is connected to one of the guides 1432 by a coil spring 1435 which causes the slider 1433, when not displaced by the roller 1431, to return to or remain in a position such that roller 1434 will not touch the swivel plate 1436 as the bead setter assembly 1301 moves longitudinally relative to the base 1308.

Referring now to FIGS. 19a and 19b for a description of the remainder of the bead setter positioning assembly 1310, a support bracket 1437 is mounted on the base 1308 at such a longitudinal position as to correspond with the longitudinal position of the slider 1433 at the time when, in the normal sequence of operation of the bead setter, the plate 1424 is being depressed by the sleeve 58 of the drum. Mounted on the top surface 1437' of the support bracket 1437 near the side of said top surface nearest the path of longitudinal travel of the slider 1433 are two hinge posts 1438. Hinged to the posts 1438 by means of hinge pins 1439 is the aforementioned swivel plate 1436, which is suspended from the posts 1438 in such as way as to pivot in a direction transverse to the longitudinal axis of the bead setter about the hinge pins 1439 which together comprise a pivot axis parallel to the longitudinal axis of the bead setter. The swivel plate 1436 is held by a spring 1440 in contact with valve actuator 1441'. Valve actuator 1441' is part of and causes the closing of the deceleration valve 1441 when the swivel plate swivels to the left as shown in FIG. 19a.

Referring now again to FIG. 30, as well as FIG. 19a, as the bead holding and bladder carrier assembly 1302 travels forward, the plate 1424 contacts the sleeve 58 on the drum causing the plate 1424 to remain stationary relative to the floor and to be forced rearward relative to the bead setter assembly 1301. This in turn causes the relative rearward movement of the push rod 1428 which bears against the slider 1433 causing the slider 1433 to move transversely outward from the longitudinal axis of the bead setter depressing to the left (as shown in FIG. 19a) the swivel plate 1436, with which, by this time, the slider 1433 is in alignment. The movement of the swivel plate 1436 to the left gradually actuates the deceleration valve 1441 to restrict the feed of hydraulic fluid (as will be explained in a subsequent discussion of the hydraulic system), to hydraulic cylinder assembly 1309, thus slowing the forward movement of the bead holding and bladder carrier assembly 1302. Further transverse swiveling of swivel plate 1436 to the left actuates limit switch K–LS2 which, in turn, causes ball check shut off valve 1442 (FIG. 30) to shut off all further feed of hydraulic fluid to the cylinder assembly 1309 thereby stopping the forward movement of the bead holding and bladder carrier assembly 1302 in proper longitudinal relationship to the particular drum and carcass size presented at random. The deceleration valve 1441 may be adjusted, by means of the adjustment screw 1443 set in the threaded post 1444 (FIG. 19a), for proper transverse position to insure effective deceleration.

In FIG. 40 is shown schematically the pneumatic system which is employed to inflate and deflate the bladder 1330 and to actuate the external bead fingers 1400, 1400' and 1400". High pressure air is fed from an air supply such as a compressor and accumulator (not shown) through the primary pressure regulator 1445 to a common air supply line 1445' for both the bladder 1330 and the pneumatic cylinders 1392, 1392' and 1392". The air supply for the bladder 1330 is further reduced in pressure through pressure regulator 1446, after which it is fed to the bladder through the electrically actuated solenoid valve K–SV5 shown in its normal position with the bead setter at rest or home position, the bladder 1330 being deflated. Downstream of the solenoid valve K–SV5 the air supply to the bladder is passed through flexible hose 1447, which permits movement of the bead holding and bladder carrier assembly 1302, into the rigid air supply piping 1448 which is mounted on the bead holding and bladder carrier assembly 1302 and which actually feeds the bladder 1330. A portion of this piping 1448 is shown in FIG. 19. A pressure switch K–PS1 is mounted on the air conduit between the solenoid valve K–SV5 and the bladder 1330 so as to indicate whether or not the bladder 1330 is inflated.

The air for actuation of the external bead fingers 1400, 1400' and 1400" passes, without further reduction in pressure, directly from the common supply line 1445' through the electrically actuated solenoid valve K–SV4, shown schematically in FIG. 40 with the fingers gripping a bead preparatory to the start of the bead setter operating cycle. This air supply to the cylinders 1392, 1392' and 1392" must also pass through flexible hoses 1449 and 1449' to permit movement of the cage assembly 1305 as well as the bead holding and bladder carrier assembly 1302.

The hydraulic system for the operation of the bead setter is shown schematically in FIG. 41. This system is used to actuate the hydraulic rotary motor 1304, the hydraulic cylinder assembly 1307 and the hydraulic cylinder assembly 1309. For actuation of the rotary motor 1304, hydraulic fluid is fed from the common supply line through the pressure regulator 1450 to the electrically actuated solenoid valve K–SV3, shown here in its position when the bead setter is at rest or home position and the internal bead setter fingers 1337 are retracted radially inward. Restriction orifices with bypass check valves 1451 and 1451' are provided at both inlets (outlets) to the rotary motor to control the speed of rotary movement as the rotor 1346 is driven from the "fingers retracted" position to the "fingers out" position and vice versa. As in the case of the pneumatic components, flexible hoses 1452 and 1452' are provided in the hydraulic supply lines to the rotary motor 1304 to permit movement of the bead holding and bladder carrier assembly 1302.

Hydraulic fluid from the common supply line is also fed through an electrically actuated solenoid valve K–SV2 and flexible hoses 1453 and 1453' to actuate the hydraulic cylinder assembly 1307. As in the case of rotary motor 1304, restriction orifices with bypass check valves 1454 and 1454' are provided at both inlets (outlets) to cylinder assembly 1307. Valve K–SV2 is shown in FIG. 41 in its normal position when the bead setter 1300 is at home or rest position and the cage assembly 1305 is extended forward relative to the bead holding and bladder carrying assembly 1302.

Also from the common supply line, hydraulic fluid for actuating the hydraulic cylinder assembly 1309 is fed through the electrically actuated solenoid valve K–SV1, shown in FIG. 112 with the bead setter at home or rest position and the bead holding and bladder carrier assembly 1302 retracted to the rear relative to the base 1308. When the piston in the hydraulic cylinder assembly 1309 is to be advanced forward toward the turret, the valve K–SV1 is actuated, through the hydraulic differential, by solenoid 1, admitting fluid through the line 1455 and the bypass check valve 1456 to the rear end of hydraulic cylinder assembly 1309. As the piston advances moving the bead setter assembly 1301 forward toward the turret fluid flows out of the cylinder assembly 1309 through restriction orifice 1456' into the conduit 1455'. In the conduit 1455' is located the ball check shut off valve 1442 which, while the piston is traveling forward, is held in an open position by hydraulic fluid admitted through electrically actuated solenoid valve K–SV6. Further along the conduit 1455' the hydraulic fluid passes through previously mentioned deceleration valve 1441 and, thereafter, flows back through valve K–SV1 into the low pressure reservoir. As previously described, when the piston in the cylinder assembly 1309 approaches the desired end point of its stroke (as determined by the length of the drum presented by the turret 1000), the mechanically actuated deceleration valve 1441 is gradually actuated to slow the escape of the fluid from the cylinder assembly 1309, thereby slowing down the forward travel of the piston. When the aforementioned swivel plate 1436 has moved far enough to actuate the limit switch K–LS2, the valve K–SV6 is actuated by solenoid No. 6 thereby permitting hydraulically actuated shut off check valve 1442 to close stopping completely the forward travel of the piston.

For a description of the mechanical functioning and sequence of operation of the bead setter, reference will now be had to FIGS. 18 and 19 and to FIGS. 28 through 39. FIGS. 18, 19 and 28 all represent the major assemblies of the bead setter in their home or rest position. The entire bead setter assembly 1301 has been retracted to the rear by the hydraulic cylinder assembly 1309, limit switches K–LS1 and M–LS26 being actuated. Rotary motor 1304 is in its rest position with the internal fingers 1337 retracted radially inward, limit switch K–LS5 being actuated and limit switch K–LS6 being unactuated. Hydraulic cylinder assembly 1307 is in its rest position with the cage assembly 1305 extended forward relative to the bead holding and bladder carrier assembly 1302, limit switch K–LS4 being actuated and limit switch K–LS3 being unactuated. Limit switch K–LS2 and one-way limit switch K–LS10 are unactuated. The bladder 1330 is deflated and limit switch K–LS9 is unactuated. Pressure switch K–PS1 is also unactuated.

As represented in FIG. 18, the bead setter 1300 has just completed its preceding cycle and a bead 1423 has been delivered to receiving position by the bead servicer arm 1575 (not shown) which will be described in a later portion of this specification. The external fingers 1400, 1400' and 1400" have not yet gripped the bead 1423. In FIG. 19, while the major assemblies of the bead setter are still at home position, external bead placing assemblies 1306, 1306' and 1306" have been actuated by the action of solenoid valve K–SV4 to grip the bead 1433, the bead servicer arm 1575 having then been withdrawn. At this point in the sequence of operations, limit switch K–LS8 has been actuated, limit switches K–LS7, K–LS15 and K–LS16 are unactuated and limit switches K–LS11, K–LS13 and K–LS14 are actuated by the presence of the bead 1423 in the fingers 1400, 1400′ and 1400″. As shown in FIG. 28, the turret 1000 has just presented a new drum wrapped with carcass plies to the bead setter 1300. Photocell K–PC1 now indicates the presence of a carcass. At this point and time the bead setting cycle commences.

Referring now to FIG. 29, the bead holding and bladder carrier assembly 1302 is being advanced toward the turret 1000 by the action of hydraulic cylinder assembly 1309, and the drum center 1354 is entering the sleeve 58 on the drum. Limit switches K–LS1 and M–LS26 have been de-actuated as the bead holding and bladder carrier assembly 1302 started its forward movement. Since the sleeve 58 has not yet contacted the bead setter positioning assembly 1310 at the plate 1424, the slider 1433 (as shown in FIG. 29a) has not yet reached a longitudinal position corresponding to the location of the swivel plate 1436, and has not yet been forced transversely outward by the push rod 1428, hence the deceleration valve 1441 and limit switch K–LS2 remain unactuated. Simultaneously with the forward movement of the bead holding and bladder carrier assembly 1302, the cage assembly 1305 has been retracted, relative to bead holding and bladder carrier assembly 1302, by the hydraulic cylinder assembly 1307, limit switch K–LS4 having been deactuated by the relative rearward motion of cage assembly 1305 and limit switch K–LS3 having been actuated by the arrival of cage assembly 1305 in its fully retracted position. Because of the rearward motion of the cage assembly 1305, one-way limit switch K–LS10 has not yet been actuated by actuator 1416 mounted on the carriage frame 1414. The fingers 1400, 1400′ and 1400″ continue to grip the bead 1423 and the actuation of the limit switches on the three external bead placing assemblies 1306, 1306′ and 1306″ remain unchanged. The bladder 1330 remains deflated, and limit switch K–LS9 remains unactuated. The internal bead holding fingers 1337 remain retracted, limit switch K–LS5 remaining actuated and limit switch K–LS6 remaining unactuated.

In FIG. 30, the various components of the bead setter 1300 are shown in their appropriate positions at the instant that the bead holding and bladder carrier assembly 1302 has come to rest at the end of its forward motion. Face plate 1424 has been depressed to the rear, relative to bead holding and bladder carrier assembly 1302, by the pressure of sleeve 58 on the drum sufficiently far that deceleration valve 1441 has completed its function. Limit switch K–LS2 has been actuated causing ball check shut off valve 1442 to interrupt further forward motion of the piston in hydraulic cylinder assembly 1309 and, consequently, further forward motion of the bead holding and bladder carrier assembly 1302. Deceleration valve 1441 and limit switch K–LS2 have been actuated through the mechanical linkage formed by the push rod 1428, the slider 1433 and the swivel plate 1436, the slider 1433 having been moved into a longitudinal position corresponding with some portion of the face of swivel plate 1436 at about the same time that the forward motion of face plate 1424 was interrupted by the pressure of sleeve 58. The status of actuation of all other limit switches remains the same as that set forth in connection with the description of the various bead setter components as shown in FIG. 29. As shown in FIG. 30a, the arm 1349 is still in its rotational rest position while, as shown in FIG. 1016, the central shaft 1350 is also at its rotational rest position, the internal fingers 1337 being retracted inwardly.

Referring now to FIG. 30c, the band 60 on the drum is shown depressed to its non-extended position. This depression has been accomplished by the pressure of depressor ring 1368 against the ends of rods 62 during the forward motion of the bead holding and bladder carrier assembly 1302, the depression being completed just as the forward motion of said assembly ceases. Also as shown in FIG. 30c, the external bead fingers 1400, 1400′ and 1400″, still gripping the bead 1423 have come into longitudinal alignment with the internal fingers 1337 which have not yet been extended radially outward to grip the bead 1423. The carcass plies previously wrapped on the drum are positioned internally concentric with the bead 1423, and the bead 1423 is in proper longitudinal position for being set in the carcass.

As shown in FIG. 31, the rotary motor 1304 has been actuated causing the central shaft 1350 to be rotated from the position as shown in FIG. 30b to the position shown in 102b. The rotation of the shaft 1350 has, in turn, caused the rotation of drum 1362 and camming plate 1363 whereby the internal fingers 1337 have been extended radially outward to grip the bead 1423 and the interposed fabric plies wound on the drum. Actuation of the rotary motor 1304 has also caused the rotation of arm 1349, as shown in FIG. 31a, thereby de-actuating limit switch K–LS5 and actuating limit switch K–LS6. The status of actuation of all other limit switches remains unchanged from the position of the various bead setter assemblies as shown in FIG. 30.

FIGS 32 through 35a show, in detail, the sequence of operation involved in transferring the bead 1423 from the grip of the external fingers 1400, 1400′ and 1400″ to the grip of the internal fingers 1337 and the subsequent inflation of the bladder 1330 against the cage 1388 preparatory to actually making the carcass ply turn-up around the bead 1423. The positions of the internal and external bead holding components as shown in FIGS. 32 and 32a correspond to the sequential position of the bead setter as described in connection with FIG. 30, the bead holding and bladder carrier assembly 1302 just having come to rest at the end of its forward movement. FIGS 33 and 33a, which correspond to the sequential position of the various bead setter components as described in connection with FIG. 31, shows the camming plate 1363 in its rotated position with the internal fingers 1337 extended radially outward and gripping the bead 1423 and the interposed carcass plies wound on the drum, thus "setting" the bead 1423 and adhering it to the plies in the proper location relative to the carcass.

In FIGS. 34 and 34a, which show the next sequential step in the functioning of the bead setter, high pressure air has been admitted to the cylinder 1392 through inlet 1395′ forcing the piston 1393 and piston rod 1394 radially outward. This action has caused the external fingers 1400, 1400′ and 1400″ to release their grip on the bead 1423 as the result of being retracted radially outward. The radially outward movement of cross bar 1397 has caused limit switch K–LS8 to become de-actuated while limit switch K–LS7 has been actuated as have limit switches K–LS15 and K–LS16 (not shown in this view). Fingers 1400, 1400′ and 1400″ having been removed from contact with head 1423, limit switch K–LS11 has become de-actuated, as have limit switches K–LS13 and K–LS14 (not shown in this view). The positions of all other subassemblies of the bead setter and the status of actuation of all other limit switches have remained unchanged during this sequential step.

In FIGS. 35 and 35a, the bladder 1330 has been inflated expanding and pulling the carcass ply ends taut and pressing them tightly against the cage 1388. Pressure switch K–PS1 has been actuated by the pressurized air admitted to the bladder 1330 and limit switch K–LS9 has been actuated by the direct pressure of the bladder 1330. All sequential steps preparatory to the actual turn-up of the plies around the bead 1423 have now been completed.

Referring now to FIG. 36, in the next sequential step in the operation of the bead setter, the hydraulic cylinder assembly 1307 is actuated to drive the cage assembly 1305 forward thereby rolling both the bladder 1330 and the carcass ply ends (which have previously been pressed tightly against the cage 1388 by the expanded bladder 1330) over the bead 1423. This rolling action of the expanded bladder 1330 adheres the ply ends firmly to the main body of the carcass plies on the drum enfolding the bead in the carcass plies as shown in FIG. 98b. This adherence is satisfactorily achieved because of the pressure sensitive nature of the rubber-like coating on the fabric plies. As the cage assembly 1305 commences its forward motion, limit switch K–LS3 is de-actuated. Limit switch K–LS4 is actuated when the hydraulic cylinder assembly 1307 completes its forward stroke. Also, one-way limit switch K–LS10 is engaged by actuator 1416 during the forward movement of the carriage frame 1414 on which the cage 1388 is mounted, but due to its internal construction, its contacts do not close for motion in the described direction. It is the function of the relief valve shown on line 1488 in FIG. 111 to relieve the air pressure in the bladder 1330 as the bladder 1330 and the ply ends are rolled between the cage 1388 and the carcass bearing drum. Such pressure relief is necessary, as the bladder 1330 is rolled into this constricted space, to avoid overloading the hydraulic system and particularly the cylinder assembly 1307. Such overloading could result in slowing up or stalling the operation of the bead setter 1300. The relative positions of the other bead setter subassemblies and the actuation status of the other limit switches remain unchanged during the actual ply turn-up operation.

As shown in FIG. 37, after the bead has been set and the ply turn-up has been made, the hydraulic cylinder assembly 1307 is again actuated rearward to retract the cage assembly 1305 from its extreme forward position. In returning to its retracted position, the cage 1388 rolls the still inflated bladder 1330 back to its original position relative to the bead holding and bladder carrier assembly 1302 leaving the carcass ply ends firmly adhered to the carcass ply body wound on the drum. In returning to this position limit switch K–LS4 is immediately de-actuated by the rearward motion of the cage assembly 1305 and limit switch K–LS3 is actuated upon arrival of the cage assembly 1305 at its fully retracted position. As the actuator 1416, during its rearward travel, again passes the one-way limit switch K–LS10 this time switch actuation does take place, since the one-way switch K–LS10 is sensitive to rearward motion of the cage assembly 1305. This actuation is momentary, switch K–LS10 returning to its unactuated position as the motion carries the actuator 1416 past and out of range of switch K–LS10. This initiates deflation of the bladder 1330 slightly before the bladder 1330 has been returned to its rest position.

As shown in FIG. 38, after the bladder 1330 has been returned to its normal or rest position on the drum 1329, the pneumatic system functions to complete the deflation of the bladder 1330. K–PS1 is de-actuated by the release of the inflation pressure in the bladder conduit 1488. When the bladder 1330 has deflated sufficiently to de-actuate limit switch K–LS9, the rotary motor 1304 is again actuated hydraulically to return the central shaft 1350 to its starting position as shown in FIG. 38b. Rotary motor 1304 also serves to rotate the arm 1349 (FIG. 38a) to its starting position thereby de-actuating limit switch K–LS6 and actuating limit switch K–LS5. The rotation of the shaft 1350 causes the internal fingers 1337 to be retracted radially inward thereby disengaging completely the bead setter assembly 1301 from the bead 1423, the carcass to which it has been assembled and the drum upon which the carcass has been wrapped.

In FIG. 39 the bead setter is shown after it has been returned to rest position by the rearward action of hydraulic cylinder assembly 1309 and before the turret 1000 has indexed. Limit switch K–LS2 is again de-actuated. Simultaneously, with the rearward movement of the bead holding and bladder carrier assembly 1302, hydraulic cylinder assembly 1307 has again functioned to extend the cage assembly 1305 forward with respect to the bead holding and bladder carrier assembly 1302, limit switch K–LS3 having again been de-actuated and limit switch K–LS4 having been actuated. Limit switches K–LS1 and M–LS26 are again actuated as end plate 1317 of the bead holding and bladder carrier assembly 1302 reaches its orignal start position. External bead fingers 1400, 1400' and 1400'' have remained retracted radially outward and are now in a position to receive and grip a new bead to be delivered by the bead servicer arm. After this new bead has been delivered and clamped in external fingers 1400, 1400' and 1400'' the bead setter will be ready to repeat its operational sequence as soon as turret 1000 has indexed to present a new drum and carcass to the bead setter.

*Intermediate article and method of making same*

This section of the specification relates to an improved method of construction of fabric carcasses for pneumatic vehicle tires and to the method of fabricating them. More specifically it relates to the conformation of the cord fabric in the region adjacent to the beads at either end of the carcass cylinder, and to the relative diameters of the carcass cylinder and the beads.

Tire carcasses are generally built by forming two or more sheets of tire cord fabric into a generally cylindrical shape, affixing a bead to the exterior surface of each end region of this shape, and then turning up that portion of the fabric which extends beyond the bead and adhering this turned up fabric to a portion of the surface of the fabric disposed between the beads, thereby "locking" each of the beads into the fabric construction. The cord fabric employed for this construction is generally coated with a this turned up fabric to a portion of the surface of the material rather sticky. Therefore, the raw tire carcass tends to retain the shape into which it was formed unless major forces are exerted to overcome the tack between adjacent layers of the coated cord fabric. Subsequent to the building of the carcass the other components of the tire, such as for instance the tread and sidewall portions, are assembled to it. The raw tire is then changed from its generally cylindrical shape to the familiar toroidal tire shape by exerting a considerable radial force upon the inside of the structure. This is generally accomplished by exerting internal pressure on a curing bag which has been inserted into the raw tire within the confines of a curing press, wherein the shaped tire is also vulcanized. Examples of such tire curing presses are the "Bag-O-Matic" curing press of the McNeil Machine & Engineering Company, generally described in U.S. Patent 2,997,740 and the Autoform curing press of the National Rubber Machinery Company, generally described in U.S. Patent 2,858,566.

The raw tire carcass is generally formed on a building drum by wrapping the respective sheets of cord fabric on the surface of the drum, carefully maintaining the desire dangle between cords of adjacent layers of cord fabric. It is common to use for this purpose a "collapsible" building drum of the type shown on page 415, The Vanderbilt Rubber Handbook, Winspear (ed.) (1958). Such a drum is generally "oversized"; that is, when assembled it has an external diameter greater than the internal diameter of the beads to be used in the tires to be built upon it. The fabric is generally wrapped on these drums in such a fashion that a portion of each sheet overhangs the respective axial extremities of the drum by a predetermined amount. This overhanging fabric is then smoothly turned radially inwards over the shoulders located on the respective axial extremities of the drum surface. A bead is then placed concentrically against each of these turned down fabric surfaces, and the respective free ends of fabric are then "turned up" smoothly to envelop each bead. When a building operation upon such a drum is complete, the drum is collapsed, i.e., made to assume a diameter smaller than the beads, to permit the raw tire to then be slipped off axially. If one considers the cross-section of such a carcass on a plane through its axis, it will be apparent that the fabric in the region of the respective beads will form an angle α as defined below with the axis of the carcass which is a function of the internal diameter of the beads relative to the expanded diameter of the collapsible building drum and of the curvature of the drum shoulders. Thus, for example, tire carcasses with a nominal 14-inch diameter are commonly built upon drums with a 15¼-inch external expanded diameter. A normal two-ply carcass built on such a drum would have a fabric angle as designated above of approximately 53°.

The magnitude of angle α is relatively important in the subsequent manufacture of the tire. When the shape of the raw tire is changed from the generally cylindrical form to the toroidal tire form, the fabric plies must rotate about the respective beads from their orientation in the raw cylindrical tire to a position in which the fabric is almost perpendicular to the tire axis in the region of each bead. The tacky nature of these fabric plies, resulting from the coating of uncured rubber on each ply, tends to inhibit this rotation of the fabric about the bead. Where the rotation is excessive, weaknesses may be introduced into the individual tire cords due to the excessive local stresses imparted to them, or nonuniformities may be introduced into the tire structure as a whole by virtue of nonuniform rotation of the various components. It is therefore desirable to keep the required rotation to a minimum. Inasmuch as the final orientation of the fabric (more or less normal to the tire axis in the region of the beads) is dictated by the required shape of the finished article, the required rotation can be reduced only by affecting the design of the raw tire. Thus the greater the angle between the fabric in the region of each bead and the axis of the raw tire, the less rotation will be required during the forming of the tire.

It is highly desirable to form raw tires on "undersized" building drums, that is, on drums which have an external diameter not greater than the internal diameter of the carcass in the bead region. The advantages of the use of such drums are multiple. They obviate the need for a collapsing mechanism for the drum. Tires can be removed from them by simply breaking the tacky bond between the inside surface of the cord fabric and the exterior of the drum, as by blowing air between the surfaces, and then pulling the carcass off the drum axially. Defects in quality of tires stemming from the introduction of wrinkles where the fabric is not turned radially inwards over the shoulder of the oversized drum with perfect smoothness are also avoided by the use of undersized drums, since the entire step of turning the fabric inwards is obviated. The use of such drums is also desirable in tire carcass manufacturing processes wherein the beads are set in place and the fabric end regions are turned up automatically, as for instance on bead setter 1300 described in an earlier section of this specification.

However, the angle between the fabric in the bead region and the axis of a raw tire made on undersized drums would ordinarily be such as to require far greater rotation about the bead during shaping than is the case with tires built on "oversized" drums.

It is an object of this invention to provide a substantially uncured tire carcass having throughout its tubular central portion an internal fabric diameter no greater than the internal diameter at the beads, but wherein the fabric in the bead region forms an angle with the axis of the tire carcass that will require a minimum rotation about the bead when the tire is formed into toroidal shape.

It is another object of this invention to provide a raw tire in cylindrical form wherein the internal fabric diameter is no greater than the internal diameter at the beads, but wherein the fabric in the bead region forms an angle with the axis of the tire that will require a minimum rotation about the bead when the tire is formed into toroidal shape.

The generally cylindrical tire carcass 510 shown in FIGS. 79 and 80 consists of two 511 and 512 layers of tire cord fabric formed into a two-ply fabric tube. Although two plies are shown in FIG. 79, it is within the meaning and scope of this invention to form the carcass of any number of plies of cord fabric, as for instance one, four or six plies. Each ply of fabric is coated on both of its surfaces with a layer of uncured rubber which renders the surface tacky and prevents slip between adjacent surfaces during tire construction. The beads 513 and 513a are shown in FIG. 79 to be substantially rectangular in cross-section. It is, however, within the scope of this invention to employ beads of other than rectangular cross-section, as, for instance, beads of circular cross-section. As can be seen from FIG. 79 the bead 513 is held in position in the end region of the carcass 510 and subsequently in the end region of the tire 508 by virtue of a turn-up made in the ends of the fabric tube. This turned up fabric adjacent said ends is adhered to that portion of the carcass fabric surface with which it is contacted by virtue of the tackiness of the rubber coated surface.

The tread stock 514 and sidewall stock 515 of the raw cylindrical tire 508 are shown with the aid of "phantom" lines in FIG. 79.

In FIG. 80 the details in construction in the bead region of the tire carcass 510 can be seen in greater detail. Whenever reference is made in this specification and claims to the angle of the fabric in the bead region with reference to the axis 509 of the raw carcass 510 or tire 508, the angle α shown in FIG. 79 is intended. The angle α is defined as the angle between (a) a line through the centroid 517 of the bead 513 parallel to the axis 509 of the tire 508 or carcass 510 and (b) a line in any plane containing the axis 509 of the tire 508 or carcass 510 which connects the centroid 517 of the bead 513 with the point of first substantial contact 518 between the turned up end 519 of fabric and the fabric ply 511 to which it is joined. The centroid 517 of the bead is defined as the point which would be the center of gravity of the cross-section of the bead 513 if all of the elements of the bead 513 were of equal density. The point of first contact 518 is defined as the point closest to the bead 513 at which, in the defined plane containing the axis 509, the tangent to the surface 519a of the turned up fabric end 519 is parallel to the tangent to the underlying surface 520 of the ply 511 to which the turned up fabric end 519 is joined.

FIG. 81 shows the cross-section that the raw tire 508 assumes when it has been shaped into toroidal form, a process that generally occurs in the curing press. A more detailed examination of the fabric in the bead region of such a formed tire 508, made possible by the enlarged representation of this area in FIG. 82, indicates that the fabric is now more nearly vertically disposed with respect to the tire axis 509. The shaping process rotates the fabric about the respective beads 513 and 513a and shifts the location of the point of first substantial contact from 518 to 518' as shown in FIG. 82 so that the line 517–518' now forms the angle β with a line parallel to the tire axis 509 through the centroid 517. It will be appreciated that during the forming step the fabric in the bead region was rotated about the bead 513 by an angle equal to β minus α. Therefore, the greater the magnitude of angle α in the raw tire 508 or raw tire carcass 510, the less rotation of the fabric about the bead 513 will be necessary during the forming step. Such rotation is conducive to the forming of fabric wrinkles or the uneven distribution of fabric, weakening of individual cords within the fabric, and the separation of the cord fabric from its coating of uncured rubber due to the fact that the sliding of the ply surfaces 519a and 520 one upon the other is inhibited by the presence of the tacky uncured rubber between adjacent surfaces.

The raw tire carcasses 510 and raw tires 508 of this invention may be prepared by the method and apparatus described with reference to the bead setter 1300 in a foregoing section of this specification. It is essential for the construction of such a carcass 510 and resultant tire 508 that the building drum upon which the plies 511 and 512 are wound have an exterior diameter less than the interior diameter of the carcass 510 and tire 508 in the bead region.

The desired value of angle *a* may be imparted to the cord fabric during the building process by shaping means disposed within the confines of the fabric cylinder. These shaping means may be radially retractable to facilitate the subsequent axial removal of the finished raw carcass 510 or tire 508 from the drum. The required action of these means is that they "raise," that is increase the diameter of, a narrow zone of the fabric adjacent to each bead and lying between that bead and the other. These means can be the same means as those which perform the function of restraining the axial convergence of the beads during the turning up of the fabric ends to envelop the beads.

The said means may be the internal bead holding fingers disclosed in said foregoing section of this specification relating to the bead setter 1300.

It is within the scope of this invention to actuate these means and thereby impart the desired value of the angle $\alpha$ to the fabric either before or after the tread and/or sidewall portions are added to the carcass plies in the building of the tire, thereby to make either the raw carcass 510 or the raw tire 508 of this invention.

In principal, the objects of this invention would best be served when the angle $\alpha$ in a carcass 510 or raw tire 508 is as large as possible because, as already observed, the greater the magnitude of angle $\alpha$, the less rotation of fabric about the bead 513 will occur in the tire shaping process.

But there are practical limitations to the magnitude of angle $\alpha$, beyond which it is not feasible to form the tire carcass 510 and raw tire 508 of this invention. Firstly, if the shape of the fabric in the bead region is to be created by radially retractable shaping means disposed within the confines of the fabric cylinder, the magnitude of angle $\alpha$ will be a function of the relative expanded and retracted diameters of these means. A practical problem in designing these means arises if this ratio is required to be very high.

Secondly, if the narrow zone of fabric adjacent to each bead is "raised," that is increased in diameter, very greatly (to create an angle $\alpha$ of great magnitude) the gross distortion in the carcass 510 or raw tire 508 which would be required to accommodate this change could be as detrimental to the product as those which this invention is designed to prevent.

We have found that when the angle $\alpha$ is greater than approximately 70° these practical disadvantages outweigh the benefits of the invention. The distention to which the fabric must be subjected if it is to be "raised" to create an angle $\alpha$ of more than 70° can be as detrimental as excessive rotation of fabric about the beads during the tire shaping step. Also, such excessive "raising" may cause slippage of the turned up fabric which would result in a tire wherein the amount of fabric turned up over the bead was not constant around the circumference of the bead.

On the other hand, where angle $\alpha$ is less than 0° the advantages to be gained in terms of reduced fabric rotation about the bead during the shaping of carcasses or raw tires of this invention decrease to the point where they become unobservably small. Also, if the means for creating the angle $\alpha$ serve simultaneously to restrain the convergence of the beads 513 and 513$\alpha$ during fabric turn-up, the radial protrusion of these means to such an extent as to produce an angle $\alpha$ of at least 0° is necessary to restrain the said convergence.

With the apparatus of the bead setter 1300 described in an earlier section of this specification, two-ply tire carcasses with an angle $\alpha$ of approximately 19° are formed. These carcasses perform very satisfactorily during subsequent shaping into tires and produce a finished tire of highly acceptable quality. Another example of a tire carcass of this invention which performs very satisfactorily during subsequent processing and in ultimate service as a tire is a two-ply 14-inch tire with an angle $\alpha$ of 53°.

*Description and explanation of operation of the first bead servicer*

As is shown in FIGS. 1 and 2, a major sub-assembly of the machine is provided for the purpose of automatically supplying beads to each of the two bead setters 1300 and 1300A, said beads being supplied one at a time upon demand signal from each of the respective bead setters serviced by these sub-assemblies. These sub-assemblies, which shall be hereinafter referred to as the bead servicers, have the additional function of storing an inventory of beads which may be replenished by manual loading from time to time. The first bead servicer, designated generally as 1500, services the bead setter 1300 and the second, designated generally as 1500A, services the bead setter 1300A. These two bead servicers 1500 and 1500A are located, respectively, adjacent and to the left (facing the turrets) of the bead setter 1300 and adjacent and to the right (facing the turrets) of the bead setter 1300A. The structures and functioning of the two-bead servicers 1500 and 1500A being identical except that bead servicer 1500A is constructed of opposite hand to bead servicer 1500, only bead servicer 1500 will be described in detail in the specification. As in the foregoing description of the bead setter 1300, the expressions "front" and "forward" as applied to the bead servicer 1500, shall be deemed to indicate the end of the bead servicer 1500 nearest the turrets. Conversely, the expressions "rear" and "rearmost" shall be deemed to indicate the end of the bead servicer 1500 most remote from the turrets.

As previously indicated, the function of the bead servicer 1500 with respect to the bead setter 1300 which it services, is to deliver beads, one at a time and automatically upon demand from the control system, to the bead setter 1300. Such delivery is made while the bead setter 1300 is at home or rest positions and is made to a location in space where each such bead may be grasped by the external fingers 1400, 1400' and 1400'' of the bead setter 1300.

The structure of the bead servicer 1500 may be seen and more easily understood by reference now to FIGS. 42 through 50. In particular, FIGS. 42 through 44 will be initially referred to in describing the major assemblies comprising the bead servicer 1500. The bead servicer 1500 is comprised of the following major sub-assemblies: the dual barrel assembly 1501, the stationary frame assembly 1502, the bead transfer arm assembly 1503 and the loader assembly 1504. The bead servicer 1500 is also provided with the necessary hydraulic, pneumatic and electrical systems for power and control, all of which will be described in a later portion of this specification.

Referring now especially to FIGS. 42, 43, 44 and 45, the frame assembly 1502 includes a base 1505 which is comprised of two spaced, parallel built-up rails 1505$a$ affixed by suitable machine mounts (not shown) to the floor 1506. Joining and spacing these rails 1505$a$ is a crossbrace 1505$b$. Mounted upon and affixed to the respective base rails 1505$a$ are two parallel upright stanchions 1507. A second cross-brace 1507$a$ joins and spaces the stanchions 1507 as well as the rails 1505$a$ to which the stanchions 1507 are affixed. Mounted on the stanchions 1507, above the cross-brace 1507$a$ and by means of gussets 1507$b$, are two parallel cylindrical guide rods 1508. These guide rods 1508, which run longitudinally the entire length of the bead servicer 1500 and are fixed in the gussets 1507$b$, comprise a track on which the loader 1504 slides during the operation, to be described hereinafter, of transferring a supply of beads from the loader 1504 to the barrel assembly 1501. Fixed to the forward and rearward ends of the guide rods 1508 are cross-brace assemblies 1509 which serve to hold guide rods 1508 in the closely parallel relationship required in order to insure the proper mating of the loader 1504 with the barrel assembly 1501. These cross-brace assemblies 1509 serve the additional function of supporting the ends of the guide rods 1508 from the floor 1506 to which the cross-brace assemblies 1509 may be affixed by suitable machine mounts (not shown). The other principal components of the frame assembly 1502 are the transfer arm support 1510 mounted on the stanchion 1507 nearest the bead setter 1300 and the hydraulic rotary motor support 1511 mounted on the opposite stanchion 1507.

Rotatably mounted between the stanchions 1507, by means of trunnions 1514 rotating in bearings 1515, is the barrel assembly 1501. The barrel assembly 1501 comprises two identical bead storage barrels 1516 mounted in the relative positions shown in FIGS. 113 and 115 on the rotatable barrel frame assembly 1517. For purposes of describing the sequential functioning of the bead servicer 1500 in a later portion of this specification, the barrel 1516 shown uppermost in the drawings has been additionally designated as barrel #1 while the barrel 1516 shown lowermost in the drawings has been additionally designated as barrel #2. The principal components of the barrel frame assembly 1517 are the two opposed parallel side frames 1518 and the two parallel, but vertically offset, end frames 1519 fixedly mounted perpendicular to the side frames 1518 between their respective opposed ends. The barrels 1516, in turn, are mounted on the end frames 1519 in such positions relative to the axis of rotation of the trunnions 1514 that, when the barrel frame assembly 1517 is rotated 180° on the trunnions 1514, the barrels 1516 will exchange exact positions, whereby the then lowermost barrel 1516 may be loaded with a fresh supply of beads from the loader 1504 while the then uppermost barrel is releasing beads, one by one, to the transfer arm assembly 1503.

Referring now particularly to FIG. 46, the detailed construction of the barrels 1516 will be described. Each barrel 1516 is comprised of six spaced straight slats 1520 of arcuate cross section each joined at one end to an end frame 1519 and at the other end to a face plate 1521, the outside diameter of both slats 1520 and face plate 1521 being such that beads being supplied by the bead servicer will freely slide thereon. A fixed hollow cylindrical shaft 1522, coaxial with the barrel 1516, is also fixed to the face plate 1521 and the end frame 1519, the ends of the shaft 1522 extending respectively through the face plate 1521 and the end frame 1519. A bearing 1523 is attached to and fitted over the face plate end of the shaft 1522 while a cap 1524, including a bearing 1524a, is fitted over the end frame end of the shaft 1522. Passing through the hollow center of the shaft 1522 and coaxial with it, is a central shaft 1525, to which, at its face plate end, a crank disc 1526 is affixed by means of a pin 1526a. The shaft 1525 and the crank disc 1526 are rotatable together, the end frame end of the shaft 1525 rotating in and extending beyond the bearing 1524a, while the crank disc 1526 rotates on the bearing 1523.

Slideably mounted on the hollow shaft 1522 is a spider assembly 1530 comprising a slider 1531 and a spider plate 1532 which is suitably sized to move freely longitudinally within the barrel interior as defined by the slats 1520, but which has projecting segments or fingers 1532a extending radially through and beyond the longitudinal spaces or slots 1533 between the slats 1520. Mounted 120° apart on the end frame side of the spider plate 1532 are three constant tension spring assemblies 1534, each comprising a mounting 1534a, a reel 1534b and a coil flat spring 1534c, one end of which is fixed to its reel 1534b and the other end of which is attached by suitable means as shown in FIG. 117 to the face plate 1521. The springs 1534c exert a constant force tending to pull the spider assembly 1530 toward the face plate 1521 regardless of how distant the spider plate 1532 is from the face plate 1521. Mounted on the end of each of the six projecting fingers 1532a of the spider plate 1532 is an arcuate pusher plate 1535 each of which transmits the spring force of the springs 1534c to the beads on the barrel 1516 thereby pushing them towards the face plate 1521. A metal pad 1536 attached to each pusher plate 1535 and bearing against the spider plate 1532 serves the dual function of stiffening the connection of the pusher plate 1535 to the spider plate 1532 and of providing pads for the end plugs 1615 of the loader assembly 1504 to bear against when the barrel 1516 is being loaded with a fresh supply of beads as described hereinafter.

Referring now especially to FIGS. 43 and 46, fixed by a key or other suitable means to the end frame end of the central shaft 1525 is an arm 1539. Two tension-loaded coil springs 1540, attached respectively to the opposite ends of the arm 1539 and to the end frame 1519, exert a pull on the arm 1539 tending to rotate both the arm 1539 and the central shaft 1525 in a clockwise (as shown in FIG. 43) direction. A solenoid E–S6 (visible in FIG. 43), mounted on a suitable bracket 1541 affixed to the end frame 1519, is also fastened to the arm 1539 and, when energized, rotates both the arm 1539 and the shaft 1525 in a counter-clockwise direction. A corresponding solenoid E–S5 (not visible in FIG. 43) actuates the arm 1539 of the upper (as shown in FIG. 43) barrel 1516. On the lower (as shown in FIG. 43) end of the arm 1539 are two switch actuators 1542 and 1543 which serve to actuate, respectively, limit switches E–LS3 and E–LS9, limit switch E–LS3 being actuated when the arm 1539 is rotated clockwise and limit switch E–LS9 being actuated when the arm 1539 is rotated counter-clockwise. Although not readily visible in the drawings, two corresponding switch actuators 1544 and 1545 on the upper (as shown in FIG. 44) end of the arm 1539 of the upper barrel 1516 (as shown in FIG. 44) actuate, respectively, limit switches E–LS1 and E–LS8, limit switch E–LS1 being actuated when the arm 1539 is rotated clockwise and limit switch E–LS8 being actuated when the arm 1539 is rotated counter-clockwise.

Referring now particularly to FIGS. 43 and 46, six equally spaced sliders 1548 are slideably mounted on the exterior face of face plate 1521 in suitable guides 1549 so that each slider 1548 is permitted to slide radially inwardly and outwardly. Affixed to the radially outward end of each slider 1548 is an arcuate bead release finger 1550 having an arcuate knurled bead gripping surface 1550a for gripping the bead nearest the face plate and of the barrel 1516. Pivotally connected to the radially inward end of each slider 1548 and to the crank disc 1526 is a connecting rod 1551 pivotally attached to the crank disc 1526 at such a position that when the arm 1539 is rotated counter-clockwise by the solenoid E–S5, this rotation is transmitted to the disc 1526 which, in turn, by means of the connecting rods 1551, exerts a pull on the sliders 1548 drawing the sliders 1548 and the bead release fingers 1550 radially inward and releasing the bead then gripped by the knurled surfaces 1550a on the six bead release fingers 1550. It should be noted that the crank disc 1526 is provided with three equally spaced arcuate slots 1552 through which extend, loosely fitted, the shoulder portions of shoulder screws 1553 which screws are threaded into the bearing 1523. By means of these shoulder screws 1553 the rotation of the crank disc 1526 is limited.

Referring now particularly to FIGS. 42, 43 and 44, the entire dual barrel assembly 1501 may be rotated 180° clockwise in the plane of FIG. 44 from the position shown in FIG. 44 so that the positions on the two drums 1516 are reversed. The motor power for this rotation (which is, of course, reversible) is supplied by a hydraulic rotary motor 1555 of the type known as a "Rotac" which is mounted in a suitable mounting bracket 1556 bolted to the support 1511. The shaft 1555a of the motor 1555 is rotationally locked with the trunnion 1514. The rotation of barrel assembly 1501 in either direction is limited, respectively, by the adjustable stops 1557 and 1558 mounted, respectively, in stop brackets 1557a and 1558a affixed to the side frame 1518 most remote from the bead setter 1300. The stops 1557 and 1558 bear, respectively, on the stop plates 1557b and 1558b welded to the stanchion 1507. Also mounted on the stop brackets 1557a and 1558a, respectively, are switch actuators 1559 and 1560, which actuate, respectively, limit switches E–LS5 and E–LS4.

The dual barrel assembly 1501 is held in its alternate operating positions by means of a shot pin 1561 which mates alternatively with the shot pin recesses 1562 and 1563 on the side frame 1518 most remote from the bead setter 1300. The shot pin 1561 is attached to the piston rod 1564a of a hydraulic cylinder assembly 1564, which, in turn, is mounted on a bracket 1565 from the stanchion 1507. A helical compression spring 1566, which is mounted surrounding and coaxial with the shank of the shot pin 1562 and the piston rod 1564a between the bracket 1565 and the shot pin collar 1567, tends to keep the shot pin 1562 in locked or engaged relationship with the side frame 1518. Upon actuation of the hydraulic cylinder 1564 by a solenoid valve E–SV2, however, the shot pin 1562 may be retracted to permit the rotation of the barrel assembly 1501. Retraction of the shot pin 1562 causes the shot pin collar 1567 to actuate a limit switch E–LS7 mounted on the bracket 1565.

Referring now particularly to FIGS. 44 and 45, two cams 1570 and 1571, mounted respectively on the rotary hydraulic motor shaft 1555a and the trunnion 1514 nearest the bead setter 1300, actuate, respectively, the cam operated hydraulic valves 1572 and 1573 which control the operation of the motor 1555 in the manner described in greater detail hereinafter.

Referring now to FIGS. 42, 43 and 45, it is the function of the transfer arm assembly 1503 to pick up a bead from the storage barrel 1516, to move the bead to a ready position and await a signal from the bead setter 1300, and to deliver and release the bead to the bead setter 1300 upon receipt of the demand signal, thereafter repeating this cycle of operations as long as the carcass building machine is in operation. The bead transporting element of the transfer arm assembly includes the transfer arm 1575 on the rearward face of which is fixedly mounted the perforated circular transfer arm plate 1576. Rotatably mounted in coaxial holds through the arm 1575 and the circular plate 1576 is a shaft 1577, the rotational axis of which is perpendicular to and passes through the center of the circular plate 1576. The forward end of this shaft 1577 is fixedly attached to and may be rotated by a crank 1578, which, in turn, is attached by a yoke and pin to the piston rod 1579a of a pneumatic cylinder assembly 1579. The pneumatic cylinder assembly 1579, which is hinged at its end remote from the crank 1578 to a bracket 1580 on the arm 1575, provides the motor force to rotate the crank 1578 and the shaft 1577.

On the other end of the shaft 1577, rearward of the plate 1576, is fixedly mounted a crank disc 1581 which, therefore, rotates with the shaft 1577. Hinged to the disc 1581 at equally spaced circumferential intervals by means of pins 1582 are six S-shaped flat fingers 1583 having stepped arcuate bead gripping elements 1584 attached to their radially outermost ends. Near their radially outermost ends, the fingers 1583 are provided with elongated slots 1585 extending radially relative to the center of the circular plate 1576. Shoulder screws 1586 fastened to plate 1576 pass through each of the slots 1585 with sufficient clearances to permit the fingers 1583 to slide relative to plate 1576, whereby, when the crank disc 1581 is alternately rotated in a clockwise and counterclockwise (as viewed in FIG. 42a) direction, the bead gripping elements 1584 on the ends of the fingers 1583 move substantially radially inwards and outwards, thereby releasing or gripping a bead properly positioned with respect to the gripping elements 1584.

Having now described the structure of the transfer arm itself, we will now consider the mechanism for moving it from the position of pickup of a bead from the storage barrel 1516 to the position of delivery of the bead to bead setter 1300 and back again. In order to accomplish this bead transfer cycle, the arm must first, while rotationally stationary, advance longitudinally forward away from the storage barrel 1516, then rotate about its rotational axis to a position opposed to the bead setter 1300, then, while rotationally stationary, advance longitudinally rearward toward the bead setter, and, finally, retrace these movements in the point of beginning.

As may best be seen in FIG. 49, the hub 1590 of the arm 1575 is rotatably and slideably mounted on the shaft 1591 which, in turn, is rotatably mounted in the bearing blocks 1592a and 1592b. Fixedly mounted on the shaft 1591 forward of the arm 1575 and rotating with the shaft 1591 is a cam 1593 having a camming surface 1593' provided with a notch or depression 1594. Rotatably mounted, by means of a suitable bracket 1595 and a pin 1595' on the forward face of the arm 1575, is a cam follower 1596 which is so located as to roll upon the camming surface 1593' as the cam 1593 is rotated relative to the arm 1575, a compression coil spring 1597, which surrounds the hub 1590 and the shaft 1591 and bears against the hub 1590 and the bearing block 1592b, tends to force the hub 1590 forward on the shaft 1591 thereby assuring that the cam follower 1596 will always bear against the cam 1593.

The shaft 1591 is coupled, by means of a coupling 1598, at its rearward end to the shaft 1599' of a hydraulic rotary motor 1599 of the type known as a "Rotac" by which means the shaft 1591 may be caused to rotate through an angle of 280°, the notch 1594 on the camming surface 1593' of the cam 1593 being rotated with the shaft 1591 from 140° on one side of the vertical to 140° on the other side of the vertical. As shown in FIGS. 45 and 45a, mounted upon and rotating with the shaft 1599' on the rearward end of the motor 1590 is a cam 1600. The cam 1600 actuates a cam operated-hydraulic valve 1601 which controls the operation of the motor 1599 in a manner described in greater detail hereinafter. The cam 1600 also actuates a limit switch E-LS7.

Assuming that the arm 1575 is in the vertical position, we have the conditions shown in FIG. 47, the cam follower 1596 being seated in the notch 1594. As the shaft 1591 is rotated clockwise (as shown in FIG. 48) the cam follower 1596 initially remains seated in the notch 1594 and the arm 1575 is also rotated clockwise towards the barrel assembly 1501. When the shaft 1591 has rotated clockwise far enough so that the arm 1575 is extended horizontally towards the barrel assembly 1501, another cam follower 1602, rotatably mounted on a suitable bracket 1603 projecting from the rearward face of the arm 1575 and from the hub 1590, contacts a cam 1604 which prevents further rotation of the arm 1575. This stage in the sequence of operation is shown in FIG. 49. Since the shaft 1591 and the cam 1593 continue to rotate, the cam follower 1596 is forced to follow the camming surface 1593' out of the notch 1594, and the arm 1575 and the hub 1590 are forced rearward against the spring 1597, the follower 1602 following the cam 1604. By the time that the shaft 1591 and the cam 1593 have been rotated to the position shown in FIG. 50, the cam follower 1596 is completely disengaged from the notch 1594 and the arm 1575 has come to rest in a position suitable for the transfer of bead from the barrel 1516 to bead gripping elements 1584 on the fingers 1583 (see FIG. 46). The stop 1605 has actuated a limit switch E-LS6.

Similarly, when the direction of rotation of the shaft 1591 and the cam 1593 is reversed, the follower 1602 is, at first, held by the bar 1606 above the cam 1604 until the cam 1593 has rotated far enough so that the cam follower 1596 has become seated in the notch 1594 and the cam follower 1602 has become disengaged from the bar 1606. Thereupon, the cam follower 1596 will remain seated in the notch 1594 until the arm 1575 has been rotated to a horizontal position opposed to the bead setter 1300 (see FIGS. 42 and 45). In this position, the arm 1575 and the hub 1590 are prevented from rotating further counter-clockwise by the cam follower 1602, coming in contact with the cam 1607, and cam follower 1596 is again forced out of the notch 1594 by the further counter-clockwise rotation of the cam 1593. The arm 1575 and the hub 1590 are again forced to the rear until the fingers 1583 are in proper position to transfer the bead to the bead setter fingers 1400, 1400′ and 1400″ and the switch actuator 1605 has contacted a limit switch E–LS12. After transfer of the bead to the bead setter 1300, and as the shaft 1591 begins again to rotate clockwise, the arm 1575 is prevented from rotating, the cam follower 1602 being engaged by the bar 1608, until the cam follower 1596 has again become seated in the notch 1594 and the arm 1575 has been moved forward to its rotating position.

Mounted on the shaft 1591 is a cam 1609 which actuates a limit switch E–LS13 whenever the arm 1575 is rotated to a position on the bead setter side of the vertical. It is the function of this limit switch to give a signal which will prevent operation of the bead setter 1300 when the arm 1575 is in the way of its forward motion.

Referring now particularly to FIGS. 42 and 44, the loader assembly 1504 will next be described. It is the function of the loader 1504 to receive periodically a manually supplied inventory of beads and, under manual operation, to transfer this inventory of beads, in a single loading movement, to each empty barrel assembly 1516 successively presented in the lower or load position as shown in FIG. 44. The loader 1504 comprises two main assemblies, the carrier 1610 and the base 1611 on which the carrier 1610 is mounted when a barrel 1516 is to be loaded. The carrier 1610, which may be loaded with an inventory of beads while it is mounted on the base 1611 or may be loaded at a remote location and subsequently rapidly mounted on the base 1611, comprises a cylindrical plate 1612 rigidly fastened to a larger diameter plate 1613 having radially projecting tabs 1613′ for handling and clamping. As shown in FIG. 42, projecting from the plate 1612 towards the barrel 1516, are the six equally spaced cylindrical shafts 1614 on which the bead inventory is loaded. Three of these shafts 1614, equally spaced, are provided with end plugs 1615 in which, in turn, are mounted leaf springs 1616 which serve to retain the bead inventory on the shafts 1614 during the loading operation. FIG. 42b shows the detailed construction of the end plugs 1615 and the springs 1616. Two handles 1617 are provided on tabs 1613′ for handling the carrier 1610 when it is removed from the base 1611.

The base 1611 of the loader 1504 comprises a horizontal frame 1618 which is provided, on its underside, with three slides 1619 rigidly attached to the frame 1618 and disposed as shown in FIG. 42. These sliders 1619 permit the base 1611 to be slid forward and rearward along the guide rods 1508. Hinged, by means of hinge pins 1620, to the top of the frame 1618 is a bracket 1621 which is provided with a mounting plate 1622. The bracket 1621, by means of its hinge mounting, may be swung from the bead loading position (shown in dotted lines on FIG. 44), wherein plate 1622 is horizontal and facing upwards, to the barrel loading position (shown in solid lines on FIG. 44) wherein the plate 1622 is vertical and facing the barrel 1516 to be loaded. Mounted on the frame 1611 is a spring-loaded lock pin 1623 which is registerable in either of two holes 1624 in the slide of the bracket 1621 to hold the bracket 1621 in either of its alternative operating positions. The mounting plate 1622 is provided with two upstanding pins 1625 which register with and are inserted into two correspondingly located holes 1626 in the plates 1612 and 1613 when the carrier 1610 is mounted upon the mounting plate 1622, thereby ensuring the proper orientation of the carrier 1610 with respect to the barrel 1516 to be loaded with beads. The carrier 1610 may be secured to the mounting plate 1622 by means of two toggle clamps 1627 which clamp onto the tabs 1613′.

Except when a bead inventory is being transferred from the carrier 1610 to a barrel 1516, the loader 1504 is held in its most rearward position by the latch 1629 which is mounted on the rear cross-brace 1509 and engages the frame 1618. When the frame 1618 is so latched, the switch actuator 1630, mounted on the underside of the frame 1618, actuates a limit switch E–LS10 mounted on the rear cross-brace 1509. When the loader 1504 is unlatched and moved forward to load the barrel 1516, the end plugs 1615 on the shafts 1614 engage the pads 1536 of the spring-loaded spider plate 1532 and push same forward until the carrier plate 1612 contacts the bead release fingers 1550. With the loader 1504 in this last-mentioned position, the switch actuator 1631, mounted on the frame 1618, actuates a limit switch E–LS2 which, in turn, is mounted on a suitable bracket 1632 attached to the stanchion 1507. The handles 1633 are provided on the loader frame 1618 for facilitating the manual movement of the loader 1504 forward and rearward.

In FIG. 53 the pneumatic system employed to radially extend and retract the bead gripping elements 1584 on the transfer arm assembly 1503 is shown schematically. High pressure air is fed from an air supply such as a compressor and accumulator (not shown) through the pressure regulator 1640 to an air supply line 1641. From the air supply line 1641, the air is fed to a cylinder assembly 1579 through electrically actuated solenoid valve E–SV7 which is shown in its normal position with the bead gripping elements 1584 retracted and the arm assembly 1503 returning empty to the bead servicer 1500. Downstream of the solenoid valve E–SV7, the air supply to the cylinder assembly 1579 is passed through a flexible hose 1642 which permits movement of the bead servicer arm 1575 on which is mounted the cylinder assembly 1579. Similarly, the return or alternate path for air to the cylinder assembly 1579 from the valve E–SV7 is through a flexible hose 1642′. The valve E–SV7 is solenoid actuated in both directions, solenoid E–S7, when energized, functioning to radially retract the bead gripping elements 1584, and solenoid E–S7A, when energized, functioning to radially extend them.

The hydraulic system for the operation of the bead servicer 1500 is shown schematically in FIG. 54. This system is used to actuate the hydraulic rotary motor 1555, an hydraulic cylinder assembly 1564 and the hydraulic rotary motor 1599. For the operation of the hydraulic cylinder assembly 1564, which serves to retract the shot pin 1561 to a disengaged or "out" position, hydraulic fluid is fed from the common supply line through an electrically actuated solenoid valve E–SV2 shown here in its normal position with the shot pin 1561 engaged or "locked." Restriction orifices with bypass check valves 1643 and 1643′ are provided at both inlets (outlets) to the cylinder assembly 1564 to control the speed of movement of the piston and piston rod 1564a.

Hydraulic fluid from the common supply line is also fed through double solenoid actuated valve E–SV4 to hydraulic rotary motor 1555 which rotates the barrel frame assembly 1517 to interchange the positions of the barrels 1516. This valve, which is shown in its normal position with the barrels 1516 stationary, has three positions, its normal position (no flow) and positions for rotating the barrel frame assembly in either direction (flow to alternate lines). When the solenoid E–S4A is energized, motor 1555 moves the barrel #2 to the "up" position and when the solenoid E–S4B is energized, barrel #1 is moved to the "up" position. Downstream of the valve E–SV4, fluid flowing to rotate the barrel #2 up will bypass cam actuated valve 1573 through its built-in check valve and enter the motor 1555, but fluid flowing from the motor 1555 must pass through the cam actuated valve 1572, its built-in check valve being closed to flow in this direction. Hence, the valve 1572 controls and ultimately halts the flow of the fluid and the rotation of the motor 1555. Similarly, when barrel #1 is rotated up, the fluid bypasses the cam operated valve 1572 but is controlled and ultimately shut off by cam operated valve 1573. The fluid entering either side of the motor 1555 must pass through restriction orifices with bypass check valves 1644 and 1644'.

The rotary motor 1599 is also fed from the common supply line through a double solenoid actuated three position valve E–SV1, shown in FIG. 54 in its position with solenoid E–S1B energized and the arm 1575 rotating towards the barrel 1516. As shown in the drawing, the fluid flowing in this direction can pass cam operated valve 1601 unimpeded, either through the built-in check valve or through the cam operated valve should it be open, to reach the motor 1599, and fluid flowing from the motor 1599 can pass unimpeded (other than by restriction orifice 1645) to the sump. However, when solenoid E–S1A is energized, the direction of flow is reversed, and fluid flowing from the motor 1599 must, in addition to passing through restriction orifice 1645', pass through the cam actuated valve 1601 which controls and ultimately stops the flow of fluid and the movement of the arm 1575. This additional gradual cushioning effect on the braking of the arm 1575 is desirable in order to avoid unseating the bead carried by the bead gripping elements 1584 to the bead setter 1300.

It will be useful at this point to consider the entire mechanical sequence of operation of the bead servicer 1500 including the cycle for delivery of beads from the uppermost storage barrel to the bead setter 1300 and the barrel interchange and loading cycles. As a starting point, it will be assumed that barrel #1 is up and still holds several beads, that barrel #2 is down and already loaded with a full inventory of beads, that the loader 1504 is latched at its rearmost position, that the transfer arm assembly 1503 has already delivered its bead to the bead setter 1300 and that the arm 1575 is returning to the storage barrel (#1) 1516 and has passed its vertical or mid-point position. At this point in the sequence, limit switch E–LS1 is not actuated because barrel #1 is not empty, and the bead release fingers 1550 are restrained from full outward movement by the bead presently gripped by the surfaces 1550a; limit switch E–LS2 is not actuated because the loader 1504 is not in the extreme forward or "load" position; limit switch E–LS3 is not actuated because barrel #2 is not empty; limit switch E–LS4 is not actuated because barrel #1 is not in the "down" position; limit switch E–LS5 is actuated because barrel #2 is in the "down" position; limit switch E–LS6 is not actuated because the arm 1575 has not yet reached the storage barrel 1516 (in this case, barrel #1); limit switch E–LS7 is not actuated because the shot pin 1562 is "in" or "locked," limit switches E–LS8 and E–LS9 are not actuated because the bead release fingers 1550 on both barrels 1516 are not unclamped (or in release position); limit switch E–LS10 is actuated because the loader 1504 is latched in its extreme rear position; limit switch E–LS11 is not actuated because the arm 1575 is not at its vertical position; limit switch E–LS12 is not actuated because the arm 1575 is not at the bead setter; limit switch E–LS13 is not actuated because the arm 1575 is not on the bead setter side of the vertical; and limit switch K–LS8 on the bead setter 1300 is actuated because the bead setter finger 1400 is in clamped position gripping a bead. Also, solenoid E–S1B is energized and solenoid E–S1A is not energized, solenoid valve E–SV1 being thereby opened to cause the hydraulic rotary motor 1599 to rotate the arm 1575 toward barrel #1; and solenoid E–S7 is energized and solenoid E–S7A is not energized, solenoid valve E–SV7 being thereby opened to retract the bead gripping elements 1584 on the arm assembly 1503. All other solenoids are not energized.

When, as shown in FIG. 50, the arm 1575 has reached a position such that the bead gripping elements 1584 (see FIG. 51a) of the transfer arm assembly 1503 are in contact with the bead release fingers 1550 of the storage barrel 1516 (barrel #1), the switch actuator 1605 mounted on the hub 1590 actuates limit switch E–LS6. Solenoid E–S1B becomes de-energized allowing valve E–SV1 to close and thereby halting rotation of the shaft 1599' of motor 1599. Solenoid E–S5 (FIG. 46) becomes energized causing the arm 1539 and the shaft 1525 to rotate, thereby unclamping or retracting radially inward the bead release fingers 1550. The switch actuator 1545 mounted on the arm 1539 actuates limit switch E–LS8 when the bead release fingers 1550 are unclamped.

As shown in FIG. 51a, when the bead release fingers 1550 unclamp or move radially inward, the beads on the barrel 1516 are all pushed forward toward the arm 1575 by the action of the constant tension springs 1534c. The shape and dimensions of the bead gripping elements 1584 are such that the end bead is permitted to slide forward off the bead release fingers 1550 onto the bead gripping elements 1584 while the next bead is stopped opposite the knurled surface 1550a of the fingers 1550. After a sufficient time has elapsed for the beads to move forward, the solenoid E–S5 is de-energized and the springs 1540 (FIG. 43) cause the arm 1539, the shaft 1525 and the bead release fingers 1550 to return to their normal position, de-actuating limit switch E–LS8, and causing the aforementioned next bead to be firmly gripped by the fingers 1550 as shown in FIG. 122b. Next, solenoid E–S7 is de-energized and solenoid E–S7A is energized causing valve E–SV7 to admit air to the opposite end of the cylinder 1579, whereby the piston rod 1579a is extended causing the bead gripping elements 1584 to move radially outward and to grip the end bead as shown in FIG. 51b.

A bead having been transferred from the barrel 1516 to the arm assembly 1503, the arm 1575 is now ready to begin traveling towards the bead setter 1300. The solenoid E–S1A is energized, opening solenoid valve E–SV1 to admit hydraulic fluid to the rotary motor 1599 causing the arm 1575 to begin rotating towards the bead setter 1300. As the arm 1575 leaves its position at the storage barrel 1516, limit switch E–LS6 is de-actuated.

As the arm 1575 reaches its vertical or mid-point position in its travel towards the bead setter 1300, the cam 1600 (FIG. 45a) actuates limit switch E–LS11 which, by electrical means described hereinafter, causes the solenoid E–S1A to be de-energized and the arm 1575 to halt in its vertical position until a signal is received from the bead setter 1300 demanding a bead. When a demand signal is received from the bead setter 1300 indicating that the bead setter in its its home or rest position and that the fingers 1400, 1400' and 1400" are retracted radially outward, limit switch K–LS8 being no longer actuated, the solenoid E–S1A is again energized, and the arm 1575 continues its travel towards the bead setter 1300, limit switch E–LS11 being de-actuated as the arm 1575 leaves the vertical.

As the arm 1575 moves into the path of forward motion of the bead setter 1300, the cam 1609 (FIG. 47) actuates the limit switch E–LS13, which sends a signal preventing the bead setter 1300 from executing any forward motion steps while the arm 1575 is in the way. The shaft 1591 continues to rotate until the bead gripping elements (as shown in FIG. 52a) carrying the bead have reached a position opposed to the external fingers 1400, 1400' and 1400" of the bead setter 1300. At this location, the switch actuator 1605 on the hub 1590 actuates limit switch E–LS12 which, in turn, de-energizes solenoid E–S1A closing valve E–SV1 and preventing further rotation of the shaft 1591. Just before limit switch E–LS12 was actuated, the cam 1600 (FIG. 45a) gradually closed cam operated valve 1601 causing the arm 1575 to come to rest gradually so that the bead would not be dislodged from the bead gripping elements 1584.

In response to a signal that the arm 1575 has reached its proper position so that the bead carried by the bead gripping elements 1584 is opposed to the fingers 1400, 1400' and 1400", the bead setter 1300 operates (as described elewhere herein) to cause the fingers 1400, 1400' and 1400" to advance radially inward and to grip the bead as shown in FIG. 52b. As the finger 1400 grips the bead, limit switch K-LS8 is actuated. Solenoid E-S7 is next energized simultaneously with the de-energization of solenoid E-S7A, thereby causing the solenoid valve E-SV7 to admit air to the cylinder 1579 retracting the bead gripping elements 1584 radially inward and releasing the bead. Solenoid E-S1B is then energized opening solenoid valve E-SV1 to admit fluid to the motor 1599 and to commence the return of the arm (as shown in FIG. 52c) to the storage barrel 1516 to pick up another bead.

As the arm 1575 leaves its transfer position at the bead setter 1300, limit switch E-LS12 is de-actuated, and cam 1600 allows valve 1601 to open. When the arm 1575 is clear of the forward path of travel of the bead setter 1300, the cam 1609 allows the limit switch E-LS13 to become de-actuated. When the arm 1575 reaches its vertical position on the return journey, limit switch E-LS11 is again actuated, but the arm 1575 will continue its travel towards the barrel 1516 without interruption thereby immediately de-actuating switch E-LS11 unless the shot pin 1561 is "unlocked" or disengaged from the barrel frame assembly 1517, in which case the arm 1575 will halt at the vertical until the shot pin 1561 is again engaged.

It should be noted that, at some time during the transfer cycle of the bead servicer 1500, the limit switch K-LS8 will normally have become de-actuated by virtue of the bead setter 1300 having "set" the previously delivered bead and the fingers 1400, 1400' and 1400" having been retracted radially outward. In the event, however, that the previously delivered bead has not been "set" by the time the transfer arm 1575 reaches its vertical position on its next trip to the bead setter 1300 (as would occur if there had been no carcass on the drum presented to the bead setter 1300 after delivery of the previously delivered bead), the fingers 1400, 1400' and 1400'" will not have released the previously delivered bead and limit switch K-LS8 will remain actuated. In this event, the arm 1575 will simply remain at the vertical while the turret 1000 and the bead setter 1300 continue to cycle until a bead demand signal is received.

We are now back at the time and place of beginning of this description of the normal bead transfer cycle of the bead servicer 1500. It should be appreciated that this cycle is repeated over and over again upon demand from the bead setter 1300 until the last bead has been transferred from the uppermost barrel 1516. It should also be noted that, although this cycle description has related to the functioning of the bead servicer 1500 when barrel #1 is uppermost, the cycle is exactly the same when barrel #2 is uppermost except that the functions of solenoid E-S5 and limit switches E-LS5, E-LS1 and E-LS8 are replaced by those of their respective equivalents solenoid E-S6 and limit switches E-LS4, E-LS3 and E-LS9.

Now we will consider the mechanical sequence of operation of the bead servicer 1500 when the last remaining bead is removed from the barrel #1. When solenoid E-S5 is de-energized after the last bead has been pushed from barrel #1 onto the bead gripping elements 1584 by the action of springs 1534c, springs 1540 cause the arm 1539 to override its normal position because there is no remaining bead to limit the outward motion of the bead release fingers 1550. Consequently, the switch actuator 1544 mounted on arm 1539 contacts and actuates limit switch E-LS1 signaling that barrel #1 is empty. With the exception of the aforementioned actuation of limit switch E-LS1, the mechanical cycle of the arm assembly 1503 in transferring this last bead to the bead setter 1300 is identical to the cycle as hereinbefore described for such transfer of any other bead, at least up until the arm 1575 reaches the vertical or mid-point position of its return journey to the storage barrels 1516, and this bead transfer cycle proceeds simultaneously with the barrel interchange and load cycles to be described hereinafter.

When the arm 1575 has reached its vertical or mid-point position during its travel to the bead setter 1300, solenoid E-S2 becomes energized permitting hydraulic fluid to flow to hydraulic cylinder 1564 to unlock or disengage the shot pin 1561 from the recess 1562 in the frame 1517. This movement of the piston rod 1564a in the cylinder 1564 causes the shot pin collar 1567 to actuate limit switch E-LS7. Once limit switch E-LS7 has signaled that the shot pin 1561 is disengaged, solenoid E-S4A is energized opening valve E-SV4 so that hydraulic fluid flows to rotary motor 1555. Rotary motor 1555 then rotates the frame 1517 so that the positions of the barrels 1516 are reversed, barrel #1 proceeding to the "down" position and barrel #2 replacing it in the "up" position. As the barrels 1516 and frame 1517 begin to rotate, the cam 1571 opens cam operated valve 1573. As the barrels 1516 approach their interchanged positions, the cam 1570 gradually closes valve 1572, thereby cushioning the stop so that no bead will be shaken loose from barrel #2. As the barrels 1516 begin their interchange, limit switch E-LS5 becomes de-actuated and when the barrels 1516 reach their interchanged positions, the actuator 1560 actuates limit switch E-LS4. Solenoid E-S2 becomes de-energized, the shot pin 1561 reengages the frame 1517 and limit switch E-LS7 becomes de-actuated. Solenoid E-S4A becomes de-energized and valve E-SV4 closes.

As previously noted, the transfer arm 1575 will have been interrupted in its return travel to the barrels 1516 and held in its vertical position if it has reached this point in its cycle while the shot pin 1561 is disengaged. At this stage in the barrel interchange and load cycles, then, the arm 1575 can again proceed towards the barrels 1516 to receive a new bead from barrel #2.

A fresh supply of beads can now be transferred from the loader 1504 to the empty barrel #1 which is now in the "down" or "load" position. With the loader 1504 in the position shown in FIGS. 113 and 115, the latch 1629 is manually unlatched and the entire loader assembly 1504 is shoved forward along the guide rods 1508 into engagement with barrel #1, the end plugs 1615 on the rods 1614 bearing against pads 1536 to depress the spider plate 1532 forward against the action of the springs 1534c. Upon the loader assembly beginning its forward motion, limit switch E-LS10 becomes de-actuated and solenoid E-S5 becomes energized thereby unclamping the bead release fingers 1550, as hereinbefore described, so that the beads carried by the rods 1614 can slip over barrel #1 as they are pushed forward. Limit switch E-LS8 becomes actuated and limit switch E-LS1 becomes de-actuated.

When the loader assembly 1504 reaches its extreme forward position, limit switch E-LS2 becomes actuated by the actuator 1631. Solenoid E-S5 becomes de-energized and the action of springs 1540 (as hereinbefore described), causes the bead release fingers 1550 to grip the rearmost bead on the barrel #1, and limit switch E-LS8 to become de-actuated.

As the loader assembly 1504 is withdrawn rearward, limit switch E-LS2 becomes de-actuated and as the empty loader reaches its rearmost position, the latch 1629 clamps it there, and limit switch E-LS10 again becomes actuated. The carrier 1610 may now be tilted to its vertical position as shown in dotted lines in FIG. 115, and a fresh supply of beads may then be manually loaded on the loader assembly 1540 while barrel #2 is being emptied of beads by the transfer arm assembly 1503.

Description of the carcass remover

As may be seen in FIGS. 2 and 8, the carcass remover 1700 is located adjacent to position VII of turret No. 2 and serves to strip the beaded carcass from the drum before the drum is returned to the input end of the machine to be recycled therethrough. The carcass remover function is achieved by first bringing a carcass remover carriage into contact with that beaded end of a carcass which projects outward from position VII, clamping said beaded end of the carcass against the carriage, encircling and constricting the end of the carcass remote from the carriage by means of a set of tong clamps, inflating the carcass with a continuing air blast to free the tacky inner surface of the carcass from the outer surface of the drum, releasing the encircling tong clamps, and while continuing the air blast, withdrawing the carcass from the drum by moving the carriage (and carcass clamped thereto) back to its starting position while the drum is held at position VII.

The structure employed to accomplish the foregoing may be seen by reference now to FIGS. 55 through 64. In particular, FIGS. 56 and 58 will be referred to initially in order to bring out the manner in which the carcass remover carriage is mounted for horizontal movement towards and away from position VII of turret No. 2. A plurality of vertical stanchions or posts 1701 are included in the stationary framework of the carcass remover 1700. They are mounted on a pair of longitudinal base members 1702, one of which is positioned along each side of the carcass remover. The longitudinal base members may rest on the floor of the working space through the medium of a plurality of adjustable bolts (not shown) in the same manner as disclosed previously in connection with the foundation of turrets Nos. 1 and 2. Transverse base members (not shown) rigidly interconnect the longitudinal base members 1702 to form a firm rectangular support for the carcass remover 1700. In the configuration shown three vertical stanchions or posts 1701 are provided at either side of the carcass remover 1700, the six stanchions being rigidly mounted atop the longitudinal base members 1702 and projecting upwardly a sufficient height to form an enclosure for the carcass remover equipment. Three upper cross members 1703a, 1703b and 1703c extend transversely across the top portion of the carcass remover space to rigidly interconnect the upper ends of the vertical stanchions 1701. Additionally, longitudinally extending upper members 1704 and 1705 are welded to the undersides of the upper cross members 1703a, 1703b and 1703c to rigidly interconnect the upper ends of the stationary carcass remover structure, thereby forming an open, overall box-like structure.

A pair of tracks or guideways, shown generally at 1706 and 1707 (FIG. 58), are supported from the longitudinally extending upper members 1704 and 1705 by means of brackets 1708 and 1709, respectively. The tracks or guideways 1706 and 1707 extend longitudinally throughout the length of the carcass remover stationary structure and, consequently, a plurality of the brackets 1708 are spaced along one side of the carcass remover and a plurality of the brackets 1709 are spaced along the other side of the carcass remover, as indicated more clearly in FIG. 55 (one of the brackets 1709 being omitted for purposes of clarity).

Tracks or guideways 1706 and 1707 are similarly constructed except that they extend down opposite sides of the carcass remover 1700. Hence, a description of track 1706 only will be made and the same designating numerals will be used to indicate similar parts in the track 1707, except that these numerals will be given the subscript a. Track 1706 includes upper and lower vertically spaced angle irons 1710 and 1711 which are bolted or otherwise fastened to the brackets 1708. A rail 1712 is rigidly carried on the upper surface of the lower angle iron 1711, and a guide plate 1713 is fixedly supported from the lower surface of the upper angle iron 1710. Rail 1712 and guide plate 1713 are coextensive with the angle irons 1711 and 1710 to form the track or guideways 1706 which supports the horizontal movement of the carcass remover carriage therealong.

The movable portions of the carcass remover 1700 include a horizontally movable carriage or truck, shown generally at 1714 (FIG. 55). The carriage 1714, in plan, is generally rectangular in shape and includes longitudinal angle irons 1715 and 1716 which are joined together by cross bars 1717, 1718 and (FIG. 56) 1719 to form a horizontal upper support for the moving parts of the carcass remover 1700. Wheel assemblies, shown generally at 1720, are positioned adjacent each corner of the carriage 1714 to support the carriage from the tracks 1706 and 1707. The wheel assemblies 1720 are similar to each other and a description of one only will be supplied.

Referring more particularly to FIG. 58, it may be seen that each wheel assembly 1720 is supported from the carriage 1714 by means of a vertical bracket 1721. A vertically disposed wheel 1722 is rotatably carried by the bracket 1721, and the wheel 1722, in turn, is adapted to cooperate with and roll on rail 1712 to support the weight of the carriage 1714. Additionally, a second bracket 1723, carrying a horizontally disposed wheel 1724, is rigidly supported on the vertical bracket 1721. The wheel 1724 cooperates with guide plate 1713 to prevent the carriage 1714 from moving laterally, thereby keeping the wheels 1722 in alignment with the rail 1712 during horizontal longitudinal movement of the carriage 1714.

Referring now to FIG. 56 in conjunction with FIG. 58, the means by which the carcass remover carriage 1714 is horizontally translated towards and away from position VII of turret No. 2 has been more clearly illustrated. A hydraulic rotary motor 1725, which may be of the type known as a "Rotac" is employed in providing the linear translating force to the carriage 1714. The hydraulic motor 1725 is rigidly supported on a bracket 1726 which, in turn, is adjustably carried by a support plate 1727. Support plate 1727 may be welded or otherwise rigidly fixed to a pair of I beams 1728 which are rigidly mounted between the middle and rear stanchions 1701 at one side of the carcass remover. An angle iron 1729, which is rigidly mounted between the middle and rear vertical stanchions 1701 on the opposite side of a carcass remover, is also employed to stiffen the rear portion of the structure of the carcass remover 1700.

The rotary hydraulic motor 1725 may be of the type which provides a 180° angular output upon being hydraulically actuated. The angular output of the hydraulic motor 1725 is supplied through a shaft 1730 which is keyed or otherwise secured to one end of an arm 1731 that rotates with the shaft. The other end of arm 1731 carries a roller 1732 which is held in place by means of a pin 1733. The roller 1732 operates within a slot or groove 1734 formed between a pair of spaced angle irons 1735 and 1736. The angle irons 1735 and 1736 are welded to or otherwise rigidly secured to the underportion of the carriage 1714. Thus, when output shaft 1730 of the hydraulic motor 1725 is rotated through its 180° angular stroke, the engagement of the arm 1731 (via roller 1732) with the slot 1734 causes the carriage member 1714 to move laterally from the position shown in FIG. 56 (adjacent the turret) back to its starting position remote from the turret, the roller 1732 twice traversing the length of the slot 1734 (FIG. 55) during the angular movement of arm 1731.

Limit switches are employed to sense the various positions of the carriage 1714 and the arm 1731 during the stroke of the hydraulic motor 1725. In the carcass remover carriage "forward" position shown in FIG. 55 (wherein the carriage 1714 is adjacent the turret) a limit switch M–LS20, carried on the horizontal portion of the bracket 1726, is engaged by the arm 1731 to provide an electrical signal indicating that the carriage 1714 is in its extended or forward position. Upon counter-clockwise rotation of the hydraulic motor 1725 (as viewed in FIG. 55) the roller 1732 moves horizontally within groove 1734 until, with the motor 1725 in mid-position, the roller 1732 actuates limit switch M–LS21 to provide a signal indicating that the carcass remover carriage has returned half way towards its retracted or starting position. When the motor 1725 has completed its 180° counter-clockwise movement and the arm 1731 lies in a position 180° from that shown in in FIG. 55, the arm 1731 engages limit switch M–LS19 to indicate that the carriage 1714 is back at its starting or "retracted" position. An additional limit switch M–LS27, which is carried by the stationary track or guideway structure 1707, is actuated by the rear cross bar 1717 of the carriage 1714 when it is in its retracted position. This provides an additional signal that the carcass remover has, in fact, retracted and is clear of the turrets for indexing.

Referring now to FIG. 56, it may be seen that hydraulic fluid under pressure is provided from a source (not shown) via an inlet conduit 1737, through double solenoid valve M–SV13, of which M–SV13A and M–SV13B are the solenoids, and a pair of conduits 1738 and 1739, to the hydraulic rotary motor 1725. When energized, solenoid M–SV13A operates the valve to apply hydraulic fluid under pressure to the hydraulic motor 1725 in such a manner as to cause the carcass remover carriage 1714 to move to its retracted or starting position away from turret No. 2. Similarly, when solenoid M–SV13B is energized it operates the valve to cause the motor 1725 to move the carcass remover carriage to its extended or forward position adjacent the turret.

The automatic electrical circuitry and controls utilized in the foregoing operations will be discussed in greater detail hereinafter; however, the hydraulic control system employed may be seen by reference now to FIG. 63. The hydraulic control system includes a restrictor 1740 provided in conduit 1738, and a check valve 1741 connected to bypass the restrictor when solenoid M–SV13A is energized. Similarly, a restrictor 1742 is provided in conduit 1739 and a check valve 1743 is connected to bypass the restrictor when solenoid M–SV13B is energized. The function of each restrictor and check valve arrangement is to allow hydraulic fluid at high pressure to flow through the check valve in the supply line to the motor 1725 when the associated solenoid valve is energized, to thereby immediately start driving the hydraulic motor 1725 one way or the other. The restrictor in the return line remains un-bypassed to create a back resistance on hydraulic motor 1725 in order to control the speed of movement of the carcass remover carriage and prevent excessive shock as it approaches the end of its travel on each stroke. Thus, when valve solenoid M–SV13A is energized, hydraulic pressure fluid from line 1737 enters line 1738, bypasses restrictor 1740 by virtue of check valve 1741, and drives the carcass remover back to its retracted position through the motor 1725. In the return flow line, check valve 1743 would be closed and resistor 1742 in line 1739 would act to increase the back pressure on motor 1725 to control the speed of the carcass remover at it approaches its retracted or starting position. It will be noted that, when valve solenoid M–SV13A is energized, return line 1739 is connected through the solenoid valve to a drain or sump 1744. Surge or safety valves 1745 and 1746 are provided in the conduits 1738 and 1739 to prevent excessive pressure buildups during operation of the motor 1725. Should either of these valves be actuated when its respective conduit is pressurized, the hydraulic fluid would return to the sump 1744 by means of drain lines connected thereto.

As previously indicated, bracket 1726 (FIG. 56) which supports the rotary motor 1725, is adjustably carried by support plate 1727. This arrangement serves to allow for fine control and adjustment of the final extended or forward location of the carcass remover carriage with respect to the carcass bearing drum on turret No. 2. Support plate 1727 is provided with a plurality of slots 1747. A corresponding number of bolts 1748 (FIG. 58) extend through the slots 1747 into threaded engagement with the bracket 1727. Thus, by loosening the bolts 1748, the bracket 1726 may be longitudinally adjusted, forwardly or rearwardly, to allow accurate positioning of the carcass remover carriage in relation to the carcass carried at position VII of turret No. 2.

In addition to allowing fine control over the positioning of the carcass remover carriage in its extended position, the adjustability feature provided by bracket 1726, slots 1747 and bolts 1748 allows the carcass remover to be employed with various length drums so that tire carcasses of the different sizes may be built on the machine. Thus, should a longer tire building drum be employed in order to fabricate a tire carcass of greater cross-sectional thickness, the bracket 1726 would be moved rearwardly with respect to support plate 1727 and readjusted for proper meeting of the carcass remover carriage with the longer carcass carried by the drum at position VII.

Referring now to FIG. 56, the movable carriage 1714 of the carcass remover will now be described in greater detail. In general, the elevational profile of the carriage 1714 is triangular. The carriage 1714 includes the previously mentioned (FIG. 55) longitudinal angle irons 1715 and 1716 and the cross bars 1717, 1718 and (FIG. 56) 1719. A front vertical support plate 1749, which is rigidly connected to angle iron 1719 and depends therefrom, and a pair of diagonal supporting members, one of which is shown at 1750, complete the basic triangular frame of the carriage 1714. The diagonal support member 1750 is rigidly attached to the rear surface of the lower portion of the front vertical support plate 1749 and is bolted to a bracket 1751, which is rigidly secured to the under surface of the longitudinal angle iron 1716, the foregoing components, together, forming the firm, movable, carriage 1714.

As previously indicated, the function of the carcass remover 1700 is to clamp the projecting beaded end of the carcass carried by a drum at position VII and thereafter pull or strip the built up carcass from the drum, while the drum is held rigidly to position VII of turret No. 2. In order to grasp the beaded end of the carcass, a clamping arrangement or clamping means, shown generally at 1752, is provided at the forward end of the carriage 1714. The clamping means 1752 has been illustrated in FIGS. 55, 56, 57 and 59.

Referring to FIGS. 55 and 57, it may be seen that the clamping means 1752 includes first and second crescent shaped arcuate clamps 1753 and 1754, respectively. The first and second clamps 1753 and 1754 are pivotally carried on the front vertical support plate 1749 by means of a pivot mechanism including links 1755 and 1756. Links 1755 and 1756 connect the central portion of the clamps 1753 and 1754 for swinging movement with respect to the front plate 1749. The outer ends of the clamps 1753 and 1754 are each pivotally connected to one of a plurality of arms 1757. The arms 1757, in turn, pass through apertures 1758 in the front vertical support plate 1749 and, additionally, are supported on the front vertical support plate 1749 by means of pivots shown at 1759. The forward end of each of the arms 1757 connect with an end of one of the clamps 1753 and 1754 by means of a pivot pin 1760. Similarly, the rear end of each arm 1757 is connected to a link 1761 by means of a swivel pin 1761a. The links 1761 are arranged in two pairs, an upper pair and a lower pair. The upper pairs of links, as seen in FIG. 55, pivotally connect with a central adapter 1762 that is rigidly carried at one end of a piston rod 1763. The piston rod 1763, in turn, is operable in pneumatically actuated power cylinder 1764 which is utilized as a means for effecting the opening and closing of clamps 1753 and 1754. A similar arrangement, employing the same numerals as described for the upper clamp opening and closing means, is utilized in connection with the lower pair of links 1761 as may be seen in FIG. 56.

Referring to FIG. 55, the clamps 1753 and 1754 are shown in their closed position, i.e., they would be clamping a carcass to the carriage 1714 in this position. Should the power cylinders 1764 be actuated to retract piston rods 1763, arms 1757 would be rotated about pivots 1759 under the action of links 1761 (the upper arms 1757 of FIG. 55 rotating clockwise and the lower one of FIG. 55 rotating counterclockwise). This would result in arcuate movement of clamp 1753 to the left and up, and in arcuate movement of clamp 1754 to the left and down as viewed in FIG. 126. As viewed in FIG. 57, the same movement would cause the clamps to move in directions away from each other to present a greater open central area therebetween, and this, in turn, would result in the release of a previously clamped carcass.

Referring now to FIG. 59, a number of details of the clamping means 1752 have been illustrated, along with portions of an air blast arrangement for breaking the tacky contact between the carcass and the drum on which it is carried at position VII. When the carriage 1714 is moved to its extended position (towards position VII of turret No. 2) the clamping mechanism or clamping means 1752 comes into contact with the bead ring area of a carcass located there, as shown in FIG. 59. Front vertical support plate 1749 is provided with inner and outer rings 1765 and 1766, respectively, bolted thereto. The inner and outer rings 1765 and 1766 are radially spaced apart from each other so as to form an annular chamber 1767 therebetween at the front surface of vertical support plate 1749. An annular cover plate 1768 is mounted atop the inner and outer rings 1765 and 1766 to complete the enclosure for the chamber 1767.

Cover plate 1768 is provided with a plurality of apertures 1769 which form conduits connecting the annular chamber 1767 with the space immediately forward of the cover plate 1768, and a pair of conduits 1770 (see FIG. 55 also), one of which is located at either side of the front vertical support plate 1749 are provided in communication with the annular chamber 1767 to convey compressed air thereto.

A ring 1771, which is bolted to the cover plate 1768, projects forwardly therefrom into close proximity with the inner periphery of the drum carried at position VII to form a relatively close tolerance clearance therewith. Also, the outer surface of cover plate 1768 is contoured at 1772 in order to receive the bead area of the fabricated carcass carried at position VII.

When the drum clamps 1753 and 1754 are closed, they each engage a semi-circular portion of the carcass immediately behind the bead and, due to their swinging movement, tend to pull the carcass firmly up against the contoured portion 1772 of the cover plate 1768 and clamp it thereto so that, upon subsequent movement of the carriage 1714 to the left (as viewed in FIG. 59), the carcass will be pulled along with the carriage to strip it from the drum.

Both prior to and during the pulling or stripping movement, compressed air is introduced through conduits 1770 to the annular chamber 1767 and, from there, through orifices 1769, into the space between the carcass and the drum on which it is carried to free the carcass therefrom. The means for utilizing this air blast will now be considered.

Referring to FIGS. 60, 61 and 62, there has been illustrated a tong clamping mechanism which operates in conjunction with the air blast to assist in inflating the carcass about the drum at position VII prior to the stripping of the carcass from the drum. The tong clamping mechanism is carried by the stationary structure of the carcass remover 1700 and, more particularly, is supported on a pair of longitudinally extending support members 1773 which are mounted on cross members 1703a and 1703b (FIG. 56) of the stationary structure of the carcass remover.

As shown in FIGS. 60, 61 and 62, the tong clamping mechanism includes a pair of arcuate tong clamps 1774 and 1775, each of which is carried adjacent one end of a supporting arm 1776 and 1777, respectively. The outer ends of the arms 1776 and 1777 are pivotally connected to the stationary framework at 1778 in such a manner that the tong clamps 1774 and 1775 may be swung outwardly and away from each other in order to be clear of the position VII area of the turret during indexing thereof. However, when the tong clamps 1774 and 1775 are closed (or brought together), they clamp the carcass to the drum near that bead area which is remote from the carcass remover 1700. Thus, recalling the previous discussion made in connection with FIG. 59, if air is admitted to the annular chamber 1767 while the tong clamps 1774 and 1775 are closed, as shown in FIGS. 60 and 61, the carcass body surrounding the drum will become inflated, as indicated at 1179 in FIG. 60. It will be understood, of course, that the tong clamps 1774 and 1775 must be opened at some time prior to the start of movement of the carcass remover carriage back to its retracted position in order that the carcass may be stripped from the drum.

The means for opening and closing the tong clamps 1774 and 1775 includes a hydraulically actuated rotary motor 1780 similar to the "Rotac" previously described in connection with movement of the carcass remover carriage 1714. The output of rotary motor 1780 is in the form of an angular rotation (approximately 180°) of an output shaft 1781 (FIG. 61). A crank 1782 is keyed to the output shaft 1781 for rotation therewith and a pair of links 1783 and 1784 is provided, each link having one end connected to the crank 1782 and its other end connected to one or the other of the arms 1776 and 1777. Upon counter-clockwise rotation of the crank 1782 (as viewed in FIG. 61), the links 1783 and 1784 will cause arms 1776 and 1777 to swing away from each other, thereby causing the tong clamps 1774 and 1775 to move apart and assume an open position.

Shaft 1781, in addition to projecting out of the front end of the rotary motor 1780 to actuate crank 1782, also projects out the rear end of the motor 1780 and carries a cam 1785 therewith in its rotation (FIG. 62). Cam 1785 cooperates with a pair of limit switches M–LS29 and M–LS30 to provide electrical signals which indicate that the tong clamps 1774 and 1775 are either in their closed position (M–LS29 actuated) or in their open position (M–LS30 actuated).

The supply of hydraulic fluid to motor 1780 is controlled (FIG. 60) by a pair of solenoid valves M–SV10A and M–SV10B. Solenoid valve M–SV10A, when energized, serves to provide hydraulic fluid to rotary motor 1780 in a direction which closes the tong clamps 1774 and 1775, and solenoid valve M–SV10B sends hydraulic fluid to the motor 1780 in a direction to open the tong clamps when it is energized.

A lamp and photoelectrically operated relay assembly M–PC2 (FIG. 60), which is supported from a bracket 1786 carried by the foundation plate 1043 (see FIG. 8 also), is employed to determine the presence or absence of a carcass on a drum at position VII on turret No. 2. A mirror 1787 (FIG. 60), supported by the bracket 1786, is provided in alignment with the light beam from the lamp of photoelectrically operated relay assembly M–PC2, and, when no carcass is present at position VII, it reflects the light beam back up to the photocell of assembly M–PC2, thereby energizing the relay assembly which provides electrical signals to indicate this condition. When a carcass is present at position VII, the carcass intercepts the reflected light beam between the lamp and photocell of assembly M–PC2, thereby de-energizing the relay assembly to indicate that a carcass is present. The arrangement is similar to the photoelecterically operated relay assembly previously described in connection with bead setter No. 1, (FIG. 8) the difference being that the mirror 1787, in this case, is stationary, whereas the mirrors employed in controlling bead setter No. 1 are carried by the drum supporting posts 1012 through 1015 of turret No. 1 (FIG. 2). Photoelectrically operated relay assembly M–PC2 operates in conjunction with the previously mentioned limit switches M–LS29 and M–LS30, and other electrical components in the automatic electrical control circuitry hereinafter to be described, to insure that proper sequential operation of the carcass remover and the tong clamping mechanism will occur.

An additional feature of the carcass remover should be noted at this time. It will be remembered that the tong clamps 1774 and 1775 (FIG. 61) remain closed during the initial portion of the air blast so that the carcass inflates, as at 1779 in FIG. 60, to break the tacky seal between the carcass and the drum. Subsequently the tong clamps 1774 and 1775 are opened and then the carcass remover carriage 1714 (FIG. 59) begins to retract, pulling the carcass along with it, while the air blast from chamber 1767 continues. The air blast is shut off at a predetermined point during the return stroke of the carriage 1714 and, in order to avoid the formation of a vacuum within the drum at position VII as the carcass remover retracts, a spring-loaded check valve 1788 is installed in the cup shaped housing 1789 that covers the central opening in the vertical plate 1749. The housing 1789 serves as a shield to protect the notched and stepped end of the drum at position VII during the time that the carcass remover carriage is extended into close proximity with the drum at that position, and as a container to prevent undue leakage of the air blast through the clearance between the ring 1771 and the drum (FIG. 49).

Referring now to FIG. 55, various of the elements employed in controlling the opening and closing of the clamping means 1752 will now be described. A limit switch M–LS23, carried on the rear surface of the front vertical support plate 1749, is positioned in such a manner that it is actuated by one of the arms 1757 when the clamps 1753 and 1754 are closed by the power cylinders 1764. Similarly, a limit switch M–LS22, carried on the supporting structure of the carriage 1714, is so positioned as to be actuated by one of the arms 1761 when the clamps 1753 and 1754 are opened by the power cylinders 1764. The two limit switches (M–LS23 and M–LS22) operate in conjunction with a pair of double solenoid valves M–SV11 and M–SV12 to control the supply of compressed air to the power cylinders 1764. Compressed air is brought to the aforementioned solenoid valves from a source (not shown) by means of a flexible conduit 1790. A portion of the compressed air is led to the inlet of solenoid valve M–SV12 by means of a conduit 1791 and a portion of the air is conducted to the inlet of solenoid valve M–SV11 by means of a conduit 1792.

Referring now to FIG. 56 and to the pneumatic control system shown in FIG. 63, it may be seen that the outlet of solenoid valve M–SV12 connects with a conduit 1793 which leads to a Y-connector 1794. The Y-connector 1794, in turn, distributes compressed air to one end of both of the pneumatically actuated power cylinders 1764 by means of conduits 1795 and 1796. Similarly, the outlet of solenoid valve M–SV11 connects with a conduit 1793a which leads to a second Y-connector 1794a. From the Y-connector 1794a, the compressed air is led to the other end of both of the pneumatically actuated power cylinders 1764 by means of the conduits 1795a and 1796a.

Solenoid valves M–SV11 and M–SV12 are each provided (FIG. 63) with bleed lines 1797 that are open to the atmosphere in order to allow for unloading of the inactive sides of power cylinders 1764 when the active sides are actuated. In the condition of operation shown in FIG. 63, valve solenoids M–SV11A and M–SV12B are energized, while valve solenoids M–SV11B and M–SV12A are de-energized. With this set up, both sides of each of the power cylinders 1764 are connected to atmosphere and the piston rods 1763 remain stationary.

Should solenoid M–SV11A become de-energized and solenoid M–SV11B become energized, the valve member would shift and compressed air would then be directed through conduit 1793a to the left end of the power cylinders 1764. This would result in the retraction of piston rods 1763 into the power cylinders 1764 and consequent opening of the clamping means 1752 (FIG. 56). Similarly, assuming we start with the condition shown in FIG. 63, if solenoid M–SV12A becomes energized and solenoid M–SV12B is de-energized, compressed air would then flow through conduit 1793 and conduits 1795 and 1796 to the right end of power cylinders 1764. This would result in movement of the piston rods 1763 out of the power cylinders 1764 and cause the clamping means 1752 (FIG. 56) to close about the bead area of a carcass.

The means of controlling the flow of compressed air to the air blast chamber 1767 (FIG. 59) may also be seen by reference to FIGS. 127 and 134. Compressed air is brought from a source (not shown) through a regulating valve and past a check valve 1797a to a spring-loaded solenoid valve M–SV9. An accumulating tank 1798, connected in the line between the check valve 1797 and solenoid valve M–SV9, serves to retain a sufficient supply of air at the carcass remover to accomplish the air blast function without suffering too great a loss in pressure during the air blasting. From solenoid valve M–SV9 a pair of flexible conduits 1799 conduct the compressed air (upon energization of solenoid valve M–SV9) to the previously mentioned conduits 1770 located at either side of the air blast chamber 1767. In this manner, when solenoid valve M–SV9 becomes energized, communication is established between the accumulator tank 1798 and the air blast chamber 1767 to inflate the carcass at position VII and to assist in the withdrawing of the carcass from the drum. It should be pointed out that the flexible conduits 1799 are of sufficient length (FIG. 56) to compensate for the movement of the carriage 1714 during its travel from the retracted to the extended position. Also, the arrangement of components within the stationary structure of the carcass remover is such as to allow clearance for the flexible conduits 1799 during this horizontal movement. Similar considerations are involved in the physical positioning of flexible conduit 1790 (which provides actuating air for the power cylinders 1764 associated with the clamping means 1752).

FIG. 64 represents a schematic drawing of the hydraulic control system utilized in operating the hydraulic rotary motor 1780 for the tong clamps 1774 and 1775. As in the previous hydraulic systems, a check valve and restrictor are provided in both the supply and return line of the rotary motor 1780. Upon energization of a solenoid M–SV10B and de-energization of solenoid M–SV10A, hydraulic fluid under pressure passes from a pump (not shown) to one side of the motor 1780 through a check valve 1799a. The return flow from the other side of the motor 1780 comes back through a restrictor 1799b to a sump or drain, the restrictor 1799b serving to control the speed of movement of the tong clamps 1774 and 1775. Similarly, when solenoid M–SV10A is energized and solenoid M–SV10B is de-energized, the hydraulic fluid under pressure passes to the opposite side of the hydraulic motor 1780 through the check valve 1799c, the return flow coming through restrictor 1799d. It should be noted that the energization of solenoid M–SV10A causes the tong clamps 1774 and 1775 to close, whereas energization of solenoid M–SV10B causes tong clamps 1774 and 1775 to open.

In summary, the sequence of operations occurring at the carcass remover 1700 is as follows. During indexing of the turrets a new carcass bearing drum is brought to position VII of turret No. 2 and the following steps then occur: The carcass remover carriage 1714 is brought forward to its extended position; the clamping means 1752 clamps the projecting bead area of the carcass; the tong clamps 1774 and 1775 clamp the remote end of the carcass to the drum; the air blast begins and inflates the carcass about the drum; the tong clamps 1774 and 1775 then open; while the air blast continues, the carcass remover carriage 1714 begins retracting and starts to remove the carcass from its drum; and, finally, the air blast is discontinued during the retracting stroke of the carcass remover carriage 1714 and the stripping action continues until the carcass is completely removed from the drum. When the carriage 1714 is back to its starting position, the clamping means 1752 opens to release the carcass, thereby allowing it to be removed either by an operator or by conveying means (not shown). Following the opening of the clamping means 1752, a signal would be sent to the electrical circuits to indicate that the carcass remover operation has been completed, thereby clearing that portion of the turret circuits for the subsequent indexing operation.

*Description of drum return conveyor*

The drum return conveyor, shown generally at 1800 in FIGS. 1 and 2, is located adjacent position VIII of turret No. 2. The drum return conveyor 1800 serves the function of removing the bare drums from position VIII and returning them to the input end of the tire building machine in order that the drums may be reused in building subsequent carcasses.

Referring now to FIGS. 65, 66, 67 and 68, the drum return conveyor 1800 has therein been illustrated in greater detail. The drum return conveyor 1800 (FIG. 65) comprises three main sections; a conveyor platform mechanism, shown generally at 1801; a storage area, shown generally at 1802; and a return conveyor belt, shown generally at 1803.

The conveyor platform mechanism 1801 is positioned immediately adjacent position VIII of turret No. 2, and includes a conveyor platform 1804 which is pivotally supported at one end from a stationary foundation 1805. The stationary foundation 1805 may be provided with a plurality of adjusting bolts (not shown) similar in nature to those provided for the foundation of the turrets in order that the vertical elevation of the drum return conveyor 1800 may be conveniently aligned with turret No. 2. A plurality of rollers 1806 are carried by the platform 1804 and move therewith when the platform is rotated about its pivot. The rollers 1806 form a guideway or path upon which the drums may move after they are removed from the drum supporting posts at position VIII.

A pneumatically actuated power cylinder 1807, which is pivotally supported at one end from the foundation 1805, serves as the motive means for raising and lowering the platform 1804. A piston rod 1808, one end of which carries a piston operable within the power cylinder 1807 and the other end of which is pivotally connected to the platform 1804, transmits the motive forces developed in the power cylinder 1807 to the platform 1804.

A drum unloading means, shown generally at 1809, becomes operative after the platform 1804 is raised to propel the drum from its location at position VIII onto and across the platform 1804 and into the storage area 1802. The sequential operation of, first, the conveyor platform mechanism 1801 and, then, the drum unloading means 1809 occurs after the turret has completed indexing and the vacuum at position VIII has been broken (by solenoid valve M–SV4 of FIG. 11a).

Drum unloading means 1809 includes a pneumatically actuated power cylinder 1810; a piston rod 1811 extending therefrom; a finger or rake 1812 pivotally attached to one end of the piston rod 1811 for transverse movement with respect thereto; and a guideway 1813 and a roller 1814 which cooperates to require linear movement by the rake 1812, the roller 1814 being carried by the end of the piston rod 1811 that is remote from the power cylinder 1810. During indexing of the turrets the piston rod 1811 is normally fully extended in order to provide a clear path for an indexing drum to swing into position VIII. However, the pivotal connection of the rake 1812 to the piston rod 1811 allows the rake to move sideways in the event that the rake is not fully extended and is struck by an indexing drum. The conveyor platform 1804 is lowered before indexing in order to also provide a clear path for the indexing drum to swing into position VIII. After indexing, the platform 1804 is lifted into contact with the lower portion of the drum, and, subsequently, the rake 1812 retracts (i.e., piston 1811 is drawn into power cylinder 1810) and, with the vacuum holding the drum at position VIII broken, the drum is projected onto and beyond the conveyor platform 1804, into the storage area 1802 and onto the return conveyor belt 1803.

The storage area 1802 also includes a plurality of rollers 1815 in order to provide a low friction path for the drums to move upon in their movement from position VIII to the return conveyor belt 1803.

Referring of FIG. 68, it may be seen that the upper portion of the foundation 1805 carries a pair of limit switches M–LS9 and M–LS14 in proximity to the drum at position VIII. Limit switch M–LS9 serves to provide an electrical indication that a drum has, in fact, arrived at position VIII of turret No. 2. Limit switch M–LS14, on the other hand, serves as a warning means which gives an electrical indication in the event that the turrets index while a drum still remains at position VIII. Thus, in the event the drum is not removed by the drum return conveyor 1800 while it is at position VIII, limit switch M–LS14 would become energized to stop the machine, thereby preventing the machine from carrying a drum from position VIII back to position V.

Referring back to FIG. 65, it may be seen that the platform 1804 is provided with a lug 1816 projecting downwardly therefrom. Lug 1816 cooperates with a limit switch M–LS11 to provide an electrical indication that the conveyor lifter platform 1804 has reached its raised position. Similarly, a limit switch M–LS6, which is actuated by the platform 1804 when it is in its down position (as indicated by dotted lines) serves to provide an electrical indication that the conveyor lifter platform 1804 has reached its down position. These electrical signals are utilized in the automatic sequential control of the drum return conveyor 1800 and will be further described hereinafter.

Referring now to FIGS. 65 and 68, the pneumatic control system by which the rake power cylinder 1810 and conveyor platform power cylinder 1807 are actuated will now be discussed. Compressed air from a source (not shown) passes through a cut-off valve 1817 and through a filter, pressure regulator and lubricating assembly 1818, to a conduit 1819. Conduit 1819 provides pressurized air to two dual solenoid values M–SV3 and M–SV5. The energization of valve solenoid M–SV3A (while M–SV3B is de-energized) results in the flow of compressed air through a check valve 1820 and then to one side of conveyor platform power cylinder 1807 to cause the platform 1804 to rise. At the same time, the return flow from the other side of power cylinder 1807 passes through a restrictor 1821 and then bleeds to the atmosphere through the solenoid valve.

A reverse action, and consequent downward movement of the platform 1804, occurs when solenoid valve M–SV3A is de-energized and solenoid valve M–SV3B is energized. In this case high pressure air is conducted through check valve 1822 to the opposite side of the power cylinder 1807 to cause retraction of the piston into the cylinder. The return flow from power cylinder 1807 in this case passes through a restrictor 1823 and then bleeds to atmosphere through the solenoid valve.

The operation of power cylinder 1810 to extend and retract the rake 1812 is similar to the foregoing. Energization of solenoid valve M–SV5B (with solenoid valve M–SV5A de-energized) results in high pressure air being supplied through a check valve 1824 to one side of power cylinder 1810, causing the rake 1812 to extend.

The return flow from power cylinder 1810 passes through a restrictor 1825 and then bleeds to atmosphere through the solenoid valve. Similarly, when solenoid M–SV5B is de-energized and solenoid valve M–SV5A is energized, compressed air passes through a check valve 1826 to the other side of power cylinder 1810, causing the rake 1812 to retract. The return flow for power cylinder 1810, under these circumstances, passes through a restrictor 1827 and thence to the atmosphere via a bleed line on the solenoid valve. The restrictors in the return flow lines of both power cylinders 1810 and 1807 regulate the speed of movement of their respective pistons by increasing the back pressure against the pistons as they move through their respective strokes.

The storage area 1802 (FIGS. 65 and 66) is provided along its length with a plurality of spaced apart presence-sensing limit switches M–LS10, M–LS12, M–LS13 and M–LS24. These switches are each individually actuated as a drum passes through the storage area 1802. Thus, as the rake 1812 begins retracting, limit switch M–LS10 is actuated first, then limit switch M–LS12 is actuated, then limit switch M–LS10 is de-actuated and limit switch M–LS13 is actuated. As the drum continues its movement through the storage area 1802, limit switch M–LS12 becomes de-actuated, limit switch M–LS24 becomes actuated, limit switch M–LS13 becomes de-actuated and, assuming the return conveyor belt 1803 then begins carrying the drum to return it to the input part of the machine, limit switch M–LS24 will become de-actuated. The foregoing limit switches (M–LS10, M–LS12, M–LS13 and M–LS24) are utilized to provide electrical signals to the electrical automatic control circuitry of the machine and their functions will be set forth more specifically in the discussion of the electrical control circuits.

Referring to FIG. 1, the return conveyor belt 1803 conducts the bare drum back to the input end of the machine. The details of the return conveyor belt 1803 have not been illustrated, since a conventional conveyor system may be employed. However, the return conveyor belt 1803 should be arranged in such a manner as to clear fabric unit No. 2 (400a) in order that there will be no interference with the return of the drums to the input end of the machine. This may be accomplished by providing a raised portion in the return conveyor belt 1803 to lift the drums over fabric unit No. 2.

A 180° turn is required between the drum return conveyor belt 1803 and the input end of the machine. This is accomplished by means of rollers 1826 positioned in the path of the drums. A downward slope is given to these rollers and gravity provides the necessary force for the drums to move along the rollers 1826 from the belt 1803 to the input end of the machine.

Referring back to FIG. 65, upon de-actuation of limit switch M–LS10 after the drum has cleared the platform 1804, the power cylinder 1807 may be actuated to lower the platform 1804, and the power cylinder 1810 may be actuated to re-extend the rake 1812 back to its initial position to await the next indexing of the turrets. The lowering of the platform 1804 and consequent actuation of limit switch M–LS6 provides a signal to the electrical circuitry that the drum return conveyor functions have been completed and this assists in clearing the indexing circuits for subsequent indexing of the turrets.

*Description of the electrical control system for the turret end of machine*

The electrical system by means of which various operations at the turret end of the machine are automatically controlled has been illustrated in FIGS. 69a, 69b, 69c, 70a, 70b, 71, 72a and 72b.

In conjunction with the electrical schematic drawings for the turret end of the machine, a group of electrical sequential action charts comprising FIGS. 73–78 have been employed to assist in analysis of the electrical schematic drawings.

It will be remembered that, as a matter of choice, a period of seven and a half seconds was selected as the time period for the various operations at the turret end of the machine to occur. During six seconds of the seven and a half second period the turrets are stationary. During the remaining one and a half seconds (when the Geneva arm travels between 270° and 360°) the turrets are both indexing. Thus, a six second period is provided for the various operations to occur at the respective turret positions. In order to make maximum utilization of the six second period, the various operations (loading of carcass bearing drum at position I, setting of bead at position III, transfer of drum from position IV to position V, setting of bead at position VI, removal of carcass at position VII, and removal of bare drum at position VIII) all take place at substantially the same time. Since the turrets must be precluded from indexing in the event that any one of the foregoing operations have not been completed during the six second period, all of the operations are interrelated electrically in such a manner that the failure of any one of them to be completed will cause an interruption in the indexing circuits and prevent the turrets from indexing.

For convenience, the electrical circuits have been broken down into two groups. One group, comprising FIGS. 69a, 69b and 69c, relates to the following automatic operations: the loading of a drum at position I; the transfer of a drum from position IV to position V; the removal of the carcass at position VII; the removal of the drum at position VIII; and the indexing of the turrets. The second group of electrical circuits, comprising electrical drawings for bead setters and bead servicers relate to the automatic bead setting and bead servicing operations occurring at position III and position VI. The interrelation between the two groups of drawings will be pointed out at appropriate places in the description relative to each of the two groups of drawings.

Similarly, the electrical sequential action charts comprising FIGS. 73–78 have also been broken down into groups. For example, FIG. 73 shows the sequential actions occurring with respect to the loading of a drum at position I, the indexing of the turrets, and the transfer of a drum from position IV to position V; FIG. 77 shows the sequential actions taking place with respect to the removal of the carcass from the drum at position VII; and, FIG. 78 relates to the sequential actions occurring in relation to the removing of a drum from position VIII and the returning of it to the input end of the machine.

Table M–A, below, serves as a "master list" of many of the electrical components used in the electrical circuits to control the operation of the turret end of the machine. It sets forth the functions of the various limit switches, solenoid valves, photoelectrically operated relays and cam operated switches of these electrical circuits.

TABLE M–A

| Electrical Component | Control Function or Effect |
|---|---|
| Contacts M–LS1A of limit switch M–LS1. | Closes, drum transfer carriage 1112 (Fig. 2) at position V and home. |
| Contacts M–LS1B of limit switch M–LS1. | Closes, drum transfer carriage 1112 (Fig. 2) at position V and home. |
| Contacts of limit switch M–LS2. | Closes, shot pin 1233 (Fig. 9) down. |
| Contacts of limit switch M–LS3. | Closes, shot pin 1237 (Fig. 7) down. |
| Contacts M–LS6A of limit switch M–LS6. | Closes, conveyor platform 1804 (Fig. 65) down. |
| Contacts M–LS6B of limit switch M–LS6. | Closes, conveyor platform 1804 (Fig. 65) down. |
| Contacts of limit switch M–LS7. | Closes, shot pin 1233 (Fig. 9) up. |
| Contacts of limit switch M–LS8. | Closes, shot pin 1237 (Fig. 7) up. |
| Contacts of limit switch M–LS9. | Actuated (contacts shift up, Fig. 69b, from line M—30 to line M–29c) when drum at position VIII (Fig. 67). |
| Contacts M–LS10A of limit switch M–LS10. | Closes, drum on conveyor platform 1804 (Fig. 65). |
| Contacts M–LS10B of limit switch M–LS10. | Opens, drum on conveyor platform 1804 (Fig. 65). |
| Contacts of limit switch M–LS11. | Closes, conveyor platform 1804 (Fig. 65) up. |
| Contacts of limit switch M–LS12. | Opens, drum on its portion of storage area 1802 (Fig. 65). |

| Electrical Component | Control Function or Effect |
| --- | --- |
| Contacts of limit switch M-LS13. | Opens, drum on its portion of storage area 1802 (Fig. 65). |
| Contacts of limit switch M-LS14. | Opens, drum past position VIII (Fig. 67). |
| Contacts of limit switch M-LS17. | Opens, turret loader 900 (Fig. 5) at position I. |
| Contacts of limit switch M-LS18. | Closes, turret loader 900 (Fig. 5) back at starting position. |
| Contacts of limit switch M-LS19. | Closes, actuating arm 1731 carcass remover carriage 1714 (Fig. 55) back. |
| Contacts of limit switch M-LS20. | Closes, carcass remover carriage 1714 (Fig. 55) forward. |
| Contacts of limit switch M-LS21. | Closes, carcass remover carriage 1714 (Fig. 55) at midstroke. |
| Contacts of limit switch M-LS22. | Closes, carcass remover clamping means 1752 (Fig. 55) open. |
| Contacts of limit switch M-LS23. | Opens, carcass remover clamping means 1752 (Fig. 55) closed. |
| Contacts of limit switch M-LS24. | Opens, drum on its portion of storage area 1802 (Fig. 65). |
| Contacts M-LS29A of limit switch M-LS29. | Closes, tong clamps 1774 and 1775 (Figs. 61 and 62) closed. |
| Contacts M-LS29B of limit switch M-LS29. | Opens, tong clamps 1774 and 1775 (Figs. 61 and 62) closed. |
| Contacts of limit switch M-LS30. | Actuated (contacts shift up, Fig 130C, from line M-64a to line M-64) when tong clamps 1774 and 1775 (Figs. 61 and 62) open. |
| Contacts of limit switch M-LS25. | Closes, bead setter No. 2 back (Corresponds to M-LS26 of bead setter No. 1.) |
| Contacts of limit switch M-LS26. | Closes, bead setter No. 1 back. (Fig. 30b). |
| Contacts of limit switch M-LS27. | Closes, carcass remover carriage 1714 (Fig. 55) back. |
| Contacts M-CS1A of limit switch M-CS1. | Opens, Geneva arm 1207 (Fig. 10) at 360°. |
| Contacts M-CS1B of limit switch M-CS1. | Opens, Geneva arm 1207 (Fig. 10) at 360°. |
| Contacts of limit switch M-CS2. | Opens, Geneva arm 1207 (Fig. 10) at 270°. |
| Contacts of limit switch M-CS3. | Closes, Geneva arm 1207 (Fig. 10) between 230° and 290°. |
| Contacts of vacuum switch M-VS1. | Closes, vacuum at position I (Fig. 11). |
| Contacts of vacuum switch M-VS2. | Closes, vacuum at positions II and III (Fig. 11). |
| Contacts of vacuum switch M-VS3. | Closes, vacuum at position V (Fig. 11a). |
| Contacts of vacuum switch M-VS4. | Closes, vacuum at positions VI and VII (Fig. 11a). |
| Contacts M-PC1A of relay M-PC1. | Closes, light beam broken by drum arriving at turret loader 900 (Fig. 2). |
| Contacts M-PC1B of relay M-PC1. | Opens, light beam broken by drum arriving at turret loader 900 (Fig. 2). |
| Contacts M-PC2A of relay M-PC2. | Closes, carcass on drum at position VII (Fig. 60). |
| Contacts M-PC2B of relay M-PC2. | Opens, carcass on drum at position III (Fig. 60). |
| Solenoid M-SV1A of solenoid valve M-SV1. | Moves shot pins 1233 and 1237 down (Fig. 8). |
| Solenoid M-SV1B of solenoid valve M-SV1. | Moves shot pins 1233 and 1237 up (Fig. 8). |
| Solenoid of solenoid valve M-SV2. | Releases vacuum at position IV (Fig. 11). |
| Solenoid M-SV3A of solenoid valve M-SV3. | Drives conveyor platform 1804 up (Fig. 65). |
| Solenoid M-SV3B of solenoid valve M-SV3. | Drives conveyor platform 1804 down (Fig. 65). |
| Solenoid of solenoid valve M-SV4. | Releases vacuum at position VIII (Fig. 11a). |
| Solenoid M-SV5A of solenoid valve M-SV5. | Retracts rake 1812 to remove drum from position VIII (Fig. 65). |
| Solenoid M-SV5B of solenoid valve M-SV5. | Extends rake 1812 back to starting position (Fig. 65). |
| Solenoid of solenoid valve M-SV6. | Clamps drum to turret loader 900 (Fig. 3), and releases same. |
| Solenoid M-SV7A of solenoid valve M-SV7. | Drives turret loader 900 to position I (Fig. 5). |
| Solenoid M-SV7B of solenoid valve M-SV7. | Returns turret loader 900 back home from position I (Fig. 5). |
| Solenoid of solenoid valve M-SV8. | Drives drum transfer carriage 1112 to position IV, and returns same (Fig. 8). |
| Solenoid of solenoid valve M-SV9. | Starts and stops air blast (Fig. 56). |
| Solenoid M-SV10A of solenoid valve M-SV10. | Closes tong clamps 1774 and 1775 (Fig. 60). |
| Solenoid M-SV10B of solenoid valve M-SV10. | Opens tong clamps 1774 and 1775 (Fig. 60). |
| Solenoid M-SV11A of solenoid valve M-SV11. | Unloads unclamping side of power cylinders 1764 for carcass remover clamping means 1752 (Figs. 55 and 56). |
| Solenoid M-SV11B of solenoid valve M-SV11. | Opens clamping means 1752 on carcass remover (Figs. 55 and 56). |
| Solenoid M-SV12A of solenoid valve M-SV12. | Closes clamping means 1752 on carcass remover (Figs. 55 and 56). |
| Solenoid M-SV12B of solenoid valve M-SV12. | Unloads clamping side of power cylinders 1764 for clamping means 1752 on carcass remover Figs. 55 and 56). |
| Solenoid M-SV13A of solenoid valve M-SV13. | Drives carcass remover carriage 1714 back from position VII to start position (Fig. 56). |
| Solenoid M-SV13B of solenoid valve M-SV13. | Drives carcass remover carriage 1714 forward towards position VII from start position (Fig. 56). |
| Solenoid of solenoid valve M-SV14. | Unlocks latch to permit turrets to index (Fig. 2). |

*Explanation of operation of the turret loader, indexing, and drum transfer carriage circuits*

The first group of electrical drawings will now be considered in relation to the circuits controlling the loading of a drum at position I, the indexing of the turrets, and the transfer of a drum from position 4 to position 5. Table M–B, set forth below, and the sequence diagram of FIG. 131 will be referred to in conjunction with FIGS. 69a, 69b and 69c in the description that follows:

TABLE M–B.—TURRET LOADER, INDEXING, AND DRUM TRANSFER CARRIAGE SEQUENCE (FIG. 73)

| Time: | Occurence |
| --- | --- |
| T1 | Initial conditions: no vacuum at position I, turret loader 900 back, shot pins 1233 and 1237 up. |
| T2 | Drum arrives at turret loader (M-PC1A closes). |
| T3 | Geneva arm 1207 starts to rotate (M-MB2 de-energizes, M-MC2 energizes) and clamps close on drum in turret loader (M-SV6 energizes). |
| T4 | Turret loader starts towards position I (M-SV7A energizes). |
| T5 | Turret loader reaches position I (M-LS17 opens). |
| T6 | Vacuum raises at position I (M-VS1 closes). |
| T7 | Clamps open on drum in turret loader (M-SV6 de-energizes). |
| T8 | Turret loader starts home (M-SV7B energizes). |
| T9 | Turret loader reaches home (M-LS18 closes). |
| T10 | Shot pins start down (M-SV1A energizes). |
| T11 | Geneva arm at 230° (M-CS3 closes). |
| T12 | Shot pins down (M-LS2 and M-LS3 close). |
| T13 | Latch solenoid unlocks (M-SV14 energizes). |
| T14 | Geneva arm at 270° (M-CS2 opens), turrets start indexing. |
| T15 | Geneva arm at 290° (M-CS3 opens). |
| T16 | Latch solenoid resets (M-SV14 de-energizes). |
| T17 | Geneva arm at 360° (M-CS1 opens), indexing completed. |
| T18 | Vacuum broken at position IV (M-SV2 de-energizes). |
| T19 | Shot pins start up (M-SV1B energizes). |
| T20 | Shot pins up (M-LS7 and M-LS8 close). |
| T21 | Shot pin up signal sent out to various components (M-CR9 energizes). |
| T22 | Drum transfer carriage 1112 starts to move to position IV (M-SV8 energizes). |
| T23 | Vacuum raises at position V (M-VS3 closes), drum transfer carriage at position IV. |
| T24 | Drum transfer carriage starts back to position V (M-VS8 de-energizes). |
| T25 | Drum transfer carriage arrives at position V (M-LS1A and M-LS1B close) and system back to initial conditions existing at T1. |

Referring now to FIGS. 69a, 69b and 69c in connection with the following detailed discussion of the turret loader, indexing and drum transfer carriage control circuitry, a supply voltage is delivered to the electrical system (FIG. 69a) by means of conductors M–L1 and M–L2. A switch, including contacts M–SW5A and M–SW5B is employed to energize the control circuits. With contacts M–SW5A and M–SW5B in the condition shown in FIG. 69a, the electrical system is de-energized and a circuit is closed to energize lamp M–LT19 to indicate this condition. Upon shifting the positions of contacts M–SW5A and M–SW5B, the electrical system becomes energized and lamp M–LT20 is energized to indicate this condition.

Assuming that the vacuum pumps at the turrets are operating properly and vacuum exists at positions II, III, VI and VII due to drums being carried at these positions, vacuum switches M–VS2 and M–VS4 (both normally open, line M–15) will be closed and the energization of the electrical system causes control relay M–CR14 (line M–15) to become energized. This relay remains energized at all times during operation of the machine so long as the drums at positions II, III, VI and VII are tightly held in their respective positions and the vacuum pumps at the turrets are running properly. With the energization of control relay M–CR14 (line M–15), contacts M–CR14a (normally open, line M–3) close, energizing lamp M–LT3 to indicate proper vacuum exists at positions II, III, VI and VII. Contacts M–CR14b (normally open, line M–20) and M–CR14c (normally open, line M–36) also close, the former having no further effect, while the latter causes valve solenoid M–SV1B to become energized. Since the shot pins are already up, under the initial conditions set forth above in Table M–B, the energization of solenoid M–SV1B has no further effect. Contacts M–CR14d and M–CR14e (both normally open, line M–51) also close and thereby provide signals to the electrical circuits of bead setters No. 1 and No. 2, respectively, that proper vacuum exists at positions II, III, VI and VII.

Assuming that all previous operations at the turret end of the machine have been completed and that the turret loader or pusher 900 is back to its starting position awaiting another drum to start a new cycle of operation, the following conditions exist. Photoelectrically operated relay M–PC1, in line M–23 of FIG. 69a, is energized due to the fact that its lamp beam hits its photocell because no drum is in the turret loader to intercept the beam. Thus, contacts M–PC1A (normally closed, line M–18) are open and control relay M–CR4 (line M–17) is de-energized. Additionally, contacts M–CR1b (normally open, line M–18A) are open at this time, since control relay M–CR1 (line M–13) is de-energized due to the fact that vacuum switch M–VS1 is de-actuated (no drum at position I). Also, the contacts of limit switch M–LS18 (normally open, line M–16) are closed as a result of the turret loader 900 being home and, therefore, control relay M–CR11 (line M–16) is energized. With relay M–CR11 energized, its contacts M–CR11a (normally open, line M–4) are closed energizing lamp M–LT4 (line M–4) to indicate that the turret loader is back home. Similarly, contacts M–CR11b (normally open, line M–20) are closed and contacts M–CR11c (normally open, line M–25) are closed. The foregoing conditions represent the initial starting conditions and are shown at T1 in FIG. 73.

When a drum enters the turret loader 900, photoelectric relay M–PC1 (line M–23) de-energizes, resulting in the closing of its contacts M–PC1A (normally closed, line M–18), as indicated at T2 of FIG. 144. This in turn causes relay M–CR4 (line M–17) to energize. Its contacts M–CR4a (normally open, line M–17) then close, thereby preconditioning a lock-in circuit for relay M–CR4 through contacts M–CS1B (line M–17) of cam operated switch M–CS1 which close shortly thereafter when the Geneva drive starts turning. Contacts M–CS1B are closed during the time that switch M–CS1 (FIG. 37) is de-actuated and, since this switch is only actuated at the 360° position of the Geneva arm and the Geneva arm moves past 360° as soon as it starts up, contacts M–CS1B will soon be closed to provide the lock-in circuit to relay M–CR4.

The energization of control relay M–CR4 also results in the following actions by its contacts: M–CR4b (normally open, line M–25) closes; M–CR4c (normally closed, line M–45B) opens; M–CR4d (normally open, line M–45C) closes; M–CR4e (normally closed, line M–46B) opens; and M–CR4f (normally open, line M–46C) closes. The foregoing results in the de-energization of the magnetic brake M–MB3 (line M–45B) and energization of the magnetic clutch, M–MC3 (line M–45C) to commence operation of the line-to-turret synchronizer, which action will be further described hereinafter. Similarly, magnetic brake M–MB2 (line M–46B) becomes de-energized and magnetic clutch M–MC2 (line M–46C) becomes energized to connect the Geneva drive mechanism 1200 (FIG. 2) with the output shaft D of the main drive. Thus, the Geneva arm begins its rotation from the 360° (or 0°) position at which it had previously stopped and relay M–CR4 (line M–17) locks in due to the closing at this time of contacts M–CS1B (line M–17).

The shot pins 1233 and 1237, which lock turrets No. 1 and 2 in the fixed position, are in their upper or locking position at this time (between indexing cycles of the turrets). Hence, the contacts of limit switches M–LS7 and M–LS8 (line M–19) are closed and control relay M–CR9 (line M–19) is energized. Since relay M–CR9 is energized, its contacts M–CR9a (normally open, line M–25) are closed and, when contacts M–CR4b (normally open, line M–25) closed upon energization of relay M–CR4 (remembering that relay M–CR11 is energized), a circuit was completed to the turret loader drum clamps solenoid valve M–SV6 (line M–25) and to relay M–CR6 (line M–26). Thus, these two electrical components became energized (see T3 of FIG. 144).

With the energization of control relay M–CR6, its contacts M–CR6a (normally open, line M–26) close, thereby locking in solenoid valve M–SV6 and control relay M–CR6. Energization of the solenoid valve M–SV6 results in the closing of the drum clamps 904a and 904b on the turret loader 900. This clamps the carcass bearing drum to the turret loader.

The energization of control relay M–CR6 (line M–26) also results in the closing of its contacts M–CR6b (normally opened, line M–27) and in the opening of its contacts M–CR6c (normally closed, line M–29). These actions cause valve solenoid M–SV7A (line M–28) to become energized and valve solenoid M–SV7B (line M–29) to become de-energized. This in turn causes the turret loader 900 to move to position I of turret No. 1 (See T4 of FIG. 144). As the turret loader moves forward, the contacts of limit switch M–LS18 (normally open, line M–16) open, de-energizing control relay M–CR11 (line M–16). When the turret loader reaches position I, the contacts of limit switch M–LS17 (normally closed, line M–49) open but no action results therefrom (see T5 of FIG. 144). Also, vacuum develops at position I to hold the drum against the turret, and the contacts of vacuum switch M–VS1 (line M–13) close, causing control relay M–CR1 (line M–13) to energize (see T6 of FIG. 73).

The energization of control relay M–CR1 results in the closing of its contacts M–CR1a (normally open, line M–1), thereby lighting lamp M–LT1 (line M–1) to indicate that a vacuum has developed at position I. Also, contacts M–CR1b (normally open, line M–18A) close to provide an alternate path of energization for control relay M–CR4 (line M–18). Similarly, contacts M–CR1c (normally open, line M–20) close to precondition line M–20 for subsequent energization of control relay M–CR3. Contacts M–CR1d (normally closed, line M–25) open at this time, thereby de-energizing solenoid valve M–SV6 (line M–25) and control relay M–CR6 (line M–26).

67

The de-energization of solenoid valve M–SV6 results in the opening of the turret loader drum clamps 904a and 904b to release the drum from the turret loader 900 (see T7 of FIG. 73). Also, with the de-energization of control relay M–CR6, its contacts M–CR6b (normally open, line M–27) open and its contacts M–CR6c (normally closed, line M–29) close. This results in the de-energization of valve solenoid M–SV7A (line M–28) and in the energization of valve solenoid M–SV7B (line M–29). The energization of valve solenoid M–SV7B sends the turret loader 900 back to its starting or home position to await another drum (see T8 of FIG. 73). When the turret loader 900 is back to its home position, the contacts of limit switch M–LS18 (normally open, line M–16) close, resulting in the energization of control relay M–CR11 (see T9 of FIG. 73).

As stated earlier, when the drum first arrived at the turret loader and intercepted the light beam of the photoelectric relay M–PC1 (line M–23), the resulting electrical sequential actions caused the magnetic brake M–MB2 (line M–46B) to become de-energized and the magnetic clutch M–MC2 (line M–46C) to become energized. This applied rotary input to the Geneva drive 1200, and the Geneva arm, consequently, started turning and was moving while the foregoing sequential actions involving the turret loader took place.

Before the turrets are allowed to index, certain conditions must be met which insure that the various operations at the turret end of the machine have been completed and the turrets are clear to index. Table M–C below shows the conditions which must be met and the indications that they have been met.

TABLE M–C

| Necessary Condition | Indication That the Condition Has Been Met |
|---|---|
| 1. Conveyor platform 1804 down. | M–LS6A (normally open, line M–20) is closed. |
| 2. Drum transfer carriage 1112 home at position V. | M–LS1A (normally open, line M–20) is closed. M–LS1B (normally open, line M–10) is closed, lighting lamp M–LT10 (line M–10). |
| 3. Turret loader 900 back home. | M–CR11B (normally open, line M–20) is closed. |
| 4. Vacuum at positions II, III, VI and VII. | M–CR14b (normally open, line M–20) is closed. |
| 5. No drum at position VIII. | M–CR7a (normally closed, line M–20) is closed. |
| 6. Vacuum at position V. | M–CR10b (normally open, line M–20) is closed. |
| 7. Vacuum at position I. | M–CR1c (normally open, line M–20) is closed. |
| 8. Carcass remover carriage 1714 back home. | M–CR15b (normally open, line M–20) is closed. |
| 9. Bead setter No. 1 back home. | M–KCR10b (normally open, line M–20) is closed. M–KCR10a (normally open, line M–8) is closed, lighting lamp M–LT8 (line M–8). |
| 10. Bead setter No. 2 back home. | M–MCR10b (normally open, line M–20) is closed. M–HCR10a (normally open, line M–9) is closed, lighting lamp M–LT9 (line M–9). |
| 11. Carcass removed from drum at position VII. | M–PC2B (normally open, line M–59A) is closed. |
| 12. Bead setter No. 1 has completed its operation. | M–KCR13a (normally open, line M–20) is closed. |
| 13. Bead setter No. 2 has completed its operation. | M–HCR13a (normally open, line M–20) is closed. |

With the conditions set forth in Table M–C, above, satisfied, control relay M–CR3 (line M–20) becomes energized. It should be noted that the last one of the 13 items listed in Table M–C to occur will be the one that ultimately closes the circuit for energization of control relay M–CR3, and, during normal operation, this occurs before the Geneva arm reaches 270° of travel. The energization of relay M–CR3 results in the closing of its contacts M–CR3a (normally open, line M–34) and in the opening of its contacts M–CR3b (normally closed, line M–36). The former action causes valve solenoid M–SV1A (line M–34) to become energized and the latter action causes valve solenoid M–SV1B (line M–36) to become de-energized (see T10 of FIG. 73). The energization of solenoid valve M–SV1A causes the shot pins

68

1233 and 1237 to be moved down to free the turrets for subsequent indexing between 270° and 360° of Geneva arm travel. When the shot pins start down, the contacts of limit switches M–LS7 (normally open, line M–19) and M–LS8 (normally open, line M–19) are opened, de-energizing control relay M–CR9 (line M–19). However, no further sequential action is initiated by that relay at this time. When the shot pins arrive at their down position, the contacts of limit switches M–LS3 (normally open, line M–21) and M–LS2 (normally open, line M–21) close (T11 of FIG. 73), thereby energizing control relay M–CR2 (line M–22) from line M–20 (T12, FIG. 73).

The energization of control relay M–CR2 causes its contacts M–CR2a (normally open, line M–11) to close, thereby energizing light M–LT11 (line M–11) to indicate that this relay has picked up. Similarly, its contacts M–CR2b (line M–22) close, providing a lock in circuit for control relay M–CR2 through the cam operated switch contacts M–CS1a (normally open, line M–22) which are normally held closed and only open at 360° of Geneva arm travel. Concurrently, with the energization of control relay M–CR2 (line M–22), its contact M–CR2c (normally closed, line M–36) open, thereby insuring that solenoid valve M–SV1B will remain de-energized while control relay M–CR2 is energized. Also, contacts M–CR2d (normally open, line M–48) close to provide a shunt across the contacts of cam operated switch M–CS2 (normally closed, line M–49). The contacts of cam operated switch M–CS2 (line M–49) open subsequently (at 270° travel of the Geneva arm) to check that control relay M–CR2 is energized. The operation of the switches and contacts in line M–49 will be explained in greater detail hereinafter when the fail circuit and its fail relay M–CR5 of line M–49 are considered. For the present discussion, it should merely be understood that if relay M–CR2 is not energized when the contacts of switch M–CS2 open, fail relay M–CR5 (line M–49) de-energizes and stops the machine.

When the Geneva arm reaches 230° of travel, the contacts of cam operated switch M–CS3 (normally open, line M–29A) close (T11, FIG. 73) and remain closed until the Geneva arm reaches 290° of travel. During this period, therefore, control relay M–CR8 (line M–29A) is energized and its contacts M–CR8a (normally open, line M–29B), in turn, are closed, causing latch solenoid M–SV14 (line M–29B) to be energized for a similar amount of time (see T13 of FIG. 73). The latch solenoid M–SV14 thus remains energized during the travel of the Geneva arm from its 230° position to its 290° position. The purpose of the latch solenoid M–SV14 is to provide a stop for the turrets upon the completion of indexing at 360° of Geneva arm travel, at which time the latch solenoid is no longer energized. Since the turrets start indexing at 270° travel of the Geneva arm, the energization of the latch solenoid M–SV14 from 230° to 290° effectively opens a gate at the start of indexing and closes the gate before indexing is completed to insure that there will be no override by the turrets at the completion of indexing. Latch solenoid M–SV14 may be seen in FIG. 2 mounted near the upper left hand corner of the housing of the Geneva drive 1200.

Assuming that the machine is operating properly, when the Geneva arm reaches 270° of travel and engages the Geneva wheel to start indexing the turrets, the checking operation performed by cam operated switch M–CS2 at 270° (T14, FIG. 73) will prove satisfactory and the turrets will begin to index. At 290° of Geneva arm travel (T15, FIG. 73) the contacts of cam operated switch M–CS3 (normally open, line M–29A) open, de-energizing control relay M–CR8 (line M–29A) which, in turn, de-energizes latch solenoid M–SV14 (see T16 of FIG. 73) through the opening of its contacts M–CR8a (normally open, line M–29B). This action, as previously indicated, closes a latch which acts as a gate to stop the turrets when the Geneva arm later reaches 360° of travel.

At 360° of travel, the Geneva arm disengages from the Geneva wheel and the indexing of the turrets is completed. With the arrival of the Geneva arm at its 360° position, cam operated switch M–CS1 becomes actuated and its contacts M–CS1B (normally open, line M–17) open (T17, FIG. 73), thereby de-energizing relay M–CR4 (line M–17). This, in turn, causes the Geneva drive 1200 to become disengaged from the main drive and causes a brake to be applied to stop further movement of the Geneva arm. The circuit causing these actions includes contacts M–CR4f (normally open, line M–46c), which open to de-energize magnetic clutch M–MC2, and contacts M–CR4e (normally closed, line M–46B), which close to energize magnetic brake M–MB2. Similarly, the line-to-turret synchronizer also becomes disengaged when control relay M–CR4 (line M–17) de-energizes. In this case contacts M–CR4d (normally open, line M–45C) open to de-energize magnetic clutch M–MC3, and contacts M–CR4c (normally closed, line M–45B) close to energize magnetic brake M–MB3.

The arrival of the Geneva arm at 360° of travel and the consequent actuation of cam operated switch M–CS1 cause further significant electrical occurrences (at T17 of FIG. 73). Contacts M–CS1A (normally open, line M–22) open upon actuation of switch M–CS1. This results in the de-energization of control relays M–CR2 (line M–22) and M–CR3 (line M–21). The alternate circuit for energizing relays M–CR2 and M–CR3 (via line M–20) is open at the completion of indexing due to the fact that, with the indexing of the turrets, the vacuum at position I is broken and the contacts of vacuum switch M–VS1 (line M–13) open. This causes control relay M–CR1 (line M–13) to de-energize which, in turn, causes line M–20 to open due to the opening of its contacts M–CR1c (normally open, line M–20). Thus, the alternate source of energization via line M–20 for control relays M–CR2 (line M–21) and M–CR3 (line M–21) is removed and the opening of contacts M–CS1A (normally open, line M–22) de-energizes these relays.

Similarly, with the indexing of the turrets the vacuum at position V is broken due to the fact that the drum at position VIII had been removed from its drum supporting post prior to indexing and, after indexing, no drum is carried at position V. Hence, vacuum switch M–VS3 (line M–14) becomes de-actuated at the end of indexing and, in turn, de-energizes relay M–CR10 (line M–14). Contacts M–CR10c (normally open, line M–37) are, therefore, opened when the Geneva arm reaches 360° of travel and this causes the solenoid of valve M–SV2 to de-energize, thereby breaking the vacuum at position IV and preparing the drum at that position for its subsequent transfer to position V by the drum transfer carriage (T18, FIG. 73).

Remembering that drums are always carried at each of positions II, III, VI and VII of the turrets, it follows that vacuum switches M–VS2 and M–VS4 (both in line M–15) remain actuated and therefore, control relay M–CR14 is always energized during normal operation. With relay M–CR14 energized, its contacts M–CR14c (normally open, line M–36) are closed and the previously mentioned de-energization of control relays M–CR2 and M–CR3 results in the closing of their contacts M–CR2c and M–CR3b (both normally closed, line M–36). Thus, valve solenoid M–SV1B becomes energized. Similarly, contacts M–CR3a in line M–34 open with the de-energization of control relay M–CR3 and valve solenoid M–SV1A de-energizes. The net result of the energization of valve solenoid M–SV1B and de-energization of valve solenoid M–SV1A is that the shot pins begin to move up into their shot pin receiving assemblies to lock the two turrets in fixed position at 360° (T19 of FIG. 73).

The upward movement of the shot pins results in the opening of the contacts of their lower limit switches M–LS2 and M–LS3 (both normally open, line M–21) and, as indicated at T20 of FIG. 73, in the closing of the contacts of their upper limit switches M–LS7 and M–LS8 (both normally opened, line M–19) to thereby energize control relay M–CR9 (line M–19), as indicated at T21 of FIG. 73.

Control relay M–CR9 (line M–19) is utilized to send electrical signals out to all of the components associated with the turrets that the turrets have finished indexing and are again locked in place ready for these components to perform their respective operations on new drums. Thus, control relay M–CR9 (line M–19) then signals the turret loader, the bead setters, the drum transfer carriage mechanism, the carcass remover, and the drum return conveyor that they are each clear to operate. These signals occur as follows. Contacts M–CR9a (normally open, line M–25) precondition the turret loader circuits for subsequent operation thereof upon arrival of a new drum at the turret loader from the main line. Contacts M–CR9e (normally closed, line M–51) and contacts M–CR9f (normally open, line M–51) are in the control circuits of bead setter No. 1 and send the completion of index, or shot pins up, signal thereto. Similarly, contacts M–CR9g (normally closed, line M–51) and contacts M–CR91 (normally open, line M–51) are in the control circuits of bead setter No. 2 and send the completion of index signal thereto. Contacts M–CR9c (normally open, line M–39) are in the control circuits of the drum transfer carriage mechanism and signal these circuits that the shot pins are up. Contacts M–CR9i (normally closed, line M–60) and contacts M–CR9j (normally open, line M–67) are in the control circuits of the carcass remover and signal these circuits upon completion of indexing. And, finally, contacts M–CR9b (normally open, line M–31) are in the drum return conveyor control circuits to provide the signal to that component that indexing has finished and the shot pins are up.

In order to provide the necessary number of signals that indexing is completed, it has been found advisable in practice to employ three conventional relays connected in parallel with each other in line M–19, in place of the single relay shown in FIG. 69a. Thus, the closing and opening of the contacts of limit switches M–LS7 and M–LS8 (both in line M–19) would cause all three relays to energize and de-energize simultaneously and sufficient sets of contacts are provided by the three relays to send the completion of index signal to all of the components associated with the turrets.

The effect of the completion of index or shot pins up signal on the drum transfer carriage mechanism, which transfers drums from position IV to position V, will now be considered. When the turrets finish indexing there is no drum present at position V of turret No. 2 due to the fact that the drum previously at position VIII was removed by the drum return conveyor before indexing of the turrets. Hence, there is no vacuum present at position V and, therefore, the contacts of vacuum switch M–VS3 (normally open, line M–14) are open and control relay M–CR10 (line M–14) is de-energized. Contacts M–CR10d normally closed, line M–39) are, therefore, closed and, with the closing of contacts M–CR9c (line M–39), the solenoid of valve M–SV8 (line M–39) becomes energized (T22, FIG. 73). Solenoid valve M–SV8, it will be remembered, causes the drum transfer carriage at position V to move to position IV of turret No. 1.

As previously explained, the solenoid of valve M–SV2 (line M–37), which serves to release the vacuum on the drum at position IV of turret No. 1, is de-energized. Hence, when the drum transfer carriage reaches the drum at position IV, vacuum is picked up at position V and the contacts of vacuum switch M–VS3 (normally opened, line M–14) close (T23, FIG. 73) and energize control relay M–CR10 (line M–14). Contacts M–CR10a (normally open, line M–2) close, lighting lamp M–LT2 (line M–2) to indicate this condition. Contacts M–CR10d (normally closed, line M–39) open, thereby de-energizing the solenoid of valve M–SV8 (T24, FIG. 73) and causing the drum transfer carriage to return to position V on turret No. 2 (T25, FIG. 73). Similarly, contacts M–CR10c (normally open, line M–37) close, causing the solenoid of valve M–SV2 (line M–37) to become energized to set up position IV for the next vacuum holding sequence on subsequent indexing of the turrets. At this time the electrical components of FIG. 73 are back to the initial conditions existing at T1 and a new cycle may be commenced with the arrival of a new drum at the turret loader.

*Explanation of operation of carcass remover control circuits*

The electrical circuitry controlling the removal of the carcass from the drum at position VII of turret No. 2 will now be considered. In this connection Table M–D, set forth below, may be referred to with respect to the sequence diagram of FIG. 77.

TABLE M–D.—CARCASS REMOVER SEQUENCE CHART (FIG. 148)

| Time: | Occurrence |
| --- | --- |
| T1 | Initial conditions: carcas remover carriage 1714 is back; tong clamps 1774 and 1775 are open; clamping means 1752 is open; shot pins 1233 and 1237 are down; and the turrets are rotating to bring a new carcass to position VII. |
| T2 | Drum with carcass arrives at position VII (M–PC2A closes). |
| T3 | Shot pins up signal arrives (M–CR9 energizes). |
| T4 | Carcass remover carriage starts towards position VII (M–SV13B energizes). |
| T5 | Tong clamps start to close (M–SV10A energizes). |
| T6 | Carcass remover carriage at mid-stroke (M–LS21 actuates). |
| T7 | Clamping means power cylinder unloads (M–SV11A energizes). |
| T8 | Tong clamps are closed (M–LS29A and M–LS29B actuate). |
| T9 | Carcass remover carriage at position VII (M–LS20 actuates). |
| T10 | Clamping means starts closing about bead area of carcass (M–SV12A energizes). |
| T11 | Clamping means closed (M–LS23 actuates). |
| T12 | Air blast starts and time delay relay energizes (M–SV9 and M–TR1 energize). |
| T13 | Tong clamps start opening (M–SV10B energizes). |
| T14 | Tong clamps wide open (M–LS30 actuactuates). |
| T15 | Carcass remover carriage starts to move towards home (M–SV13A energizes). |
| T16 | Carcass remover carriage at mid-point of stroke (M–LS21 actuates). |
| T17 | Air blast ceases (M–SV9 de-energizes) and clamping means power cylinders unload (M–SV12B energizes). |
| T18 | Carcass remover carriage back home (M–LS19 actuates). energizes). |
| T19 | Clamping means starts to open (M–SV11B |
| T20 | Clamping means wide open (M–LS22 actuates). |
| T21 | Shot pins down signal arrives (M–CR9 de-energizes) and system back to initial condition existing at T1. |

Referring now to FIGS. 69a, 69b, 69c, 77 and Table M–D in connection with the following detailed discussions of the carcass remover control circuitry, just prior to the completion of indexing the carcass remover carriage 1714 is home (retracted), the clamping means 1752 carried by the carcass remover carriage is open, the tong clamps 1774 and 1775 are open, and the shot pins 1233 and 1237 are down as a new carcass bearing drum approaches position VII (T1, FIG. 61). Under these conditions, the contacts of limit switch M–LS22 (normally open, line M–60) and limit switch M–LS23 (normally closed, line M–61) are closed. The contacts of limit switch M–LS19 (normally open, line M–53) are closed, and, therefore, control relay M–CR15 (line M–53) is energized. Also, the contacts M–LS29A (normally opened, line M–57) of limit switch M–LS29 are open, the contacts of limit switch M–LS30 (line M–64) are in their upper position, as viewed in FIG. 69c, thereby closing a portion of line M–64 to solenoid valve M–SV13A, and contacts M–LS29B (normally closed, line M–68) are closed. Near the completion of indexing, the carcass carried by the new drum into position VII intercepts the light beam of photoelectrically operated relay M–PC2 (line M–52), de-energizing this relay, and, therefore, contacts M–PC2A (normally closed, line M–60) close (T2, FIG. 61). Similarly, contacts M–PC2B (normally open, line M–59A) open and break the circuit to line M–20 to prevent any subsequent indexing of the turrets while a carcass remains at position VII.

Since, as set forth above, control relay M–CR15 (line M–53) is energized, its contacts M–CR15A (normally open, line M–7) are closed and lamp M–LT7 (line M–7) is lit to indicate that the carcass remover carriage is back. Also, contacts M–CR15B (normally open, line M–20) are closed but perform no function at this time. Similarly, contacts M–CR15d (normally open, line M–60) are closed and, since contacts M–CR9i (normally closed, line M–60) are closed because relay M–CR9 (line M–19) is not energized, control relay M–CR18 (line M–60) becomes energized with the previously mentioned closing of contacts M–PC2A (normally closed, line M–60) upon arrival of a carcass bearing drum at position VII. Control relay M–CR18 (line M–60) locks itself in through its contacts M–CR18B (normally open, line M–61) and the normally closed contacts of limit switch M–LS23 (line M–61).

The remaining conditions existing in the carcass remover circuitry prior to the arrival of the shot pin up (completion of indexing) signal from control relay M–CR9 are as follows. Contacts M–CR15c (normally closed, line M–56) and contacts M–CR15e (normally closed, line M–64) are open. Contacts M–CR15f (normally open, line M–66) are closed. Contacts M–CR18c (normally closed, line M–64) are open and contacts M–CR18d (normally open, line M–67) are closed.

As previously indicated, upon completion of indexing the shot pins move up, closing the contacts of limit switches M–LS7 and M–LS8 (both in line M–19) and causing control relay M–CR9 to energize and send out a signal to various components that the shot pins are up and the turrets have completed indexing. The signal from control relay M–CR9 is shown occurring at time T3 of FIG. 77. With the energization of control relay M–CR9, its contacts M–CR9i (normally closed, line M–60) open and its contacts M–CR9j (normally open, line M–67) close. The former action has no effect on control relay M–CR18 (line M–60) because that relay had previously locked itself in via its contacts M–CR18b (normally open, line M–61). However, the latter action (the closing of contacts M–CR9j of line M–67) causes valve solenoid M–SV13B (line M–67) to energize through closed contacts M–CR16c (normally closed, line M–67) and the now closed contacts M–CR18d (normally opened, line M–67). The energization of valve solenoid M–SV13B causes the carcass remover carriage to move forward towards position VII of turret No. 2 (T4, FIG. 77).

Simultaneously, with the energization of solenoid valve M–SV13B, control relay M–CR19 (line M–68) becomes energized through its contacts M–CR19b (normally closed, line M–68). Contacts M–CR19a (normally open, line M–68) then close, locking in control relay M–CR19 (line M–68). Similarly, contacts M–CR19b (normally closed, line M–68) then open, divorcing the operation of control relay M–CR19 from the subsequent actions of control relays M–CR16 (line M–54) and M–CR18 (line M–60).

At the same time as the foregoing, contacts M–CR19c (normally open, line M–69) close, thereby energizing valve solenoid M–SV10A (line M–69) through contacts M–CR9j (normally open, line M–67). This causes the tong clamps to start closing around the carcass on the drum at position VII (T5, FIG. 77). The purpose of the tong clamps, as set forth earlier, is to entrap the subsequent air blast between the carcass and the drum in order to separate the carcass from the drum to facilitate its removal from the drum.

It will be remembered that the carcass remover carriage is moving forward under the action of valve solenoid M–SV13B (line M–67) while the tong clamps are closing. At the start of the forward movement of the carriage, the contacts of limit switch M–LS19 (normally open, line M–53) open, de-energizing control relay M–CR15 (line M–53). Contacts M–CR15f (normally open, line M–66) open, de-energizing valve solenoid M–SV11B (line M–66). This preconditions solenoid valve M–SV11 (FIG. 53) for subsequent shifting when valve solenoid M–SV11A (line M–62) becomes energized. Midway in the stroke of the carriage, the contacts of limit switch M–LS21 (normally open, line M–55) momentarily close (T6, FIG. 77) for a sufficient period of time to energize control relay M–CR17 (line M–55). Control relay M–CR17 locks itself in through its contacts M–CR17a (normally open, line M–56) and the now closed contacts M–CR15c (line M–56) and M–CR16a (line M–56). The energization of control relay M–CR17 also causes its contacts M–CR17c (normally open, line M–62) to close, thereby energizing valve solenoid M–SV11A through the now closed contacts M–CR18b (normally open, line M–61), as indicated at T7 of FIG. 61. This causes solenoid valve M–SV11 to remove pressure from the unclamping side of the power cylinders which control movement of the carcass remover clamping means. The cylinders are then clear to await a later signal that will cause the clamping means to clamp about the projecting bead area of the carcass carried at position VII.

In the meantime, the tong clamps, which have been closing during the forward movement of the carcass remover carriage, reach their closed position. At this time (T8, FIG. 77), the limit switch contacts M–LS29B (normally closed, line M–68) open to drop out control relay M–CR19 (line M–68). Contacts M–CR19c (normally open, line M–69), in turn, open and solenoid valve M–SV10A (line M–69) becomes de-energized. The closing of the tong clamps also causes limit switch M–LS30 (line M–64) to de-actuate and its contacts move down to the position shown in FIG. 69c, thereby readying a path to control relay M–CR20 (line M–64A). Similarly, the closing of the tong clamps causes limit switch contacts M–LS29A (normally open, line M–57) to close, preconditioning a path to time delay control relay M–TR1 (line M–57) and air blast solenoid valve M–SV9 (line M–58).

Next, the carcass remover carriage reaches its extended or forward position, adjacent the drum at position VII, and the contacts of limit switch M–LS20 (normally open, line M–54) close (T9, FIG. 77), energizing control relay M–CR16 (line M–54). Contacts M–CR16c (normally closed, line M–67) thereupon open, de-energizing valve solenoid M–SV13B (line M–67) to remove the driving force that moved the carriage forward. Contacts M–CR16a (normally closed, line M–56) open de-energizing control relay M–CR17 (line M–55), and contacts M–CR16b (normally open, line M–63) close, energizing solenoid valve M–SV12A (T10, FIG. 77). The de-energizing of control relay M–CR17 causes its contacts M–CR17c (normally open, line M–62) to open, thereby de-energizing valve solenoid M–SV11A (line M–62), and the energizing of valve solenoid M–SV12A causes the clamping means to start closing about the projecting bead area of the carcass at position VII. While closing, the clamping means opens the contacts of limit switch M–LS22 (line M–60) with no further effect. When the clamping means finishes closing on the projecting bead area of the carcass at position VII, the contacts of limit switch M–LS23 (normally closed, line M–61) open (T11, FIG. 77), causing control relay M–CR18 (line M–60) to de-energize. This opens the contact M–CR18b (normally open, line M–61) and also initiates the next sequence of events by the carcass remover—the air blast.

The air blast occurs upon the de-energization of control relay M–CR18 (line M–60) as follows: contacts M–CR18a (normally closed, line M–57) close to energize solenoid valve M–SV9 (line M–58) through a circuit including contacts M–CR17b (normally closed, line M–59), the now closed contacts M–LS29A (normally open, line M–57) and contacts M–CR15c (normally closed, line M–56). The energization of solenoid valve M–SV9 (line M–58) initiates the air blast to separate the carcass from the drum (T12, FIG. 77). Simultaneously with the above action, time delay control relay M–TR1 (line M–57) is energized (also at T12, FIG. 77). Relay M–TR1 is a timing device which controls the duration of closure of the tong clamps to provide time for the air blast to free the carcass from the drum. Contacts M–TR1a (normally open, line M–58) close instantly upon energization of relay M–TR1, so that the subsequent opening of limit switch contacts M–LS29A (line M–57), when the tong clamps open, does not cause de-energization of either the relay M–TR1 or the solenoid of valve M–SV9. Contacts M–TR1b (normally open, line M–64) also close, but only after the passing of a timed interval of approximately a few seconds duration during which the tong clamps constrain the incoming air blast to lift the carcass free of the drum. The closing of contacts M–TR1b (line M–64) energizes control relay M–CR20 (line M–64A) through the now closed contacts M–CR18c (line M–64) and M–CR15e (line M–64), and through the contacts of limit switch M–LS30 (line M–64) which, as indicated earlier, are in the position shown in FIG. 69c because the tong clamps are closed. With the energization of control relay M–CR20, its contacts M–CR20a (normally open, line M–70) close, thereby energizing valve solenoid M–SV10B (line M–70) which, in turn, then causes the tong clamps to start opening (T13, FIG. 61). Initially, limit switch M–LS29 de-actuates and its contacts M–LS29A (normally open, line M–57) open, while its contacts M–LS29B (normally closed, line M–68) close. However, no action results from this. When the tong clamps reach their wide open position (clear of the path of the carcass being removed), limit switch M–LS30 becomes actuated (T14, FIG. 77) and its contacts (line M–64) move up, as viewed in FIG. 69c, thereby de-energizing control relay M–CR20 (line M–64A) and energizing valve solenoid M–SV13A (line M–64). Contacts M–CR20a (normally open, line M–70) thus open to de-energize valve solenoid M–SV10B (line M–70), while the energized solenoid M–SV13A (line M–64) causes the carcass remover carriage to start moving back home (T15, FIG. 148), carrying the carcass along with it.

As the carcass remover carriage starts back, the contacts of limit switch M–LS20 (normally open, line M–54) open, causing control relay M–CR16 (line M–54) to become de-energized. Its contacts M–CR16b (normally open, line M–63) open, causing valve solenoid M–SV12A (line M–63) to de-energize and remove the pressure source holding the carcass remover clamping means closed. This prepares the system for later energization of valve solenoid M–SV12B (line M–65), which unloads the clamping sides of the power cylinders of the clamping means, and still later energization of valve solenoid M–SV11A (line M–62) which will open the clamping means. Contacts M–CR16a (normally closed, line M–56) close, readying a circuit to control relay M–CR17 (line M–55) for subsequent energization. Also, contacts M–CR16c (normally closed, line M–67) close, readying solenoid valve M–SV13B (line M–67) for future energization.

When the carcass remover reaches midstroke on the way home to its retracted position, limit switch M–LS21 becomes actuated momentarily and its contacts (normally open, line M–55) close (T16, FIG. 77). This results in the energization of control relay M–CR17 (line M–55), which then locks itself in through its contact M–CR17a (normally open, line M–56) and the remaining closed contacts in line M–56. The energization of control relay M–CR17 (line M–55) causes its contacts M–CR17d (normally open, line M–65) to close, thereby energizing solenoid valve M–SV12B (line M–65) through the closed contacts M–CR18c (normally closed, line M–64), as indicated at T17 of FIG. 77. Solenoid valve M–SV12B (line M–65) releases the pressure from the clamping side of the clamping means power cylinders to facilitate the later opening of the clamping means by solenoid valve M–SV11B (line M–66).

At the same time as the foregoing, the now energized control relay M–CR17 (line M–55) operates to stop the air blast. Contacts M–CR17b (normally closed, line M–59) open with the energization of relay M–CR17 to de-energize solenoid valve M–SV9 (line M–58) and this stops the air blast, provided switch M–SW4 (line M–58) is in the "short" position as shown in FIG. 69c. If switch M–SW4 is in the "long" position, the air blast continues until contacts M–CR15c (normally closed, line M–56) open on energization of relay M–CR15 (line M–53) by the closing of the contacts of limit switch M–LS19 (line M–53) upon arrival of the carriage at its home position. Also, with the energizing of control relay M–CR17 (line M–55), contacts M–CR17c (normally open, line M–62) close, thereby readying a path to valve solenoid M–SV11A for its subsequent energization during a new cycle of operation.

When the carcass remover reaches its retracted position, under the influence of valve solenoid M–SV13A (line M–64), the contacts of limit switch M–LS19 (normally open, line M–53) close (T18, FIG. 77), thereby energizing control relay M–CR15 (line M–53). Contacts M–CR15f (normally open, line M–66) then close to energize valve solenoid M–SV11B (line M–66) which, in turn, causes the clamping means to start opening (T19, FIG. 77) to release the carcass. When the clamping means starts opening, the contacts of limit switch M–LS23 (normally closed, line M–61) close without further effect. When the clamping means is fully open, the contacts of limit switch M–LS22 (normally open, line M–60) close (T20, FIG. 77) but no further action results therefrom.

The energization of control relay M–CR15 (line M–53) also results in the opening of its contacts M–CR15c (normally closed, line M–56) to de-energize time delay relay M–TR1 (line M–58) and control relay M–CR17 (line M–55). Also, contacts M–CR15e (normally closed, line M–64) open to de-energize valve solenoid M–SV13A, thereby removing the driving force that caused the carcass remover carriage to move home. Similiarly, contacts M–CR15d (normally open, line M–60) close to ready a path for future energization of control relay M–CR18 (line M–60). When control relay M–CR17 (line M–55) de-energizes, as indicated above, its contacts M–CR17d (normally open, line M–65) open to de-energize valve solenoid M–SV12B, thereby preparing the clamping means for subsequent actuation during the next cycle of operation of the carcass remover.

It should be noted at this point that the removal of the carcass from the drum at position VII causes the mirror 1787 of photoelectrically operated relay M–PC2 (FIG. 60) to become uncovered. This allows the light beam to hit the photocell of this relay, resulting in its energization. Thus, contacts M–PC2B (normally open, line M–59A) close and a circuit is closed to energize line M–20 (FIGS. 69a and 69c). Also, contacts M–PC2A (normally closed, line M–60) open without further effect.

The cycle of operation of the carcass remover is complete at this point and the electrical circuits therefor are almost back to their initial conditions. The only remaining step still to be accomplished is the de-energization of control relay M–CR9 (line M–19). It will be recalled that this relay becomes energized when the shot pins go up and it becomes de-energized when the shot pins go down, the former action indicating the completion of indexing and the latter action indicating the start of indexing. It will also be remembered that the shot pins do not go down until all components associated with the turret end of the machine have finished their individual operations and that the last component to finish its operation initiates the downward movement of the shot pins. Thus, if the carcass remover is not the last component to finish its operation, the electrical circuits thereof must then await the later de-energization of relay M–CR9. This time delay is shown on the horizontal component line for relay M–CR9, in FIG. 77, by the right hand portion of the line being made up of dashes. When relay M–CR9 finally de-energizes (T21, FIG. 77), the electrical circuits of the carcass remover are back to the initial conditions existing at T1 of FIG. 77.

No means have been illustrated for removing the fabricated carcass from the carcass remover after it completes its operation; however, a conventional conveyor positioned below the carcass remover may be used or an operator may remove the carcasses therefrom by hand in order to perform subsequent operations on the carcass such as the application of toe strips, the application of a tread slab, and the shaping and vulcanizing of the carcass into a tire.

*Explanation of operation of the drum return conveyor control circuits*

The electrical circuitry controlling the removal of the bare drums from position VIII of turret No. 2, and the return of these drums to the input end of the tire building machine, will now be considered. In this connection Table M–E, set forth below, may be referred to with respect to the sequence diagram of FIG. 78 to indicate the specific actions occurring at the various vertical time lines T1 through T17.

TABLE M–E.—DRUM RETURN CONVEYOR SEQUENCE CHART (FIG. 78)

| Time: | Occurrence |
|---|---|
| T1 | Initial conditions: Geneva arm approaching 360° of travel; rake 1812 extended; conveyor platform 1804 down, storage area 1802 empty; return conveyor belt 1803 running; and shot pins 1233 and 1237 down. |
| T2 | Drum at position VIII (M–LS9 actuated). |
| T3 | Shot pins up signal occurs (M–CR9 energizes). |
| T4 | Conveyor platform starts rising (M–SV3A energizes), vacuum breaks at position VIII (M–SV4 energizes). |
| T5 | Conveyor platform reaches up position (M–LS11 actuated). |
| T6 | Rake begins to retract (M–SV5A energizes). |
| T7 | Leading edge of drum arrives at M–LS10; drum starting to enter storage area. |
| T8 | Trailing edge of drum arrives at M–LS9. |
| T9 | Leading edge of drum at M–LS12; M–LS10 still actuated. |
| T10 | Trailing edge of drum at M–LS10; drum entirely in storage area. |
| T11 | Conveyor platform starts to drop (M–SV3B energizes); rake starts to extend (M–SV5B energizes); vacuum builds up at position VIII. |

| Time: | Occurrence |
|---|---|
| T12 | Leading edge of drum at M–LS13 and trailing edge of drum at M–LS12. |
| T13 | Leading edge of drum at M–LS24; drum starting to leave storage area and ready to move to return conveyor belt. |
| T14 | Conveyor platform reaches down position (M–LS6 actuates). |
| T15 | Trailing edge of drum arrives at M–LS13; drum partially on return conveyor belt. |
| T16 | Trailing edge of drum arrives at M–LS24; return conveyor belt controlling movement of drum. |
| T17 | Shot pins down signal occurs (M–CR9 de-energizes), system back to initial condition existing at T1. |

Referring now to FIGS. 69a, 69b, 69c, 78 and Table M–E in connection with the following detailed discussion of the drum return conveyor control circuitry, just prior to the completion of indexing the rake 1812 is extended, the conveyor platform 1804 is down, the storage area 1802 is empty, the return conveyor belt 1803 is running, and the shot pins 1233 and 1237 are down as a new bare drum approaches position VIII (T1, FIG. 78). Under this set of initial conditions, limit switch M–LS9 is de-actuated and its contacts are in their lower position as shown at line M–30 in FIG. 69b. Hence, control relay M–CR7 (line M–29C) is de-energized.

Similarly, limit switch M–LS10 is de-actuated and its contacts M–LS10A (normally open, line M–32) are open. Contacts M–LS10B (normally closed, line M–30) are closed, completing a circuit to lamp M–LT13 which indicates that there is no drum present at position VIII. Limit switch M–LS11 is de-actuated since the conveyor platform is down and its contacts (normally open, line M–32) are open. Limit switches M–LS12, M–LS13 and M–LS24 are all de-actuated with no drum in the storage area and their contacts (all of which are normally closed and in line M–32) are all closed. Also, with the conveyor platform down, limit switch M–LS6 is actuated and its contacts M–LS6A (normally open, line M–20) are closed and its contacts M–LS6B (normally open, line M–5) are closed, the latter energizing lamp M–LT5 (line M–5) to visually indicate that the conveyor platform is down.

It should also be noted, under the initial conditions existing near the end of indexing, that control relays M–CR12 (line M–31) and M–CR13 (line M–32) are de-energized. This is due partly to the fact that control relay M–CR7 (line M–29C) is de-energized and, therefore, its contacts M–CR7b (normally open, line M–31) are open. It is also due to the fact that limit switch M–LS10 is de-actuated and therefore, contacts M–LS10A (normally open, line M–32) are open. These two factors combine to de-energize relays M–CR12 (line M–31) and M–CR13 (line M–32). Thus, contacts M–CR12c (normally closed, line M–42) are closed and they energize valve solenoid M–SV3B (line M–42), which, in turn, is applying a downward force on the conveyor platform. Similarly, contacts M–CR13c (normally closed, line M–44) are closed and they energize valve solenoid M–SV5B (line M–44), which, in turn, is applying a force to the rake to keep it extended or in its home position.

When indexing finishes and the new drum reaches position VIII, it actuates limit switch M–LS9 (T2, FIG. 78) whose contacts (line M–30) shift from the position shown in FIG. 140b to an upper position closing a circuit to line M–29C. This energizes control relay M–CR7 (line M–29C) and its contacts M–CR7a (normally closed, line M–20) open to insure that no further indexing will take place while a drum is present at position VIII. Similarly, contacts M–CR7b (normally open, line M–31) close to precondition line M–31 for the arrival of the shot pins up signal from control relay M–CR9 (line M–19).

The next sequence of events occurs when the shot pins are raised and control relay M–CR9 (line M–19) energizes (T3, FIG. 78). When this happens, contacts M–CR9b (normally open, line M–31) close and a circuit is completed to energize control relay M–CR12 (line M–31).

The energization of control relay M–CR12 (line M–31) results in the opening of its contacts M–CR12c (normally closed, line M–42), thereby causing de-energization of solenoid valve M–SV3B (line M–42). Similarly, contacts M–CR12B (normally open, line M–41) close to energize solenoid valve M–SV3A (line M–41) and the conveyor platform then starts to move up (T4, FIG. 62). Additionally, contacts M–CR12a (normally open, line M–38) close to energize solenoid valve M–SV4 (line M–38). This breaks the vacuum on the drum at position VIII so that it can subsequently be removed.

As the conveyor platform moves up, limit switch M–LS6 de-actuates and its contacts M–LS6A (normally open, line M–20) open to provide an additional interlock in line M–20, precluding the turrets from indexing with the conveyor platform up. Similarly, contacts M–LS6B (normally open, line M–5) open to de-energize lamp M–LT5 (line M–5). This visually indicates that the conveyor platform is no longer down.

When the conveyor platform reaches its upper position adjacent the drum at position VIII, limit switch M–LS11 becomes actuated and its contacts (normally open, line M–32) close (T5, FIG. 62). Since the storage area is empty and the contacts of limit switches M–LS12, M–LS13, and M–LS24 (all in line M–32) are closed, control relay M–CR13 (line M–32) becomes energized via the now closed contacts M–CR7b (normally open, line M–31). The energization of relay M–CR13 (line M–32) then results in the closing of its contacts M–CR13a (normally open, line M–33). This locks relay M–CR13 in an energized condition irrespective of subsequent actions of the storage area limit switches M–LS12, M–LS13 and M–LS24 (all in line M–32). Contacts M–CR13c (normally closed, line M–44) open to de-energize the rake extending solenoid valve M–SV5B (line M–44). Similarly, contacts M–CR13b (normally open, line M–43) close, thereby energizing the rake retracting solenoid M–SV5A (line M–43). The rake then starts to retreat (T6, FIG. 78) and begins pulling the drum off position VIII and onto the conveyor platform.

When the drum leaves position VIII, its leading edge actuates limit switch M–LS10 (T7, FIG. 78) before its trailing edge de-actuates limit switch M–LS9 (T8, FIG. 78). Thus, contacts M–LS10A (normally open, line M–32) close and contacts M–LS10B (normally closed, line M–30) open before the contacts of limit switch M–LS9 (line M–30) moves down, as viewed in FIG. 69b. Consequently, when limit switch M–LS9 (line M–30) de-energizes control relay M–CR7 (line M–29C), and its contacts M–CR7b (normally open, line M–31) open, contacts M–LS10A (normally open, line M–32) are closed and they continue to keep control relays M–CR12 (line M–31) and M–CR13 (line M–32) energized. The de-energizing of relay M–CR7 (line M–29C) closes its contacts M–CR7a (normally closed, line M–20) without further effect. As the drum moves forward into the storage area of the conveyor, its leading edge reaches and actuates limit switch M–LS12 (normally closed line M–32), which opens (T9, FIG. 62); however, contacts M–CR13a (normally open, line M–33) are still closed and they keep control relay M–CR13 (line M–32) locked in. When the drum is entirely in the storage area and its trailing edge leaves limit switch M–LS10, the limit switch deactuates and its contacts M–LS10A (normally open, line M–32) open (T10 FIG. 62), thereby dropping out the control relays M–CR12 (line M–31) and M–CR13 (line M–32). Contacts M–LS10B (normally closed, line M–30) also close at this time, lighting lamp M–L13, which indicates that the drum is entirely in the storage area. The location of limit switch M–LS10 is so chosen that the drum must be clear of the movable conveyor platform before the limit switch de-actuates to cause subsequent lowering of the platform.

The de-energization of control relays M–CR12 (line M–31) and M–CR13 (line M–32) preconditions position VIII for vacuum build-up and causes the conveyor platform to drop and the rake to become extended (return home), to await the next indexing cycle in the following manner. When control relay M–CR12 (line M–31) drops out, its contacts M–CR12a (normally open, line M–38) open, thereby de-energizing the solenoid of solenoid valve M–SV4 (line M–38) and disconnecting the communication between the vacuum chamber at position VIII and atmosphere. Also, contacts M–CR12b (normally open, line M–41) open, thereby de-energizing the platform up valve solenoid M–SV3A (line M–41). Similarly, contacts M–CR12c (normally closed, line M–42) close, thereby energizing the platform down valve solenoid M–SV3B (line M–42). The energization of valve solenoid M–SV3B, in turn, causes the conveyor platform to start moving down (T11, FIG. 78). The downward movement of the conveyor platform causes limit switch M–LS11 (normally open, line M–32) to actuate and its contacts open without further effect. Similarly, when control relay M–CR13 (line M–32) de-energizes, its contacts M–CR13b (normally open, line M–43) open to de-energize the rake retracting valve solenoid M–SV5A (line M–43), and its contacts M–CR13c (normally closed, line M–44) close to energize the rake extending valve solenoid M–SV5B (line M–44). Solenoid valve M–SV5, in turn, causes the rake to start moving towards its extended or home position (this also occurs at T11, FIG. 78).

The momentum imparted to the drum during the retracting movement of the rake carries the drum along through the storage area. During its movement therethrough, the drum reaches and actuates limit switch M–LS13 (normally closed, line M–32), thereby opening its contacts (T12, FIG. 78), but no action results since control relay M–CR13 (line M–32) is already de-energized. At the same time, the trailing edge of the drum passes beyond and deactuates limit switch M–LS12 (normally closed, line M–32), thereby closing its contacts (also at T12, FIG. 78), but no action results.

The leading edge of the drum then reaches and actuates limit switch M–LS24 (normally closed, line M–32). Its contacts open (T13, FIG. 78) but, as before, no action results because control relay M–CR13 (line M–32) is still de-energized. The drum, at this point, is starting to leave the storage area and its momentum will shortly carry it on to the return conveyor belt 1803 (FIGS. 65 and 1). It should be reiterated at this time that the return conveyor belt is constantly running during the operation of the machine so that, irrespective of when a drum arrives there, it will return the drum to the input end of the machine. A separately energized drive motor keeps the return conveyor belt running.

The next action to take place in the drum return conveyor electrical circuits occurs when the conveyor platform, which has been moving down during the movement of the drum through the storage area, reaches its lower position. At this time (T14, FIG. 78), limit switch M–LS6 actuates, thereby sending a clear for indexing signal to line M–20 by means of the closing of its contacts M–LS6A (normally open, line M–20), and energizing lamp M–LT5 (line M–5) by means of the closing of its contacts M–LS6B (normally open, line M–5).

In the meantime the momentum of the drum continues to carry it along its return path. This movement brings the trailing edge of the drum beyond limit switch M–LS13 (normally closed, line M–32). The limit switch, thus, deactuates and its contacts close (T15, FIG. 78). Again no action results because contacts M–CR7b (normally open, line M–31) and contacts M–LS10A (normally open, line M–32) are both already open, as are the contacts of limit switch M–LS24 (normally closed, line M–32), to keep control relay M–CR13 (line M–32) de-energized. By this time the leading edge of the drum has reached the return conveyor belt and the drum is starting to be moved along by the belt as its momentum is absorbed thereby.

The return conveyor belt then carries the drum therewith and the trailing edge of the drum reaches and deactuates limit switch M–LS24 (normally closed, line M–32), thereby causing its contacts to close (T16, FIG. 78). This action brings the drum return conveyor electrical circuits almost back to the initial conditions at which they started. The only action yet remaining is for the shot pins down signal to occur. This happens when control relay M–CR9 (line M–19) de-energizes after all the components at the turret end of the machine have completed their operations and the turrets are ready for indexing. The horizontal component line (FIG. 62) for relay M–CR9 ends in a plurality of dashes to indicate the passing of this time period and, finally, relay M–CR9 de-energizes (T17, FIG. 78) and the drum return conveyor electrical circuits are back to the initial conditions existing at T1 of FIG. 78. These circuits then await the indexing of the turrets and the arrival of a new drum at position VIII and a new shot pins up signal from relay M–CR9 to begin their cycle of operation anew. In the meantime the drum that was removed from position VIII is carried by the return conveyor belt back to the input end of the machine to start a new pass through the machine.

*Explanation of operation of the line-to-turret synchronizer electrical circuitry*

The electrical circuits of FIGS. 69a, 69b, and 69c as indicated earlier, are also employed in controlling the actuation of the line-to-turret synchronizer of the machine.

The line-to-turret synchronizer functions to adjust the speed of the winding frame line—the rapidity with which drums approach the turret loader 900—to keep drums arriving at the turret loader at seven and a half (7½) second intervals. As previously indicated, it takes the Geneva drive six (6) seconds to cycle through 360° of travel. Then a one and a half (1½) second dwell time is provided at the end of the Geneva drive cycle during which time the turret loader awaits the arrival of a new drum to start a new cycle. Thus, a seven and a half (7½) second period is maintained between successive quarter-turns of the turrets. The one and one-half second dwell time is achieved primarily by a mechanical line-to-turret synchronizer mechanism to be described hereinafter. However, in order to provide a synchronizing signal to the mechanical line-to-turret synchronizer mechanism for purposes of adjusting the dwell time, an electrical circuit is utilized which operates simultaneously with the actuation of the Geneva drive.

A magnetic brake M–MB3 (line M–45B) and a magnetic clutch M–MC3 (line M–45C) are employed in the electrical line-to-turret synchronizing circuits. The magnetic brake M–MB3 and magnetic clutch M–MC3, as previously described, are controlled by contacts M–CR4c (normally closed, line M–45B) and M–CR4d (normally open, line M–45C), respectively, which are controlled by relay M–CR4 (line M–17). Since the magnetic brake M–MB3 and magnetic clutch M–MC3 are operated by means of a D.C. voltage, a D.C. power pack is provided (see FIG. 69b) which includes a bridge rectifier for converting the A.C. control voltage of lines M–L1 and M–L2 into a corresponding D.C. voltage for use by the magnetic brake M–MB3, and it also includes a voltage dividing rheostat for providing a lower D.C. voltage for use by the magnetic clutch M–MC3. Additionally, two arc reducing capacitors are provided in the power pack. One is connected in shunt with the magnetic brake M–MB3 and one is connected in shunt with the magnetic clutch M–MC3. The capacitors serve to cancel out the inductive effect of the brake and clutch upon opening of the relay contacts which control them in order to diminish the possibility of undesirable arcing when these contacts open. It should be pointed out that a corresponding power pack arrangement is used in conjunction with the Geneva drive magnetic brake M–MB2 (line M–46B) and magnetic clutch M–MC2 (line M–46C).

*The turret fail circuits*

As indicated earlier, the electrical circuits of FIGS. 69a, 69b and 69c include provisions which will shut the machine down in the event of specific malfunctions.

Referring to FIG. 69b, the fail circuit components have been illustrated in lines M–47, M–48, M–49, M–50 and M–51A. A control relay M–CR5 (line M–49) is provided to shut down the machine in the event a serious malfunction occurs at the turret end of the machine. If this relay becomes de-energized, its contacts M–CR5c (normally open, line M–51A) open, and, in turn, cause the main drive motor to be disconnected from the remainder of the machine. Control relay M–CR5 (line M–49), which may be conveniently termed a "fail relay," normally remains energized throughout all operations of the machine. Its contacts M–CR5b (normally closed, line M–50) are usually open, and, when the fail relay de-energizes, they serve to light a lamp M–LT16 (line M–50) which provides a visual indication that a fail condition has occurred. Similarly, lamp M–LT15 (line M–48) is connected in parallel with the fail relay M–CR5 (line M–49) and, therefore, remains lit at all times during normal operation of the machine, indicating that no fail condition has occurred.

The manner in which the fail circuits check to determine whether or not certain malufunctions have occurred in the operation of the turret end of the machine will now be considered. Referring to line M–49 of FIG. 69b, it may be seen that the contacts of cam actuated switch M–CS2 (normally closed, line M–49) are connected across the contacts M–CR2d (normally open, line M–48) of control relay M–CR2 (line M–22). Switch M–CS2, which is physically mounted atop the Geneva Drive mechanism 1200 (FIG. 9) and actuated by a cam carried by shaft 1206, is provided with normally closed contacts (line M–49, FIG. 69b) which open momentarily when the Geneva arm reaches 270° of travel. On the other hand, control relay M–CR2, which is supposed to be energized by the time the Geneva arm reaches 270° of travel, only becomes energized if all of the contacts in lines M–20 and M–59A are closed and the shot pins are down. Thus, the turret loader, the bead setters, the drum transfer carriage, the carvass remover, and the drum return conveyor must all have finished their operations, and the shot pins must be down, for control relay M–CR2 (line M–22) to become energized. If control relay M–CR2 is not energized at 270° of Geneva arm travel, its contacts M–CR2d (normally open, line M–48) are open, and the opening of the contacts of cam operated switch M–CS2 (normally closed, line M–49) at 270° of Geneva arm travel causes the fail relay M–CR5 to de-energize, thereby disconnecting the main drive motor from the remainder of the machine. Hence, serious damage to the machine is averted by precluding indexing of the turrets while one of the components is still performing its function.

A separate check is made by the fail circuits to insure that a drum does not index past position VIII on turret No. 2 and into position V. In this case the contacts of limit switch M–LS14 (normally in the down position shown in line M–49 of FIG. 69b) are usually connected in series with fail relay M–CR5 (line M–49). In the event a drum indexes past position VIII (see FIG. 57), limit switch M–LS14 becomes actuated and its contacts shift up from the position shown in FIG. 140b (line M–49). This results in de-energization of the fail relay M–CR5 (line M–49) and in the lighting of lamp M–LT14 (line M–47) to indicate this condition.

Similarly, the contacts of limit switch M–LS17 (normally closed, line M–49), which open when the turret loader or pusher 900 is in its forward position, are wired in series with contacts M–CR9d (normally open, line M–49) and both of these sets of contacts are shunted by contacts M–PC1B (line M–48). Contacts M–PC1B, it will be remembered, are controlled by the photoelectrically operated relay M–PC1 (see FIG. 2) which operates in conjunction with the turret loader or pusher. Thus, when a carcass bearing drum enters the turret loader, ready for movement to position I, photoelectrically operated relay M–PC1 (line M–23) becomes de-energized and its contacts M–PC1B (normally open, line M–48) open. At this time, however, control relay M–CR9 (line M–19) is energized, because the shot pins are up, and the contacts of limit switch M–LS17 (normally closed, line M–49) are closed so that the circuit to fail relay M–CR5 is completed. While the turret loader is moving to position I, and prior to the time that it reaches that position, the photocell of relay M–PC1 is cleared. Hence, this relay energizes and its contacts M–PC1B close to shunt out the contacts of limit switch M–LS17 (normally closed, line M–49) before they open upon arrival of the turret loader at position I. This provides an alternate source of energization to the fail relay M–CR5 to keep it energized during normal operation. In the event that photoelectrically operated relay M–PC1 should become de-energized due to a defect therein, however, this circuit would shut down the machine when the turret loader actuates limit switch M–LS17. Similarly, the arrival of a second drum at the turret loader, while the first drum is being loaded at position I, would have a similar effect in stopping the machine.

It should be noted that the contacts M–CR9d (normally open, line M–49) also cooperate with contacts M–PC1B (normally open, line M–48) in de-energizing fail relay M–CR5 (line M–49) in the event of a malfunction. Control relay M–CR9 (line M–19), it will be recalled, is energized at all times when the shot pins are up. Thus, if a drum arrives at the turret loader from the main line before the shot pins are up, contacts M–CR9d will be open at the same time that contacts M–PC1B are open and the fail relay will de-energize. This feature serves to prevent movement of a drum to position I while the turrets are still indexing.

Another checking feature of the fail circuits will now be considered. The contacts of limit switches M–MLS25 (normally open, line M–49), M–MLS26 (normally open, line M–49) and M–MLS27 (normally open, line M–49) are each closed when, respectively, the following conditions exist: bead setter No. 1 is retracted; bead setter No. 2 is retracted; and, the carcass remover carriage is retracted. The three sets of contacts are in series in line M–49 and they are shunted by contacts M–CR2e (normally closed, line M–48). Control relay M–CR2 (line M–20), as previously indicated, is energized only when the shot pins are down and, therefore, contacts M–CR2e are open only at that time. Thus, should either bead setter No. 1, bead setter No. 2 or the carcass remover carriage not be fully retracted when the shot pins go down and relay M–CR2 becomes energized, one or another of the contacts of limit switches M–MLS25, M–MLS26 and M–MLS27 will be open, causing the fail relay M–CR5 (line M–49) to de-energize and disconnect the main drive motor from the remainder of the machine. This provides additional assurance that the machine will stop with the occurrence of any of the foregoing malunctions.

In the event of a malfunction resulting in the de-energization of fail relay M–CR5 (line M–49), its contacts M–CR5a (normally open, line M–49) would open, thereby precluding fail relay M–CR5 from becoming re-energized until such time as a reset button M–PB5 (line M–48) is depressed after the reason for the malfunction has been corrected. Also, the contacts of switches M–SW1, M–SW7 and M–SW3 in line M–49 are normally in the condition shown in FIG. 69b during automatic operation of the machine. Hence these switches do not play any part in the automatic operation of the fail relay M–CR5. However, if any of these switches are turned to manual operation, the fail relay drops out disconnecting the main drive motor from the machine during the period of manual control thereof.

*Turret manual control circuitry*

The electrical circuits of FIGS. 69a, 69b and 69c are provided with various switches and push-buttons for either manually controlling the operation of the turret end of the machine, varying the operating characteristics of the components associated therewith, or de-energizing the control circuits thereof.

A switch M–SW1 (line M–25) and a pushbutton M–PB1 (line M–24) are provided in order to allow manual control over the operation of the drum clamps 904a and 904b (FIG. 33) which clamp and unclamp a carcass bearing drum to the turret loader. Switch M–SW1 includes two sets of contacts, one in line M–49 and one normally in line M–25. When switch M–SW1 is turned to its manual position, its contacts in line M–49 open, thereby de-energizing fail relay M–CR5 (line M–49) and stopping both the main line and the Geneva drive indexing mechanism to allow subsequent manual operation of the turret loader drum clamps. Additionally, the contacts of switch M–SW1 normally in line M–25 move up, as viewed in FIG. 140a to connect line M–24 with the solenoid of valve M–SV6 (line M–25) when the switch is put on manual. Solenoid valve M–SV6, it will be recalled, controls the operation of the power cylinder of the turret loader drum clamps and, by depressing and releasing pushbutton M–PB1 (line M–24), the drum clamps can be manually brought into and out of engagement with a drum located in the turret loader.

Switches M–SW2 (line M–28) and M–SW3 (line M–27), together, provide a means of manually controlling the movement of the turret loader 900 (FIG. 5) towards or away from position I of turret No. 1. Switch M–SW3 is provided with contacts in lines M–27, M–28, M–29 and M–49. Upon shifting switch M–SW3 (line M–27) to its manual position, its contacts in line M–27 open, its contacts in line M–28 close, its contacts in line M–29 open, and its contacts in line M–49 open. Thus, the control over valve solenoids M–SV7A (line M–28) and M–SV7B (line M–29) is removed, respectively, from lines M–27 and M–29, and line M–28 is energized up to switch M–SW2. Similarly, the contacts of switch M–SW3 in line M–49 open to de-energize the fail relay M–CR5, thereby precluding operation of the main line and Geneva drive. Switch M–SW2 (line M–28) may then be used to control the valve solenoids M–SV7A (line M–28) and M–SV7B (line M–27). Switch M–SW2 is a three-position switch in which the central position is open and each of the two outer positions is connected to one or the other of solenoid valves M–SV7A and M–SV7B. When the switch is in its central position, no action occurs involving the solenoid valves. However, upon shifting switch M–SW2 upwardly, as viewed in FIG. 69a, line M–28 becomes electrically connected to valve solenoid M–SV7A (line M–28) and, consequently, the turret loader starts to move toward position I of turret No. 1. Similarly, if the contacts of switch M–SW2 are shifted downwardly, as viewed in FIG. 69a, line M–28 becomes electrically connected to valve solenoid M–SV7B (line M–29), causing the turret loader to return to its starting or home position.

In order to provide a degree of control over the length of time during which the air blast of the carcass remover is turned on, a switch M–SW4 (line M–58) is provided. Switch M–SW4 (line M–58) includes a set of contacts which may either be closed in the "long" position to shunt out contacts M–CR17b (line M–59) or may be opened in the "short" position to allow contacts M–CR17b to control the air blast solenoid valve M–SV9 (line M–58). In the position shown, the switch M–SW4 is set in its "short" position so that solenoid valve M–SV9 (line M–58) will maintain a relatively short air blast for breaking the seal between the carcass and the drum at position VII. Should the switch M–SW4 be shifted to its "long" position, its contacts will then divorce contacts M–CR17b (normally closed, line M–59) from controlling the operation of solenoid valve M–SV9. The ultimate effect of switching switch M–SW4 from its short to its long position is that control over air blast solenoid valve M–SV9 is shifted from control relay M–CR17 (line M–55) to control relay M–CR15 (line M–53). Thus, rather than the solenoid valve M–SV9 becoming de-energized to stop the air blast when the carcass remover carriage has reached the mid-position of its return stroke and limit switch M–LS21 (line M–55) energizes control relay M–CR17, solenoid valve M–SV9 will not become de-energized until limit switch M–LS19 (line M–53) energizes control relay M–CR15 (line M–53) and its contacts M–CR16c (normally closed, line M–56) open to de-energize solenoid valve M–SV9. Hence, it may be seen that, upon shifting switch M–SW4 to the long position, the air blast is allowed to continue throughout the entire retracting stroke of the carcass remover carriage rather than cutting off when the carriage reaches mid-position on its retracting stroke.

Switch M–SW5 has been referred to earlier in the discussion of the electrical circuits. Its contacts M–SW5A (line M–L1, FIG. 140a) and M–SW5b (line M–L2, FIG. 69a) serve to energize and de-energize all of the electrical circuits shown in FIGS. 69a, 69b and 69c.

A means of changing the point at which air is released from the clamping sides of the power cylinders of the carcass remover clamping means to prepare for subsequent actuation thereof is provided by switch M–SW6 (line M–62). Switch M–SW6, which is shown in FIG. 69c as being in its "mid-stroke" position, may be manually shifted to its "full stroke" position. In the mid-stroke position, its contacts in line M–62 allow contacts M–CR17c (normally open, line M–62) to control valve solenoid M–SV11A (line M–62), and its contacts in line M–65 allow contacts M–CR17d (normally open, line M–65) to control valve solenoid M–SV12B. Thus, the power cylinder unloading valve solenoids M–SV11A (line M–62) and M–SV12B are controlled by relay M–CR17 (line M–55). By shifting switch M–SW6 to the full stroke position, valve solenoid M–SV11A (line M–62) is then put under the control of relay M–CR16 (line M–54) by means of contacts M–CR16b (normally open, line M–63), and valve solenoid M–SV12B (line M–65) is put under the control of relay M–CR15 (line M–53) by means of contacts M–CR15f (normally open, line M–66). This action shifts the pressure release point of the clamping means power cylinders from the mid-position of the carcass remover carriage travel to the two end positions (the extended and retracted positions). Thus, the clamping means is held either open or closed for a slightly longer time and its actions are more positively controlled.

Manual initiation of the carcass remover sequence of operations while the main line and Geneva drive are stopped is provided for by switch M–SW7 (line M–60). Normally, switch M–SW7 is kept in the position shown in FIG. 69c for automatic operation; however, when this switch is shifted to its manual position, one set of its contacts will move from line M–60 to line M–60A and, so long as control relay M–CR14 (line M–15) is energized (dependent on their being vacuum existing in positions II, III, VI, and VII), the carcass remover sequence of operations may be manually started by depressing a pushbutton switch M–PB2 (line M–60A). Pushbutton switch M–PB2 and manual control switch M–SW7, together, bypass the operation of the carcass remover from its dependence upon there being a carcass on the drum carried at position VII. Thus, when switch M–SW7 is in manual, photoelectrically operated relay contacts M–PC2A (normally closed, line M–60) are effectively removed from the carcass remover control circuits by the contacts of switch M–SW7 (line M–60), and pushbutton switch M–PB2 (line M–60A) serves to initiate the energization of control relay M–CR18 in lieu of photoelectrically operated relay contacts M–PC2A.

It should be noted that switch M–SW7 (line M–60) is also provided with a second set of contacts located in the fail circuits of line M–49. These contacts are closed during the time that switch M–SW7 is in the automatic position to help keep the fail relay M–CR5 (line M–49) energized. However, when switch M–SW7 is placed in manual, its contacts in line M–49 open, thereby de-energizing the fail relay M–CR5 (line M–49) and stopping both the main line and the Geneva drive indexing mechanism.

In order to provide a means for operating the machine with the line-to-turret synchronizing equipment cut off, a manual control switch M–SW8 (line M–45) is provided. When switch M–SW8 (line M–45) is in its lower or automatic position, as shown in FIG. 69b, the line-to-turret synchronizer power pack is energized via manual control switch M–SW9 (line M–46A) for normal automatic operation thereof. However, should switch M–SW8 be moved to its upper or manual position, the energization source for the line-to-turret synchronizer would be broken and lamp M–LT17 (line M–44A) would become energized to indicate this condition.

Similarly, switch M–SW9 (line M–46A) is utilized to provide manual control over the application of power to both the Geneva drive power pack and the line-to-turret synchronizer power pack in order to turn both units off simultaneously in connection with manual operation of the machine. With switch M–SW9 (line M–46A) in its lower or automatic position, as shown in FIG. 69b, power is supplied from line M–46 through switch M–SW9 to both the Geneva drive power pack and the line-to-turret synchronizer power pack. However, upon moving switch M–SW9 (line M–46A) to its upper or manual position, the energization source is removed from both of the power packs and lamps M–LT18 (line M–46D), in turn, lights, indicating this condition.

In the event that it becomes desirable to have the carcass remover carriage stop at its extended position while precluding the tong clamps from closing and the air blast from occurring, a manual control switch M–SW10 (line M–59) may be moved from its normal "in" position to its "out" position. This feature is advantageous in connection with manual operation of the carcass remover for adjustment purposes. Upon turning switch M–SW10 (line M–59) to its "out" position, its contact both in line M–59 and line M–68 open. The opening of the contacts of switch M–SW10 in line M–68 prevents control relay M–CR19 (line M–68) from becoming energized and this, in turn, precludes the energization of the close tong clamps solenoid M–SV10A (line M–69). Thus, the tong clamps would remain open at all times and limit switch contacts M–LS29A (line M–57) would constantly remain in an open condition because limit switch M–LS29 could not then become actuated. With line M–57 open by contacts M–LS29A, line M–58 open due to contacts M–TR1a being open, and line M–59 open due to switch M–SW10 being in the "out" position, time delay relay M–TR1 (line M–57) and air blast solenoid valve M–SV8 (line M–58) must remain de-energized. Since relay M–TR1 (line M–57) is de-energized, its contacts M–TR1b (normally open, line M–64) remain open and valve solenoid M–SV13A (line M–64) cannot become energized to drive the carcass remover carriage back to its home or retracted position. Thus, manual switch M–SW10 (line M–59) serves to provide a means for causing the carcass remover carriage to stop in its extended position with the tong clamps open and the air blast off.

A number of additional manual provisions are incorporated in the manual control circuitry. In order to manually control the movement of the shot pins a pair of pushbutton switches M–PB3 (line M–34) and M–PB4 (line M–34A) are provided. Pushbutton M–PB3 includes contacts in line M–34 and contacts in line M–35A. Upon depressing pushbutton M–PB3, its contacts in line M–34 open to de-energize shot pins down valve solenoid M–SV1A (line M–34), and its contacts in line M–35A close to energize shot pins up valve solenoid M–SV1B (line M–36) from line M–35. The net effect of the depression of pushbutton switch M–PB3 (line M–34) is to cause the shot pins to move up irrespective of the condition of the reset of the automatic control circuitry of FIGS. 69a, 69b and 69c. The pushbutton switch M–PB4 (line M–35A) performs a like function in moving the shot pins down.

Upon depressing pushbutton switch M–PB4, its contacts in line M–35A close and its contacts in line M–36 open. This positively de-energizes shot pins up solenoid M–SV1B (line M–36) and positively energizes shot pins down solenoid M–SV1A (line M–34), to cause the shot pins to go down irrespective of the condition of the remainder of the automatic electrical control circuits.

The operation of pushbutton switch M–PB5 (line M–48) has previously been described in connection with the discussion of the fail circuits and fail relay M–CR5 (line M–49). It serves to reset the fail circuits for automatic operation after the reason for stoppage of the machine has been corrected. This is accomplished by its shunting out contacts M–CR5a (normally open, line M–49), upon depression, to re-energize fail relay M–CR5.

In order to allow manual movement of the drum transfer carriage to and from position IV of turret No. 1 and position V of turret No. 2, while a drum is carried at position V and the shot pins are up, a pushbutton switch M–PB6 (line M–40) is provided. With the shot pins up, control relay M–CR9 (line M–19) is energized and its contacts M–CR9c (normally open, line M–39) are closed. Similarly, with a drum at position V, a vacuum exists at that position and vacuum switch M–VS3 (line M–14) is actuated, thereby energizing control relay M–CR10 (line M–14). This, in turn, opens contacts M–CR10d (normally closed, line M–39) to normally prevent the drum transfer carriage solenoid valve M–SV8 (line M–39) from energizing and moving the carriage to position IV. However, the contacts of pushbutton M–PB6 (line M–40) are connected across contacts M–CR10d and, by depressing the pushbutton, solenoid valve M–SV8 may be energized to move the drum transfer carriage to position IV. Similarly, upon releasing pushbutton M–PB6, solenoid valve M–SV8 de-energizes and the carriage returns to position V. Thus, a convenient manual means for moving the drum transfer carriage to and from positions IV and V while the shot pins are up and a drum is at position V is provided.

It will be apparent now that a great many of the vital functions which take place at the turret end of the machine may be manually controlled by an operator to facilitate adjustments. Similarly, the manual control circuitry is so arranged as to provide for "dry runs" of a bare drum through the turret end of the machine in the event that it is desired to observe and adjust the operation of the various components associated with the turrets.

*Explanation of operation of bead setter circuits*

Considering now the operation of the bead setter of FIG. 18 with reference to FIGS. 70a, 70b, 71 and 74, it will be assumed initially that the bead servicer has supplied a bead to the bead setter and that the bead servicer arm is clear of the bead setter, causing the contacts E–CR9a (line 11) to be closed. These contacts are controlled by relay E–CR9 of the bead servicer. Limit switches K–LS13 (line 7), K–LS14 (line 7), and K–LS11 (line 7) are actuated by the bead and closed, thereby energizing relay K–CR7. Because the shoulder fingers 1337 are retracted (see below), limit switch K–LS6 is not actuated. Solenoid valve K–SV4 (line 32) is energized through the normally closed limit switch contact K–LS6A (line 32) and through contacts K–CR7d (line 32A). Referring for the moment to FIG. 40, when the solenoid K–SV4 is energized, the valve K–SV4 is in the condition represented in the drawing, thereby actuating cylinders 1392, 1392' and 1392" to extend the external fingers 1400, 1400' and 1400" of FIG. 19. The fingers 1400, 1400' and 1400" of FIG. 19 grip the bead, closing limit switch K–LS7 (line 27), limit switch K–LS16 (line 27), limit switch K–LS15 (line 27), and limit switch K–LS8A (line 11).

Because the bladder is not inflated, limit switch K–LS9 (line 6) is closed, thereby energizing relay K–CR6 (line 6). Contacts K–CR6b (line 23) are closed. Pressure switch K–PS1A (line 18) is open when the bladder is not inflated and pressure switch K–PS1B (line 28) is closed when the bladder is not inflated.

While the fingers 1337 (FIG. 20a) are retracted, the limit switch K–LS6 (FIG. 19) is de-actuated with its contacts K–LS6A (line 32) closed and contacts K–LS6B (line 33) open. Also, while the fingers 1337, are retracted, limit switch K–LS5 (FIG. 18) is actuated with its contacts (line 5) closed, energizing control relay K–CR5 (line 5). Relay contacts K–CR5a (line 11) are closed, contacts K–CR5b (line 13) are open, contacts K–CR5c (line 22) are closed and contacts K–CR5d (line 23) are closed.

Also, as an initial operating condition, cylinder 1309 (FIG. 18) is retracted, causing limit switch K–LS1 (line 1) to be closed, thereby energizing control relay K–CR1 (line 1). Relay contacts K–CR1a (line 11) are closed, relay contacts K–CR1b (line 12) are open, and relay contacts K–CR1c (line 23) are closed.

Also as an initial condition, cylinder 1302 (FIG. 19) is extended, causing limit switch K–LS4 (line 4) to be closed, energizing relay K–CR4 (line 4). Relay contacts K–CR4a (line 11) are closed, relay contacts K–CR4b (line 12) are open, relay contacts K–CR4c (line 18) are closed, and relay contacts K–CR4d (line 23) are closed.

The bead setter circuit also includes a stepping relay K–TS having holding contacts K–TSX (line 11) and also 19 sets of contacts K–TS1 to K–TS19. The stepping relay is of conventional construction, for example, relay #MT19A612–012 of Eagle "MT" series manufactured and sold by Eagle Signal Corporation, Moline, Ill., and described in Eagle Bulletin 780, Oct. 15, 1957. The stepping relay contacts are actuated by a cam (not shown) having 12 positions. The contacts which are closed for any cam positions are represented on the chart of FIG. 142 by the symbol X. In the initial operating condition the stepping relay is in cam position 1 with contacts K–TS1 (line 11) closed and contacts K–TS12 (line 14) closed. The remainder of the stepping relay contacts are open in cam position 1.

Also, as an initial operating condition, it will be assumed that the turret has indexed and there is a carcass on a drum in position 6 of the turret, causing photocell K–PC1 (line 19) to be de-actuated when darkened due to interruption of light emitted by a suitable light source K–LT1 on the turret and reflected by a reflector K–R1 to the photocell K–PC1 in the absence of a carcass, as represented in FIG. 29 on turret No. 1. When photocell K–PC1 is de-actuated, contacts K–PC1a (line 19) close and contacts K–PC1b (line 20) open, de-energizing relay K–CR15 (line 22). Relay contacts K–CR15a (line 10A) close, contacts K–CR15b (line 18) close, and contacts K–CR15c (line 30) open.

There is a vacuum at positions 2, 3, 6 and 7 of the turret and relay contacts M–CR14a (line 8) are closed, energizing latch solenoid K–LB through relay contacts K–CR8 (line 8). Note that relay K–CR8 (line 14) is unactuated; it is actuated only in case a bead is not held firmly by the bead clamps when there should be one present. That is, relay K–CR8 is actuated when a circuit exists through contacts E–CR8 is actuated when a circuit exists through contacts E–CR9a, K–LS8A, K–CR7b, and TS12. In this event the latch solenoid K–LB would be de-energized and the stepping relay would be locked in position, unable to move until the presence of a bead is brought about manually. In the assumed initial condition a bead is present, the latch solenoid being energized as stated. When the latch solenoid is energized, the stepping relay K–TS (line 11) is free to step through its cycle.

When the turret is in the correct position for the bead setting operation, a shot pin signal causes contacts M–CR9a (line 24) to open and contacts M–CR9b (line 11) to close. When contacts M–CR9b close, relay K–TS (line 11) is energized through relay contacts E–CR9a (line 11) which are closed when the bead service arm is retracted, limit switch K–LS8A (line 11), contacts K–CR7a (line 11), contacts K–CR6a (line 11), contacts K–CR5a (line 11), contacts K–CR1a (line 11), contacts K–CR4a (line 11), contacts K–TS1 (line 11), switch S3b (line 11) and contacts K–TSX (line 11). When the stepping relay completes its stroke, contacts K–TSX (line 11) open, de-energizing the relay. This causes the relay cam to step to position 2 at which point contacts K–TSX close again.

When the stepping relay steps to position 2, relay contacts K–TS1 (line 11) open, preventing relay K–TS (line 11) from again becoming energized from the combination of switches on line 11 which just caused the relay to advance. Relay contacts K–TS2 (line 12) close and relay contacts K–TS11 (line 10) close. Relay contacts K–TS11 remain closed for the remainder of the cycle. Relay contacts K–TS12 remain closed. Relay contacts K–TS13 (line 26) close, energizing solenoid valve K–SV1 which starts to extend cylinder 1309. Relay contacts K–TS14 (line 27) close, energizing solenoid valve K–SV2 along lines 27 and 28. This causes cylinder 1307 to be retracted. Relay contacts K–TS18 (line 32) close, supplying a path for energization of solenoid valve K–SV4 in position 3 and 4.

While cylinder 1309 starts to extend and cylinder 1307 starts to retract, limit switch K–LS1 (line 1) opens, de-energizing relay K–CR1 (line 1) and limit switch K–LS4 (line 4) opens, de-energizing relay K–CR4 (line 4). The contacts of relays K–CR1 and K–CR4 then shift to the de-energized condition. Contacts K–CR1a (line 11) open, K–CR1b (line 12) close, K–CR1c (line 23) open, K–CR4a (line 11) open, K–CR4b (line 12) close, K–CR4c (line 18) open, and K–CR4d (line 23) close. When contacts K–CR1b (line 12) close and contacts K–CR4b (line 12) close, stepping relay K–TS is energized through contacts K–TS2 (line 12), contacts K–CR6a (line 11), contacts K–CR7a (line 11), limit switch K–LS8A (line 11) and contacts E–CR9a (line 11). The cam of the relay then steps to position 3 by the same action as previously described in connection with the step from position 1 to position 2.

While the stepping relay is in position 3, relay contacts K–TS2 (line 12) are open. Relay contacts K–ST3 (line 13) close to prepare future energization of relay K–TS (line 11). Relay contacts K–TS11, K–TS12, K–TS13, and K–TS14 remain closed. Relay contacts K–TS16 (line 30) close and when fully extended cylinder 1309 closes limit switch K–LS2 (line 2), and control relay K–CR2 (line 2) is energized, closing relay contacts K–CR2a (line 30). Relay contacts K–CR2b (line 17) close, K–CR2c (line 13) close, K–CR2d (line 10A) close, and K–CR2e (line 20) close.

When the cylinder 1307 is retracted, and limit switch K–LS3 is closed, relay K–CR3 (line 3) is energized. Relay contacts K–CR3a (line 17) open, K–CR3b (line 30) close, K–CR3c (line 21) close, and K–CR3d (line 13) close. When relay contacts K–CR3b (line 30) close, solenoid valve K–SV3 becomes energized to raise the fingers 1337 by rotation of the Rotac 1304. When the fingers 1337 are rising, limit switch K–LS5 (line 5) opens, de-energizing relay K–CR5 (line 5). Relay contacts K–CR5a (line 11) open, K–CR5b (line 13) close, K–CR5c (line 22) open, and K–CR5d (line 23) open. The closing of relay contacts K–CR5b (line 13) completes the circuit through K–CR2c, K–CR3d, and K–TS3, and results in energization of relay K–TS for stepping to position 4 in a manner similar to that previously described. The condition of the contacts of relay K–TS in position 4 is indicated in FIG. 71.

When the fingers 1337 are fully raised, limit switch K–LS6A (line 32) opens and limit switch K–LS6B (line 33) closes. When limit switch K–LS6A (line 32) opens, solenoid valve K–SV4 (line 32) is de-energized and the external fingers 1400, 1400', 1400'' are retracted. This causes limit switches K–LS7 (line 27), K–LS16 (line 27), and K–LS15 (line 27) to open and limit switch K–LS8A (line 11) to open and limit switch K–LS8B (line 11) to close.

Limit switches K–LS13 (line 7), K–LS14 (line 7), and K–LS11 (line 7) open because of the absence of a bead in the fingers 1400, 1400', 1400'' and relay K–CR7 (line 7) is de-energized. Relay contacts K–CR7a (line 11) open, K–CR7b (line 14) close, K–CR7c (line 25A) close, and K–CR7d (line 32A) open. When the fingers 1400, 1400', 1400'' are retracted, switch K–LS8A (line 11) energizes relay K–TS (line 11) through contacts K–TS4 (line 16) and relay K–TS steps to position 5, with its contacts assuming the conditions represented in FIG. 71.

The closing of limit switch K–LS6B in combination with contacts K–TS19 (line 33) in position 4 causes solenoid valve K–SV5 to be energized, which causes the bladder 1330 to be inflated. When the bladder is fully inflated, pressure switch K–PS1B (line 28) opens, de-energizing solenoid valve K–SV2 (line 27), causing cylinder 1307 to be extended and moving the cage forward. When the bladder is fully inflated, pressure switch K–PS1A (line 18) closes, and K–LS9 (line 6) opens, de-energizing relay K–CR6. Relay contacts K–CR6a (line 11) open, K–CR6b (line 23) open, and K–CR6c (line 22) open.

While the stepping relay is in position 5, when cylinder 1307 starts to be extended, limit switch K–LS3 (line 3) opens, de-energizing relay K–CR3 (line 3). Relay contacts K–CR3a (line 17) close, K–CR3b (line 30) open, K–CR3c (line 21) open, and K–CR3d (line 13) open. When relay contacts K–CR3a (line 17) close, relay K–TS in energized through contacts K–TS5 (line 17) and contacts K–CR2b (line 17). This causes the stepping relay to step to position 6 with its contacts assuming the conditions represented in FIG. 71.

When the cylinder 1307 is fully extended, limit switch K–LS4 (line 4) closes, energizing relay K–CR4 (line 4). Relay contacts K–CR4a (line 11) close, K–CR4b (line 12) open, K–CR4c (line 18) close, and K–CR4d (line 23) close. Relay K–CR9 (line 18) is energized through pressure switch K–PS1A (line 18) and relay contacts K–CR4c (line 18) and relay contacts K–CR2b (line 17). Relay contacts K–CR9a (line 19) close to hold relay K–CR9 is an energized condition and relay contacts K–CR9b (line 29) close so that solenoid valve K–SV2 is again energized when the stepping relay is in position 6 with contacts K–TS15 (line 29) closed. Energization of solenoid valve K–SV2 (line 27) causes cylinder 1307 to be retracted. While cylinder 1307 is being retracted, it opens limit switch K–LS4 (line 4) de-energizing relay K–CR4 (line 4), and it closes limit switch K–LS10 (line 20), completing an energization path for relay K–TS through relay contacts K–CR2b (line 17), limit switch K–LS10 (line 20), and contacts K–TS6 (line 20). The relay K–TS then steps to position 7, and limit switch K–LS10 (line 20) again becomes de-actuated as the cylinder 1307 continues its motion.

Relay contacts K–TS19 are open in position 7, de-energizing solenoid valve K–SV5 (line 33) to deflate the bladder. Release of pressure de-actuates switch K–PS1, opening switch K–PS1A (line 19), and closing switch K–PS1B (line 28). As the bladder deflates limit switch K–LS9 again closes, energizing relay K–CR6 and closing its contacts. Also while the relay is in position 7, relay contacts K–TS7 (line 21) are closed and when cylinder 1307 is fully retracted, limit switch K–LS3 (line 3) is closed and relay K–CR3 becomes energized. Contacts K–CR3a (line 17) open, K–CR3b (line 30) close, K–CR3c (line 21) close, and K–CR3d (line 13) close. When relay contacts K–CR3c (line 21) close, energizing relay K–TS is energized to step the relay to position 8.

When the relay is in position 8, contacts K–TS17 (line 31) open, de-energizing the solenoid K–SV3 (line 30), causing the fingers 1337 to be retracted, closing limit switch K–LS6A (line 32) and opening limit switch K–LS6B (line 33). With the fingers retracted, limit switch K–LS5 is closed, energizing relay K–CR5 (line 5). Relay contacts K–CR5a (line 11) close, K–CR5b (line 13) open, K–CR5c (line 22) close and K–CR5d (line 23) close. Relay K–TS becomes energized through contacts K–TS8 (line 22), contacts K–CR6c (line 22), contacts K–CR5c (line 22), contacts K–CR3c (line 21) and contacts K–CR2b (line 17). The relay K–TS then steps to position 9.

While the relay reaches position 9, relay contacts K–TS13 (line 26) open, de-energizing solenoid valve K–SV1 (line 26) causing cylinder 1309 to start to retract. Relay contacts K–TS15 (line 29) open, de-energizing solenoid valve K–SV2 and cylinder 1307 starts to be extended. Limit switch K–LS2 opens when cylinder 1309 starts to retract, de-energizing relay K–CR2 (line 2) opening its contacts. This de-energizes relay K–CR9 (line 18). Limit switch K–LS1A closes when cylinder 1309 is fully retracted, energizing relay K–CR1 (line 1). Limit switch K–LS3 (line 3) opens, de-energizing relay K–CR3 when cylinder 1307 starts to be extended. Contacts K–CR3a (line 17) close, K–CR3b (line 30) open, K–CR3c (line 21) open and K–CR3d (line 13) open. Limit switch K–LS4 (line 4) closes when cylinder 1307 is fully extended, energizing relay K–CR4. Relay K–TS becomes energized through contacts K–CR1c, K–CR4d, K–CR5d, K–CR6b and contacts K–TS9 (line 23). The relay then steps to position 10, opening contacts K–TS9.

When the relay is in position 10, contacts K–TS10 (line 24) are closed, but contacts M–CR9a (line 24) are open due to energization of relay M–CR9 of the turret circuit. When the shot pins on the turret go down, relay contacts M–CR9a (line 24) close and the relay K–TS steps to position 1 through positions 11 and 12. Relay contacts M–CR9b (line 11) are open preventing the bead setter from operating until a new shot pin signal is received.

When the relay K–CR1 is energized, as occurred when K–TS was in position 9 contacts K–CR1c (line 23) close and relay K–CR11 (line 25A) becomes energized through contacts K–CR1c, K–CR4d, K–CR5d, K–CR6b (line 23), K–CR7c (line 25A) and K–CR8c (line 25A). Contacts of relay K–CR11 in series with relay E–CR13 of the bead servicer circuit then close. When the turret develops a new shot pin signal, closing contacts of relay M–CR9 in series with relay E–CR13, relay E–CR13 is energized. Contacts E–CR13d (line 31A) then close, energizing solenoid valve K–SV4 (line 32) and extending fingers 1400, 1400', 1400'' to grip the bead. The conditions corresponding to this point in the operating cycle are then restored.

Considering now the operation of switch K–CS1 on turret 2, latch relay K–CR14a and K–CR14b and relay K–CR13, when the cylinder 1309 is fully extended, relay K–CR2 is energized through limit switch K–LS2 (line 2) and relay contacts K–CR2e (line 20) close, energizing relay K–CR14a (line 20). Latch relay contacts K–CR14a (line 19), K–CR14b (line 21) close, energizing relay K–CR13 (line 19). At this time switch K–CS1 on the turret 2 is open. When cylinder 1309 starts to be retracted, relay K–CR2 is de-energized. Contacts K–CR2d (line 20) open, de-energizing latch relay K–CR14a. The contacts K–CR14a and K–CR14b (lines 19 and 21) are latched closed. The turret then indexes when the turret arrives at the 290° position, switch K–CS1 (line 21) momentarily closes, energizing latch relay K–CR14b, opening contacts K–CR14a (line 19) and K–CR14b (line 21) and thereby de-energizing relay K–CR13 and latch relay K–CR14b (line 21). De-energization of relay K–CR13 signals that the bead setter has completed its cycle. If for some reason the bead setter does not complete its cycle, the operation of the turret circuit will be stopped due to failure of contacts of relay K–CR13 to complete the turret M control circuits.

The operation of switch K–CS1, latch relay K–CR14a and K–CR14b, and relay K–CR13 occurs in a similar manner when no carcass is on the drum. However, in the event that there is no carcass on the drum, photocell contacts K–PC1B (line 19) remain closed and relay K–CR15 (line 22) becomes energized. Contacts K–CR15b (line 18) close and contacts K–CR15c (line 30) open. This prevents raising the fingers 1337 and prevents inflation of the bladder. Contacts K–CR15a (line 10A) cause the stepping relay K–TS to advance to position 1 without pause, returning the bead setter to its initial condition.

Limit switch contacts K–LS1B, activated with limit switch contacts K–LS1, and contacts of relays K–CR10 and K–CR13 are connected to the M circuits controlling the turret operation. Contacts of relay K–CR8 and K–CR16 are also connected to the main line panel, as previously described. Contacts K–CR10 and K–CR11 are connected to the bead servicer E circuits. Limit switch contacts K–LS8C, activated with limit switch contacts K–LS8A and K–LS8B, is connected to bead servicer E circuits.

The electrical circuits of the second bead setter are similar to those just described. A limit switch equivalent to photocell K–PC1 may be utilized, if desired, to determine whether a carcass is on the drum. Certain relay contacts controlled by relays (not shown) of the second bead setter circuits are designated herein by contact legends including the letter H, such as contacts M–HCR10b of the turret circuits.

*Explanation of operation of bead servicer circuits*

Considering now the electrical sequence of operation of the bead servicer 1500 with reference to FIGS. 72a, 72b, 75 and 76, it will be assumed that the position of all mechanical elements of the bead servicer and the status of switch actuation and solenoid energization are the same as stated hereinbefore at the start of the description of the mechanical functioning of this apparatus. The status of relay energization at the aforementioned start of the bead transfer cycle is as follows: Relay E–CR1 is energized, "stop" pushbutton E–PB1 being closed and "start" pushbutton E–PB2 (line 1) being open, and contacts E–CR1a (line 2) and E–CR1b (line 29) are closed; relay E–CR2 (line 3) is not energized, limit switch E–LS1 (line 3) being open, and contacts E–CR2a (line 4) and E–CR2b (line 42) and E–CR2c (line 46) are open while contacts E–CR2d (line 47), E–CR2e (line 51), E–CR2f (line 37) and E–CR2g (line 27) are closed; relay E–CR3 (line 8) is not energized, limit switch E–LS3 (line 8) being open and contacts E–CR3a (line 7), E–CR3b (line 43), E–CR3d (line 47) are open while contacts E–CR3c (line 46), E–CR3e (line 50), E–CR3f (line 36A), and E–CR3g (line 27A) are closed; relay E–CR4 (line 9) is not energized, limit switch E–LS4 (line 9) being open and contacts E–CR4b (line 33A), E–CR4c (line 36A), E–CR4d (line 42) and E–CR4e (line 44) are open, while contacts E–CR4a (line 4), E–CR4f (line 45), E–CR4g (line 46) and E–CR4h (line 13) are closed; relay E–CR5 (line 10) is energized, limit switch E–LS5 (line 10) being closed and contacts E–CR5a (line 7), E–CR5f (line 45), E–CR5g (line 47) and E–CR5h (line 15) are open, while contacts E–CR5b (line 32A), E–CR5c (line 37A), E–CR5d (line 39 and E–CR5e (line 43) are closed; relay E–CR6 (line 11) is not energized, limit switch E–LS6 (line 11) being open and contacts E–CR6a (line 14), E–CR6d (line 28) and E–CR6e (line 39) are open, while contact E–CR6c (line 22) is closed; relay E–CR7 (line 12) is not energized, limit switch E–LS7 (line 12) being open, and contact E–CR7a (line 37) is closed while contact E–CR7c (line 50) is open; relay E–CR8 (line 13) is not energized limit switch E–LS8 (line 13) being open and contacts E–CR8a (line 14) and E–CR8b (line 28) are open while contact E–CR8c (line 39) is closed; relay E–CR9 (line 16) is energized, limit switch E–LS13 (line 16) and limit switch contact E–LS12B (line 16) being closed, and relay contact E–CR9a (line 53) is closed; relay E–CR10 (line 17) is not energized, limit switch E–LS10 (line 17) being open, and contact E–CR10a (line 42) is open while relay contacts E–CR10c (line 50) and E–CR10d (line 47) are closed; relay E–CR11 is not energized, limit switch contact E–LS11A (line 18) being open and relay contacts E–CR11a (line 18A) and E–CR11d (line 47) are open while contact E–CR11c (line 34A) is closed; relay E–CR12 (line 19) is energized, being locked in through contacts E–CR12a and E–CR13b, and contact E–CR12a (line 20) is closed while contact E–CR12b (line 38) is open; relay E–CR13 (line 21) is energized, being locked in through contacts E–CR6c (line 22) and E–CR13c (line 22), and contacts E–CR13a (line 18), E–CR13e (line 31A), and E–CR13f (line 33) are open while contacts E–CR13b (line 19), E–CR13c (line 22), E–CR13d (line 53) and E–CR13g (line 37) are closed; relay E–CR14 (line 28) is not energized and contacts E–CR14a (line 25) and E–CR14e (line 37) are closed while contacts E–CR14b (line 26), E–CR14c (line 31) and E–CR14d (line 33) are open; relay E–CR15 (line 33) is not energized, contact E–CR13f (line 33) being open, and contacts E–CR15a (line 34) and E–CR15b (line 35) are open; and fail relay E–CR16 (line 27) is energized, contacts E–CR16a (line 27A), E–CR16b (line 35A) and E–CR16c (line 53) being closed. Time delay relay E–TR1 (line 14) is not energized and contact E–TR1a (line 13) is open. Bead setter relay K–CR11 is not yet energized and relay contact K–CR11a (line 35A) is open.

Referring now to the sequence charts, FIGS. 75 and 76, as well as to the circuit diagrams, FIGS. 72a and 72b, in aid of the following description of the electrical sequence of operation of the bead servicer 1500, when the arm 1575 reaches its transfer position relative to barrel #1 (1516), switch contact E–LS6 (line 11) closes energizing relay E–CR6 (line 11). Relay contact E–CR6a (line 14) closes providing a future path for locking in time relay E–TR1 (line 14) and relay E–CR8 (line 13). Contact E–CR6c (line 22) opens de-energizing relay E–CR13 (line 21). Contact E–CR6d (line 28) closes providing a future path for the energization of relay E–CR14 (line 28). Contact E–CR6e (line 39) closes energizing solenoid E–S5 (line 42) through contacts E–CR1b (line 29), E–CR8c (line 39) and E–CR5d (line 39). The de-energization of relay E–CR13 (line 22) causes contact E–CR13a (line 18) to close providing a future path for the energization of relay E–CR11 (line 18). Contact E–CR13b (line 19) opens de-energizing relay E–CR12 (line 19). Contact E–CR13c (line 22), the locking contact for relay E–CR13, opens. Contact E–CR13d (line 53) opens preventing the bead setter fingers 1400, 1400' and 1400" from again advancing radially inward until the arm 1575 has again returned with a bead to clamping position at the bead setter 1300. Contact C–CR13e (line 31A) closes providing a future path for locking in relay E–CR14 (line 28). Contact E–CR13f (line 33) closes providing a future path for the energization of relay E–CR15 (line 33). Contact E–CR13g (line 37) opens de-energizing solenoid E–S1B (line 37), and solenoid valve E–SV1 returns to its closed position, stopping the motion of arm 1575. The de-energization of relay E–CR12 (line 19) causes contact E–CR12a (line 20), the locking contact for relay E–CR12, to open. Contact E–CR12b (line 38) closes providing a future path for the energization of solenoid E–S1B (line 37).

The energization of solenoid E–S5 (line 42) causes the arm 1539 to rotate unclamping the bead release fingers 1550, thereby permitting the beads to move forward under the influence of the springs 1534c, and closing switch contact E–LS8 (line 13). This energizes time relay E–TR1 (line 14) through contact E–CR4a (line 13). After a time delay of ½ second, contact E–TR1a (line 13) closes energizing relay E–CR8 (line 13). Contact E–CR8a (line 14) closes locking in relays E–CR8 (line 13) and E–TR1 (line 14) through contact E–CR6a (line 14). Contact E–CR8b (line 28) closes energizing relay E–CR14 (line 28) through contact E–CR6d (line 28). Contact E–CR8c (line 39) opens de-energizing solenoid E–S5 (line 22) thereby permitting the arm 1539 and the bead release fingers 1550 to return to the clamping position under the influence of the springs 1540. Switch contact E–LS8 (line 13), therefore, opens, but does not de-energize locked in relays E–CR8 (line 13) and E–TR1 (line 14). The energization of relay E–CR14 (line 28) causes contact E–CR14 (line 25) to open de-energizing solenoid E–S7 (line 25). Contact E–CR14b (line 26) closes energizing solenoid E–S7A (line 26). Solenoid valve E–SV7 is thus actuated to shift the cylinder 1579 and to grip the newly advanced bead with bead gripping elements 1584. Contact E–CR14c (line 31) closes, locking relay E–CR14 (line 28) in through relay contact E–CR13e (line 31A). Contact E–CR14d (line 33) closes energizing relay E–CR15 (line 33) through contacts E–CR1b (line 29) E–CR5b (line 32A) and E–CR13f (line 33). Contact E–CR14e (line 37) opens preventing solenoid E–S1B (line 37) from becoming energized. Contact E–CR15a (line 34) closes locking in relay E–CR15 (line 33) through contacts E–CR1b (line 29) E–CR13f (line 33). Contact E–CR15b (line 35) closes energizing solenoid E–S1A through contacts E–CR1b (line 29) and E–CR11c (line 34A). Solenoid E–S1A, as previously noted, opens valve E–SV1 and initiates the movement of the arm 1575 to the bead setter 1300.

As the arm 1575 leaves the storage barrel 1516, switch contact E–LS6 (line 11) opens de-energizing relay E–CR6 (line 11). Contact E–CR6a (line 14) opens de-energizing relays E–CR8 (line 13) and E–TR1 (line 14). Contact E–CR6c (line 22) closes readying a future path for locking in relay E–CR13 (line 21). Contact E–CR6d (line 28) opens, but relay E–CR14 (line 28) remains locked in. Contact E–CR6e (line 39) opens preventing solenoid E–S5 (line 42) from becoming energized. Contacts E–CR8a (line 14) and E–CR8b (line 28) opens. Contact E–CR8c (line 39) closes readying a future path for energization of solenoid E–S5 (line 42). Contact E–TR1a (line 13) opens.

As the arm 1575 reaches the vertical position during its travel toward the bead setter 1300, switch contact E–LS11A (line 18) closes, energizing relay E–CR11 (line 18) through contact E–CR13a (line 18). Switch contact E–LS11B (line 19) also closes but performs no function because of the open contact E–CR13b (line 19). Contact E–CR11a (line 18A) closes locking in relay E–CR11 (line 18) through contact E–CR13a (line 18). Contact E–CR11c (line 34A) opens de-energizing solenoid E–S1A (line 35) and stopping motion of arm 1575 until such time as the bead setter, through contact K–CR11a (line 35A) signals a demand for a bead. The arm 1575, therefore, comes to rest at the vertical. Contact E–CR11d (line 47) closes but no action occurs because both relays E–CR2 (line 3) and E–CR3 (line 8) are unenergized.

A signal from the bead setter 1300 demanding a bead closes relay contact K–CR11a (line 35A) reenergizing solenoid E–S1A through relay contacts E–CR1b (line 29), E–CR15b (line 35) and E–CR16b (line 35A), and the arm 1575 resumes its travel towards the bead setter 1300. As a condition precedent to this bead demand signal, limit switch contact K–LS8B (line 30A) will have closed as the fingers 1400, 1400′ and 1400″ were retracted radially outward releasing the previously delivered bead. As the arm 1575 leaves the vertical position switch contacts E–LS11A (line 18) and E–LS11B (line 19) open, but no further action results. Relay E–CR11 (line 18) remains locked in through contacts E–CR11a (line 18A) and E–CR13a (line 18).

As the arm 1575 approaches the path of forward motion of the bead setter 1300, switch contact E–LS13 (line 16) opens de-energizing relay E–CR9 (line 16). Contact E–CR9a (line 53) opens sending a signal to the bead setter 1300 (panel K) to prevent any forward motion of the bead setter 1300 while the arm 1575 is in the way.

When the arm 1575 reaches its transfer position at the bead setter 1300, switch contact E–LS12A (line 21) closes energizing relay E–CR13 (line 21) and switch contact E–LS12B (line 16) opens further insuring against forward motion of the bead setter 1300 while the arm 1575 is in the way. Contact E–CR13a (line 18) opens de-energizing relay E–CR11 (line 18). Contact E–CR13b (line 19) closes preparing a future path for the energization of relay E–CR12 (line 19). Contact E–CR13c (line 22) closes locking in relay E–CR13 (line 21) through contact E–CR6c (line 22). Contact E–CR13d (line 53) closes signaling the bead setter 1300 that the fingers 1400, 1400′ and 1400″ are to be advanced radially inward to grip the bead. Contact E–CR13e (line 31A) opens but relay E–CR14 (line 28) remains locked in through contacts E–CR14c (line 31) and K–LS8B (line 30A). Contact E–CR13f (line 33) opens deenergizing relay E–CR15 (line 33). Contact E–CR13g (line 37) closes readying a future path for the energization of solenoid E–S1B (line 37). The de-energization of relay E–CR11 (line 18) causes contact E–CR11a (line 18A) to open. Contact E–CR11c (line 34A) closes readying a path for the energization of solenoid E–S1A (line 35) on the next cycle. Contact E–CR11d (line 47) opens, but no action occurs. The deenergization of relay E–CR15 (line 33) opens contacts E–CR15a (line 34) and E–CR15b (line 35), the opening of the latter contact resulting in the de-energization of solenoid E–S1A (line 35) and the return of valve E–SV1 to its closed position.

As the bead setter fingers 1400, 1400′ and 1400″ grip the bead, the bead switch contact K–LS8B (line 30A) opens de-energizing relay E–CR14 (line 28). Also K–CR11a (line 35A) opens, the demand for a bead having been satisfied. Contact E–CR14a (line 25) closes energizing solenoid E–S7 (line 25) and contact E–CR14b (line 26) opens de-energizing solenoid E–S7A (line 26) whereby the bead gripping elements on arm assembly 1503 retract radially inwardly releasing the bead to the bead setter fingers 1400, 1400′ and 1400″. Contact E–CR14c (line 31) opens and contact E–CR14d (line 33) opens, but no action results. Contact E–CR14e (line 37) closes energizing solenoid E–S1B (line 37) through contacts E–CR1b (line 29), E–CR13g (line 37) and E–CR12b (line 38). There is a parallel closed circuit through contacts E–CR7a (line 37), E–CR5c (line 37A) and E–CR2f (line 37A). Solenoid ES1B actuates the valve E–SV1 so that arm 1575 now begins its return travel to the storage barrels 1516.

As the arm 1575 leaves the bead setter 1300, switch contact E–LS12A (line 21) opens and switch contact E–LS12B (line 16) closes. Relay E–CR13 (line 21) remains locked in through contacts E–CR6c (line 22) and E–CR13c (line 22). When the arm 1575 is clear of the path of forward travel of the bead setter 1300, switch contact E–LS13 (line 16) closes energizing relay E–CR9 (line 16). Contact E–CR9a (line 53) closes to signal the bead setter 1300 that the arm 1575 is clear and forward motion may commence.

As the arm 1575 reaches its vertical or mid-point position, switch contacts E–LS11A (line 18) and E–LS11B (line 19) close, and relay E–CR12 (line 19) is energized through contact E–CR13b (line 19). Since contact E–CR13a (line 18) is open no action results from the closing of contact E–LS11A (line 18). Contact E–CR12a (line 20) closes locking in relay E–CR12 (line 19). Contact E–CR12b (line 38) opens and will de-energize solenoid E–S1A if relay E–CR7 (line 12) is energized because the shot pin is disengaged or if relay E–CR2 (line 3) is energized because barrel #1 is empty or if relay E–CR5 (line 10) is not energized because the barrels 1516 are in the process of interchanging positions. Since this operation cycle description assumes that barrel #1 is up and is not empty, solenoid E–S1A will not be de-energized at this point. Therefore, switch contacts E–LS11A (line 18) and E–LS11B (line 19) again open without further effect as the arm 1575 proceeds towards the barrel 1516. This description of the usual transfer cycle is now complete since the arm 1575 is back at the assumed starting point. This cycle is repeated over and over again until the last bead is removed from barrel #1. Also, while the foregoing description of the functioning of the electrical control system has been presented with reference to the functioning of this apparatus with barrel #1 in the uppermost position, it should be appreciated and will be obvious from the accompanying drawings that an equivalent cycle takes places when barrel #2 is in the uppermost position. In the equivalent cycle with respect to barrel #2 the functions of the following last mentioned elements are replaced by the functions of the following first mentioned equivalent elements: solenoid E–S6 (line 43) replaces solenoid E–S5 (line 42), limit switch E–LS4 (line 9) replaces limit switch E–LS5 (line 10), limit switch E–LS9 (line 15) replaces limit switch E–LS8 (line 13) and relay E–CR4 (line 9) replaces relay E–CR5 (line 10).

Considering now the sequence of operation of the electrical control system when the last remaining bead is removed from barrel #1, when solenoid E–S5 (line 42) is de-energized after the last remaining bead has been pushed from the barrel #1, the action of springs 1540 causes limit switch E–LS1 (line 3) to close energizing relay E–CR2 (line 3). Contact E–CR2a (line 4) closes locking in relay E–CR2 (line 3) through contact E–CR4a (line 4) and through parallel limit switch contact E–LS2A (line 5). Contact E–CR2b (line 42) closes readying a path for the future energization of solenoid E–S5 (line 42). Contact E–CR2c (line 46) closes readying a path for the future energization of solenoid E–S2 (line 47). Contact E–CR2d (line 47) opens but performs no function at this time. Contact E–CR2e (line 51) opens to prevent solenoid E–S4b (line 51) from becoming energized. Contact E–CR2f (line 37A) opens preventing solenoid E–S1B (line 37) from becoming energized. Contact E–CR2g (line 27) opens, but does not drop out fail relay E–CR16 (line 27) which remains locked in through contacts E–CR16a (line 27A) and E–CR3g (line 27A). It should be noted that, if barrel #2 were also empty of beads at the time that the last bead was removed from barrel #1, then relay E–CR16 (line 27) would be de-energized by the opening of contact E–CR2g (line 27) because contact E–CR3g (line 27A) would also be open.

When the arm 1575 reaches its mid-point or vertical position in its travel to the bead setter 1300, as previously indicated, switch contact E–LS11A (line 18) closes energizing relay E–CR11 (line 18) through contact E–CR13a (line 18). Contact E–CR11a (line 18A) closes locking in relay E–CR11 (line 18) and the action of the other contacts of relay E–CR11 (line 18) is the same as previously noted; however, this time, when contact E–CR11d (line 47) closes, it energizes solenoid E–S2 (line 47) through contacts E–CR1b (line 29), E–CR10d (line 47), E–CR2c (line 46), E–CR3c (line 46), and E–CR4g (line 46).

When energized, solenoid E–S2 (line 47) disengages or unlocks the shot pin 1561, which, in turn, closes limit switch contact E–LS7 (line 12) energizing relay E–CR7 (line 12). Contact E–CR7a (line 37) opens preventing the arm 1575 from returning to the barrels 1516 past its vertical or mid-point position on the return trip from the bead setter 1300. Contact E–CR7c (line 50) closes energizing solenoid E–S4A (line 50) through contacts E–CR1b (line 29), E–CR10c (line 50) and E–CR3e (line 50). It should be noted that if both barrels 1516 are empty, contact E–CR3e (line 50) will be open and solenoid E–S4A (line 50) cannot become energized.

Solenoid E–S4A (line 50) then causes the interchange of the positions of barrel #1 and barrel #2 as noted hereinbefore in connection with the mechanical sequence of operation. As barrel #1 leaves the "up" position limit switch contact E–LS5 (line 10) opens de-energizing relay E–CR5 (line 10). Contact E–CR5a (line 7) closes but performs no function since barrel #2 is not empty and relay E–CR3 (line 8) is not energized. Contact E–CR5b (line 32A) opens preventing relay E–CR15 (line 33) from becoming energized. Contact E–CR5c (line 37A) opens preventing solenoid E–S1B (line 37) from causing the arm 1575 to return past the vertical to the barrels 1516. Contacts E–CR5d (line 39) and E–CR5e (line 43) open preventing solenoids E–S5 (line 42 and E–S6 (line 43) from being energized. Contact E–CR5f (line 45) closes preventing solenoid E–S2 (line 47) from becoming de-energized while the barrels 1516 are being interchanged. Contact E–CR6g (line 47) closes setting up a future path for the energization of solenoid E–S2 (line 47) when barrel #2 is empty. Contact E–CR5g (line 15) closes setting up a future path for the energization of relay E–CR8 (line 13) and of relay E–TR1 (line 14) when barrel #2 is in the "up" position.

As barrel #1 arrives at the "down" position, limit switch contact E–LS4 (line 9) closes energizing relay E–CR4 (line 9). Contact E–CR4a (line 4) opens, but relay E–CR2 (line 3) remains energized through limit switch contact E–LS1 (line 3). Contact E–CR4b (line 33A) closes setting up a path for the energization of relay E–CR15 (line 33). Contact E–CR4c (line 36A) closes setting up a path for the future energization of solenoid E–S1B (line 37). Contact E–CR4d (line 42) closes setting up a future path for the energization of solenoid E–S5 (line 42). Contact E–CR4e (line 44) closes setting up a future path for the energization of solenoid E–S6 (line 43). Contacts E–CR4f (line 45) and E–CR4g (line 46) open de-energizing solenoid E–S2 (line 47). Contact E–CR4h (line 13) opens but performs no immediate function in so doing.

The net effect of the de-energization of relay E–CR5 and the energization of relay E–CR4 is to set up the alternative paths for the energization of the aforementioned solenoids and relays with barrel #2 in the "up" position, the normal sequence of operation being exactly the same as with barrel #1 in the "up" position as heretofore described. However, with barrel #2 in the "up" position, solenoid E–S6 (line 43) will operate in the normal cycle and solenoid E–S5 (line 42) will not.

When solenoid E–S2 (line 47) becomes de-energized the shot pin 1561 again locks the frame 1517 and limit switch contact E–LS7 (line 12) opens de-energizing relay E–CR7 (line 12). Contact E–CR7a (line 37) closes permitting the arm 1575 to be returned to the barrels 1516 through the action of solenoid ES1B (line 37). Contact E–CR7c (line 50) opens de-energizing solenoid E–S4A (line 50). Since the barrels 1516 are now locked in place by the shot pin 1561, hydraulic pressure is no longer needed in the motor 1555.

With barrel #1 down and empty, a fresh supply of beads may now be transferred to it by manual operation of the loader 1504 while the normal cycle of transferring beads from barrel #2 to the bead setter 1300 proceeds upon demand from the bead setter 1300. As the loader 1504 is moved forward toward barrel #1 from its rearmost latched position limit switch contact E–LS10 (line 17) closes energizing relay E–CR10 (line 17). Contact E–CR10a (line 42) closes energizing solenoid E–S5 (line 42) through contacts ECR2b (line 42) and E–CR4d (line 42). Contact ECR10c (line 50) opens preventing energization of solenoids E–S4A (line 50) and E–S4B (line 51) while the loader 1504 is not at its rearmost position. Contact E–CR10d (line 47) opens preventing energization of solenoid E–S2 (line 47) while the loader 1504 is not at its rearmost position. Solenoid E–S5 (line 42) retracts the bead release fingers 1550 of barrel #1 radially inward so that a fresh supply of beads can be slipped onto the barrel. Limit switch contact E–LS8 (line 13) closes but relay E–TR1 (line 14) does not become energized because contact E–CR4h (line 13) is open. Limit switch contact E–LS1 (line 3) opens but relay E–CR2 (line 3) remains locked in through limit switch contact E–LS2A (line 5) and relay contact E–CR2a (line 4).

When the loader reaches its extreme forward position limit switch contacts E–LS2A (line 5) and E–LS2B (line 6) open. The opening of contact E–LS2A (line 5) de-energizes relay E–CR2 (line 3). Contact E–CR2a (line 4) drops out preventing relay E–CR2 from again becoming energized when limit switch contact E–LS2A again closes. Contact E–CR2b (line 42) opens de-energizing solenoid E–S5 and permitting the fingers 1550 to clamp the freshly loaded beads again opening switch contact E–LS8 (line 13). Contact E–CR2c (line 46) opens, but performs no function. Contact E–CR2d (line 47) closes setting up a future path for the energization of solenoid E–S2 (line 47). Contact E–CR2e (line 51) closes setting up a future path for the energization of solenoid E–S4B (line 51). Contact E–CR2f (line 37A) closes setting up a future path for the energization of solenoid ES1B (line 37). Contact E–CR2g (line 27) closes so that relay E–CR16 (line 27) will not be de-energized when barrel #2 is empty and contact E–CR3g (line 27A) opens.

As the loader 1504 is moved rearward from the barrels 1516 switch contacts E–LS2A (line 5) and E–LS2B (line 6) close but perform no function. When the loader 1504 reaches its rearmost position switch contact E–LS10 (line 17) opens de-energizing relay E–CR10 (line 17). Contact E–CR10a (line 42) opens, but performs no function. Contact E–CR10c (line 50) closes setting up a future path for the energization of solenoids E–S4A (line 50) and E–S4B (line 51). Contact E–CR10d (line 47) closes setting up a future path for the energization of solenoid E–S2 (line 47).

It should be noted that the fail relay E–CR16 (line 27) will become de-energized only when both barrels 1516 are empty and contacts E–CR2g (line 27) and E–CR3g (line 27A) are open. Contact E–CR16a (line 27A) will open preventing reenergization of relay E–CR16 (line 27) except by reset button E–PB3 (line 27). Contact E–CR16b (line 35A) will open preventing the arm 1575 from rotating to the bead setter 1300 and contact E–CR16c (line 53) will open signaling the main control panel that a fail condition exists in the bead servicer 1500.

From the foregoing description it will be apparent that an apparatus and method in accordance with the invention have many advantages. The apparatus and method of the present invention are operative as a fully integrated and automatic machine and method capable of making tire carcasses of uniform quality at a high production rate. While the apparatus has been described in connection with the manufacture of two-ply carcasses, it will be obvious to those skilled in the art that tire carcasses of a different number of plies, for example, four plies, can be readily constructed by apparatus in accordance with the invention.

The turrets are utilized in a compact arrangement operatively synchronized with the turret loader and with bead stters for applying beads to both ends of the carcass. Bead servicers have the advantage of storing an inventory of beads and of transferring them one at a time, on demand, to the bead setters to obtain synchronized and continous bead setter operation. The bead setters are effective to set beads accurately and quickly and, while firmly holding the beads, automatically to turn up plies around the beads. The bead setters also retract the extended bands of the drums. The carcass remover has the advantage of automatically removing the carcasses from the drums, and the drum return conveyor system has the advantage of automatically removing the drums from the turret and returning the drums to the band-positioning apparatus.

The terms "fabric" and "sheet material" are used interchangeably herein.

While there have been described what are at present considered to be preferred embodiments of this invention, it will be obvious to those skilled in the art that various changes and modifications may be made therein without departing from the invention, and it is, therefore, aimed to cover all such changes and modifications as fall within the true spirit and scope of the invention.

Having thus described our invention, what we claim and desire to protect by Letters Patent is:

1. Apparatus for removing a band of sheet material disposed on the cylindrical surface of a drum, comprising: a frame; a carriage movably supported on said frame and adapted, when moved in a first direction, to engage said band disposed on said drum in the region of an extreme perimeter of said band; means for moving said carriage in said first direction; means for clamping said region of said band to said carriage; and means for moving said carriage in a second direction, substantially axially away from said drum, while the said region of said band is clamped to said carriage, to thereby remove said band from said drum.

2. The apparatus of claim 1 additionally comprising means for introducing compressed gas between the band and the drum sufficient to inflate the band about the drum to reduce the adherence of said band to said drum, said band being formed of a flexible material.

3. The apparatus of claim 2 aditionally comprising second clamping means carried by said frame and adapted to grippingly encircle the region of the other extreme perimeter of the band to facilitate the said inflation of said band about said drum.

4. For use in a tire-building machine employing cylindrical drums about which tire carcasses having beaded ends are formed, a carcass remover comprising: a frame; a carriage movably supported on said frame and adapted, when moved in a first direction, to engage a beaded end of the tire carcass disposed on a fixedly supported drum; means for moving said carriage in said first direction; means for clamping said beaded end of the carcass to said carriage; and means for moving said carriage in a second direction, substantially axially away from the drum, while the beaded end of the carcass is clamped to said carriage, to thereby remove the carcass from the drum.

5. A carcass remover in accordance with claim 4 which includes means for introducing fluid under pressure between the carcass and the drum.

6. For use in a tire-building machine in which tire carcasses having beaded ends are formed on cylindrical drums and in which said drums, each bearing a fabricated carcass with at least one beaded end projecting axially from said drum, are fixedly supported each to provide a projecting free end, a carcass remover comprising: a frame; a carriage supported on said frame and movable between a first position remote from said free end and a second position adjacent to said free end; means for moving said carriage from said first position to said second position; clamping means carried by said carriage and adapted to clamp the projecting beaded end of the carcass to said carriage when said carriage is in said second position; and means for moving said carriage back to said first position while the carcass is clamped thereto, to thereby remove the carcass from the drum.

7. A carcass remover in accordance with claim 6 which includes means for introducing a gas under pressure between the carcass and the drums.

8. In a tire-building machine in which tire carcasses having beaded ends are formed on cylindrical drums and in which said drums, each bearing a fabricated carcass with at least one beaded end projecting axially from said drum, are fixedly supported at one end to provide a second projecting free end, a carcass remover comprising: a frame; a carriage supported on said frame and movable between a first position remote from said free end and a second position adjacent to said free end; means for moving said carriage from said first position to said second position; first clamping means carried by said carriage and adapted to clamp the projecting beaded end of the carcass to said carriage when said carriage is in said second position; second clamping means carried by said frame and adapted to encircle the beaded end of the carcass at the supported end of the drum; means for introducing compressed gas between the carcass and the drum sufficient to thereby inflate the carcass about the drum; means for thereafter opening said second clamping means; and means for thereafter moving said carriage back to said first position, to thereby remove the carcass from the drum.

9. A carcass remover in accordance with claim 8 in which said means for introducing compressed gas between the carcass and the drum continues the introduction of compressed gas while said carriage is moving back to said first position.

10. A carcass remover as described in claim 9 wherein said carriage includes a vertical support plate having an annular contoured surface thereon shaped to complement the shape of the beaded end of the carcass to receive said beaded end thereon, and in which said first clamping means comprises first and second crescent-shaped members adaped to clamp the projecting beaded end of the carcass against the contoured surface on said vertical support plate.

11. A carcass remover in accordance with claim 10 wherein said second clamping means also includes first and second crescent-shaped members adapted to encircle the beaded end of the carcass at the supported end of the drum, said first and second members being supported from the frame and pivotally connected thereto by means of a pair of arms and therewith constituting a pair of tong-like clamps.

12. A carcass remover in accordance with claim 10 wherein said vertical support plate is provided with an annular chamber and includes a plurality of circumferentially spaced apart apertures located radially inwardly of said contoured surface and communicating between said chamber and the interior of said carcass, said chamber being adapted to be connected to a source of compressed gas for introduction between said carcass and said drum.

13. In a tire-building machine in which tire carcasses having beaded ends are formed on cylindrical drums and in which said cylindrical drums, each bearing a fabricated carcass with beaded ends projecting axially from said drum, are successively presented in a position of axial alignment to an automatic carcass remover, said drums each fixedly supported at a first end to provide a second projecting free end, the combination comprising: a frame; a carriage supported on said frame and movable between a first position remote from said free end and a second position adjacent to said free end; first clamping means carried by said carriage and adapted to clamp the projecting beaded end of the carcass to said carriage when said carriage is in said second position; second clamping means carried by said frame and adapted to encircle the supported beaded end of the carcass; means responsive to the successive arrival of drums in axial operational alignment with said carriage for moving said carriage from said first position to said second position; means similarly responsive for actuating said second clamping means; means responsive to the arrival of said carriage at said second position for actuating said first clamping means; means responsive to the arrival of said first and said second clamping means in their respective clamping positions for introducing compressed gas between said carcass and the drum sufficient to inflate the carcass about the drum; means for de-actuating said second clamping means after a predetermined interval of clamping; means responsive to said de-actuation for returning said carriage to said first position while said first clamping means continues to clamp the projecting beaded end of the carcass to said carriage, thereby removing said carcass from said drums; means responsive to movement of said carriage beyond a predetermined position for terminating said introduction of compressed gas; and means responsive to the arrival of said carriage at said first position for de-actuating said first clamping means, thereby releasing said carcass from said carriage.

References Cited

UNITED STATES PATENTS

| | | | |
|---|---|---|---|
| 2,605,195 | 7/1952 | Boughton | 156—444 X |
| 2,772,838 | 12/1956 | Lenz | 242—81 X |
| 3,131,880 | 5/1964 | Miller et al. | 242—81 X |
| 3,152,941 | 10/1964 | Sherman et al. | 156—351 |

EARL M. BERGERT, *Primary Examiner.*

H. ANSHER, *Assistant Examiner.*